US012293289B2

(12) United States Patent
Charnock et al.

(10) Patent No.: US 12,293,289 B2
(45) Date of Patent: May 6, 2025

(54) SYSTEM TO DETECT, ASSESS AND COUNTER DISINFORMATION

(71) Applicant: Chenope, Inc., Half Moon Bay, CA (US)

(72) Inventors: Elizabeth Charnock, Half Moon Bay, CA (US); Steve Roberts, Half Moon Bay, CA (US); Kathrin Haag, Edinburgh (GB)

(73) Assignee: Chenope, Inc., Half Moon Bay, CA (US)

( * ) Notice: Subject to any disclaimer, the term of this patent is extended or adjusted under 35 U.S.C. 154(b) by 0 days.

(21) Appl. No.: 18/387,632

(22) Filed: Nov. 7, 2023

(65) Prior Publication Data
US 2024/0070457 A1 Feb. 29, 2024

Related U.S. Application Data

(62) Division of application No. 17/003,979, filed on Aug. 26, 2020, now Pat. No. 11,972,346.

(60) Provisional application No. 62/891,442, filed on Aug. 26, 2019.

(51) Int. Cl.
G06N 3/08 (2023.01)
G06F 16/951 (2019.01)
(Continued)

(52) U.S. Cl.
CPC ............ G06N 3/08 (2013.01); G06F 16/951 (2019.01); G06N 3/04 (2013.01); G06Q 50/01 (2013.01);
(Continued)

(58) Field of Classification Search
CPC ............ G06N 3/08; G06N 3/04; G06N 5/046; G06N 20/00; G06F 16/951;
(Continued)

(56) References Cited

U.S. PATENT DOCUMENTS 8,887,286 B2   11/2014  Dupont et al.
10,826,937 B2 * 11/2020  Irimie ..................... H04L 51/18
(Continued)

OTHER PUBLICATIONS

Bracewell, D., Tomlinson, M. & Mohler, M. (2013). Determining the conceptual space of metaphoric expressions. In Computational Linguistics and Intelligent Text Processing (pp. 487-500), Springer.
(Continued)

Primary Examiner — Khoi V Le
(74) Attorney, Agent, or Firm — Procopio, Cory, Hargreaves & Savitch LLP

(57) ABSTRACT

A computer-readable medium for the identification, measurement, and combatting of the influence of large-scale creation and distribution of disinformation is herein disclosed. An embodiment of this invention is comprised of one or more repositories of data which involve online comments and articles and attributes derived from them, one or more technical targeting systems, a content analysis system, a cost and influence estimation system, a dialog system, a performance management system, a bot design and test system, a security system, a multimedia content generator, one or more machine learning components, a data collection mechanism, separate consumer and human operator applications, and a mechanism for the creation and management of bots across multiple channels.

2 Claims, 89 Drawing Sheets

(51) Int. Cl.
*G06N 3/04* (2023.01)
*G06Q 50/00* (2012.01)
*G06F 16/9032* (2019.01)
*G06F 40/186* (2020.01)
*G06F 40/205* (2020.01)
*G06F 40/279* (2020.01)
*G06N 5/025* (2023.01)
*H04L 9/40* (2022.01)

(52) U.S. Cl.
CPC ...... *G06F 16/90332* (2019.01); *G06F 40/186* (2020.01); *G06F 40/205* (2020.01); *G06F 40/279* (2020.01); *G06N 5/025* (2013.01); *H04L 63/302* (2013.01)

(58) Field of Classification Search
CPC ............. G06F 16/90332; G06F 40/186; G06F 40/205; G06F 40/279; G06F 40/20; G06Q 50/01
See application file for complete search history.

(56) References Cited

U.S. PATENT DOCUMENTS

| | | | |
|---|---|---|---|
| 11,200,140 B2* | 12/2021 | Lin | G06F 11/3438 |
| 2017/0099200 A1* | 4/2017 | Ellenbogen | G06V 10/764 |
| 2017/0345003 A1 | 11/2017 | Spears et al. | |
| 2018/0102947 A1 | 4/2018 | Bhaya et al. | |
| 2019/0005021 A1 | 1/2019 | Miller et al. | |
| 2019/0208418 A1 | 7/2019 | Breu | |
| 2019/0356684 A1 | 11/2019 | Sinha et al. | |
| 2020/0104337 A1* | 4/2020 | Kelly | H04L 51/52 |

OTHER PUBLICATIONS

Hansen, M. 1998. The function of Discourse Particles. A Study with Special Reference to Spoken Standard French. Pragmatics and Beyond New Series 53.) Amsterdam: John Benjamins. http://rakhiv-mr.gov.ua/hutsulskyj-hovir/.

Lu, Xiaofei (2010). Automatic analysis of syntactic complexity in second language writing. International Journal of Corpus Linguistics, 15(4):474-496.

Michael Mohler, Bryan Rink, David Bracewell, and Marc Tomlinson. 2014. A Novel Distributional Approach to Multilingual Conceptual Metaphor Recognition. In Proceedings of COLING 2014, the 25th International Conference on Computational Linguistics: Technical Papers, No. 2, pp. 1752-1763.

Möller, Robert. "das Brötchen", https://www.atlas-alltagssprache.de/brotchen/.

Stukal [et al.] (2019). The Use of Twitter Bots in Russian Political Communication. PONARS Eurasia Policy Memo No. 564.

* cited by examiner

Strategic Dispatch[50000] and Targeting System[10000] Interactions

High Level System Architecture View

Different Types of Locations[405]

NLU[10100] and NLG[60035] Subsystem Functioning during an Engagement[125]

NLG[60035] & NLU[10100] Subsystems Overview

Sophistication level[51710]

Novelty[45100] Detection in One Embodiment

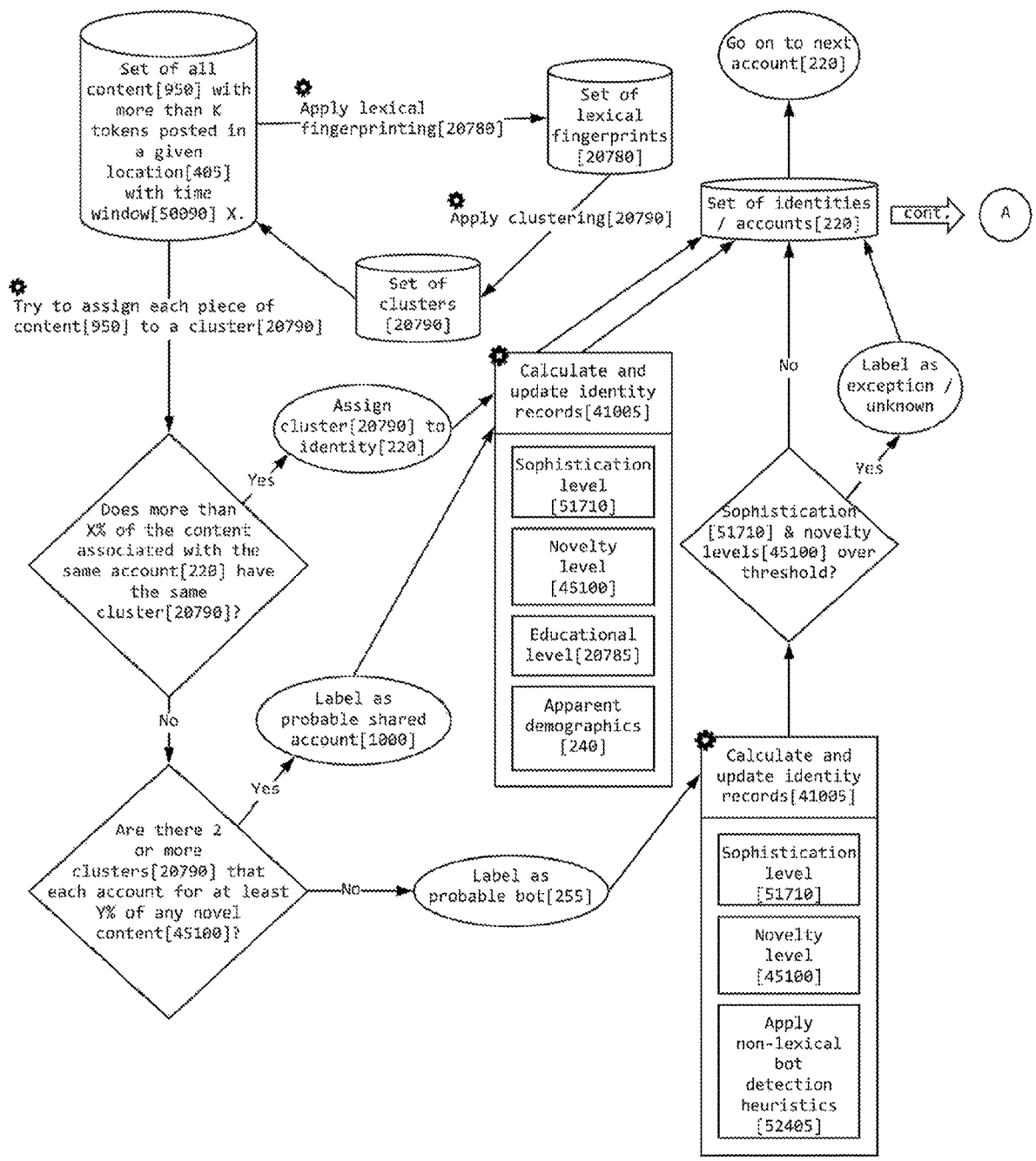

Labelling Adversary Identities[270]

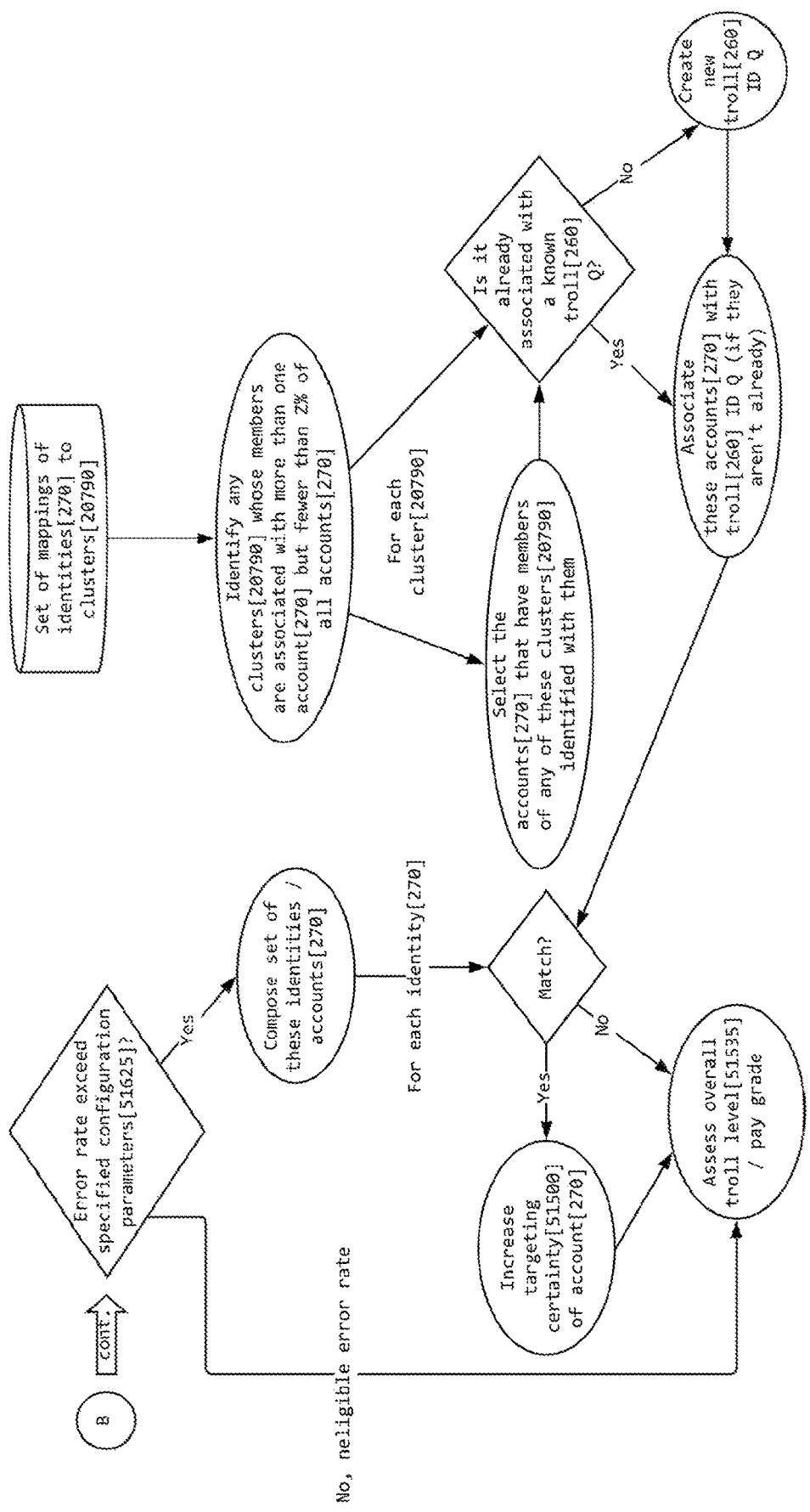

Shift[19600] Detection

Assessing Troll Level[51535] / Pay Grade

Dialect Map for the German Word "Bread Roll"

Assertion[11070] Relationships

Identifying Assertions[11070]

Relationships of Narratives[155]

An Example of Intersections of Articles[11080], Events[170] and Narratives[155]

Example of Assertable Elements in Covid Statistics

Figure 42 Aggregating Content[950] to Seek Basis Elements

Simple Example of Possible Basis Definition[52100] Based on Flynn Example

Partial Quoting[20770]: Overlapping Text Span Case

Partial quotes[20770] 1 and 2 will be considered logically equivalent since they share text spans B & C, and no other partial quotes[20770] have A. Partial quote[20770] 3 is not the same as it lacks B, which is not uniquely used. By contrast, partial quotes[20770] 4 and 5 will not be considered the same since J is also included in partial quote[20770] 6.

Partial Quoting[20770]: Determining Intent

Figure 47

Example of Partial Quoting[20770]

When approached by the police, [Floyd was foaming at the mouth.] ← Partial quote[20770] 1
When the police asked about that, Floyd replied that he had been ← Partial quote[20770] 2
"hooping earlier".
"Hooping" is a street term [that, in some locales, means placing ← Partial quote[20770] 3
drugs in one's anus.

Some junkies believe that absorbing drugs in that manner will produce a more intense and pleasurable sensation than that resulting from ingesting the drugs orally.

Types of Identities

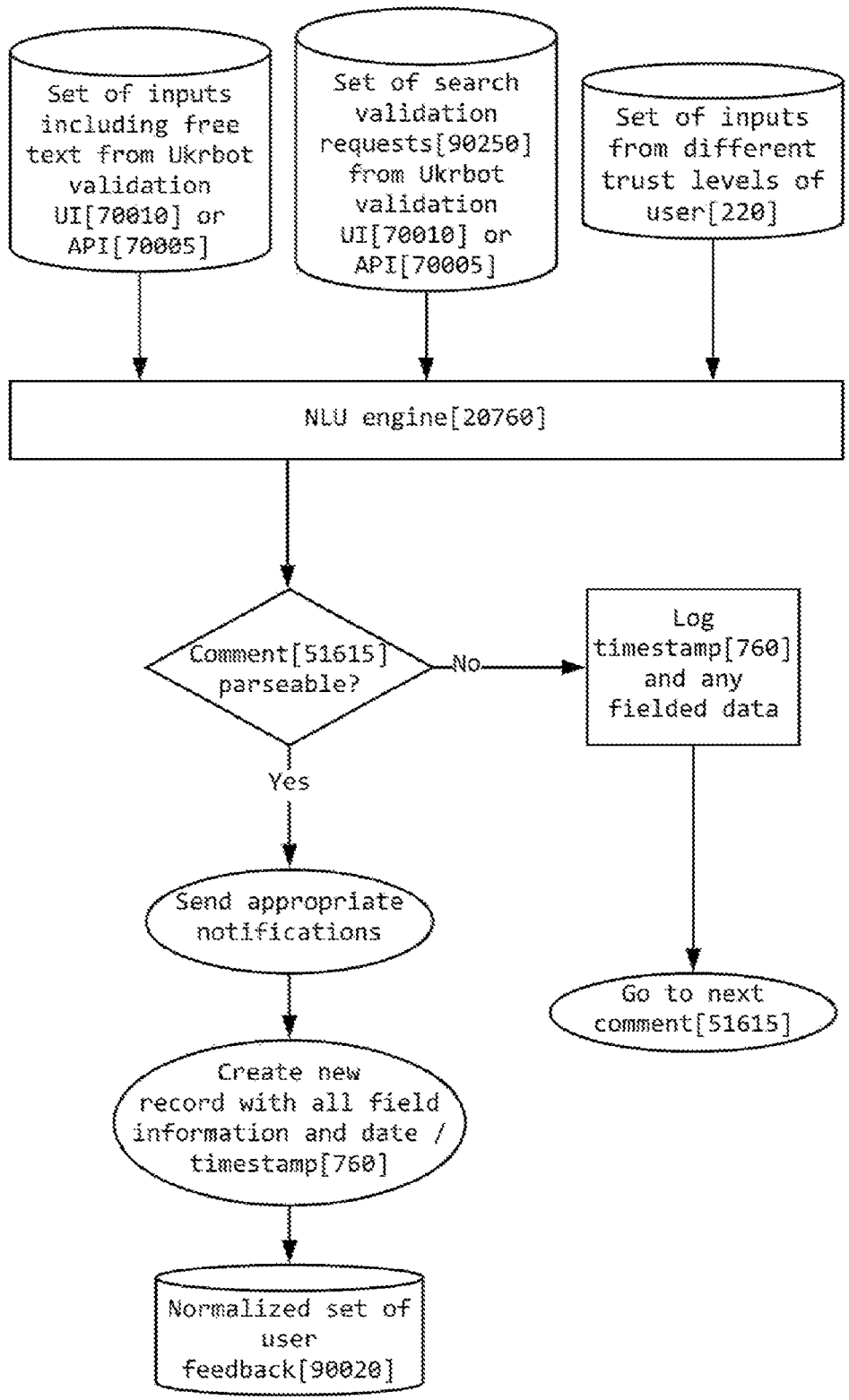

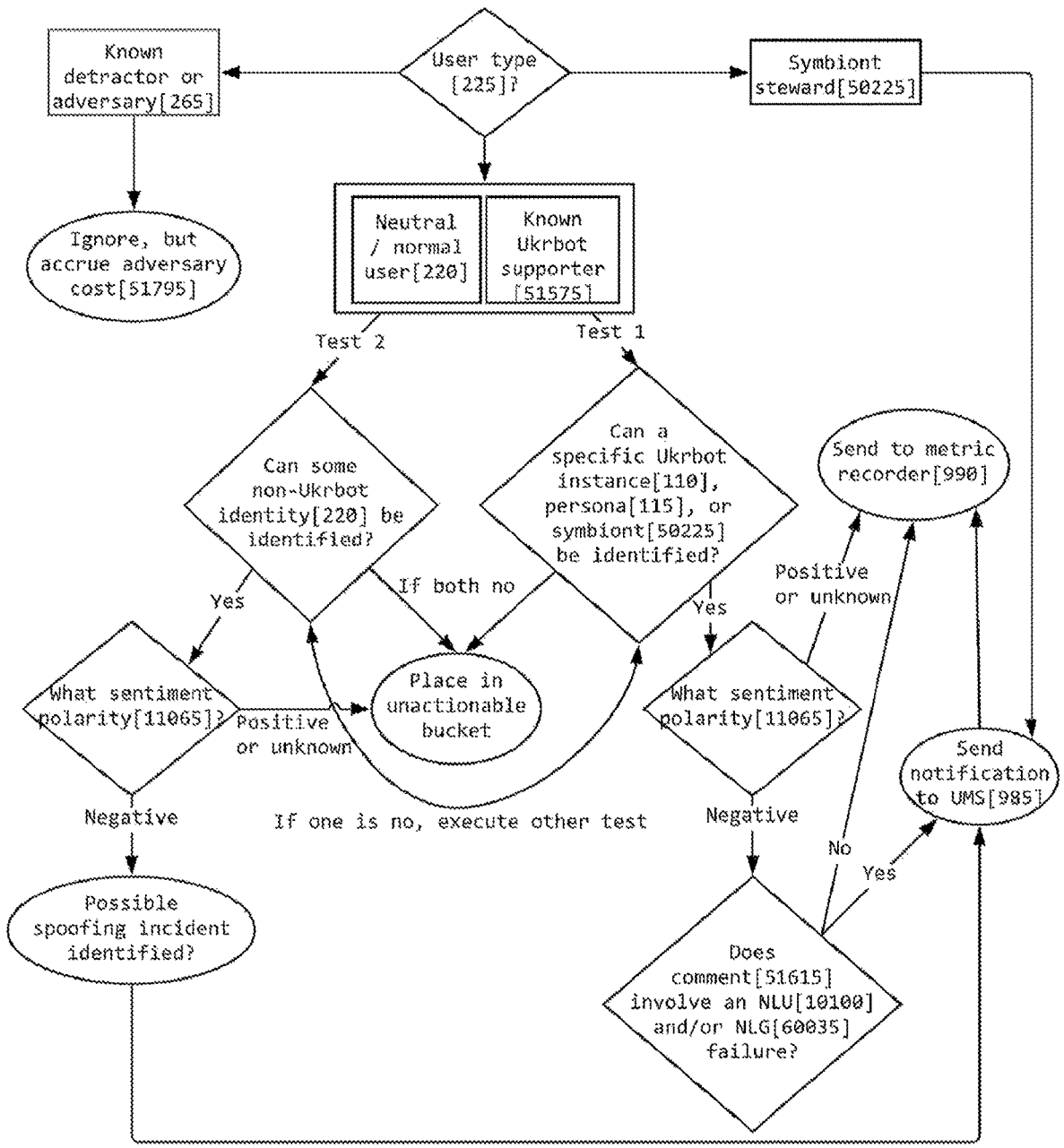

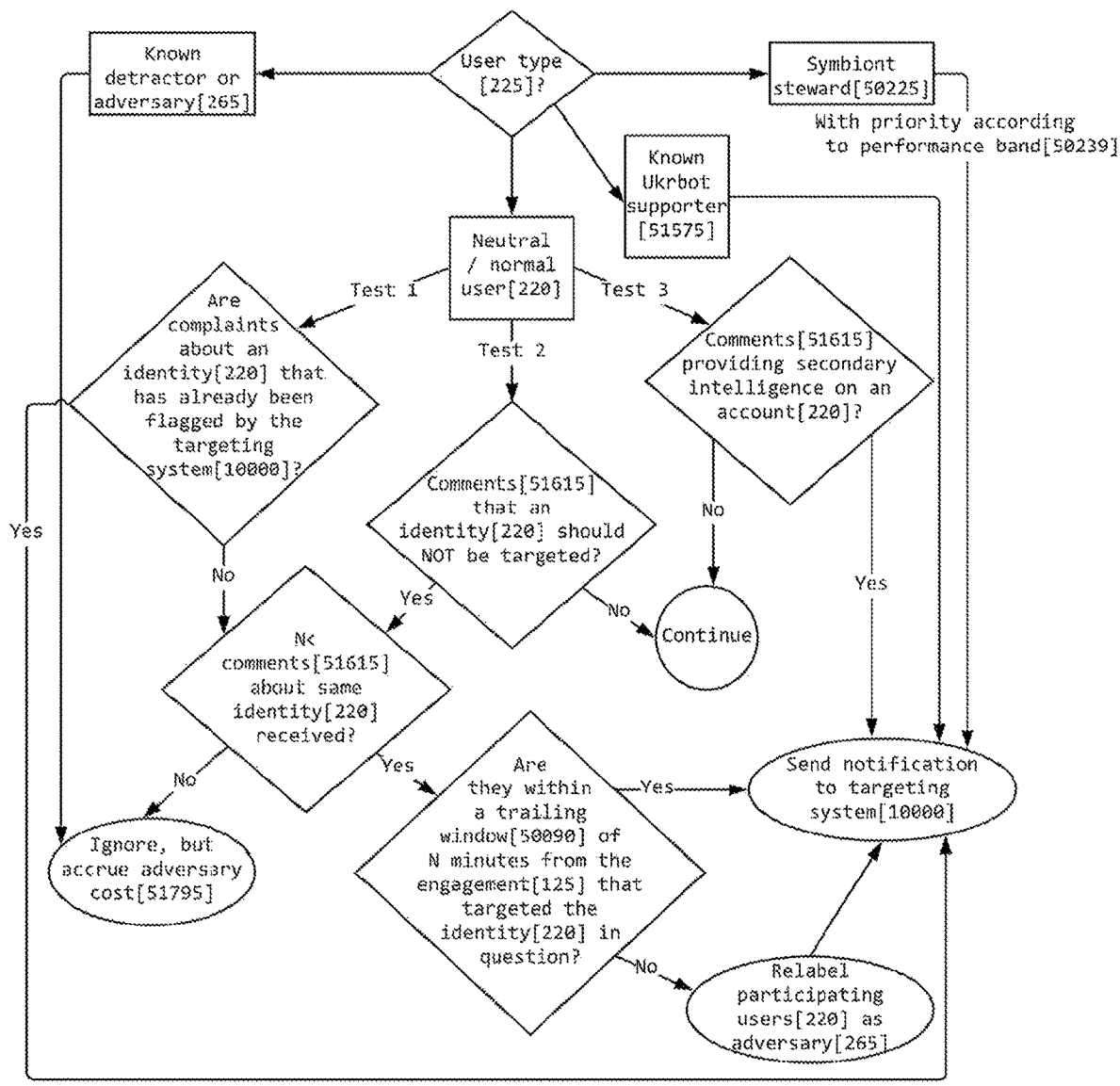

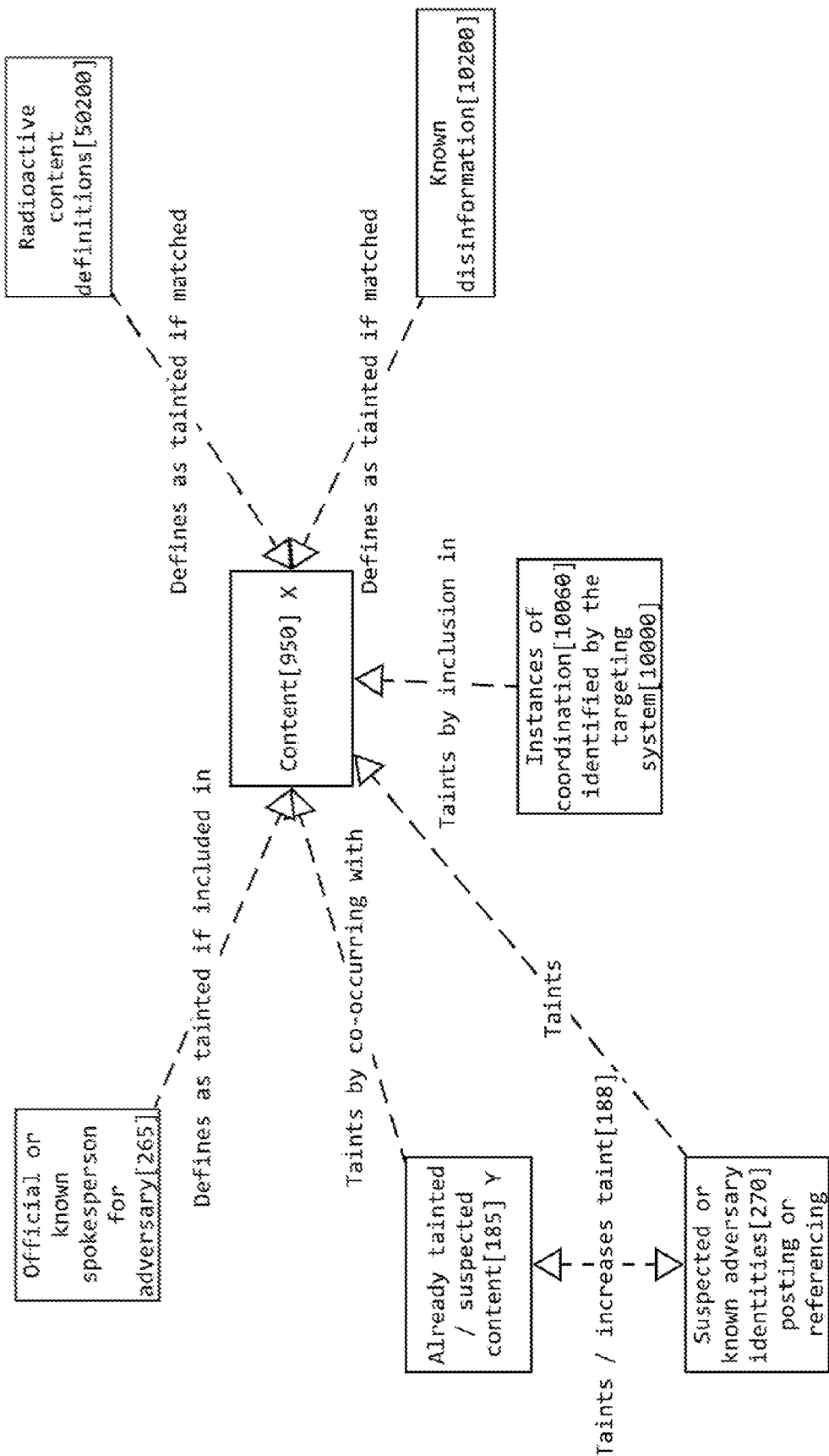

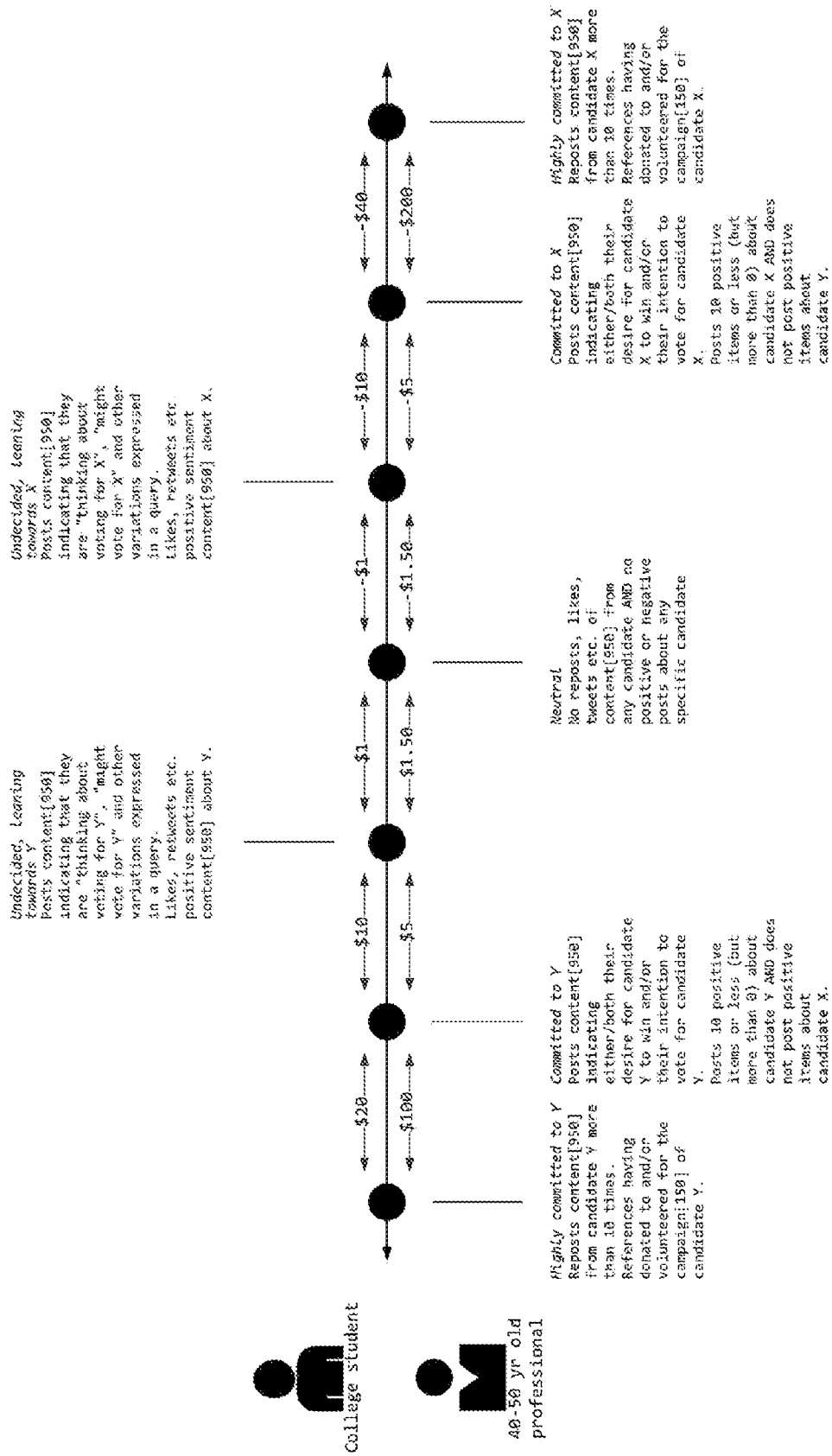

Figure 53
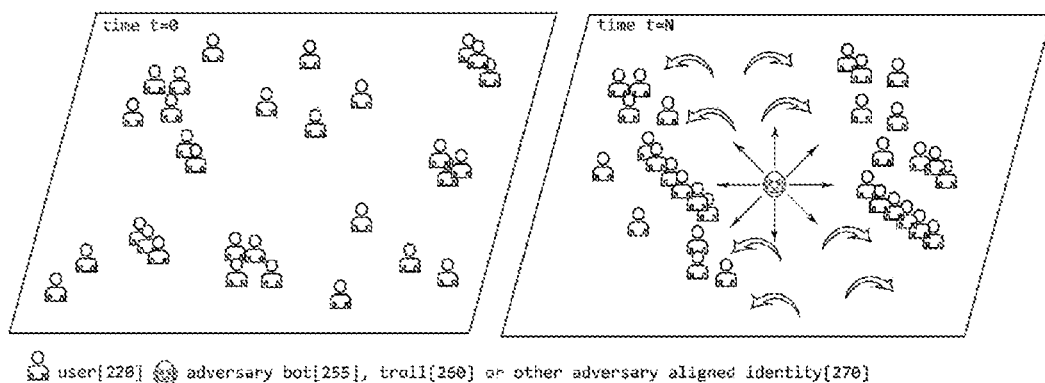
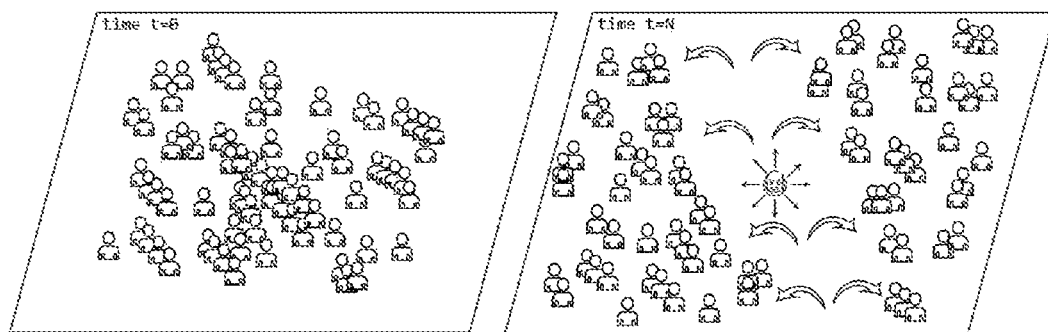
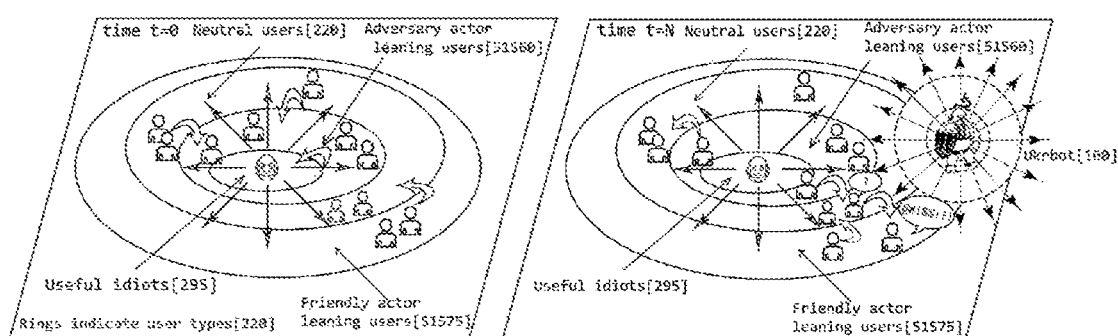

Components of an Engagement Package [50030]

Figure 59

Costs[51795] Incurred by Adversary[265] in Successful Engagement[125]

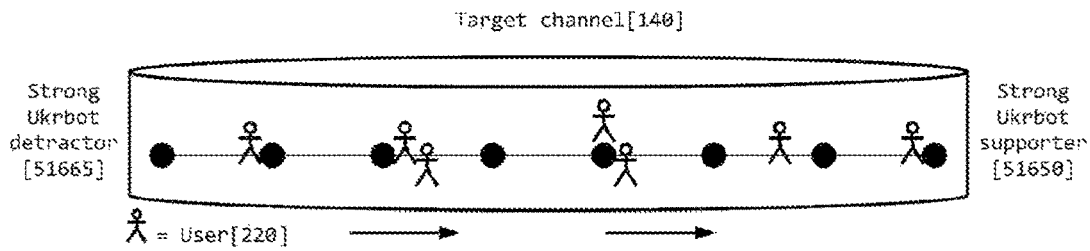

Target channel[140]

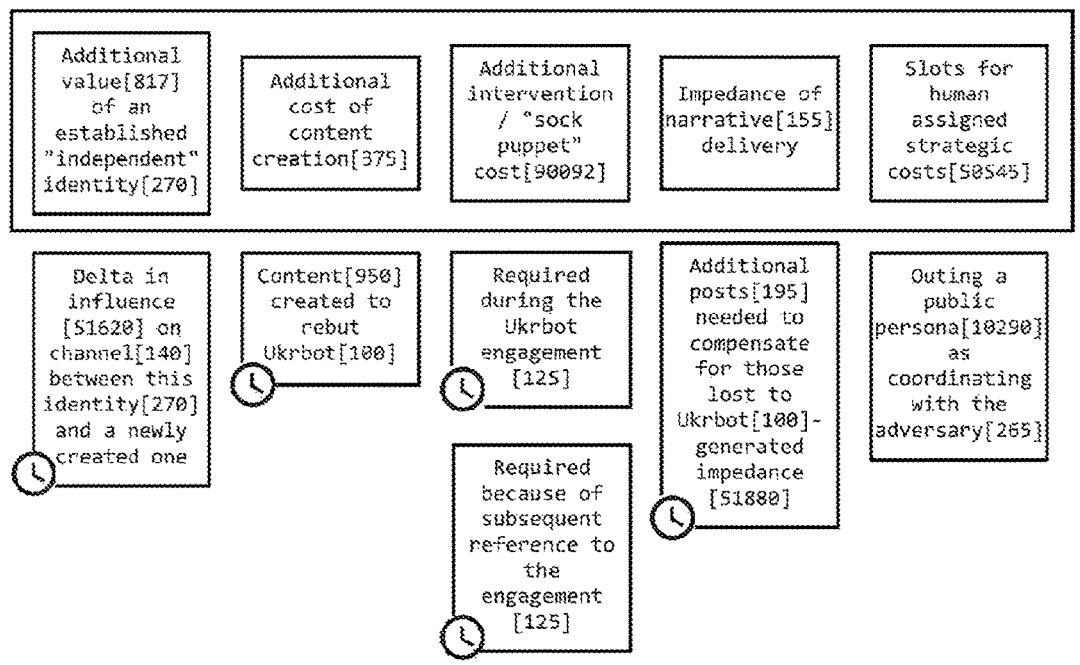

Estimated Costs[51795] Inflicted on the Adversary[265] for the Engagement[125] if Successful

| Additional value[817] of an established "independent" identity[270] | Additional cost of content creation[375] | Additional intervention / "sock puppet" cost[90092] | Impedance of narrative[155] delivery | Slots for human assigned strategic costs[50545] |
|---|---|---|---|---|
| Delta in influence [51620] on channel[140] between this identity[270] and a newly created one | Content[950] created to rebut Ukrbot[100] | Required during the Ukrbot engagement [125] | Additional posts[195] needed to compensate for those lost to Ukrbot[100]-generated impedance [51880] | Outing a public persona[10290] as coordinating with the adversary[265] |
|  |  | Required because of subsequent reference to the engagement [125] |  |  |
| Minutes spent x estimated pay of troll[260] to build up new identity[270] to same level = $A | Minutes spent x estimated pay of individual author[210] = $B | Sum (minutes spent x estimated pay of individual troll[260] or supervisor[270]) = $C | Sum (minutes spent x estimated pay of individual trolls[260] = $D | Sum of all slots = $E |

$A + $B + $C + $D + $E + $F = Total cost[51795] estimate to adversary[265] for items that are computable in most embodiments

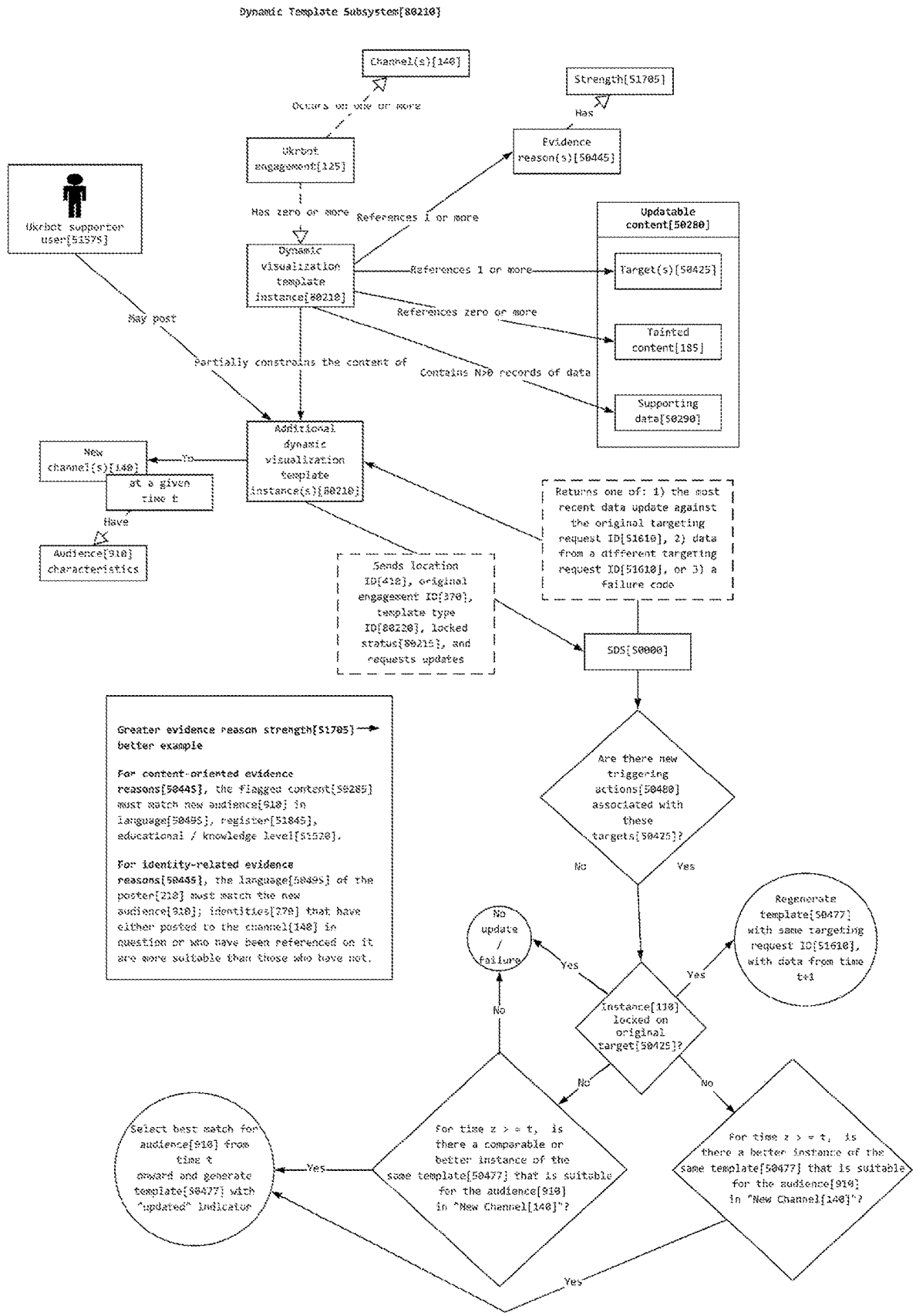

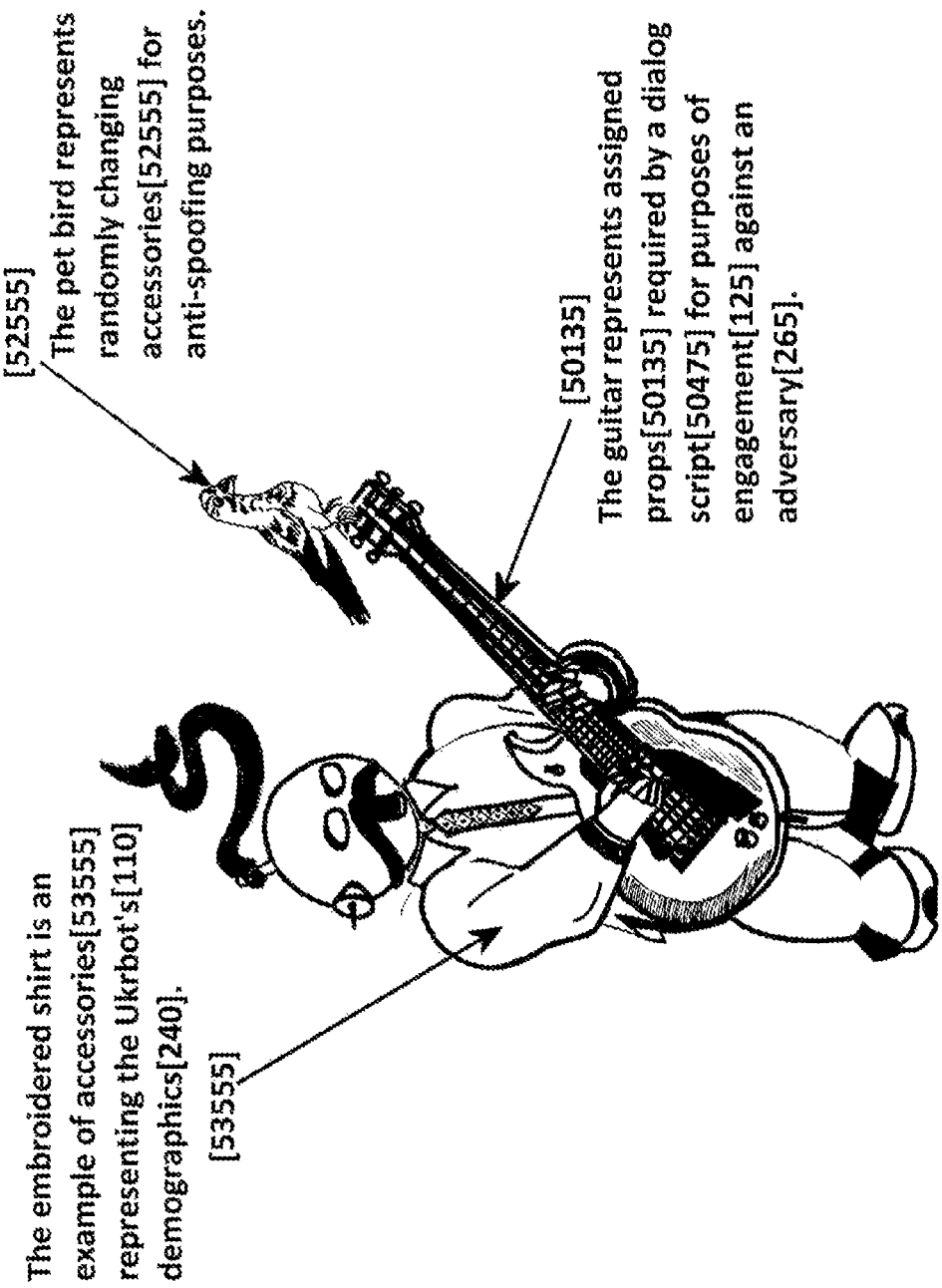

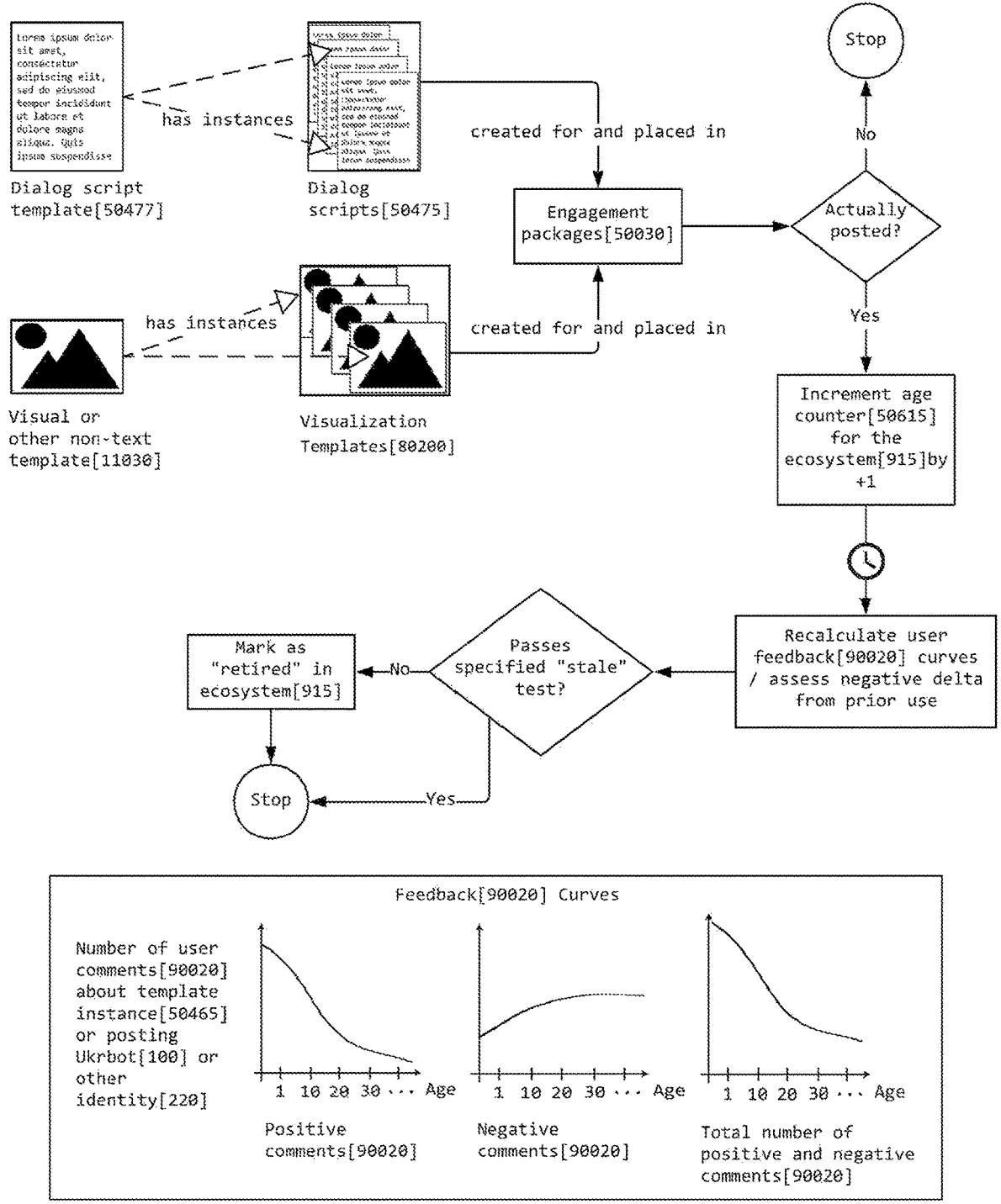

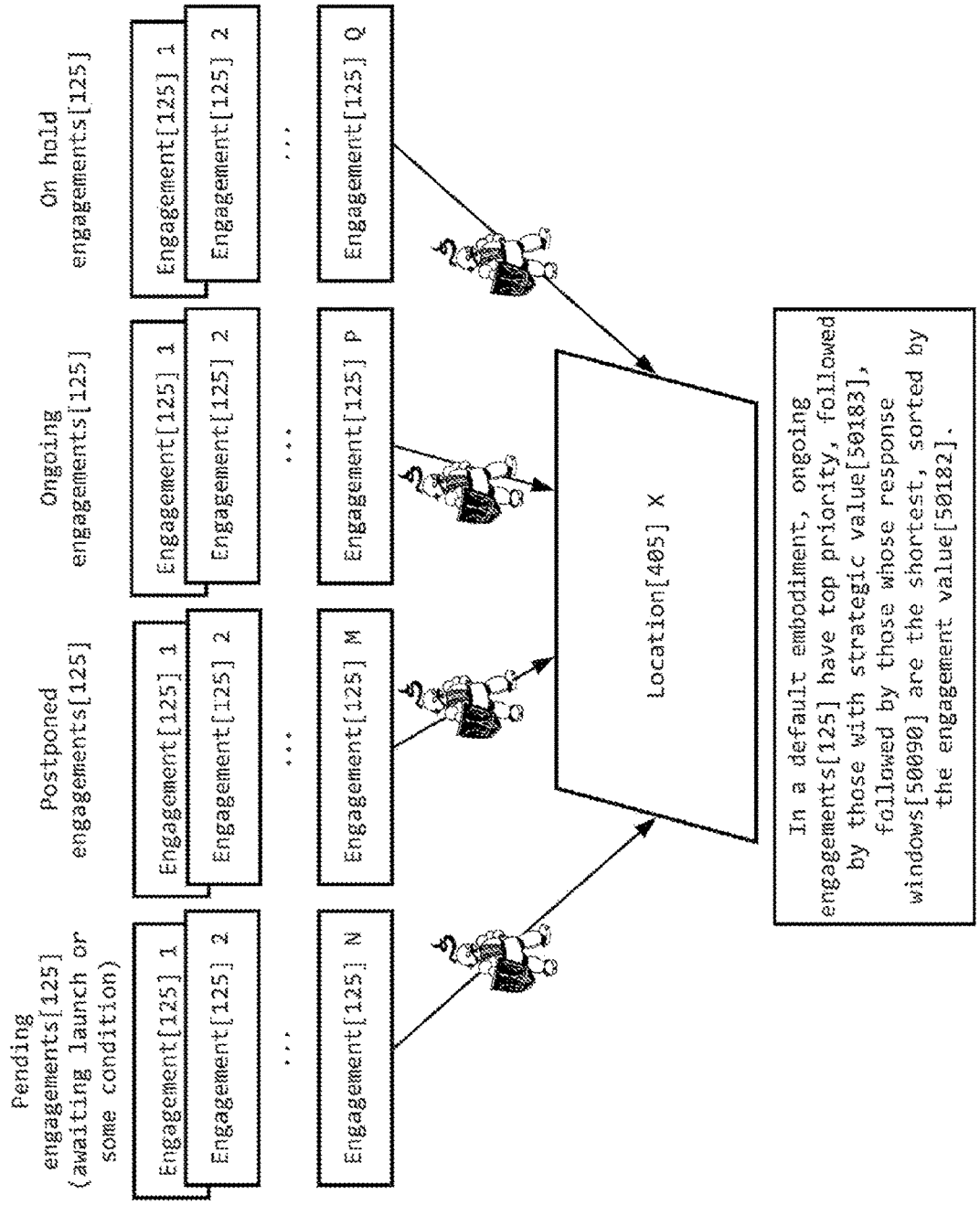

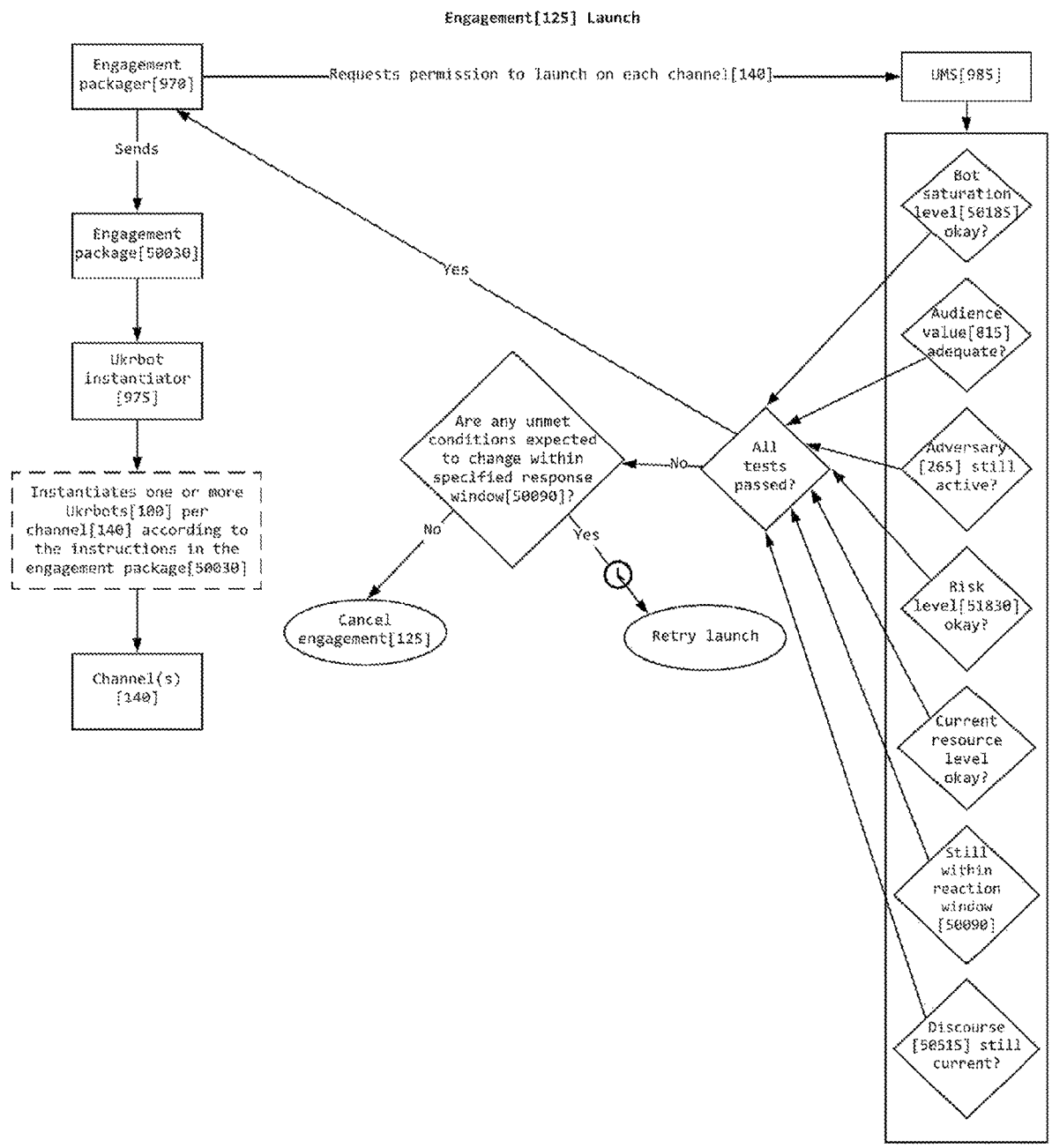

Options of the Adversary[265] when Challenged by a Ukrbot[100]

Engagement[125] and Challenge Question[50400] Protocol: Initial Turns

Engagement[125] and Challenge Question[50400] Protocol: Subsequent Turns

Adversary Identity[270] Representation in Visualizations[530] in a Default Embodiment Figure 80
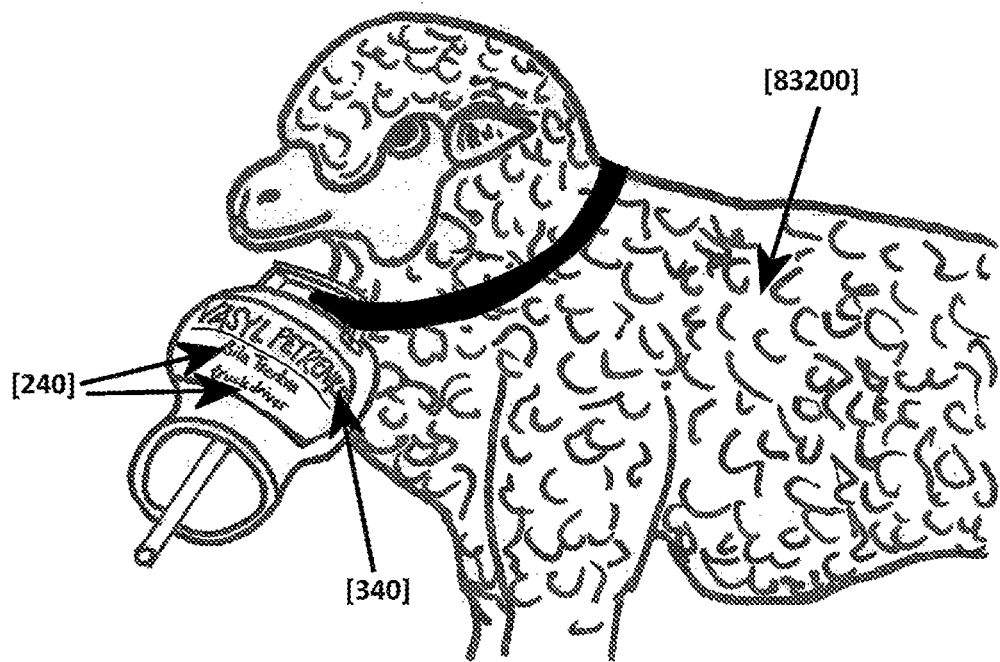
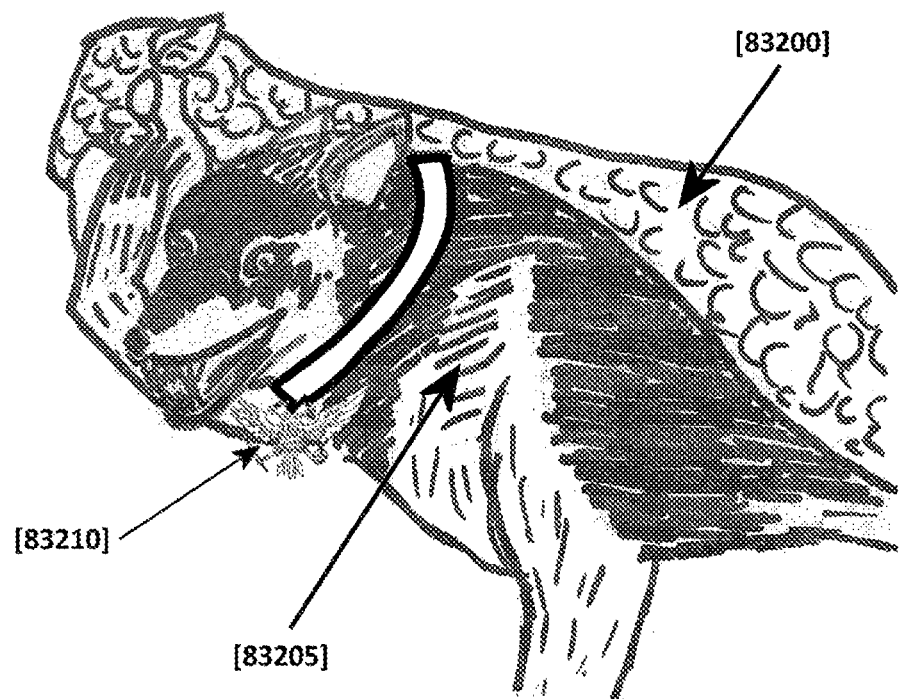

SYSTEM TO DETECT, ASSESS AND COUNTER DISINFORMATION

This application is a divisional application of U.S. patent application Ser. No. 17/003,979, filed on Aug. 26, 2020, which claims priority to U.S. Provisional Patent Application No. 62/891,442 with a filing date of Aug. 26, 2019, the disclosures of which are incorporated herein by reference in its entirety.

DESCRIPTION

Field of the Invention

The present invention relates to the identification, measurement, and combatting of the influence of large-scale creation and distribution of disinformation on the part of malign state actors and other similarly-equipped entities.

Background

Modern disinformation is complex, nuanced, and comes in many forms. For the foreseeable future, almost all debate on social and national security challenges will be subjected to it. However, there is not even a general consensus on what constitutes it. Efforts to identify it range from highly technical and forensic treatments to the increasingly common branding of anything with which one disagrees as disinformation.

Information Warfare Becomes Democratized

Timely and accurate detection of disinformation is increasingly complicated by the growing number of practitioners and the tools available to them. As technology improves, sophisticated and large-scale disinformation capabilities become accessible to not only state actors and political parties but also to large businesses, organizations, and even wealthy individuals to weaponize against their rivals, enemies, and opponents. In other words, information warfare is becoming democratized. The inevitable result is the pollution of national information spaces, a situation in which a critical mass of the public comes to believe that "factual" information is generally not to be trusted, that indeed truth is unknowable, and so becomes—and remains—demoralized and passive. Such pollution is a stated Russian information warfare goal in places like Ukraine and is the equivalent of debasing the national information debate in the way counterfeiters threaten a national currency.

Sophisticated practitioners of disinformation know that an actual set of facts, some of which will be distorted, altered, amplified, or suppressed to promote the desired agenda, will be far more effective than fabrication. Such manipulation is also far more difficult to detect by either people or machines. And even if detected in any given instance, refuting the portions that are misleading (or just outright lies) may not significantly reduce the damage done, owing to the tendency of most people to believe that which they can mostly easily recall. In most cases, this will be what they take in when first presented with a new real world event. This effect is heightened by an environment in which most online consumers of information are interested only pay attention toin headlines.

In the past, detecting "propaganda" was a simpler art as much of it was little more than a clear slow-to-change party line, repeated again and again. That is not the case today. Most current technical detection approaches are mired in the past and focus on either spotting "fake news"—an updated form of propaganda in which fabricated stories pose as factual news—or the automated identification of equally automated bots. Much of the motivation for the latter seems to be premised on the simplistic idea that bot usage is mostly a means of gaming the algorithms in social media platforms to help promote fake news. The desire to target instances of inauthentic posters is understandable, but humans posing as something they are demographically not is no more authentic than is a bot attempting to play human.

The bot vs. human distinction is increasingly becoming blurred as tools ranging from powerful NLG capacity to alter and customize content to block posting tools become available. This is especially true in the case of state and other well-funded actors. The NLU/NLG capabilities of the most sophisticated bot technologies are becoming increasingly indistinguishable from the capabilities of poorly trained, poorly paid, and poorly motivated low-caliber junior trolls. Furthermore, the case of so-called "sock puppets," or accounts that are usually controlled by a bot, but which temporarily switch over to human trolls when advantageous, are an increasingly common phenomenon.

For these reasons, accurately determining whether or not a given account is a bot is difficult—and therefore often done poorly. Most current methods rely on ML techniques, which in turn rely on human-annotated training sets that are all too often faulty owing to the biases of the annotators. (Reliance on simple heuristics isn't much better, since most operators of bots can easily detect these heuristics and circumvent them; more complex heuristics used in isolation risk generating large numbers of false positives.) But far more importantly, such a focus ignores the quality, motivation, and effectiveness of the content being posted and the level of influence that it obtains, or fails to obtain, regardless of the exact nature of the online identities posting it.

Such harder problems are often overlooked in favor of the above "checking the box" methods, for reasons ranging from their sheer difficulty level to the disincentive that many in the tech world have for challenging the idea that influence exertion can be measured in simplistic actions such as content "likes." Yet, from an information warfare perspective, understanding to what degree the desired influence is achieved is the most important thing. This mismatch between what is actually important and what is generally measured serves to benefit the disinformation peddlers.

Unfortunately, the detection of disinformation (by any definition one wishes) in most circumstances accomplishes little without a means of effectively combatting it. Indeed, most of today's disinformation techniques rely on the fact that the vast majority of the public lacks both the time and interest to seek ground truth about a story or event the vast majority of the time. Thus compiling lists of "verified" facts or fake news stories cannot be considered a broadly effective method. The practitioners of disinformation well understand the point, and indeed depend on it. Thus fighting the next war will require both rigorously identifying disinformation from an information warfare perspective at scale and actively combatting it.

SUMMARY OF THE INVENTION

A system for detecting, combatting, and measuring the influence of coordinated disinformation is described. The system is comprised of one or more repositories of data which involve online comments and articles and attributes derived from them, one or more technical targeting systems, a content analysis system, a cost and influence estimation system, a dialog system, a performance management system, a bot design and test system, a security system, a multimedia content generator, one or more machine learning components, a data collection mechanism, separate consumer and human operator applications, and a mechanism for the creation and management of bots across multiple channels.

In one aspect of the present invention, the system identifies online identities who are coordinating to spread disinformation, as well as detecting pieces of content that are the actual disinformation.

In another aspect of the present invention, the system estimates both the probable costs incurred by the malign actor in creating and distributing the content, and the level of influence that it achieved.

In another aspect of the present invention, the system estimates various aspects of content, including its levels of novelty, contextual appropriateness, and sophistication.

In yet another aspect of the present invention, the system creates and dispatches customized bots to publicly confront online identities that are distributing disinformation on different media. The bots will be furnished with customized dialog scripts and one or more pieces of customized multimedia, and backed by a dialog system. Analysts can provide supervision—and, if needed, intervention—via a system management console.

In yet another aspect of the present invention, the system will adjust the text used by the bots to be optimally appropriate in linguistic dimensions of the current context including dialect, tone, and register.

In still another aspect of the present invention, the system provides a testbed for focus and usability testing which allows analysts to assess the performance of different designs of objects used by the system, including providing live feedback on bot engagements.

In still another aspect of the present invention, members of the general public can provide feedback to the system that will then be filtered for coherence and attempts to mislead the system. Members of the public can also search for data such as posts made by a particular bot instance so as to help detect bot spoofing attempts.

In a further aspect of the present invention, the type of adversary identity/ies controlling an account is detected.

BRIEF DESCRIPTION OF THE DRAWINGS

FIG. 22 is a block diagram laying out the foundational graphs that the rest of the system is based on.

FIG. 31a is the first of a set of five block diagrams illustrating how adversaries can be identified, beginning with their level and type.

FIG. 31c is the third of a set of five block diagrams illustrating how adversaries can be identified, here detecting trolls inhabiting multiple accounts.

FIG. 47 is a block diagram illustrating an example of partial quoting from a real quote originating from a contemporary controversial incident reported in the news.

FIG. 50a is a block diagram illustrating how a typical embodiment normalizes user feedback data.

FIG. 50b is a block diagram illustrating how a typical embodiment handles user feedback on Ukrbot identities.

FIG. 50c is a block diagram illustrating how a typical embodiment handles user feedback on non-Ukrbot identities.

FIG. 51 is a block diagram illustrating most embodiments of taint sources and transmission.

FIG. 52 is a block diagram using two user states and values from the point of view of a political candidate as an example of an influence model.

FIG. 53 is a set of block diagrams showing examples of identities appearing and active in multiple locations exerting influence when associated by most embodiments of the Targeting System with increases in polarization and fragmentation.

FIG. 59 is a block diagram illustrating costs incurred by the adversary in a successful engagement by a Ukrbot embodiment.

FIG. 60 is a block diagram showing an embodiment of the Dynamic Collateral Template subsystem's updating process.

FIG. 61 is an illustration showing a Ukrbot singing and playing guitar as prompted by a dialog script as part of an engagement.

FIG. 62 is a block diagram showing the process by which Ukrbot engagement package collateral is aged out of circulation.

FIG. 63 is a block diagram illustrating the logic of one embodiment's Ukrbot engagement deployments in event of saturation.

FIG. 64 is a block diagram illustrating an embodiment of an engagement launch.

FIG. 80 is an illustration showing an embodiment of a visualization exposing adversaries who evaded previous challenges and continue to post similar or related suspicious content as a "wolf in sheep's clothing."

OVERVIEW

Figure 1:
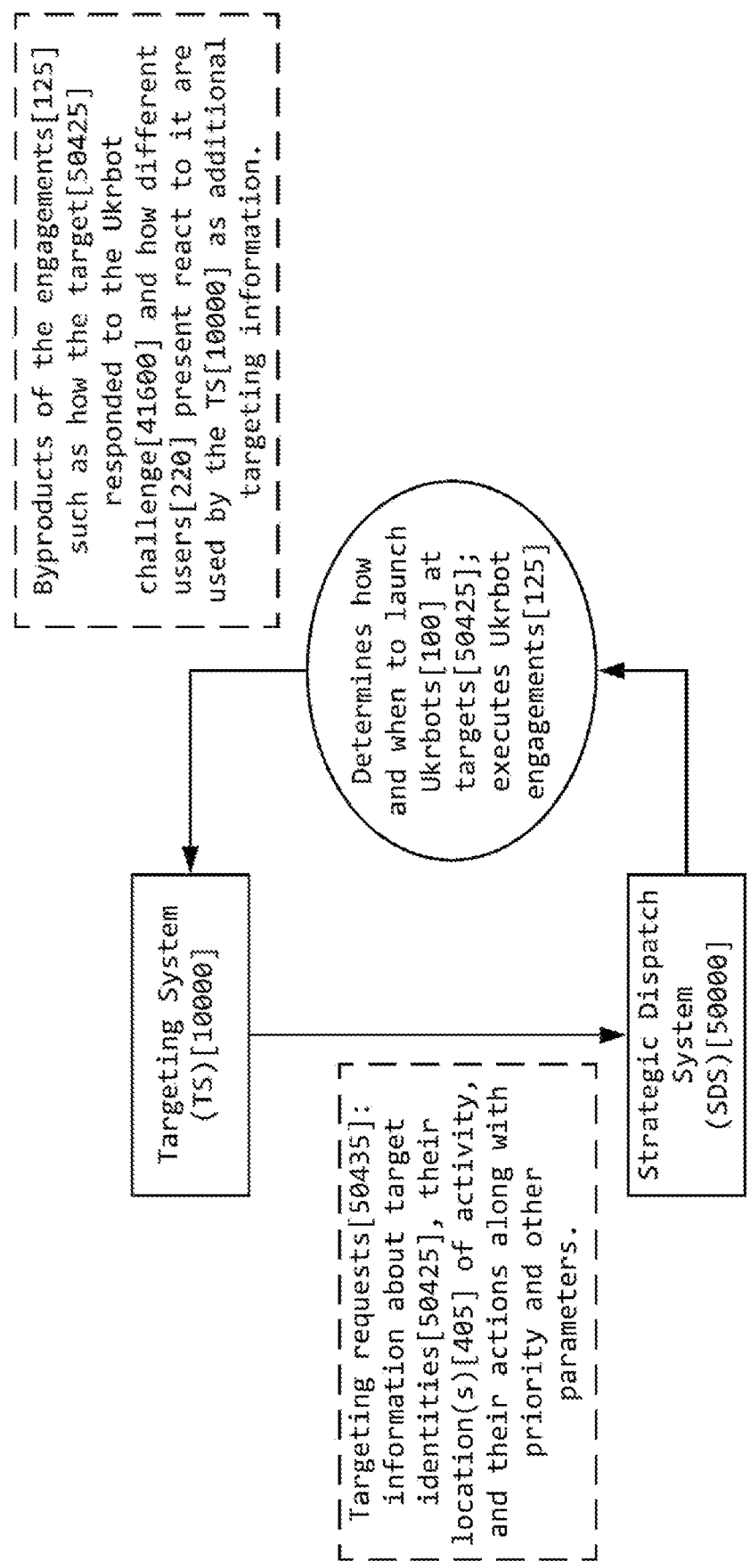
FIG. 1 is a block diagram illustrating interactions between embodiments of the Strategic Dispatch System (SDS) and Targeting System.

The present invention comprises a system to assess and combat disinformation at large scale. In order to do this, one must first define what exactly disinformation is. We choose the following definition:

Disinformation is specific pieces of content that are being distributed in a coordinated and clandestine manner and whose aim is to influence public opinion in a substantive way over time.

With this definition, we deliberately exclude cases such as a company's salespeople promoting its wares to the public. That is because in this scenario, the organizational affiliation of the identities is out in the open; users can then factor that into their assessment of their content. Importantly, the content about their products originates with them, and is not being parroted back from some other entity. Furthermore, were these salespeople to present themselves as "real customers," the influence that they are seeking to exert would result in more people buying their product as opposed to that of their competitors. This would fail the "substantive way" test, since no attitudes that anyone (apart from marketers in the company's employ) would measure will be impacted. Likewise for things like informal groups of cat lovers posting large numbers of cat videos online—no influence is being sought. The test for "coordinated" simply means that there are a number of online identities, generally with some supporting infrastructure, working together to distribute the disinformation. Otherwise put, the disinformation must be being distributed sufficiently that it may have some real world impact.

Notably absent from this definition is any test for truthfulness or accuracy of information. Such arbitration of fact is a very slippery and arguably even unproductive slope to descend for many reasons, including:

Many statements are inherently subjective in nature, and/or are unprovable (Actual) facts may be omitted to deceive, or for some innocuous reason True statements may be used in ways to mislead What is true today may not be true tomorrow; what is true in one place may not be in another For these reasons, the system[105] will take the point of view that numerous inauthentic identities[220] coordinating the distribution of content[950] intended to exert meaningful influence is disinformation, and so should be combatted. By "inauthentic" in this case, we mean either/both that the identity is not who or what it claims—including a bot masquerading as a human—and/or that it is concealing an affiliation such as employment. Indeed, in such scenarios, the content will, unsurprisingly, often be at best misleading and at worst downright propaganda.

Happily, coordination in the distribution of content is something that can be quantified. It should be noted that actually establishing coordination according to mathematical regularity is important; it should not just be presumed. Some content may spread or "go viral" organically. Very well executed fakes fall into this category, for example, a really compelling image of an alien spaceship landing on Earth. So too does reporting of very real crisis situations: many news outlets are repeating more or less the same story at the same time because it is breaking news, not because they are coordinating with one another.

Clandestinity can be assessed by the lack of an obvious, publicly stated, shared affiliation among the identities[220] distributing the content[950] in question. While "substantive way" can be somewhat open to interpretation, it can be thought of as requiring measurable changes in common attitudes among people who are exposed to the content. Most embodiments will specifically try to exclude catching product advertising which should generally be fairly easily detectable.

This definition of disinformation dictates that the system [105] attempt to detect:

Any type of acts of coordination among online identities [220] that do not share an explicit affiliation;

Evidence that an identity[220] is inauthentic in one or more respects;

Specific pieces of content[950] and content[950] derived from it that are associated with either/both the acts of coordination and/or the adversary actor[280] directly;

Likewise for assertions[11070] and narratives[155] (groups of co-occurring assertions[11070]), whose wordings may be entirely different from one another, but which are logically equivalent to one another;

Unusual changes in degree and/or speed of attitudes in channels[140] on which the adversary[265] has been active, as this suggests the exertion of influence.

In addition, the system[105] will estimate the costs [50005] likely incurred by the adversary[265] both to create the content[950] in question and the personnel costs to disseminate it. This last requires attempting to differentiate bots[255] from human trolls[260], as well as different pay grades of trolls[260]. This emphasis on cost[50005] reflects the fact that perhaps the best way to combat disinformation is to raise the cost[50005] of it sufficiently that there will be less of it. Otherwise put, a key part of the objective is to break the adversary's[265] bank.

The system[105] will seek to collect[10070] and store [10105] data from as many different media[135] as possible that are relevant to the theater of operation. This includes both social media and more traditional media, such as news sites. This data will first be analyzed by the targeting system[10000].

The invention has at its core two interlocking technical targeting systems that respectively identify and actively combat the clandestinely coordinated dispersion of information. The first of these is the targeting system[10000]. It identifies targets[50425], (which is to say online identities [220] who meet the tests of distributing disinformation: coordination, clandestinity, and seeking to obtain influence) as well as the content[950] that the targets[50425] are distributing. The now-considered-bad content[185] functions as an electronic breadcrumb trail to track trolls—and in some cases, useful idiots[295]—as they shed disposable user handles. To interpret the content[950], the targeting system [10000] will rely on a content analysis engine[10100] that includes both broad NLU and text analytics capabilities. In particular, in almost all embodiments, the content analysis engine[10100] will be used to identify instances of abstract objects such as narratives[155] and assertions[11070], the wording of which may be quite different among instances.

The targeting system[10000] in a preferred embodiment produces one or more hypergraphs[10005], which we will refer to generally as simply the hypergraph[10005], that expresses the many types of different relationships that may exist among all of the different pieces of data that are relevant; certain types of data will be filtered out automatically in most embodiments, such as product promotions. As potentially relevant data ages, it is cycled out to archival storage. However, any impact that it had on the model (the hypergraph[10005]) remains.

By performing graph computations on the hypergraph [10005], the targeting system[10000] identifies potential targets[50425] that should be confronted for their activities. For each of these potential targets[50425], the targeting system[10000] will derive a set of attributes. As indicated in a subsequent section, these attributes include, but are not limited to: target value[50430], target priority[51720], target presumed type[50440], target sophistication[51710], and the budget[50450] that may be spent in confronting the target [50425]. These target[50425] attributes are part of a targeting request[50435].

The Strategic Dispatch System or SDS[50000] accepts input—specifically targeting requests[50435]—provided by the Targeting System[10000] to determine when, where and how to launch an optimally configured bot to confront coordinating disseminators. The objective of the bot is to publicly challenge the authenticity of the adversary user identities[270] while heaping ridicule on them in the process, at the most auspicious moment—which is to say, when the greatest number of influenceable users[220] are likely to witness it. In this process, a bot may be outed as a bot rather than a human; likewise for a human troll pretending to be of a demographic that they are not, or paid trolls pretending to be just the average guy on the street. We will refer to these bots as Ukrbots[100], the name deriving from the first presumed battlefield, which is Ukraine.

The Ukrbots[100] will openly manifest as bots rather than humans. This provides for a very attractive asymmetry in both cost and complexity with the adversary[265]. Having bots pretending to be human is computationally very difficult in the face of needing to actually interact rather than just spout; it becomes just about impossible if the deliberate goal of the interlocutor is to trip them up.

The Ukrbots[100] mount challenges based on the idea of a Turing test. They ask questions that would be easy for a human of the asserted demographic to respond to, but which are likely to lie outside the knowledge space of a bot[255], or even a troll[260] who lacked the necessary language, cultural, educational or professional background. To make it entertaining for the public, in addition to the Turing test challenges[41600], the Ukrbots[100] will be equipped with comedic dialog and images to taunt and belittle the adversary identities[270], exhorting friendly users[220] to join in the fun.

The idea is to either force the bad actor off a particular channel for a while, or else force the user account to be transferred up the food chain, either from a bot to a human troll, or from a less skilled human troll to a more skilled—and hence more expensive—one. The primary goal is to drive up the costs of the adversary, while also mobilizing public opinion against him.

A targeting request[50435] provides instructions for the SDS[50000] to put together a new engagement package [50030] to engage one or more adversary identities[270] who are operating together in one or more online locations [405]. In most embodiments, an engagement package [50030] will consist of at least the following:

One or more specifications of what we will refer to in this document as a Ukrbot[100], a very specific type of bot that may be instantiated on a wide range of different media[135] in some form.

One or more dialog scripts[50475] selected from the dialog script inventory[50605], executed by a dialog system[40000] and customized by the NLG component [60035] to best match the context of the engagement [125] in linguistic aspects such as dialect[50500] and register[51485]. These dialog scripts[50475] are trees that allow for a number of variations in response on the part of the target(s)[50425] or other users[220] in the audience[910]. (Almost all embodiments will make available a free text response repository[41110] for context-free responses.)

One or more challenge questions[41600] that the Ukrbots [100] use to challenge the authenticity of a target [50425], with respect to the target[50425] actually having the demographic attributes[240] that it advertises, including being human.

One or more pieces of customized visual or multimedia collateral[505] selected from the multimedia collateral inventory[50467] and created by the multimedia renderer[60030] that highlight the evidence reasons[535] for the targeting of the particular target[50425].

A specification of human operator[250] requirements in the event that human intervention is needed. For example, at a very minimum, the operator[250] must speak the language[50495] that is primarily in use in the given location[405].

It will not always be possible for the SDS[50000] to assemble the requested engagement package[50030]. Common reasons for this include that some of the needed components are lacking (at least in the specified quality, newness, or cost), and that too many engagements[125] are already underway, or occurred recently, at the given location [405]. This is known as bot saturation[50185].

If the engagement package[50030] was successfully created, control is passed to the SDS[50000], which in addition to putting together the engagement package[50030], must verify that at least the main adversary identity[270] (if more than one) still remains active on at least one of the specified locations[405] (if more than one) in such a way that it may sensibly still be targeted. This is essentially a "staleness" check that in most embodiments will have several separate tests. This check will be performed in most embodiments since large bursts of posting activity can occur on some social media platforms even in short periods of time, and because as a practical matter, it may not be sensible to confront an adversary identity[270] who at the present moment is talking about a soccer game or the weather. If the necessary conditions are all met, the SDS[50000] will dispatch the Ukrbot(s)[100] to the specified channel(s)[140] and the engagement[125] will begin. If not, the engagement [125] will be delayed by the SDS[50000] to whatever degree needed until the conditions for launch are met.

The objectives of an engagement[125] in most embodiments are some combination of:

Publicly "outing" adversary identities[270] as inauthentic (if they are) and/or their content[950] as coming from the malign actor[280] (if it is);

Chasing adversary identities[270] off specific channels [140], at least for some period of time;

Creating cost for the adversary[265] by forcing human trolls[260] to at least temporarily take over accounts controlled by bots[255] or more junior trolls[260];

Creating public embarrassment by the adversary identity [270] being unable to respond appropriately to a challenge question[41600] and/or running away;

Turning public opinion against the malign actor[280] by exposing the extent and kind of their disinformation peddling;

Education of the general public about disinformation.

Most engagements[125] will terminate when either the adversary identity/ies[270] withdraw, or the Ukrbot(s)[100] do. Different embodiments will employ different methods for evaluating the outcome of an engagement[125], as in many cases it won't be black or white. At the end of the engagement[125], the SDS[50000] sends back updated target[50425] information, for example how well the target [50425] responded to the challenge question[41600] so that the targeting certainty[51500] for that target[50425] may be appropriately updated. The targeting system[10000] and SDS[50000] interactions are depicted at a high level in FIG. 1. Other important bookkeeping will also be performed at this time, such as an assessment of influence on the audience [910], the performance of different engagement package [50030] components, and truing up pre-engagement[51985] numbers such as budget[50450] with the amount that was actually spent.

This information will be reported to the Metric Recorder [990] which will store it in its data store[50395], and in most embodiments, will perform at least some analyses on it. This data will be used in most embodiments by different components for purposes ranging from report generation to continuous system improvement. In most embodiments this includes system[105] auditability and system performance data, user testing data from the UDTS[90000], influence model[51875] data, human operator[250] and symbiont steward[50340] performance data, and estimated costs [50005] incurred by the adversary[265].

Because users[220] unfortunately don't always proactively provide their opinions, most embodiments will use a highly integrated user testing component with which focus group and usability testing[90300] may be conducted with users[220] of different demographics[240]. This testing component, which we refer to as the UDTS[90000] can be used to test the performance of every type of user-visible object created by the system[105]. One instance of the UDTS[90000] is pictured in FIG. 2.

Figure 3:
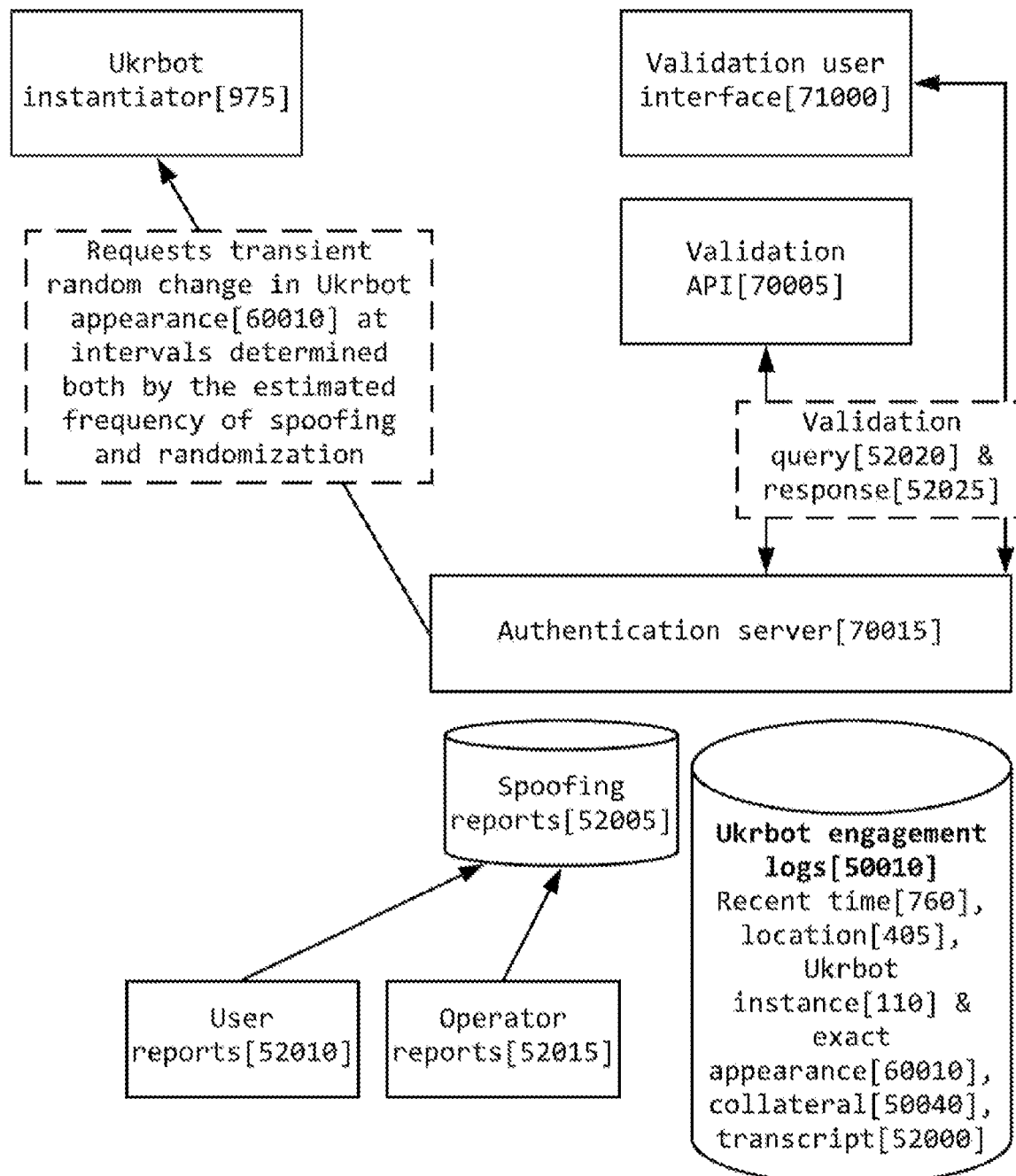
FIG. 3 is a block diagram illustrating a high-level system architecture for embodiments of the Security Subsystem.

Finally, because public education about the scope and scale of disinformation is one of the key goals of the invention, most embodiments will include a public-facing application[90020] that allows members of the public to visualize the disinformation being spread in their information space. And because spoofing of the Ukrbots[100] is likely to occur, in most embodiments users[220] can use this application[90020] to try to determine whether or not a particular post[195] was actually made by a "real" Ukrbot [100]. Programmatic access to this information will be provided in most embodiments by the Validation API [70005]. For the same reason, the Security Subsystem[107] in many embodiments will make fairly frequent random changes to the appearance of each Ukrbot instance[110]. The Security Subsystem[107] is illustrated in FIG. 3.

The multimedia renderer[60030] can be of any design so long as it is able to accept input and produce corresponding output as needed in all of the different formats, and for all of the different visual[505], aural, and multimedia collateral [50040] templates[50465] that are supported in the given embodiment.

Figure 4:
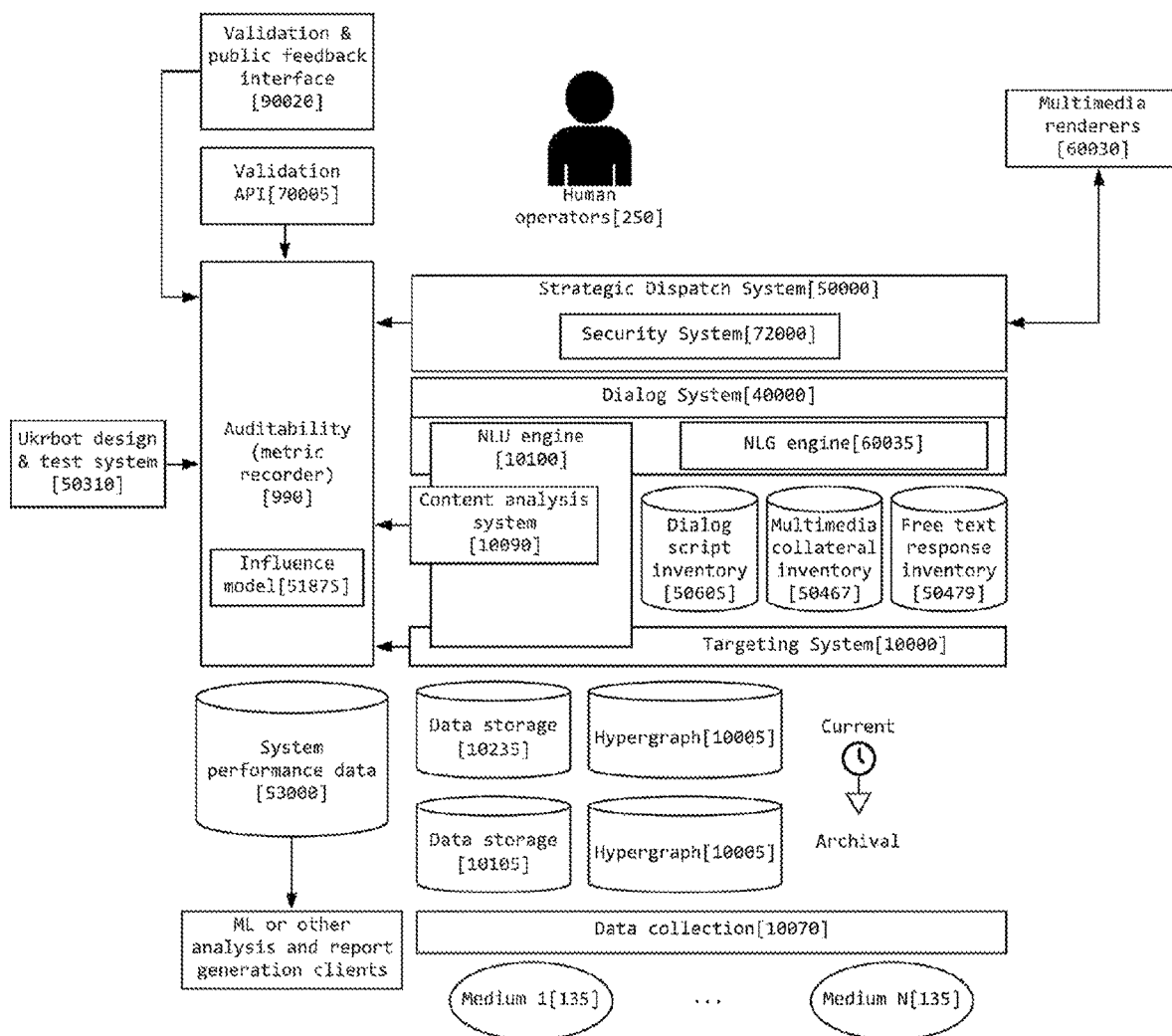
FIG. 4 is a block diagram illustrating a high level system architecture view of an embodiment of the invention.

FIG. 4 depicts the high-level system architecture of one embodiment. Note that for a variety of reasons, different embodiments may prefer different system boundary lines than those described here.

Because targeting reasons[50445] sit logically at the core of the system[105], the next section provides a list of the targeting reasons[50445] in a preferred embodiment.

Targeting Reasons[50445]

In almost all embodiments, the targeting system[10000] will apply one or more labels to the instances of clandestine cooperation and other malign behavior that it detects. These labels correspond to what the SDS[50000] understands as targeting reasons[50445]. Otherwise put, the SDS[50000] does not care about the graph substructure detection or other computations performed by the targeting system[10000]. It only cares about having the data needed to prepare, prioritize, schedule, and execute Ukrbot engagements[125]. The combination of actual evidence[535], the label(s), and a set of derived attributes (such as the importance of an individual target[50425]), comprise a targeting request[50435].

The inherent design of a multi-evidence system is tilted towards scenarios in which decisions must often be made on the basis of small amounts of evidence across different dimensions of behavior. Thus most of the following targeting reasons[50445] are not intended to be sufficiently compelling on their own but rather are intended to be used in conjunction with other reasons[50445]. Some of these reasons[50445] may be considered to be circumstantial in nature and that is exactly the intent.

Figure 5:
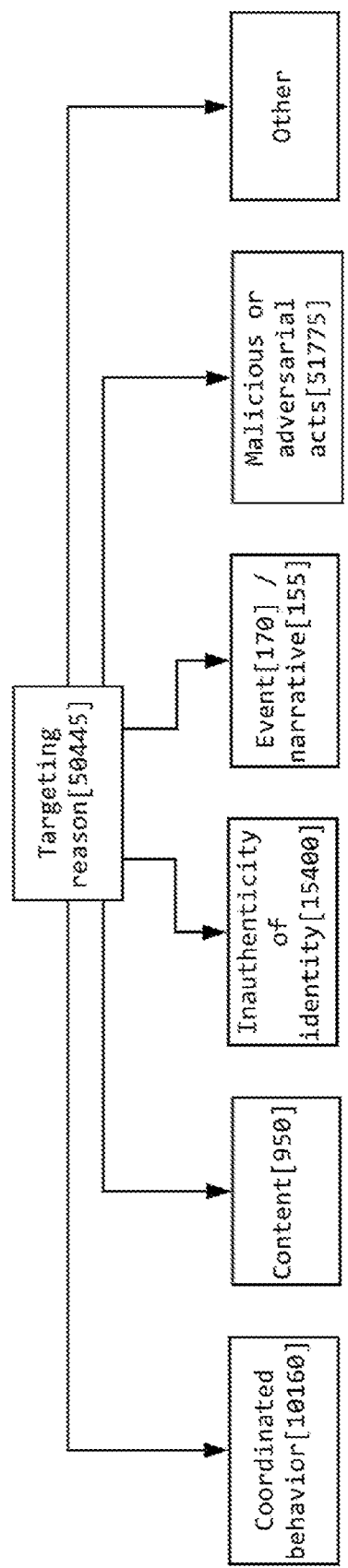
FIG. 5 is a block diagram of some common categories of malign user behaviors detected by the Targeting System which the SDS uses as Targeting Reasons for Ukrbot engagements.

In most embodiments, as indicated in FIG. 5, the main groups of targeting reasons[50445] are as follows:

Reasons[50445] that have to do with the apparent coordination[10160] of behavior per se Reasons[50445] relating to the distribution or promotion of certain specific content[950]

Evidence[535] that one or more identities[220] are inauthentic[15400]

Treatment of the narratives[155] of important real world events[170]

Actions[51775] attempting to harm the Ukrbot system [105] or other systems or people associated with the friendly actor Miscellaneous/Other However, there are important reasons[50445] that do not fall into any of these categories, and some embodiments may have additional categories. To see how multiple labels can easily aggregate to the same underlying graph structure, consider the case of several identities[270] coordinating the distribution of clearly tainted content[50185] that relates to the narrative[155] of a current event[170]. Thus the labels are capturing different aspects of the same real world behavior. This both underscores the suspect nature of the behavior and enables more flexibility for the SDS[50000] in selecting appropriate dialog scripts[50475] and multimedia collateral [505] to best illustrate the behavior in question.

In a default embodiment, the following targeting reasons [50445] are supported.

Note: Almost all embodiments will handle overt behavior differently than covert. For example, if a number of social media accounts which openly belong to the Russian government cooperate to promote a particular narrative[155], that narrative[155] will be tainted as a result of the promotion, but there would be no purpose in a Ukrbot[110] confronting someone who is openly an employee of the Russian government. So these identities[270] will not be targeted by the targeting system[10000] or the SDS[50000]. However other identities[220] who pass along this content [185] will be targeted if the evidence warrants it.

Coordination[10160]-Related

Synchronicity of activity: multiple identities[220] repeatedly turn up in and depart from the same locations[405] as one another at or around the same times. They may interact with one another in some fashion, they may be (apparently) independently posting content[950] that the adversary[265] deems useful within the particular time window[50090], or both. Most embodiments will not require that it be the exact same set of identities[220] each time, especially if the number of identities[220] is above a certain threshold, which most embodiments will express in a configuration parameter. For example, if 20 different identities[220] demonstrate highly synchronous behavior overall, but occasionally one or two of these doesn't show up, most embodiments will still consider that that group demonstrated another instance of synchronous behavior anyway.

Same content distribution: a set of multiple identities[220] repeatedly distributes and promotes content[950] that is identical or similar to one another using one or more text similarity metrics. It does not matter what the text[575] is for this reason[50445], just that it is text[575] that can reasonably be identified as much more likely to be seen within this group than others. Many embodiments may insert tests to try to avoid trapping benign special interest groups who show up and post content[950] that's of interest to them when there's some relevant newsworthy event[11005] and then disappear again. This will most often be done by comparing the narratives[155] in the distribution set with other semantically similar posts[195] taken during the same time window[50090].

Framed narrative[180] or other scripted role: this is to capture the case in which the content[950] of the posts[195] made by the coordinating group is not the same or similar, but rather reflects different identities[220] playing a designated role in a script or plan that is written with multiple roles. This could be one identity[220] making a post[195] that asserts a particular fact and then 3 other coordinating identities[220] agree with the purported fact and provide further evidence about it. It could be an N-part, or "framed" narrative[15580] in which each identity[220] provides one part, leaving a good opening for another identity[220] to segue into the next frame[11055] in the narrative[15580]. Instances of this will generally be identified on the basis of identifying the script or framed narrative[180] which is likely to be used many times.

Echo chamber creation: Instances of communities[11100] which have the following properties:

Created and maintained by several identities[220] making approximately equal contributions in the number of posts[195] and the amount of interactivity with other users[220]

Unusually rapid gain in number of posts[195] and users [220] per unit of time

And in many embodiments, at least one topic[165] on which virtually all expressed sentiment[50510] is of the same polarity[11065]

Instances in which the same identities[220] have been involved in the creation of prior echo chambers[10220] increases the strength of the targeting reason[50445] in almost all embodiments.

Other SNA: There are many different types of other SNA evidence types that may be detected by different embodiments. Many of these will be detectable on the basis of graph regularities, for example order of operations patterns that are extremely consistent (e.g. Identity D reposts content[950] from Identity C, who reposts content[950] from Identity B and so, such that any other ordering is rare or non-existent). Others may require specialized evidence detectors. For example, some embodiments will have an "in-person attendance" detector which looks for statements made by an identity[220] that assert he/she is going to a certain event [11005]. Many embodiments will look for identities[220] mentioning one another, or quoting one another. However, there are many other examples.

Multi-evidence: Used to handle the case in which there is weak evidence in more than one coordination[10160]-related evidence reason[50445], but not enough to affix an evidence reason[50445] label to any of them.

Artifactual or indirect evidence of participation in a campaign[150]: This is a subtle reason[50445] intended to trap cases in which no narrative[180] has been detected—and therefore no campaign[150] on this basis—but one or more of the same identities[220] who have been substantially active in multiple unrelated locations[405] since time t have each seen an unusually rapid and/or high degree of transformation in sentiment polarity[11065] towards a given topic[165], or similarly a change in belief about the truth of a particular assumption. The more rapid and greater in degree, the greater the targeting strength[20720]. This case is likeliest to occur when the targeted audiences[910] are on the smaller side, with the result that any narrative[180] is likely to be repeated less frequently.

To take a concrete example, there could be N completely unrelated arguments that could be advanced about why Crimea should be considered legitimately part of Russia, each targeted at a different demographic. One argument might relate to the costs of reintegration with Ukraine, suggesting that the money should instead be spent on improving health care. Another argument might focus on security-related concerns. And so on. The arguments may be partially or even totally disjoint, the end conclusion the same.

Figure 6:
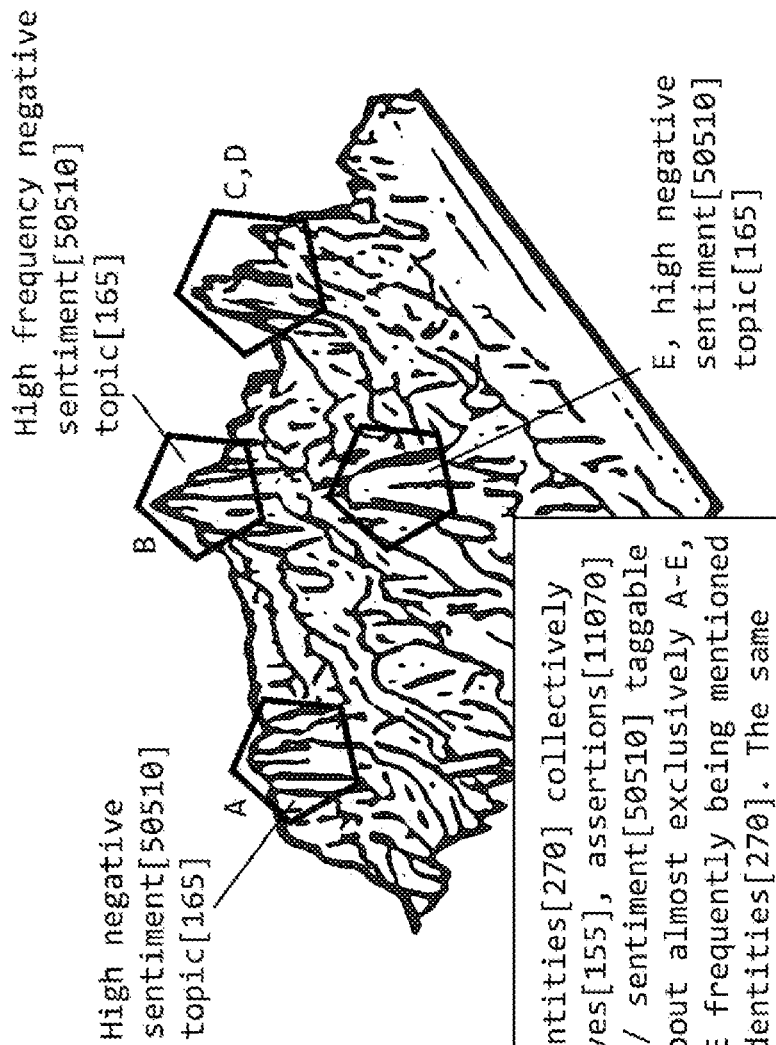
FIG. 6 is a block diagram example of a heat map used to show how the choice of topic set can provide artifactual or indirect evidence of participation in a campaign.

Almost all embodiments will assign extra targeting strength[20720] to any cases in which the locations[405] in question demonstrate an inflammation in negative sentiment [50510] on multiple topics[165]. The "fake news" example elsewhere cited in this document in which the U.S. government allegedly made an exorbitant cash payment deal on the tarmac of a Chinese airport that had the effect of sending a large jet of Covid 19-related medical equipment to the U.S. rather than to its original destination of France is a compelling example of this. It fanned strong negative sentiment [50510] on a number of topics[165] including anger at the French government for the massive equipment shortages, disappointment at American mercantilism and America as an ally, and frustration over French dependence on other countries. The greater the extent to which every substantial source of resentment within a given population[385] is fanned by a small group of identities[220], the greater the likelihood of it not occurring naturally. This is illustrated in FIG. 6.

Content[950]-Related

Individual account distributing or promoting tainted content[185] transmission: Identities[220] who repeatedly post or reference content[950] that has been marked as "tainted" based either/both on its origination with the adversary[265], and/or co-occurrence with tainted content[185] in a post [195] or conversational thread[20725], and/or its distribution or promotion by identities[220] flagged by the targeting system[10000] as being in the control of the adversary[265]. Almost all embodiments will also allow text that is similar but not identical as established by text similarity assessment measures. This taint is strengthened in nearly all embodiments if the content[185] in question is present in a flagged coordination behavior[10160] occurrence. Some embodiments may opt to allow "probably tainted" content[185] to be counted as well as certainly tainted content[185]. Note that many useful idiots[295] and just regular users[220] may unwittingly distribute such content[185] as well, but they should not principally transmit such content[185], and if innocent, generally should not have other evidence reasons [50445] accrue against them.

Toxic content[50200] transmission: Most embodiments allow system administrators or analysts[250] to specify particular content[50200] that they find to be so extraordinarily objectionable in nature that they wish the system [10000] to be especially aggressive in combatting it. Examples of such highly toxic or radioactive content[50200] might include a high quality "deep fake" video of a top government official engaging in a pedophilic sexual act, or a highly sensitive document that has been leaked—or simulated with changes that make it highly inflammatory. Because such a designation is highly context-specific, most embodiments will treat this as necessarily a human decision. As with the prior reason[50445], users[220] may innocently transmit such content[50200] because of its sensational nature, but that by itself should not be sufficient basis to target them.

Regularity of content: This is used to capture cases in which the instances of text content[950] in question are neither semantically similar nor will be assessed as similar by most text similarity metrics but they share traits that suggest that they were generated by the same text generation engine and/or from the same template. In the most common case, there will be multiple spans of shared tokens that will be shared among all of the posts[195] in question, followed by a series of distinct tokens which correspond to either contextual details being filled in or synonyms being swapped in so that the logically same post[195] can be posted by different identities[220] within a short time span without it being obvious.

Excessive novelty: This is used to capture the case in which a single identity[220] appears to be producing so much genuinely new content[950] that it is difficult to believe that it is the work of a single person. Novelty is important, since it is little effort to repost lengthy and detailed content[950] written by someone else, even if a few words are changed here and there. The novelty measurement in a default embodiment is discussed in another section.

Content original broadcaster: This forensic reason[50445] catches the case in which a particular identity[220] is apparently the first to post or reference particular content [950] which is later determined by whatever means to have originated with the adversary[265].

Inauthenticity Reasons[15400]

Controlled account set: This catches the case in which there are N many identities[220] each of which are associated with a different human name in their profiles, but lexical fingerprinting and the hours of activity suggest that the accounts[220] in question are being controlled by the same person.

Identity shedding: This reason[50445] is for the case in which one identity[220] replaces another in a given location [405], but the second identity[220] essentially picks up where the first one left off—for example, with the next portion of a framed narrative[180]. Some embodiments will also require lexical fingerprinting matches as well, with the aim of trying to ensure that it is the same person behind the proverbial curtain as well as the same adversary actor[280].

Linguistic/cultural/location: This catches the scenario in which an identity[220] claims to have specific demographic properties that are false. These will often be based on heuristics to capture things like what kinds of errors in grammar suggest that the writer is a native speaker of whatever language that they claim to be.

Education/professional or domain expertise: This is for the parallel case of professional or domain knowledge. Most embodiments will also consider the particular vocabulary used to see if it is consistent with the standard professional usage. For example, most lawyers will identify another lawyer as an "attorney" rather than as a "lawyer" unless the noun is modified (e.g. "a smart lawyer", "a divorce lawyer.").

Viewpoint: This reason[50445] captures the case in which either/both the attitudes[51750] expressed by the identity [220] are so mutually inconsistent so as to effectively have a nearly zero probability of co-occurrence and/or one or more of these attitudes[51750] is grossly inconsistently with the purported demographics of the identity[220]. This most frequently occurs with either unsophisticated text generation or a troll who lacks important cultural, political, or historical knowledge of the country that they are targeting.

Bot pretending to be human: In most embodiments, this is assessed by a variety of metrics that measure the range of the discourse associated with the identity[220] in question in conjunction with any evidence of sock puppet transfers. This is discussed in more detail in the NLU component section.

Human pretending to be a bot[15000]: This reason [50445] is to capture the uncommon case in which a human is driving a bot account either to avoid accountability or to deceive an adversary as to the capabilities of its bots. It is thus the reverse of the prior reason[50445]; it will get flagged if an identity[220] whose profile identifies it as being a bot has a range of capabilities that suggests that it is in fact a human.

Failed a Ukrbot challenge[41600]: Most embodiments will treat any bad response to a Ukrbot challenge[41600] as evidence of inauthenticity[15400], whether it's a person who isn't what they claim to be or a bot posing as human. This includes any attempt to distract or dissemble to avoid responding to a question that, assuming it is properly designed, should be both very easy and fast to answer.

Ambiguous Ukrbot challenge[41600]: Many embodiments will similarly treat ambiguous outcomes of Ukrbot engagements[125]. The logic is that because the questions [41600] should be very easy to answer if the identity[220] is legitimate, ambiguity in a response is reason for suspicion [50445].

Actor presence model: A standard set of sanity checks for things like time zone relative to what is asserted in a user profile, the presumption that someone will be off the air for several hours a day to sleep at about the same time.

Probable impostor account: This is another forensic reason[50445] that some embodiments will support with a special purpose evidence handler to search through user

[220] records looking for anomalies such as multiple accounts[220] on the same medium[135] that appear to be associated with the same person, for example:

Dr. Maxine Fishbourne, Chelsea Michigan

Maxine Fishbourne, M.D. Chelsea Michigan

Or in which the ostensibly same person posts[195] in different languages on different media[135]. (While there's nothing at all inherently wrong with this last, it is statistically unusual.)

Suspected account swapping[19400]: This reason[50445] captures the case in which the same account[220] seems to be used by more than one person despite the user profile indicating the name of a single person, and only one name is ever used in posts[195]. The logic is that since social media accounts are generally freely and easily to be had, there's no legitimate reason for people to share accounts—or for that matter to conceal it if for some reason they are. Thus the only reason to surreptitiously share accounts[220] is to boost the visibility and influence of a single account[220] by making it more prolific. Some embodiments will not apply this test to media[135] for which one must pay for an account[220]. Most embodiments will use lexical fingerprinting to establish that such swapping has likely occurred.

Suspected account transfers[19600]: This reason[50445] differs from the just-above one in that the account[220] is only transferred away from a bot or inadequately equipped human to an adequately equipped human when the identity [220] in question is confronted with a specific and immediate need. This could be a Ukrbot challenge[710]. But it could also be caused by interaction with regular users[220]. Once the need is past, control of the account[220] will generally return to the most economical option. Because this case is about dealing with immediate needs, most embodiments will consider the time lag between a post[195] and a response in addition to the tests described in the NLU section for whether an identity[220] is (usually) a bot vs a human, or posts content[950] that is consistent with their advertised demographics. Otherwise put, a sudden but temporary improvement in any type of competency, for example domain competence, language competence, breadth of vocabulary, is highly suspicious. Most embodiments will also avail themselves of lexical fingerprinting.

Content in aggregate from identity[220] unfingerprintable: This reason[50445] exists to capture instances in which there is little to no detectable similarity in the content[950] posted by the identity[220] by any method, or collection of methods including those described elsewhere in this document, used to lexically fingerprint or otherwise identify individual authors of content[950]. In other words, it is as if just about every post[195] or article[11080] posted by the identity[220] was written by a different person. Almost all embodiments will exclude content[950] that is directly quoted or ascribed to someone else.

Narrative[155]/Event[170]-Related Reasons [50445]

Note: Many embodiments may not require as fine-grained targeting reasons[50445] as the below. This set of reasons [50445] reflects tests at different points in the event lifecycle [11020].

Initial reporting different in fact: This reason[50445] is used to identify articles[11080]/comments[51615] about an emerging event[170] that contain "extra" facts[11050] that are not generally present in reports about the event[170], and so to target the identities[220] associated with them. The "extra" fact[11050] may in some cases be a contradiction of facts[11050] that appear elsewhere that could not be automatically identified as such. "Not generally present" will be defined by most embodiments by scanning for the assertion [11070] of fact[11050] across a wide number of sources relevant to the region or domain, and testing how many times it appears. Most embodiments will have thresholds for this purpose, though some may choose to assign different weights to different publications[360], media[135], authors [210], etc. It will not be defined in the vast majority of embodiments by how many times the assertion[11070] of fact[11050] appears, as that is extremely easy to game.

Initial spin difference: This is a parallel reason[50445] to the above one, but relates only to differences in subjective types of assertions[11070]. Some embodiments may opt to combine the two reasons[50445]. The argument to keep them separate basically is one of degree: spinning facts is different from suppressing or inventing them.

Prolongment or Initial Boosting: This reason[50445] is for the case in which an event[170] that has one or more known adversary narratives[155] associated with it is continually referred to by an identity[220] even as the mention curve[11040] for the event[170] is asymptoting to zero, or likewise boosting mentions of it initially relative to normal users[220]. The logic of the former is that events[170] that have been useful for the adversary[265] for propaganda are likely to have their natural lives extended to the extent possible by the adversary[265]. As noted elsewhere, most embodiments will build in certain common sense exceptions to this, such comments[51615] or articles[11080] marking the anniversary of an event[170], or the recent occurrence of a related event[170], either one that is the same kind of event[170], or which generally co-occurs in articles[11080] with the event[170] in question—that is, not just those associated with the adversary[265]. Similarly, adversary identities[270] may cooperate to help provide an event[170] in which they find propaganda value initially gain traction. While it is true that they are likely to promote such "friendly" events[170] throughout their lifecycles[11020], most embodiments will focus on the tails of the curve [11040] in which such boosting constitutes a major portion of all mentions[11075]. This is under the presumption that such efforts have outsized cost because the quality of content [950] will likely have to be higher than it will be in situations in which the adversary identities[270] can effectively just pile on, piggybacking on the backs of others (e.g. around a peak of the mention curve[11040]).

Unusual or novel mention curve[11040] shape of event [170]: This reason[50445] is to capture the case in which an event[170] has a mention curve[11040] that defies expectations either for a particular event group[11025], events[170] with certain characteristics, or for any event[170] more generally. For example, most types of events[170] will have a single peak in their mention curve[11040] which occurs whenever that event has the equivalent of its 15 minutes of fame. For some types of events[11005], such as large fires or earthquakes, the peak occurs very early on in the event lifecycle[11020]. For more complex events[170], such as criminal prosecutions, there may be multiple peaks, for example one related to the arrest and one related to the trial itself. But very few events[170] short of the rarely occurring and highly visible super events[11145] will have a long plateau at the peak of their mention curves[11040] for example. This is an indirect evidence reason[50445] that is intended to be used in conjunction with other reasons [50445]. In most embodiments will generate human operator alerts[50560] when it occurs.

Maintenance of narrative[155] differential: This reason [50445] and the one following it respectively catch the cases in which a) assertion(s)[11070] in one or more narratives [155] are retained by some identities[220] and authors[210]

despite these assertion(s)[11070] being explicitly rejected, disproved, and/or quietly disappearing in the posts[195] and articles[11080] of others, and b) assertions[11070] change in lockstep—that is, synchronously, within a specified time window[50090]—with those of the adversary[265] as it changes its assertions[11070] in ways that other sources do not within the same time window[50090]—or ever. Different embodiments may define different measures for how "fringe" the assertions[11070] in question are so as to limit this reason[50445] to apply to only more blatant cases. Technically, these are two different reasons[50445], since the former involves staying the same, while the latter involves change in the narrative[155]. Some embodiments may divide these reasons[50445] into instances of assertions [11070] of fact[11050] vs subjective ones.

Narrative[155] synchronization[10160]/lockstepping: See above. Most embodiments will assign a greater targeting strength for each lockstepped change[50320] that is detected.

Adversarial Behavior

Attempt at gaming targeting system[10000] or SDS [50000]: Any malicious feeding of information to the system [10000] will be counted by almost all embodiments as evidence of adversarial behavior. While different embodiments may handle this a bit differently, common behaviors that will be flagged include, but are not limited to, the following: providing large amounts of duplicative or clearly garbage (unparsed-able) content through any available public feedback mechanism, providing feedback that is clearly malicious (e.g. curse words, insults, tagging Ukrbot[100] or official friendly government accounts[960] as being under the control of the adversary[265].

Strong Ukrbot detractor[51560]: Identities[220] who repeatedly either/both insult the Ukrbots[100], and/or who try to interfere in Ukrbot engagements[125] by trolling the Ukrbot[100] will be presumed by most embodiments to be acting on behalf of the adversary[265]. Different embodiments may use different forms of topic[165]/sentiment [50510] detection to establish when such trolling or insulting is occurring.

Attack on adversary-of-adversary[265]: Similarly, most embodiments will treat repeated participation in swarms, or "bursts" [10045] of negative polarity sentiment[50510] against particular identities[220] and/or real world persons as evidence of adversarial behavior. Different embodiments may have somewhat different mechanisms, including (but not limited to) lists of prominent adversaries of the adversary[265], inferring a rolling list based on comments[51565] by the adversary[265], labeling the burst[10045] on the basis of the participation of a certain threshold number or percentage of known and suspect adversary identities[270].

Miscellaneous

Countermeasure response: Any identities[220] who change their behavior such that there is a detectable "trajectory" [20720], as described in "System and Method for Detecting and Analyzing Digital Communications," U.S. patent application Ser. No. 16/576,736, filed Sep. 19, 2019, herein incorporated by reference in entirety, within a specified time window[50090] from the application of a countermeasure[12000] that targets that specific behavior will be determined to be adversaries[265].

Charge-bearing: Any identities[220] whose appearance and sustained activity level[50100] on multiple locations [405] is associated with trailing substantial increases in polarization and/or fragmentation will be considered by most embodiments to be exerting influence[51620] in some otherwise not currently detected form. By "polarization and/or fragmentation," we mean substantial SNA changes in the audience[910], for example a pre-existing structure (for example, hub-spoke) disappears, or a largely sparse and random set of sparsely or unconnected graphs is replaced with small densely interlinked structures. Link types used by different embodiments may include, but are not limited to: textblock[10050] or textual similarity, topic[165]/sentiment [50510], reference by one identity[220] to another, quote of one identity[220] by another, references to the same named entities[20725], use of the same assertions[11070] and narratives[155], the same URL's posted, the same non-textual content[950] posted and co-temporal links.

Activity level[50100] may be determined differently by different embodiments. A default embodiment combines measures of number of posts[195] by the identity/ies[220] in question per unit of time, the saturation level for the location [405] (e.g. what % of all posts[195] this is) and the interactivity of the posts[195] (e.g. how many responses or references to them?). The idea is to establish that the identity/ies[220] in question were "present" enough on a given location[405] that it is reasonable to attribute structural SNA changes within the relevant audience[910] to their activities.

HUMINT—Official channels: Virtually all embodiments will accept data from official channels such as intelligence agencies so as to allow the system[10000] to profit from such knowledge. However, most embodiments will choose not to place 100% reliance on such data, and will prefer to require the analyst[250] to provide the closest available evidence reasons[50445] if any apply, along with a certainty factor that expresses the confidence in the accuracy of the intelligence. That will cause the targeting system to assign a non-zero evidence value for the "HUMINT—Official channels" reason[50445] (according to the certainty factor provided) and to augment the targeting strength[51705] for the other evidence reasons[50445] provided.

HUMINT—Ukrbot supporters[51575]: Feedback from trusted supporters[51575] as to the malign nature of an identity[270] will be accepted by most embodiments. However, most embodiments will treat such information with a greater level of skepticism. As noted elsewhere, even diligent supporters[51575] may simply sometimes be wrong, for example, wishing to target the accounts[220] of cranks or people who are posting things that may be in poor taste. Thus most embodiments will require the potentially malign identity[270] to either/both already be being followed by the targeting system[10000] and/or to be identified by multiple supporters[51575]. Many of these embodiments will discount multiple reports that occur within the same short time span so as to limit the number of cases in which multiple supporters[51575] back-chatter and report the same identity [270] based on the belief of one of the supporters[51575].

Empirically observed regularity: Since each embodiment will have its own evidence handlers, and since new structures in the graph may be discovered over time, most embodiments will support a catch-all category targeting reason[50445] for regularities that are detected but which do not fall into one of the common categories. Most embodiments will generate an operator/analyst alert[50560] when such a regularity appears more than N times, where N is a system parameter[51625].

Figure 7:
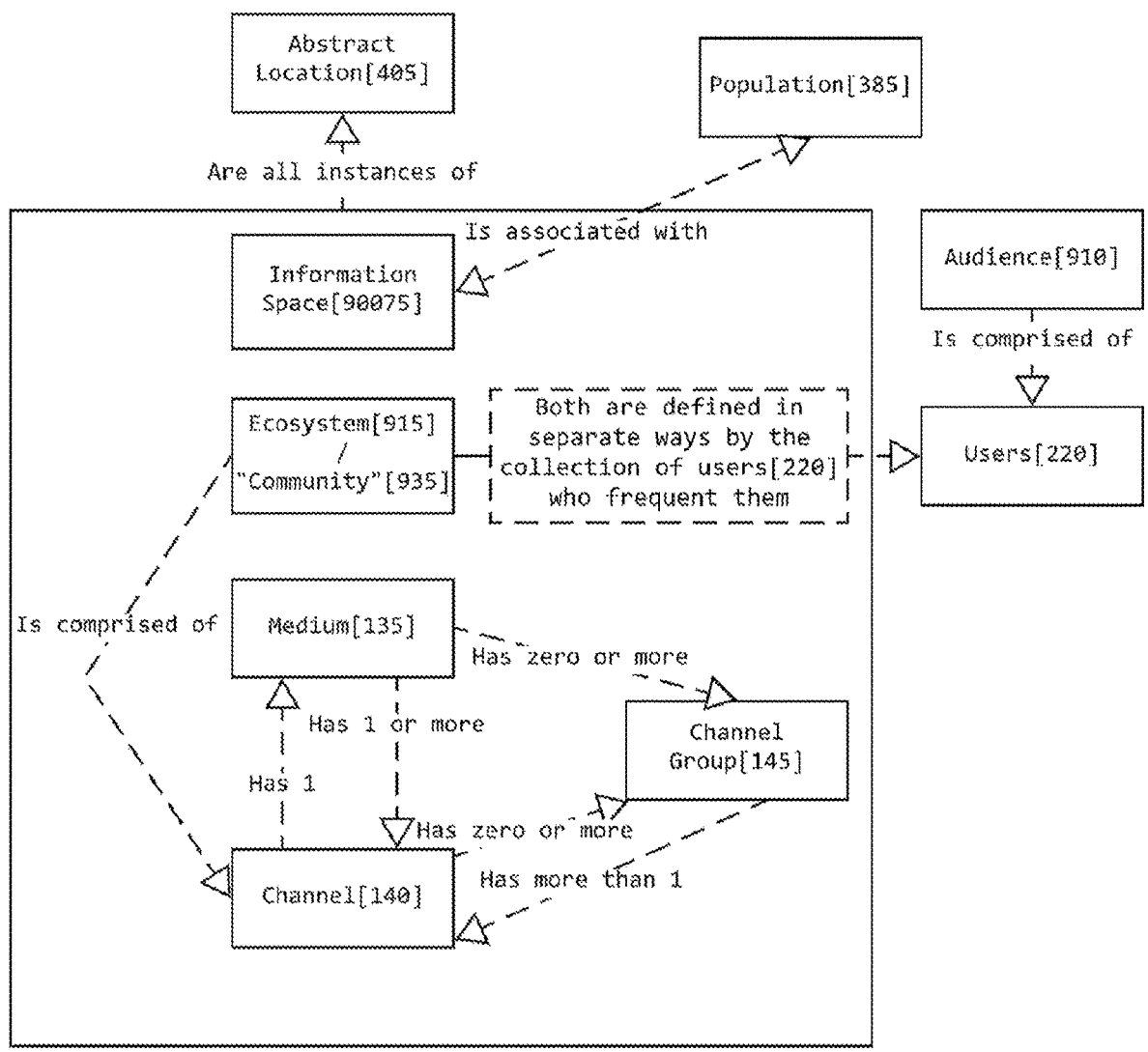
FIG. 7 is a block diagram showing the relationships between the different types of online locations and their visitors.

Excessive influence accrual: Most embodiments will seek to identify identities[220] who have garnered an unusual amount of influence[51620] rapidly within one or more particular locations[405]. Most embodiments will combine shallow medium[135]-specific measures (e.g. retweets, likes, etc) when available and deeper measures such as quoting and referencing of an identity[220]. This is because the idea is to identify any account[220] that seems to be advancing in both real influence and visibility much faster than the norm as measured at different levels of definition of location[405] (see FIG. 7). Most embodiments will waive this test for any new medium[135], since some users[220] will bring already-acquired influence or celebrity to the new platform[190] and hence be starting off with a large advantage.

Targeting System

Definitions

The targeting system[10000] is built around three fundamental elements, a semi-structured data format, a messaging based architecture, and a system for implementing incremental computations in hypergraphs[20405].

Figure 8:
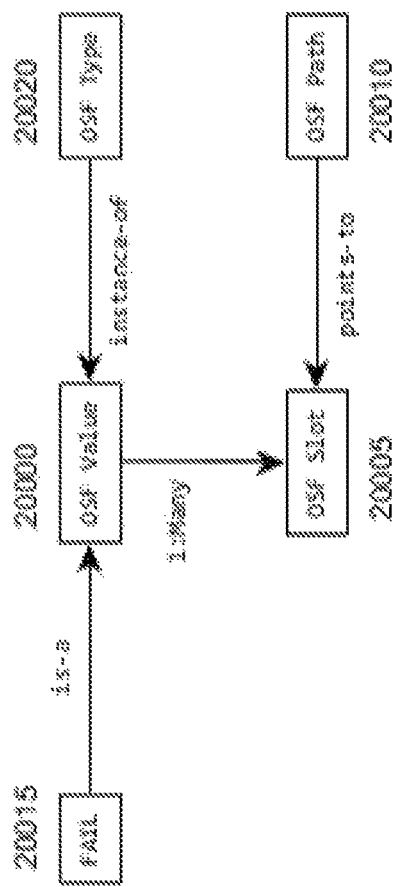
FIG. 8 is a block diagram that shows essential features of the data format used throughout the system.

We use a semi-structured data format based on the "feature structure value" format as discussed in U.S. Pat. No. 10,445,668 B2. In this document we use the term OSF value[20000] as an alias for "feature structure value". As described in FIG. 8, we only explicitly refer to a few concepts, though in terms of functionality the current invention implicitly uses the full functionality as described in the earlier patent. An OSF slot[20005] refers to one of the sub-values[20000] (itself an OSF value[20000]) contained within an OSF value[20000]. OSF paths[20010] are a query (similar in concept to Xpath as used in Web Standards) that selects a slot[20005] in some value[20000]. The path [20010] is invalid if the value[20000] has an incompatible structure (i.e. the slot is not present, or an intermediate value[20000] traversed during lookup doesn't match the type[20020] required by the path). All OSF values[20000] are labelled with one or more OSF types[20020]. A value [20000] can be labelled with a type[20020] if the pair can be unified. (The representation of a type[20020] is itself a value[20000]). A specific value[20000], FAIL[20015], is the result of a failed unification. FAIL[20015] cannot be unified to any other value[20000].

Figure 9:
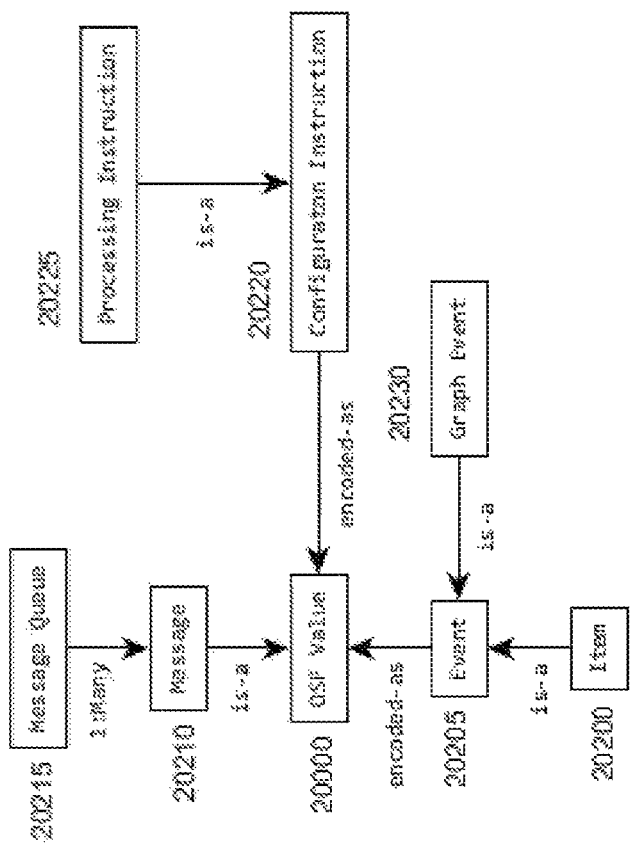
FIG. 9 is a block diagram defining the objects used in the message passing subsystem.

As described in FIG. 9, a message queue[20215] stores and distributes an arbitrary number of messages[20210]. messages[20210] contain a serialized OSF value[20000], which is decoded back to an OSF value[20000] on receipt by clients. Events[20205], representing changes in system state, are generated as or converted to an OSF value[20000], as necessary, and can be sent as messages[20210]. Items [20200] are data records generated by the data collection system[24000]. They may come in any number of data formats, depending on the source and tools used to obtain the data. At the time of this writing, that form is usually JSON (which is compatible in form with OSF values [20000], but only provides a small subset of the OSF value's[20000] capabilities). Most graph[20405] computations are implemented via passing graph events[20230], each representing an update to one element of the graph [20405]. Processing instruction[20225] is a blanket name used to refer to all other message[20210] types used in the system.

Figure 10:
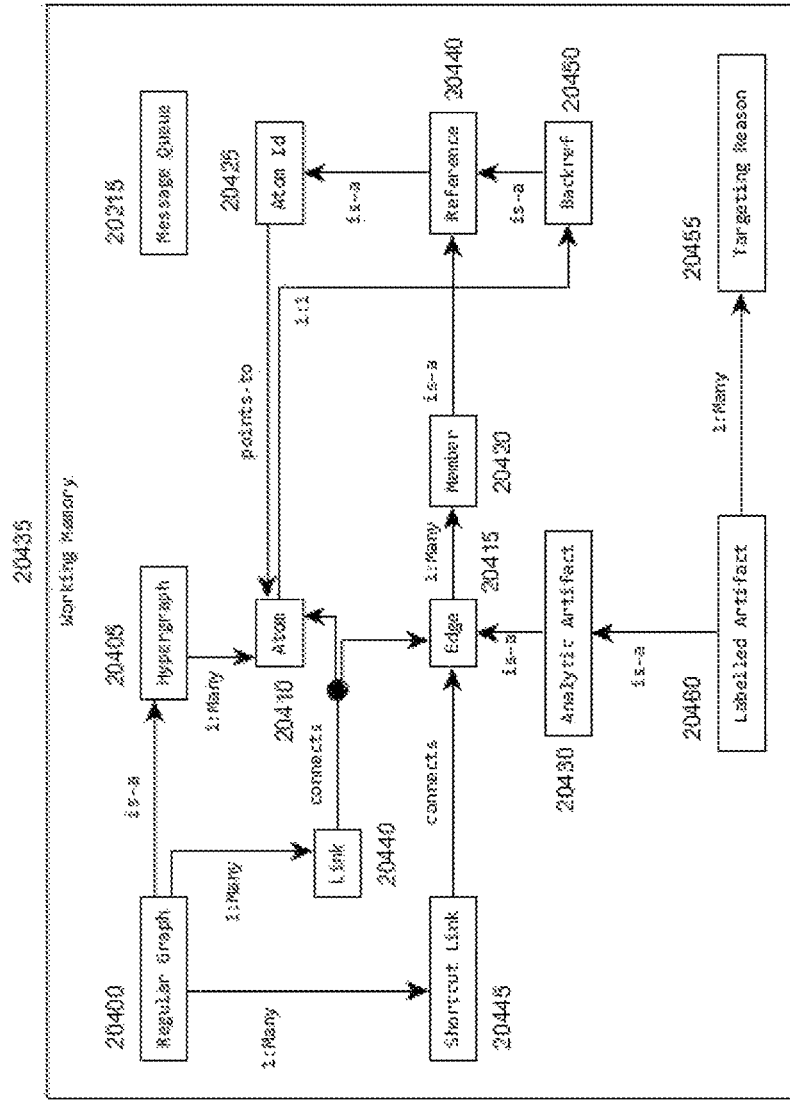
FIG. 10 is a block diagram illustrating the graph architecture

As described in FIG. 10, A hypergraph[20405] is simply a collection of atoms[20410]. Atoms[20410] can be "labelled" with an arbitrary OSF value[20000]. In fact an atom can be represented as an OSF value containing an atom id[20425] slot, a payload slot containing the "label" value, an optional member[20420] list slot, etc. . . . . This means that atoms can be mapped to OSF values. This also means that atoms[20410] can have types[20020], which are used throughout the system. When atoms are qualified in descriptions, for example "identity edge", its implied that the atom is tagged with a type corresponding to a identity[220] definition. Most descriptions of graph processes in this document don't distinguish between the view of an atom [20410] represented as OSF value or as a graph element. However, many embodiments will implement various optimizations in the representation and usage of graph elements. The details of these representations are not important here, as the atoms can always be converted to an OSF value when necessary. One example of an optimization might be to allow certain slots in an atom to be updated in place, for example a frequency counter, rather than producing an endless stream of versions of the atom.

A hypergraph edge[20415] is an atom[20410] that contains a set of members[20420]. Members[20420] are references[20440] (a reference[20440] is implemented as an atom id[20425]) that point to atoms[20410]. This distinction is drawn because atoms[20410] that have not been updated in a long time will eventually be swapped out to storage [10005]. References handle the details of retrieving an atom[20410] when it is not immediately accessible, e.g. its been moved to storage[10005], or is active on another server holding a different subset of a distributed graph[20405]. For the purposes of the descriptions here no distinction is drawn between a member[20420] as a reference[20440] and the atom[20410] retrieved via the reference[20440]. However since there may be a lot of overhead or lag time to access a non-local atom[20410], implementation strategies should be chosen to minimize unnecessary accesses to member [20420] atoms[20410]. It should be noted that only members [20420] are exposed for graph traversal. Atoms[20410] also contain backrefs[20450] which are references that point to prior versions of the atom[20410].

Atoms[20410] without members[20420] are more or less equivalent to vertices in regular graphs[20400], and may sometimes be called "leaves". Regular graphs[20400] are in fact a type of hypergraph[20405], one in which all edges contain two members[20420], referring to leaf atoms [20410]. Regular graphs[20400] are relevant because shortcut links[20445], used internally to optimize traversals between edges[20415], are sometimes exposed as a regular graph[20400] available for use by other parts of the system. Links[20465] are also regular graph[20400] edges that are used to speed up traversals within hypergraph edges[20415]. This is because ANY atom[20410] can appear as an edge member[20420], and edges[20415] can end up with deep hierarchies of sub-edges[20415]. When edges[20415] are created to represent some computational result, they are called artifacts[20430]. A labelled artifact[20460] is an artifact[20430] that has been labelled with a targeting reason [50445] (i.e. added a targeting reason[50445] slot). This idea of labelling, or decorating, atoms[20410] is also called "attaching a value".

Two edges are considered incident to each other if they share members[20420]. In some embodiments, there may be additional, configuration driven, conditions on incidence relations, for example that the edges[20415] should share some percentage of their members[20420], or require some fixed number of shared members[20420]. Given this, determining incidence may be expensive, and some embodiments may cache incidence relationships as an optimization. This is where the shortcut links[20445] come in. There are various strategies for using these links[20445], from computing shortcuts between all pairs of edges, to only caching shortcuts for frequently traversed or recently traversed edges

[20415] (for instance by maintaining an LRU cache). Similarly, links[20445] can be cached to speed up various operations on edges[20415].

Finally, the collection of OSF Values available as active atoms[20410], or in message queues[20215], is referred to as working memory[20435]. Many descriptions refer to "aging out" atoms[20410], basically swapping atoms [20410] out to storage[10005], removing them from working memory[20435]. Sometimes memory pressure may require that older atoms[20410] be swapped out to make room in working memory[20435]. In such cases, atoms [20410] only referred to via backrefs, and local copies of atoms[20410] that were retrieved from other locations are removed first.

The overall system is designed with the idea that there will often be multiple copies, called instances, of the same atom[20410] resident in working memory[20435]. This issue is addressed in greater detail later, but it should be noted that allowing copies can make many graph distribution problems easier (such as sharding a graph[20405] without breaking up atom[20410] neighborhoods).

Data Collection System

Figure 11:
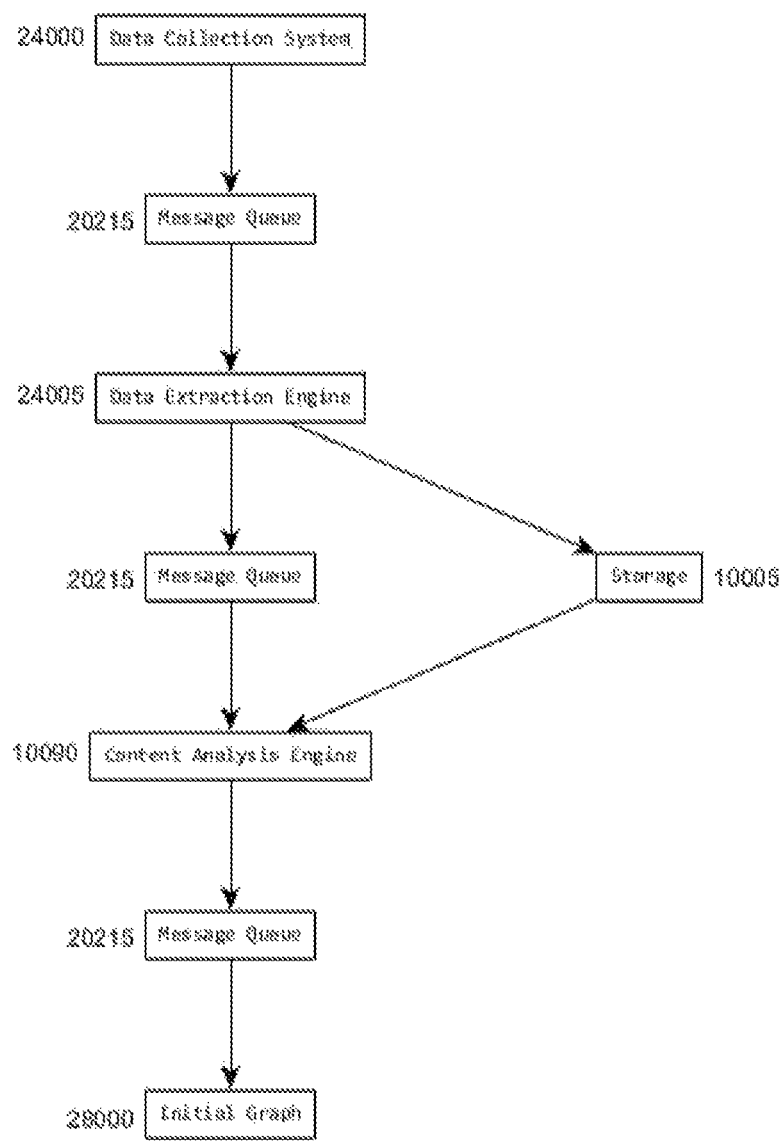
FIG. 11 is a block diagram illustrating the data processing steps transforming raw data into the items sent into the initial graph.

FIG. 11 provides a very brief description of the data collection process. Its included to highlight some important assumptions later in processing. The data collection system [24000] produces data records serialized into any number of data formats and sent to an initial message queue(s)[20215]. One or more data extraction engines[24005] are responsible for extracting individual items[20200], typically social media posts, articles, profiles, etc. . . . from incoming data records. At this point items[20200] are mapped to OSF values[20000] with a globally unique id attached. Items are sent on to a content analysis engine[10090] (presumably there is a large pool of them). The engine[10090] is responsible for decorating the item[20200] with annotations, descriptions, evidences, etc. . . . . When the process is finished items[20200] are then passed on to the initial graph[28000], where the first task is to map these items [20200] to edges[20415]. The goal is to break out every possible constituent of the item[20200] and its attendant decorations into members[20420] at some level within the target edge[20415]. This means that all of the constituent relationships are exposed for edge traversal. This simplifies many computations, as they can be implemented via a small set of graph[20405] operations. In fact there are several computations that can be expressed as the application of a single operation. Embodiments are free to add more sophisticated approaches, but the goal here is to describe minimum requirements for the enablement of the invention.

Most embodiments will immediately store data records, and the initial items[20200], for archival purposes. For items with large content[950] data, the extraction engine may send it off to storage and leave a reference in its place. Its likely that by directly interacting with storage[10005] the extraction engine and the content analysis engine[10090] may be able to shuttle the data around more efficiently. After the content analysis engine[10090] finishes its work, it should be relatively rare that other parts of the system need to examine the content directly (though there is one obvious exception). Some embodiments might find a way to move textblock[10050] detection, and shared texts[28015] detection to run at the content analysis stage.

Core Processing Model

Figure 12:
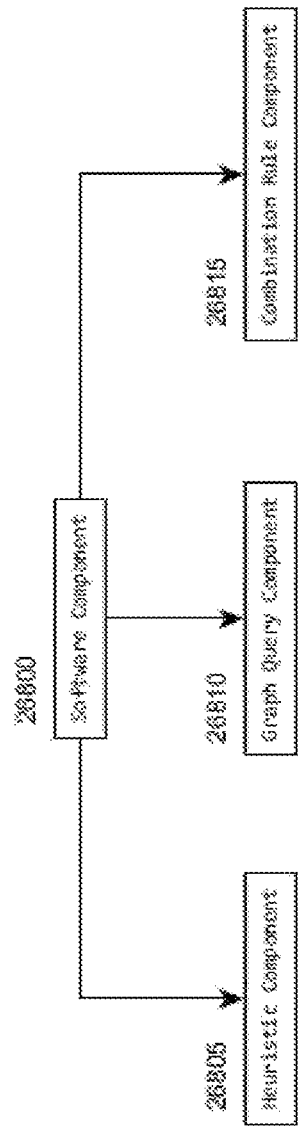
FIG. 12 is a block diagram defining some commonly used software components.

As in FIG. 12, the preferred embodiment assumes the use of a software component[26800] architecture that allows components[26800] to be loaded and configured at runtime via configuration information. This means that servers can more easily be set up to perform a range of tasks. Some embodiments might add processing instructions[20225] for the same purpose, enabling a server's role to, in theory, be switched on the fly. The system defines three classes of components that are used throughout: heuristic components [26805], graph query components[26810] and combination rule components[26815].

The preferred embodiment for the targeting system [10000] is an event[20205]-based distributed architecture based on message queues[20215]. The system[10000] is intended for high volume streaming data. Analytic results are stored as edges in a layered collection of hypergraphs [20405], but it is not assumed that all analytic algorithms are implemented as graph algorithms. In most cases analytic results are derived from a mixture of hypergraph algorithms and additional algorithms specific to individual analytic components[26010]. However the main distribution model is that of the hypergraph processing framework described here. Analytic results are represented as collections of edges [20415] in a hypergraph[20405]. An individual edge[20415] is called an analytic artifact[20430] and retains a unique identity across revisions generated as items[20200] are added to the system. Many of the design decisions in this architecture are based on deciding when an artifact[20430] is another revision of an existing artifact[20430], a new artifact[20430] or something in between (such as the splitting of an existing artifact[20430] into some number of descendant artifacts[20430]).

Message queues[20215] are provided by many current existing software systems. In the preferred embodiment described here, we assume that a large number of message queues[20215] are available in a distributed system. In the preferred embodiment, all events[20205] used by the targeting system[10000] are encoded in OSF values[20000], but events[20205] coming from other systems, such as the data collection subsystem[24000] may be encoded in some other representation (likely JSON or a binary format used by specialized serialization frameworks such as protocol buffers). Other embodiments may use different encodings, so long as they are compatible with OSF values[20000] (or a functionally equivalent substitute). Software components can subscribe to individual message queues as a either a producer or as a consumer of messages. Individual messages may be distributed to multiple consumers. Message queues [20215] can be labelled with a topic[165] name, and software components can search for message queues that use this label.

We use the standard definition of event[20205], namely a representation of a significant change in state. For example events[20205] sent between a base graph[26235] and its projection[26240] are generated when edges[20415] are created or modified in the base graph[26235]. The events [20205] discussed in this application are distinct from the intragraph events generated to implement algorithms in a distributed hypergraph system. The events[20205] described in this application are intergraph events[20205].

Figure 13:
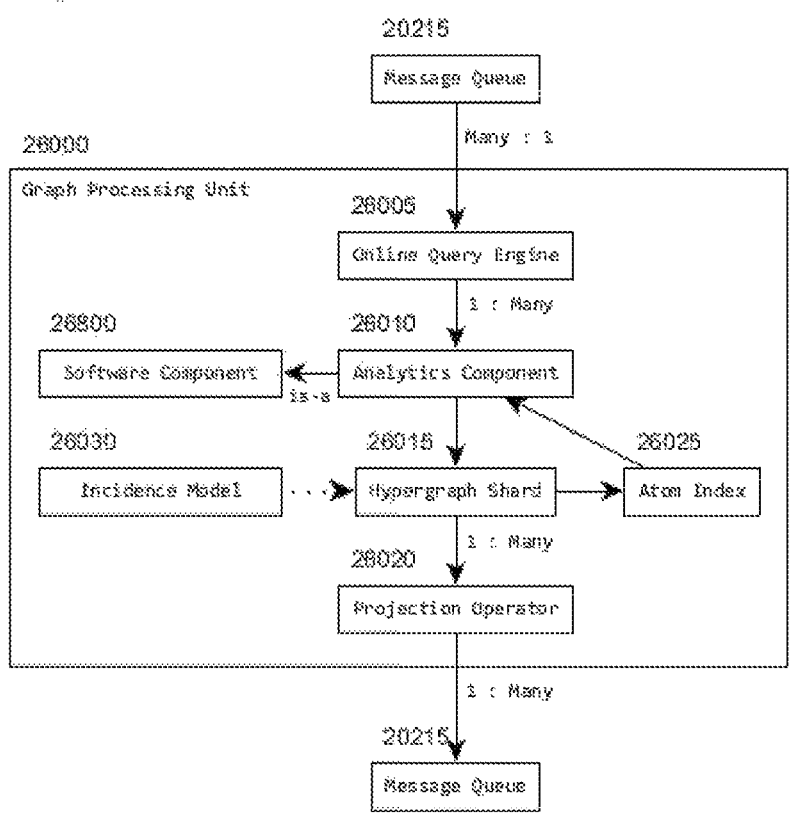
FIG. 13 is a block diagram showing the software architecture of a graph processing server.

As described in FIG. 13 a graph processing unit[26000] accepts messages[20210] from one or more message queues [20215]. messages[20210] contain encoded OSF values [20000], which are decoded and filtered through an online query engine[26005] as described in U.S. Pat. No. 10,445, 668 B2, with some additional modifications and extensions described below. The online query engine[26005] distributes OSF values[20000] (either derived from the incoming message[20210] or created created by query operators during evaluation of the query) to an analytics component[26010]. The analytics component[26010] is responsible for creating atoms[20410] to be entered into the unit's[26000] hypergraph shard[26015]. As atoms[20410] are created (or updated) in the shard[26015] they are also added to one or more search indexes based on their representation as an OSF value[20000]. The search indexes are maintained for a predetermined set of paths[20010]. atoms[20410] can be retrieved from the index by searching on a combination of the path and an OSF value[20000]. There can be one or more analytics components[26010] which each contribute to the pool of paths[20010] to be indexed. Analytics components [26010] use these indexes to retrieve relevant atoms[20410] during the computation of analytic results. Changes to the shard[26015], consisting of new atoms[20410] or updates to existing atoms[20410] are reported to one or more projection operators[26020]. A projection operator[26020] is a software component that takes in atoms[20410] and produces a possibly new set of atoms that are a "view" of atoms[20410] in the graph. The operator[26020] is free to change the representation of atoms[20410], filter out atoms [20410], combine atoms[20410] into higher level edges [20415] and so on. However, these operators[26020] are not intended to create anything truly new, but rather to transform the current graph[20405] in some way. In most cases projections[26240] will be used to filter atoms[20410] in the graph[20405]. One requirement is that the ids of atoms from the local graph need to be retained. In most cases this happens by creating a new, partial instance of an atom [20410], retaining the same id. If atoms are bundled into an edge[20415] for some reason, then the operator[26020] is subject to the same rules for id creation as are described below, note that the ids of the original atoms[20410] will be retained as members[20420] of the new edge[20415]. The atoms[20410] produced by an operator[26020] become events[20205] which are encoded as messages[20210] in outgoing message queues[20215]. The preferred embodiment will assume that events[20205] messages[20210] are produced and sent individually. Other embodiments are free to aggregate events[20205] for the sake of efficiency.

There are two senses in which graphs[20405] are distributed within the system. In the first sense, closely related atoms[20410], such as atoms[20410] generated from items [20200] on the same channel[140], are allocated to a graph [20405] running on one server. In this sense analytics [26010] running on such a graph use only local information (or can be well approximated using local information) and for these analytics[26010] atoms[20410] will be distributed amongst a large number of individual graphs[20405]. Here we define "local" as atoms[20410] that are reachable within a bounded path length if all relevant atoms were to be collected within a larger graph. atoms[20410] with a high degree of semantic similarity or some other relevance measure may also be considered local. analytics[26010] used in this sense are called "local analytics" [26010]. The system allows for (and in fact encourages) duplication of atoms [20410] across different graphs, in order to make it easier to create these local groups (when, for example, an atom [20410] is considered to be local to atoms[20410] in two or more of these smaller graphs[20405]). The second sense is the traditional model of a distributed graph[20405], where the set of atoms[20410] comprising a single graph[20405] are distributed across several servers. Note that if the individual graph[20405] used by a local analytic[26010] grows to be large then it may have to be distributed in this second sense as well. However, local analytics[26010] have been defined with the expectation that the individual graphs [20405] can be represented on one server. Analytic components[26010] that are intended to be applied in larger, distributed graphs[20405] are called "distributed analytics" [26010]. Clearly these analytics[26010] require much larger overhead, because of the communication required between the constituent shards[26015] of the graph[20405]. The messages (or whatever communication mechanism is used) generated within a distributed graph are not part of the scope of this patent. Any of several existing technologies for distributed, streaming processing of hypergraphs, or some implementation based on one of them, may be used in different embodiments of this system. Since hypergraphs [20405] can be mapped into an equivalent regular graph representation, the incidence graph, its possible to use existing technologies for computing with distributed, streaming simple graphs. This mapping represents each atom[20410] as a vertex, and for each atom[20410] draws an edge between it and each of its members[20420]. For standard hypergraphs, the resulting regular graph is a bipartite graph. In the case of the extended hypergraph[20405] mechanism used here, the mapping for an edge[20415] is an arbitrary regular graph, including cycles. This results in a regular graph where the vertex representing an atom[20410] has incoming regular edges from the vertices representing all edges[20415] that contain it. There are various optimizations to this scheme which could be used in different embodiments. For example we could flatten edges[20415], so that all atoms[20410] reachable through membership (rather than just the direct members[20420] of an edge [20415]) be treated as incident.

The online query engine[26005], as described in patent U.S. Pat. No. 10,445,668 B2, is extended in this application. Very briefly, the original enablement compiles queries to a network of match nodes. Multiple queries can be compiled into the same network, with the compilation process ensuring that common sub-parts of queries only occur once in the matching network. A stream of OSF values[20000] are processed one at a time, and matched against all queries compiled into the network. Queries consist of different combinations of matching conditions on paths[20010] in input OSF values[20000]. Queries can specify conditions across multiple input values by retaining state information between processing of input values. The purpose of this engine is to handle large numbers of queries efficiently. The matching network has an initial node that receives OSF values and implements a tree of matching conditions on those values. For every condition satisfied within this initial tree for an OSF value, a token is created which is then sent to one or more downstream match nodes. These later nodes implement various combinatory conditions (corresponding to query operators), which fire when tokens satisfying their conditions arrive and then create new tokens which are passed to later match nodes. The network terminates at one final node. Any tokens that are reported to this final node have passed the conditions specified in one of the queries compiled into the matching network.

In the current application, the input OSF values[20000] may represent items[20200] passed on from data collection, edges[20415] passed to a projection graph[26240], as well as additional values[20000] representing processing instructions (such as modifying parameter values). The specific query language used is largely the same as described in patent U.S. Pat. No. 10,445,668 B2. Our first extension is the addition of query operators that can be used to create new OSF values to pass on as results (for example converting incoming items[20200] into values meant to be entered into the processing unit's shard[26015] as atoms[20410]). This construction process is implemented by specifying unification equations, which unify multiple values[20000] to create a new merged value[20000]. The equation fails if there are any mismatches in the paths shared in common between the input values[20000], causing any query containing the equation to fail. We have a general principle that inconsistent structures are filtered out. These unification equations can be used as a general mechanism for filtering out potential analytic results. Our second extension is that there can be multiple final states. These represent different contexts in which to interpret query results. The query language used is extended so that each query is written within a statement that defines the query's context. These contexts specify a target software component (such as an analytic component) and therefore implement routing of input values and any other values created by query operators to software components. Target components can be any of the high level components listed in FIG. 13. Note that some analytic components may define multiple entry points, generically called buckets [27110] here. This system is meant to support dynamic configuration of processing units[26000]. For example directives could be used to load/activate new analytic components, add or subtract queries in the query engine[26005], modify the projection operator[26020] parameters, and so on.

The most basic function of an analytic component[26010] is to translate OSF values[20000] into atoms[20410] to be entered into a hypergraph shard[26015]. These atoms may be new or may be new versions of existing atoms. In order to do this, the system needs a method to create stable atom ids. The first requirement is that items[20200] entering the targeting system[10000] from data collection[24000] have globally unique ids. These ids must be stable, which essentially comes for free as long as item ids[20425] are guaranteed to be unique, as items are logged and can be replayed from these logs when necessary. All atom ids are derived from these ids.

Analytic components[26010] don't need to guarantee global uniqueness, but rather need to create ids such that if two analytic components[26010] running on different servers create atoms with the same id then:

the atoms[20410] are of the same type (ie they implement the same analytic process)
the atoms can be considered (partial) instances of the same logical atom.

When different analytic components[26010] create instances of the same atom[20410], its expected that the OSF values[20000] representing those instances can be unified. Note that this unified value may itself still be a partial instance of the logical atom it represents. When the instances can't be unified, it means that the system does not have a consistent representation and is cause for filtering out or removing the atom[20410] when the mismatch is detected. For example, if instances of the same atom[20410] are reported from two different base graphs[26235] to the same projection[26240], and two atoms[20410] are not consistent then they will be filtered out of the projection [26240] (or removed/invalidated). This is an integral part of the general technique of building up results through layers of analytic processing. It also enables a method for handling items[20200] coming from data collection[24000] out of order. If the processing of an out of order item[20200] causes a prior (partial) atom[20410] to become inconsistent, the update to that atom[20410] will be propagated to all downstream projections[26240], potentially invalidating dependent atoms[20410]. FAIL[20015] is the OSF value [20000] returned from an unsuccessful unification. Any other value[20000] unified with FAIL[20015] results in FAIL[20015]. This allows us to invalidate atoms[20410] by including a FAIL[20015] value in any slot within the atom [20410]. Therefore we can still rely on simply reporting graph[20405] events to pass invalidations to downstream projections[26240]. The system[10000] can pass an atom [20410] instance with ids and all information necessary for downstream analytic components[26010] to recompute and invalidate derived analytic artifacts[20430]. Essentially this means that the last version of an invalidated atom[20410] is resent with an extra slot[20005] containing a FAIL[20015] value, so that downstream analytics can process it in the same way as when it was previously seen and therefore determine which downstream atoms[20410] have to be invalidated. Some embodiments may use a modified form of unification, which rather than failing a unification operation wherever a mismatch is found (where ANY value[20000] compared to FAIL[20015] is a mismatch) instead inserts FAIL[20015] values in appropriate locations in a unification result. Due to the above requirement that atoms[20410] remain consistent (more precisely that the OSF[20000] representation of all instances of an atom[20410] be unifiable), updates may be done by some form of versioning. Whether versioning is allowed depends on the individual analytic components[26010], depending on what kinds of changes are allowed or required in analytic results as additional input items[20200] are processed. In the case that versioning is used, new ids must be generated. When an atom[20410] is versioned, a slot[20005] is added to the new version containing the id of the prior version. Different embodiments will handle invalidation of newer versions of atoms[20410] should a prior version be invalidated depending on the implementation of the graph shard's[26015] data structure. Policies for handling the interaction of versioning vs updating and their interaction with invalidation will be specified by individual analytic components[26010], depending on their needs.

Adaptive Control of System Parameters

Figure 14:
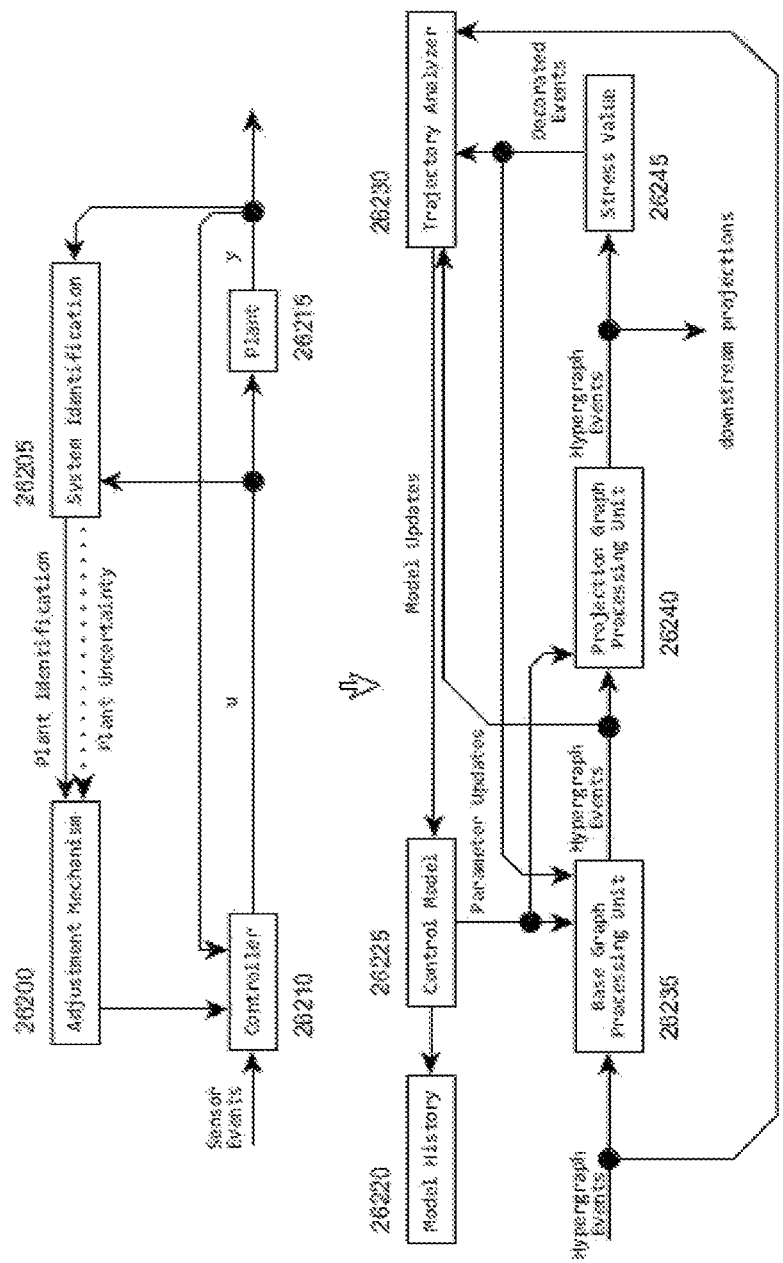
FIG. 14 is a block diagram illustrating the adaptive control loop used to set parameters for various analytics.

This application defines a system inspired by MIAC—Model Identification Adaptive Control. FIG. 14 includes a simplified version of a standard MIAC architecture. Its included for comparison to the general process we use for analytics computations described in the lower half of the diagram. The scheme is an extension of the trajectory [26600] mechanism introduced in "System and Method for Detecting and Analyzing Digital Communications," U.S. patent application Ser. No. 16/576,736, filed Sep. 19, 2019, herein incorporated by reference in entirety. One of the problems being addressed is the accommodation of drift in analytic artifacts[20430] over time. An analytic artifact [20430], for example a social group, will obviously exhibit changes over time due to changes in group membership for instance. However, there are other sources of change, for example overall levels of activity on a channel[140] (or channels[140], or possibly a wider scope) may change, the leadership, or the central issue the group is organized around may change, the group may split, or merge with another, and so on. In addition there may be more globally driven changes to parameters of the analytic component[26010] which finds these groups, such as the activity level required to be considered a member of a group. For purposes of the example, the activity level could be set at the top 10% of activity levels across the dataset or something similar. Within this web of ongoing changes, the question becomes deciding whether a group artifact[20430] is related to one of the current groups (ie as the next version of the group, or as a split from the group, or represents a new group). The other general problem, arises from measure-countermeasure cycles as described in "System and Method for Detecting and Analyzing Digital Communications," U.S. patent application Ser. No. 16/576,736, filed Sep. 19, 2019, herein incorporated by reference in entirety. This cycle results in the same question as above, what existing artifacts[20430], if any, are newly reported artifacts[20430] related to. The process for individual artifacts will follow the process used in MIAC systems, but in general will not be amenable to the same mathematical techniques. However, analytics[26010] controlled by such techniques are possible. The general issue comes down to finding long term patterns of change in the incoming data without being unduly influenced by drift in individual artifacts[20430]. Many of the parameters used in analytic components[26010] will likely be discrete, particularly those used in evaluating language and semantic evidence. For example, if a new term or meme emerges describing some target, the equivalence of that term or meme to existing ones (at least for purposes of the analytic) would be considered part of the parameter set for the analytic[26010].

Figure 15:
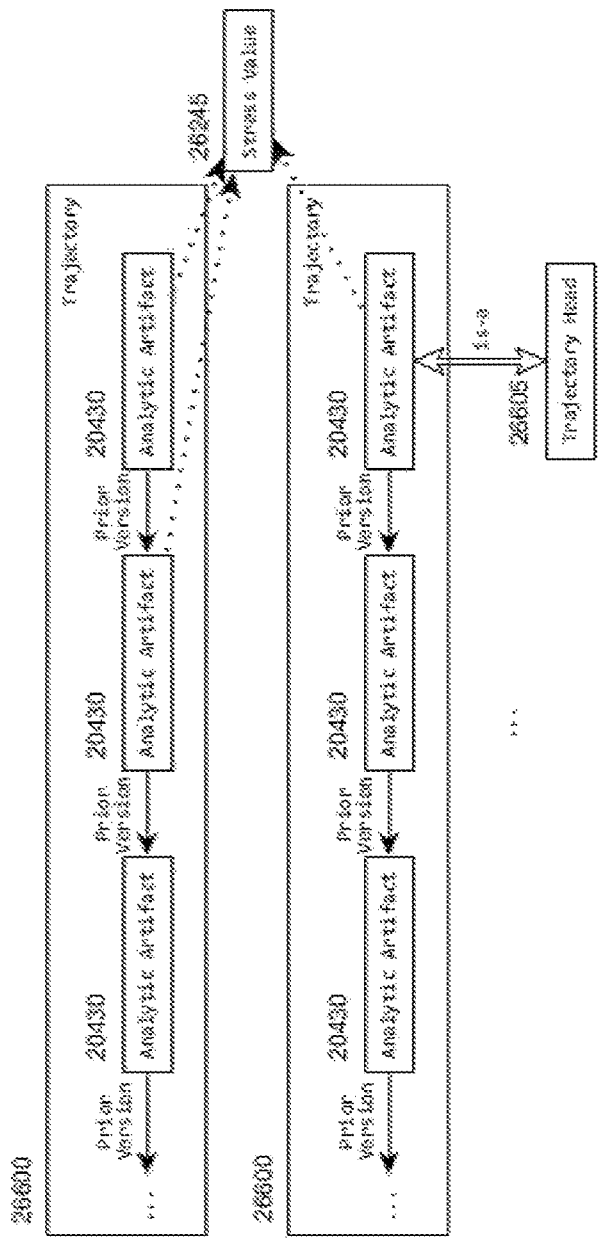
FIG. 15 is a block diagram defining the trajectory data structure.

Any analytic results subject to this kind of control need to be represented with trajectories[26600]. As shown in FIG. 15, a trajectory[26600] consists of a list of versions of some analytic artifact[20430]. Past versions are referenced by id and are not considered member atoms[20410] of the artifact for purposes of determining edge[20415] incidences. If the chain is long enough, at some point the referenced prior versions will not be resident in working memory[20435]. On going far enough back prior versions may only be available in storage[10005]. Stress[26245] is an error value based on differences between the artifact[20430] at the front of a trajectory[26600] and previous versions. Stress[26245] may also involve comparisons with other trajectories in the graph[20405]. The exact form of the stress value[26245] is dependent on the analytic component(s)[26010] involved, however it will usually be multidimensional and will include values of different types, both continuous and discrete. Therefore stress[26245] will in the preferred embodiment be an OSF value[20000].

The general form of the process is described here, specific details will be added in the descriptions of individual analytics components[26010] below. The most general form of the process applies to a pair of a base graph processing unit[26235] and a projection[26240], though it also applies to the case where there is no projection[26240] and trajectories[26600] are calculated directly. The control model[26225] determines parameters for the various software components within the graph processing unit(s)[26000]. model[26225] data will in general be modified by the trajectory analyzer[26230], but can also accept external inputs (e.g. goals entered via human operators[250]) and may be initialized via system knowledge bases[10270]. In particular, discrete parameters, including relevant topics[165], identities[220], important real world simple events[11005] and complex events[170], will be drawn from system knowledge bases[10270]. A model history[26220] is kept as parameter values passed to the rest of the system may be determined by a combination of the current and past model[26225] states. The purpose of the trajectory analyzer[26230] is to reduce the amount of stress[26245]. Stress values[26245] are calculated for each trajectory[26600] update, and are added to the event[20205] generated for it. While not defined as a measure, stress values[26245] at the very least need to be partially ordered. Realistically stress values[26245] calculated for two different trajectories[26600] may not be comparable, particularly in light of the prevalence of discrete parameters. For example if an analytic is based on references to simple[11005]/complex[170] events, two different trajectories[26600] might not have any overlap between them, and thus the stress values[26245] would not be comparable. Within a trajectory[26600], the stress values[26245] will generally be comparable. To continue the simple[11005]/complex[170] event based example above, a (partial) ordering might be based simply on the size of the difference between the head and earlier versions of the artifact[20430] in one trajectory[26600]. The minimization function of the analyzer[26230] is subject to some constraints, as we only care about significant or longer term sources of drift. When a trajectory[26600] is subject to a measure-countermeasure cycle, the intent of countermeasures taken by the opponent to avoid detection is to change the behavior represented by an artifact[20430] while still allowing users[220] to recognize the modified behavior. This means that the trajectory analyzer[26230] can assign more significance to the changes seen in an individual trajectory[26600], and may just incorporate those differences into the updates passed back to the control model[26225]. For example in the case discussed above, if a new simple[11005]/complex[170] event appears in a trajectory[26600] the analyzer[26230] may report back to the control model[26225] that it is now more strongly related to the other simple[11005]/complex[170] events which appear in that trajectory[26600]. When we are looking for other sources of drift in trajectories[26600], the analyzer's[26230] responsibility shifts more to finding stable and long term changes in characteristics across trajectories[26600] as a whole. There are multiple approaches to this, such as building frequency based statistics or gradually modifying a copy of the control model[26225]. Going back to the example of computing social groups, if participation levels of the users[220] is important to the analytic[26010], then the analyzer[26230] might simply track a statistical distribution of group participation. However, we do not want the model[26225] to be biased by only looking at the distribution over the groups selected for the final trajectories. The actual calculation might involve looking at participation levels of users[220] across the dataset, versus users[220] in identified groups found before any additional filtering, and so on. For this reason the diagram shows events coming into the base unit[26235] being distributed to the trajectory analyzer[26230] as well as events[20205] that are coming out of the processing unit(s)[26000]. In the preferred embodiment this is implemented by making the analyzer[26230] an additional subscriber to all of the message queues involved and it is then up to the analyzer[26230] to determine what it needs. For example it may randomly sample the various event streams to build estimates of the properties it is tracking.

FIG. 14 shows one instance of a control loop, but in practice there could be a many-many relationship between control models[26225] and processing units[26000]. The more general way to think of it is that a control model[26225] is responsible for a set of parameters, and a processing unit[26000] may use parameters provided by one or more control models[26225], which in turn means that each control model[26225] may have to collect updates from multiple analyzers[26230]. Trajectory analyzers[26230] will be in more of a one-to-one relationship with a particular projection[26240], but may still collect messages from multiple sources. These relationships can be managed via subscriptions to messaging queues[20215] by the various software components.

Analytic Components

Synchronization Detection

This section describes a general mechanism for detecting many different kinds of synchronization relationships between entities[27005]. Synchronization is a relationship between entities[27005] when they behave in the same way, in some sense. This can be an issue of when the behaviors occur and/or what the behaviors are and/or exhibiting a pattern of behaviors (whether a pattern of behaviors by each entity, or a pattern of behaviors across a group of entities). This is deliberately broad, not only because there are many different kinds of behaviors (and thus different ways that they can be shared) but because adversaries[265] may attempt to alter their behaviors in order to avoid detection.

Figure 16:
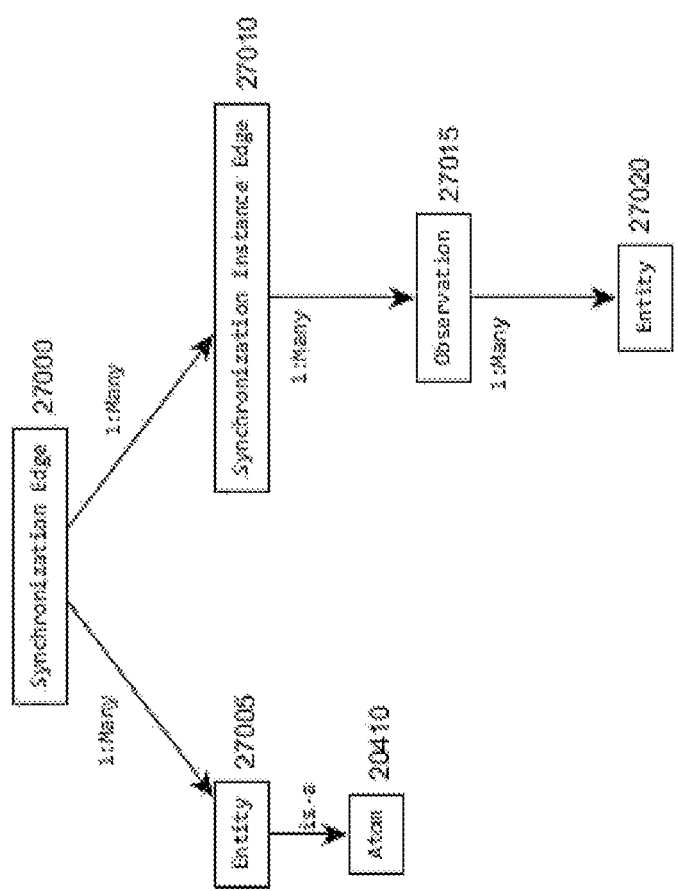
FIG. 16 is a block diagram of the synchronization edge data type

We define an abstract representation of a synchronization relationship in FIG. 16. Established relationships are represented as a synchronization edge[27000]. A relationship [27000] is intended to be consistent and stable, its generally based on detecting multiple instances of individual synchronization instances[27010]. In part this is to filter out cases where observed behaviors happen to randomly occur together. The synchronization instance edge may itself represent several occurrences, but the expectation is that the instances are isomorphic, they reference observations [27010] of the same behaviors, with the same entities [27005] organized in the same way. The different instances [27010] forming the basis of a relationship[27000] may vary in ways that are dependent on the specific relationship. For example, individual instances[27010] could be different subparts of a larger relationship, or we may consider instances to be part of the same relationship as long as differences (errors) from the relationship[27000] are infrequent (more generally satisfy a statistical criterion). We use the term observation[27015] to refer to an instance of a behavior, however defined. A synchronization instance [27010] may be based on any number of observations [27010]. At this level of description, we allow for those observations[27010] to be structured in an arbitrary way, they don't have to be a simple list, they may be arranged in a tree or some other structure. Often these instances will be events[20205] emitted from some earlier stage. Relevant entities[27005] will be extracted from observations[27010]. Typically we are interested in users[220], communities [935], or narratives[155] (narratives[155] can have behavior in the sense that if a set of events[20205] is considered to match a narrative, those are observations[27010] "caused" by the narrative[155]). Similarly as for a synchronization instance edge[20415], synchronization edges[20415] directly contain a set of entities[27005] based on the entities seen in the synchronization instances[27010] associated with the relationship[27000]. Again, these entities[27005] may be arranged in a data structure derived from the set of associated synchronization instances[27010].

However there may be cases where entities[27005] can not be attributed to observations[27010], but we can always make a partial instance that captures at least some information about an entity that might fill that role. This information serves as a constraint on whether an entity could be associated to the partial instance at a later point (again unification can be used as a simple and direct way to determine whether a proposed entity is consistent with the information we have). At the very least, we can include timing and properties of the observation itself in this partial description. In general there will be other sorts of information available, such as attributes that can be inferred from any content in the observation, references to potential users in other observations, etc. . . . .

Synchronization relationships are useful because they are indirect. These relationships can be used to infer social or other kinds of relationships between entities that we can not directly observe. When entities are involved in some kind of joint activity, its very, very difficult to avoid synchronization of behavior. These non-observed relationships may be based on shared environmental conditions, social interactions not captured in the data set, shared goals or activities between the entities involved (whether observed in the data set as a whole or not), and many other kinds of shared context.

A graph of synchronization relationships is very useful for indicating group structure. Synchronization relationships are generally stronger than the kinds of links that are typically used in social network approaches. In real world datasets those links generally come down to reply/reference/forward/ etc. . . . operations that can be easily derived from the source they are collected from. Synchronization relationships are much stronger, if for no other reason than that they are more selective (the requirements for synchronization will create a much, much smaller set of links). For this reason, we can define communities[935] much more loosely than the typical clique/module based techniques. Each relationship[27000] already carries the implication of a social relationship, whereas typical techniques depend on structure of the links to assign significance (e.g. all entities in a set interact more with each other than with those outside the set). This means we can just use simpler and faster techniques, like running connected components with a threshold on edge weights, and then look at the structure of the resulting groups rather than the other way around. As a general rule, the less the group looks a clique, the more structure it has. This is very similar to the role of entropy in information theory or combinatorial mathematics, where entropy is inversely related to informational content.

The simplest example of a synchronization is when two entities exhibit the same behavior at the same time. In the context of a website, this might be making posts at the same time. In practice an time interval is used, the length of which can be parameterized by characteristics of the interactions the analytic is looking for. Short intervals or more likely to represent a common activity, where longer intervals represent a relationship that is more indicative of a shared pattern of behavior. In one case, when using intervals of 1 second and simply recording when posts were made (with no regard to content or other characteristics, groups of twitter channels that were posting a common set of ads, frequently at the same time, were exposed. In this case the channels within each group were generally found to have similar (usually political) agendas. At the very least the channels within these groups were very likely to be run by members (or one user with multiple accounts) of a common organization, or in the smaller number of cases where the channels did not have similar agendas, had established a relationship with some third party distributing ads. In either case the ads were almost certainly posted by an automated process. With longer intervals, we start finding groups of users with similar habits, such as the time of day/day of the week that they are posting and such like. By themselves these can hardly be said to imply some kind of hidden social relationship or similar, but when combined with other analytic results, may strengthen the relationship. For example, troll[260] farms have shown patterns like posting during a fixed set of working hours. If a group identified by other analytics which show behavior consistent with trolling also lines up with a group synchronizing over one of these longer intervals, if increases the strength of the identification.

The overriding problem with detecting this kind of synchronization is that the vast majority of the posts falling in the same interval are landing there randomly. Its only when there is a consistent pattern of posts from two entities falling into the same interval that it starts to look like a significant synchronization relationship. Additionally, we want to compare those posts to the involved entities overall posting behavior. The larger the proportion of an entities overall posts are synchronized with the other entity, the more significant the relationship. Alternatively, if the synchronized posts from either of the entities have other similarities between themselves and/or are somehow different from the other posts from those entities, the significance is stronger. This pattern of issues is essentially the same for synchronization relationships in general. Significant relationships are buried in a sea of random co-occurrences, and we need to apply additional constraints, usually statistical in nature, to filter them out. Another problem in detecting these is that large, additional record keeping data structures are required. One ameliorating factor is that its less likely to run into random co-occurrences when the synchronization model is more involved. Even so, we will often have to resort to some kind of approximation algorithm, though when doing so we prefer to use one which retains higher accuracy at the cost of some recall (ie it doesn't find all synchronizations, but the ones it finds are valid).

In the current example, one approach is to use some variation of caching to retain entities, at the cost of simply dropping most single occurrences. We desire a cache which limits the number of data values stored. A least recently used cache configured to store a pair of an entity and a frequency, for example, will continue to store entities that occur at an approximate rate higher than cache size/number of entities per interval (actually this rate is a minimum guaranteed rate, as entities that are already in the cache do not need to be replaced). When an entity is encountered, and is already in the cache we increment the frequency, and if another entity in the cache needs to be replaced, then it is added with a frequency of 1. As each entity is encountered, we check to see if it is already in the cache with at least some minimum frequency and create synchronization edges to other entities in the cache as long as they have at least the minimum frequency. The higher the minimum frequency the more biased towards detecting bursts of behavior this method becomes. We could choose to only emit new edges when the in cache frequency reaches the threshold, which would help tilt the bias back towards long term behavior, as edges generated from a burst of behavior would not accumulate heavier weights as the burst got bigger. The larger the cache, the smaller the bursts would have to be in order to be detect. However, in general the cost of this approximation is that low frequency synchronizations occurring over long periods of time are less likely to be detected.

The above mechanism will likely report a synchronization relationship between for the same pairs of entities many times, and will increment a weight or frequency each time the pair is reported. Since we don't want this weight to increment indefinitely, the graph must enforce its own policy. Possibilities include managing it as for the LRU cache above, or periodically reducing weights on synchronization edges. Depending on how the synchronization relationships are to be used downstream, the projection operator could just report edges downstream, or create new edges every time after a synchronization edge had been removed from the graph (or had its weight taken down to zero), and similar strategies.

In the above example we neglected the issue of observations[27010] in order shorten the description. It's based on a single behavior, posting messages. If its important to track all the individual observation instances, there are multiple ways to represent the observation (for example could keep a list of the post ids along with each entity and let an observation include all of the posts in the list when the edge[20415] is created/updated), we leave the details as an implementation issue in different embodiments.

Figure 17:
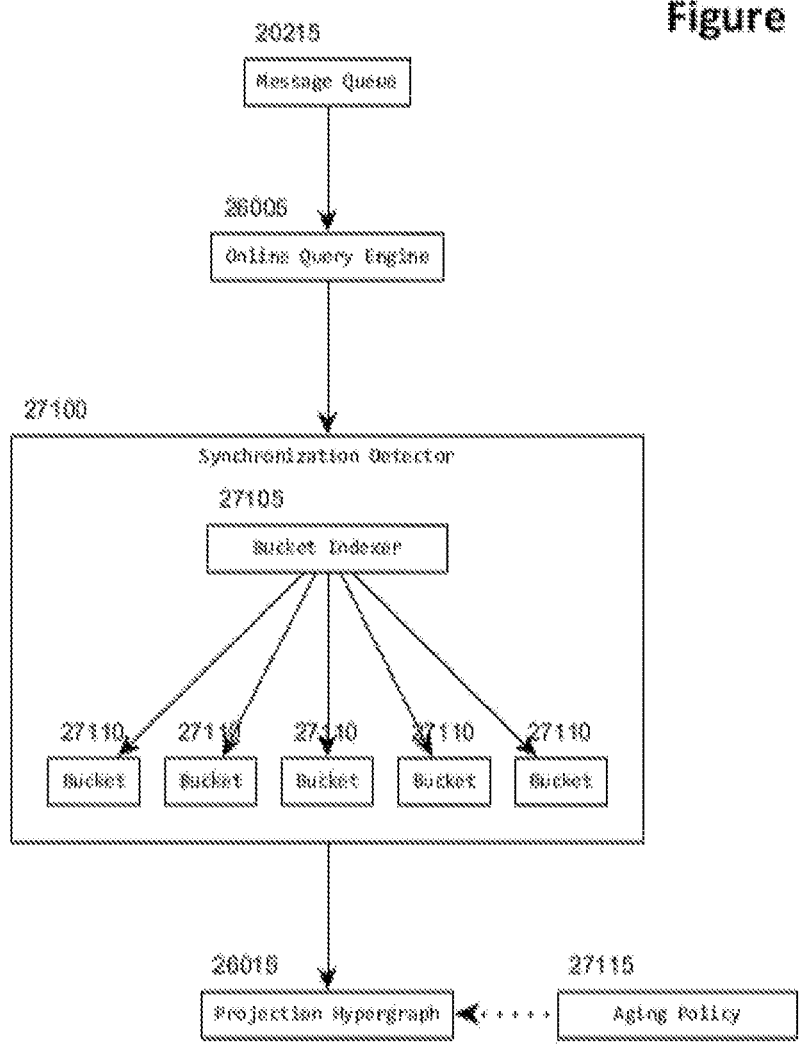
FIG. 17 is a block diagram showing the process used to detect synchronization relationships between users and other entities in the data set.

The example above demonstrates the main issues for high level detection process. The synchronization detector[27100] collects items into buckets[27110] and then decides whether, or how, to make synchronization edges[20415]. As in FIG. 17, incoming messages[20210] are decoded to OSF values[20000] and filtered through the query engine[26005] and matches passed to the synchronization detector[27100] (which is a specific implementation of a analytic component [26010]). The matches passed on from the query engine [26005] are our observations[27010]. The synchronization detector[27100] directs incoming observations to a bucket [27110]. The example above defines one bucketing strategy, namely creating buckets as needed and then using additional constraints to decide when the observations in the bucket constitute a synchronization. Another type of approach is to pre-allocate buckets that represent specific cases we are looking for. For example to detect sequences of observations [27010], we could use an interval tree, creating new intervals to hold the potential next step in a sequence of observations. An interval tree is a data structure for providing efficient access to a set of possibly overlapping intervals. Upon creating each new interval, a reference to the prior interval would be stored in the new interval. To initiate sequences we could keep a pool of recent observations, and as each new observation arrives look for a pairing that constitutes a valid next step. As intervals age out (defined here as the creation times of new observations are past the end of the interval), we could trace back through the chain of related intervals to pull out members of the sequence. This method as described would likely be quite expensive. In practice it would require that we look for specific sequences of narrowly defined observation types, or have an already defined smaller set of entities to track, or any number of other filtering strategies. As noted in the basic example above we may limit the number of items bucketed, either by limiting the data structure, randomly selecting observations to track, or other strategies.

One area the example does not demonstrate very well is the issue of determining significance. It just assumes that if things co-occur often enough, they are significant rather than random. One method is to create a "null model", and require that any edges[20415] exceed the model in some way. In the model above, the null model could consist of a distribution of the likelihood that posts from 2 users would randomly occur 1 time vs 2 times vs 3 times, etc. . . . within the interval size used. This could be used to set a reasonable minimum threshold used for detecting synchronizations. While simple to calculate, this also demonstrates the role of the adaptive control subsystem discussed above. In this case the trajectory analyzer[26230] would really only need to look at events coming into its base graph[26235], and would just accumulate a frequency distribution within a sliding window and update the control model[26225] to match. For the more general case suppose we expect groups produced from the synchronization graph[26000] to be similar to groups generated elsewhere in the system. If comparable groups elsewhere are smaller than the groups derived from synchronization relationships, the model would be adjusted to push parameters downwards (for purposes of the example, either add an adjustment to the parameters predicted from the null model, or modify the model itself).

Coordinated Group Detector[27200]

Figure 18:
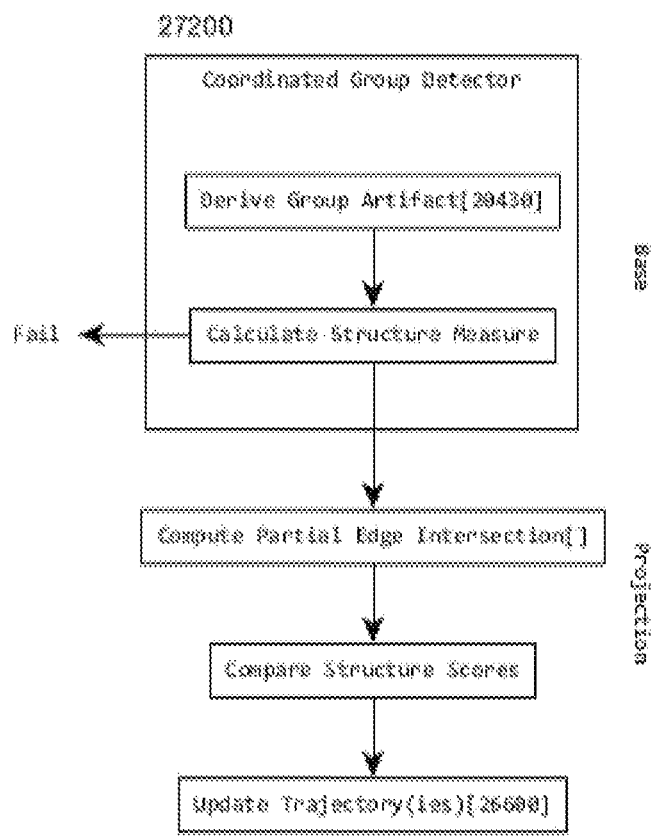
FIG. 18 is a block diagram illustrating the process for computing coordinated groups.

The process for detecting coordinated groups is very general, partly because there are many possible variations, as described in FIG. 18, in deriving groups. The main point is that the groups can be defined any number of ways. The assumption is that the source graph[26000] contains relations that are have already been deemed to be of high significance. This stands in contrast to module/community based approaches, where social significance is assigned to edges due to the structure of the graph. For instance individual reply/forward/etc. . . . relationships between posts don't make much of a case for there being a social relationship between the identities[220] involved, but if the identities[220] are both members of a community then the interactions can be deemed more socially significant. By contrast, individual synchronization relations[27000], for example, have a much heavier significance. this in turn means that we can look at groups that are derived by much simpler means. In the case above just run connected components, combined with edge filtering (i.e. culling low weight edges, or similar). The resulting components are each taken to be a group, and will often be more meaningful than groups derived by community detection.

Next calculate a structure measure. This measure should tell us how different the group is from an equivalent group that is completely connected, or alternatively how different it is from an equivalent group if its edges[20415] were distributed at random. Again this is a pretty generic statement, because there are a large number of possible measures, depending on how groups were derived and what the underlying edges[20415] denote. One approach might be to compute modularity and keep groups that score around half way between the poles, e.g. around ¾. If the members in the underlying edges are ordered, the map the group to a directed regular graph[20400] (may have already been calculated via shortcut links[20445]), and calculate what proportion of the group is oriented (i.e. the number of edges for which there is no symmetric edge. In the same scenario, measure the average path length of the group, the longer the path length, the more hierarchically structured the group. In the same scenario, determine the proportion of nodes that have mostly outgoing edges (or mostly incoming edges) vs the ones that are more evenly distributed. In any case throw out the groups that have low structure.

Next pass remaining groups on to be placed in trajectories [26600] in the projection graph[26240]. Calculate a partial edge intersection[27305] for each group so that we can enumerate the trajectories that share a high proportion of their members. If there are multiple candidates, compare against the structure scores and retain candidates with close scores. If there are still multiple candidates, apply a test to see if the structures are similar, such as computing differences in the neighborhoods of some selected members. We don't expect a lot of change in connectivity. At any point, if we have narrowed the list of candidates down to 1 (or none) then we can either update the matching trajectory, or start a new one.

Graph Operations

Figure 19:
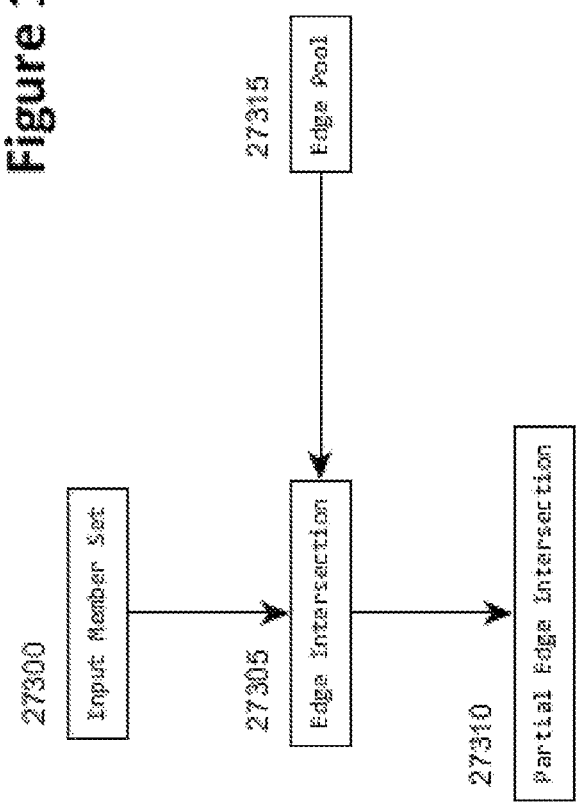
FIG. 19 is a block diagram illustrating the structure of the edge intersection graph operation.

From FIG. 19, an edge intersection[27305] is calculated starting from an initial member set[27300] (e.g. a set of atoms[20410] for which we will find containing edges [20415]). The set of edges[20415] considered is constrained by an edge pool[27315] if specified. The edge pool[27315] can be an OSF value[20000] that edges[20415] must be consistent with (e.g. that they can unify with), alternatively it could be pattern i.e. an OSF value that must fully overlap with matching edges, so that we can restrict the type of edges considered. Another alternative is that the pool is just a set of edges[20415], and edges are only included in the computation if they are in the set. Some embodiments might just define the edge pool[27315] as a software component [26800] that tests edges for inclusion.

The computation is implemented by accumulating counts into a table keyed by edge ids[20425]. For each atom[20410] in the member set[27300], enumerate incident edges[20415] and increment their count in the table. When done, scan through the table and return only those edges[20415] that accumulate a count equal to the size of the member set [27300]. The size of the table can be reduced by clearing it out after checking the second and later members of the member set[27300]. Any edges[20415] with a count<the number of members[20420] processed so far can be dropped. Some embodiments may implement this as an iterator, where the iterator scans the incident edges on the first member[20420], and checks the edges[20415] one at a time to see if it is incident on all the other members[20420].

A partial edge intersection[27305] relaxes the number of members[20420] that must be incident on each edge[20415] for it to be selected.

To compute this operation incrementally, just check to see if an edge[20415] is incident to atoms[20410] in the member set[27300] when it is updated. The edge may then have to be added or removed from the result set.

Figure 20:
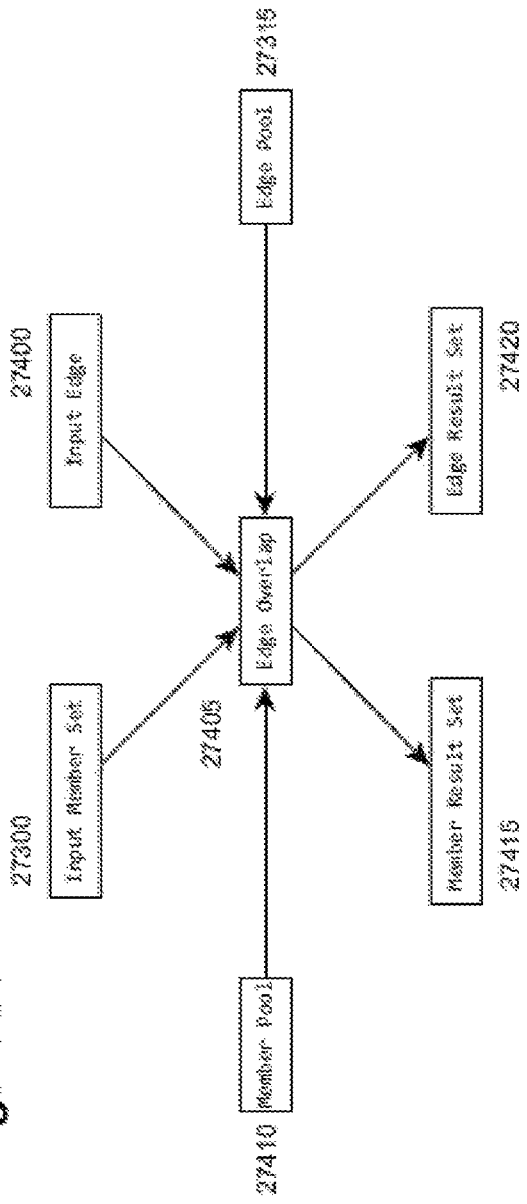
FIG. 20 is a block diagram illustrating the structure of the edge overlap graph operation.

From FIG. 20, an edge overlap[27405] considers the incidences in both directions. It functions somewhat differently depending on whether it starts with an input edge [27400], or an input member set[27300].

When starting from an input edge[27400], enumerate the incident members[20420] and make a member set[27300], note that we may specify a member pool[27410], in which case some of the members might be culled from the set [27300]. Now, perform an edge intersection[27305]. From the resulting edges[20415], run a member intersection (i.e. flip the roles of member and edge in an edge intersection [27305]). We know all the edges[20415] contain at least the atoms in the member set[27300], so running this intersection will potentially produce some extra members[20420] over the input member set[27300]. Return the two result sets.

When starting from a member set[27300], we perform all the steps but the first, as we have already specified a member set[27300].

As when running edge intersections[27305], we can relax the required counts. Edge overlaps[27405] can run continuously so long as we retain the counting tables.

Figure 21:
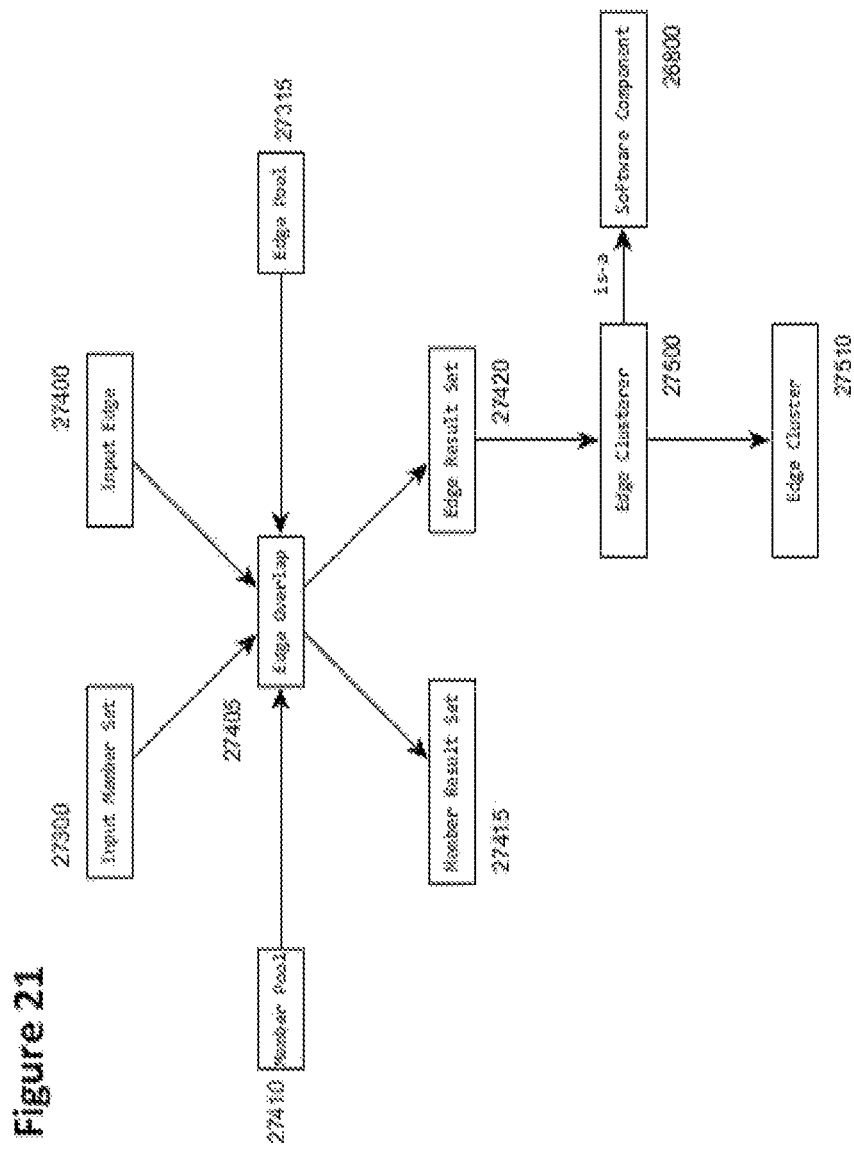
FIG. 21 is a block diagram illustrating the structure of the edge clustering graph operation.

From FIG. 21, an edge cluster[27510] is computed by running edge overlaps[27405] for each edge[20415] in a population (such as a graph[20405]). For each edge result set[27420] of 2 or more edges, join the edges[20415] (i.e. iterate through the result set[27420], and pass pairs of the first edge[20415] and each of the following edges to the edge clusterer[27500] to be joined in a cluster. In some embodiments the edge clusterer just runs union-find to build the clusters.

It only makes sense to run this with relaxed requirements on the counts, other wise it would just keep returning the same result set[27420] for all the edges[20415] in a cluster [27510]. When run with relaxed count requirements, the edges in a cluster[27510] may each return a somewhat different result set[27420]. Note that as an agglomerative clustering algorithm, this may produce run away clusters [27510] (i.e. clusters that continue to increase in size at a faster and faster rate). So some protection should be put in place, like terminating the computation if a cluster[27510] or clusters[27510] get too large.

In theory this could be run incrementally, if all the counting tables were kept active, but for computations calling for edge clustering its probably better to run it periodically. Note that this method produces stable clusters, and for sparse-ish graphs it runs surprisingly quickly.
Targeting Reasons
Coordination-Related
Synchronicity of Activity Multiple identities[220] repeatedly turn up in and depart from the same locations[405] as one another at or around the same times. They may interact with one another in some fashion, they may be (apparently) independently posting content that the adversary deems useful within the particular time window, or both. Most embodiments will not require that it be the exact same set of identities[220] each time, especially if the number of identities[220] is above a certain threshold, which most embodiments will express in a configuration parameter. For example, if 20 different identities [220] demonstrate highly synchronous behavior overall, but occasionally one or two of these doesn't show up, most embodiments will still consider that that group demonstrated another instance of synchronous behavior anyway.

Candidate artifacts[20430] can be derived via simple time based synchronization of identities[220], using an interval tree as described above. Observations[27010] minimally consist of artifacts containing posting time, location[405] and the posting identity[220]. In the easiest case, the observations[27010] have already been filtered, and nothing more need be done. If the observations[27010] have already been annotated with a property indicating whether it constitutes an entry to or exit from a location[405], then the incoming observation messages[20210] can be filtered by initial queriesocation[405]. Otherwise we can use the synchronization detector itself to detect entry and exit from a location (and presumably annotate observations with that information, for downstream projections[26240]). When an observation [27015] is initially entered into a bucket[27110], the detector [27100] checks to see if it is present in a prior interval (within a time span determined by model[26225] parameters). When a bucket[27110] ages out, any identities[220] that do not appear in following intervals (using the same time span as above) are deemed to have left the location [405]. The width and number of intervals will be determined by model[26225] parameters. These will cover a span of time at least as large as the span determined by model [26225] parameters.

In some embodiments, the control model[26225] determines a time span based on the distribution of session lengths. It picks a threshold based on a strategy such as using the session length most frequently seen, or setting the threshold such that a certain percentage of sessions are at or below that length, or any of many similar such strategies. This can be further modified if feedback from operators [250] or stress values[26245] generated from trajectories [26600] that use these relations[27000] (essentially adjusting the threshold downwards in increments until the error indicated by stress values[26245] is reduced). Depending on embodiment, model[26225] parameters may be derived from different scopes (e.g. by identity[220], by location [405], by a population of similar identities[220] across the dataset, etc. . . . ). The wider the scope, the more computational resources needed. If a different scheme is used, the control model[26225] must still be able to provide parameters to be used in a process triggered when identities[220] are first entered into a bucket[27110] and when buckets [27110] are aged out.

Candidates artifacts[20430] consist of synchronization relations[27000] referencing a set of 2 or more identities [220]. The synchronization variance is again set via model [26225] parameters. A significance score is added to the relation artifacts[20430] based on factors including the above (social interaction between identities, posting content used by adversaries[265], and so on). These additional factors can be obtained by either initiating graph queries [26810] in shards[26015] where the relations are computed (as described earlier), or by subscribing to message queues [20215] to store these artifacts[20430] in the local graph shard[26015] for faster retrieval. The choice depends on the scale of the current graph[20405], the rate at which candidate relations[27000] are produced or updated, and so on. In either case we rely on artifacts[20430] that are computed in other graphs[20405] of the system. This analytic[26010] probably works best when graphs[20405] are smaller (dedicated to individual channels[140] or smaller channel groups [145]). If the graph[20405] contains more than one of the relevant type of location[405], then the buckets[27110] will have to be further subdivided so that we group identity[220] entries and exits for each location[405].
Same Content Distribution A set of multiple identities[220] repeatedly distributes and promotes content[950] that is identical or similar to one another using one or more text similarity metrics. It does not matter what the text[950] is for this reason[50445], just that it is text[950] that can reasonably be identified as much more likely be seen within this group than others. Many embodiments may insert tests to try to avoid trapping benign special interest groups who show up and post content[950] that's of interest to them when there's some relevant newsworthy event and then disappear again. This will most often be done by comparing the narratives in the distribution set with other semantically similar posts[195] taken during the same time window.

Candidate artifacts[20430] can be derived by a projection operator[26020] on the shared text graph[28020] via calculation of edge overlaps[27405]. Shared text artifacts[20430] are constructed with members[20420] representing different properties of text, so we compute edge overlaps[27405] starting with member atoms[20410] representing properties of interest, such as text similarity metrics. One or more candidate identity[220] sets are computed for each edge overlap[27405] by chasing through members[20420] of the edge[20415] and collecting identities[220] found. First a frequency distribution over locations[405] for shared texts [28015] in the edge overlap[27405] is calculated. If the distribution is concentrated over a small number of locations [405], a simple way to do this is to choose the n highest frequency locations that sum up to a given percentage of the total number of shared text[28015] instances, if the total number of locations in the list is below a threshold, generate candidate identity[220] sets for each location in the list. Obviously embodiments are possible that use more sophisticated statistical methods. Candidates[20430] can be pruned by checking against a list of shared texts[28015] associated with benign sources. This list can be implemented as an edge in the shared text graph[28020] that is updated when items [20200] labelled as benign sources are processed. Members [20420] of this edge are aged out over time.
Framed Narrative or Other Scripted Role This is to capture the case in which the content of the posts[195] made by the coordinating group is not the same or similar, but rather reflects different identities[220] playing a designated role in a script or plan that is written with multiple roles. This could be one identity[220] making a post[195] that asserts a particular fact and then 3 other coordinating identities[220] agree with the purported fact and provide further evidence about it. It could be an N-part, or "framed" narrative[180] in which each identity[220]

provides one part, leaving a good opening for another identity[220] to segue into the next frame[11055] in the narrative[180]. Instances of this will generally be identified on the basis of identifying the script or framed narrative [180] which is likely to be used many times.

There are basically two strategies, either find a coordinated group[20430] and then see if it matches a framed narrative[180], or find sets of posts matching a narrative and construct coordinated groups from them. As a broad generalization, its more likely that detection of coordinated groups[24030] will have larger problems with recall, since we can't know if detection works for all types of coordination, even if it worked perfectly for known types. Its also likely that many groups found will be coordinating in some other way than participating in a narrative[155], so unless these groups are being computed for other reasons, a lot of the computational work will have been wasted. On the other hand, since we are working with a defined set of narratives, it should be possible to get high recall, but the computational costs are likely to be higher. The choice is therefore dependent on the current configuration of the system as a whole.

A framed narrative[180] is defined as a partial order over frames[11055] (though in practice its almost always a total order). Each frame[11055] represents a step in an argument (or at least a connected set of assertions). Detecting sets of posts[195] matching a framed narrative[180] can be implemented using a sequence based synchronization detector [27100]. As we move through frames[11055] in the narrative [180], the detector[27100] can preallocate buckets[27110] for the next available frames[11055], and remove the bucket(s)[27110] allocated for the prior step. As new buckets[27110] are added, they maintain a reference back to the bucket[27110] from the parent step, so that we can recover the sequence when a narrative[180] is completed. The next steps are constrained by time (if nothing else so that we don't accumulate buckets[27110] indefinitely), buckets [27110] are aged out (as always, controlled by parameters supplied from a control model[26225]).

In order to make sense the narrative must occur within one location[405] (expected to be a single channel[140], but its conceivable that there could be coordination over a wider context). Its easiest therefore if this is treated as a local analytic[26010]. If not then buckets need to be subdivided in some way, for the different lower level locations[405]. There are several ways embodiments could do this, similar to other cases discussed in this application. As always, embodiments may place additional constraints on what posts[195] may be added to a bucket[27110].

Once a sequence has been found a synchronized edge instance[27010] is formed from member[20420] identities [220] found in the set of posts[195].

NOTE: observations, coordinated group is more complicated than I thought. its also synchronization, looking for members of group in a time frame.

Echo Chamber Creation

Instances of communities[935] which have the following properties:

Created and maintained by several identities[220] making approximately equal contributions in the number of posts[195] and the amount of interactivity with other identities[220]

Unusually rapid gain in number of posts[195] and users [220] per unit of time

And in many embodiments, at least one topic[165] on which virtually all expressed sentiment[50510] is of the same polarity Instances in which the same identities[220] have been involved in the creation of prior echo chambers[10220] increases the strength of the targeting reason[50445] in almost all embodiments.

Candidate artifacts[20430] can be produced by any number of methods. Existing art in incremental community detection methods in both regular graphs as well as standard graphs can be used. Regular graph algorithms can be used if the current hypergraph[20405] has been flattened with shortcut links[20445], as described earlier. In addition edge overlaps[27405] can be used. Since communities of this sort are intended to be clique-like, some of the other techniques available in the system (connected components over edges that have already been determined to be social relationships, for instance some types of synchronization relationships [27000]). The current graph[20405] will have to be subdivided by location[405] (almost always individual channels [140]) if necessary (meaning that community detection is run separately for each subgraph).

Each candidate artifact[20430] has a similar structure to that of synchronization relationships[17000], i.e. the edge contains users[220] as well as a selection from the edges [20415] traversed in detection of the community. In this case observations[27010] must be edges[20415] that relate users [220] in some way, for example representing replies, forwards, etc. . . . . A representative selection is used because otherwise the community edge[20415] would become prohibitively large. Some embodiments may update the edge [20415] with new representative observations[27010] and age out older observations[27015] so that the community edge[20415] represents current behavior. For the filtering steps below a rate distribution is needed (calculate rate of posts[195] by the community periodically, retain a sequence of them), some embodiments may choose to keep this as a part of the community edge[20415], or cache it in some other bookkeeping data structure.

Candidate community artifacts[20430] are projected to a graph[26240] tracking community trajectories[26600]. The candidates[20430] are pruned if it has not seen rapid growth at some point in its history (over time the size of the community will typically stabilize). The consistency of sentiment[50510] on a topic[165] can be determined by computing edge overlaps[27405] within posts[195] made by community members[20420], specifying member sets [27300] for each combination of sentiment[50510] and topic[165] present in the pool. In order to reduce computational work, the operator[26020] need only look at frequently occurring combinations, and a filtered set of topics [165] deemed relevant or controversial.

In the trajectory projection[26240], we can match newly reported artifacts[20430] to existing trajectories[26600] by looking through trajectory heads[26605] that are incident to a representative set of users[220]. This set is chosen based on the "founders" of the community (e.g. users[220] present at initial formation of the group, before activity and membership has ramped up). Some embodiments may choose to cache these founder sets, and if a similar set of founders has been seen multiple times, retain only those users[220] that have been seen frequently. If the newly reported community is significantly smaller than any of the incident trajectory heads[26605] then a new trajectory[26600] is started.

Coordinated Group

There are many possible edge[20415] types that by themselves signify a social relationship irrespective of structure of the graph[20405] they are embedded in (as opposed to community detection, which assigns social significance to interactions if they are part of a densely interconnected portion of the graph[20405]. Pretty much any detection of synchronization relationships[27000] involving identities [220] imply a social relationship. When these groups are NOT structured as traditional communities (i.e. a group in which members interact with other members of the group more often or more significantly than those outside the group), coordination of activity is implied. The strength and type of the coordination is strongly related to type(s) of edges[20415] relating members of the group. If the edges [20415] are sequence based synchronization relationships [27000], for example, a very high coordination score can be assigned to the group. Additional tests/measures can be used, depending on the context in which the group occurs (what location[405], what kinds of activity is tracked in the graph[20405], topics[165] discussed, and so on). The coordination structure may be characterized by some additional properties, such as the distribution of edge[20415] directions (if directions are mostly one way, the structure is more hierarchical), the distribution of vertex degree (if the distribution is strongly bimodal, it implies an authority driven group), and so on. These calculations are chosen to be cheap to compute/maintain rather than providing finer grained analyses of the group. Some embodiments may use more expensive calculations, such as measures of similarity with "template" graphs[20405] representing known coordination structures. In order to make the template comparable with a group, some embodiments may generate (randomly if appropriate) an instance of the template to match the size and other characteristics of the group.

Candidate artifacts[20430] are computed via a coordination detector[27200]. A subset of group members designated as authorities or otherwise significant is added toe the artifact[20430]. These members can be identified based on the structure tests used (e.g. the high degree member nodes, etc. . . . ) It may be useful to project these communities to trajectories[26600]. A community artifact[20430] can be connected to a trajectory[26600] by computing the edge intersections[27305] between the significant subset from above and trajectory heads[26605]. If there is more than one intersecting edge[20415], then the trajectory head[26605] most closely matching other characteristics of the group is chosen (in some embodiments can be checked by attempting to unify the candidate artifact[20430] with the head[26605]). If we cant find an intersecting edges[20415] with matching characteristics, then a new trajectory[26600] is started. Some embodiments may use a partial intersection[27305] to match, any resulting differences between the candidate's [20430] significant group and that of a matching trajectory head[26605] can be used to describe changes in group leadership/structure.

Other SNA

There are many different types of other SNA evidence types that may be detected by different embodiments for which we can't infer coordination. Many of these will be detectable on the basis of graph regularities, such as grouping edges based on the edge structure. For example, some embodiments will have a "in person attendance" detector which looks for statements made by an identity[220] that assert he/she is going to a certain event and creates edges linking the user and the event. We can then group identities by the events. Many embodiments will use low value edges such as identities[220] mentioning one another, or quoting one another.

Candidate artifacts[20430] can be formed by computing edge intersections[27305], or by projecting connected components.

Multi-Evidence

This is a catch all for the case in which we have multiple related forms of evidence that are too weak to be useful alone. In effect this is a "where there is (enough) smoke, there is fire".

Implemented by creating a graph[26240] which receives messages[20210] from multiple other graphs[26235], representing different forms of weak evidence. These base graphs[26235] fall into two broad categories, graphs[26235] that produce artifacts[20460] labelled with targeting reasons [50445], and those that just produce interesting relationships deemed to insignificant to be given a reason[50445]. For graphs[26235] producing labelled artifacts[20460], candidates that are pruned for various reasons (e.g. too weak, fail some constraint) would be sent to this graph[26240]. All of the artifacts forwarded to this graph are placed in one pool, as we are looking for any possible relations that might be useful. Candidate artifacts[20430] are generated by computing edge intersections over various member sets[27300]. Because of the heterogeneous nature of the edges[20415] more restrictive methods such as edge overlaps[27405], other forms of clustering, or other sorts of specific patterns are not likely to be meaningful. There is no practical way to enumerate all possible combinations that could be meaningful. As there is potential for an explosively large number of ways to group these edges[20415] embodiments must commit to a strategy to limit the search space. The first strategy is to limit the member sets[27300] used to generate edge intersections[27305]. Some embodiments may restrict member sets[27300] to include members[20420] incident on a small number of artifacts[20430]. Other embodiments may choose to only use preselected members[20420], for example important users[220], narratives[155], etc. . . . . This preselected set would be updated over time, as current priorities change. There are any number of such strategies possible. The more effective ones will tend to produce edge intersections[27305] that don't overlap, i.e. distinct groups.

This process may benefit greatly from setting up a control loop. Constructing trajectories will be difficult, but as for other cases described above can be based on computing edge intersections[27305] of trajectory heads[26605] from the member set[27300] used to find the candidate in the first place. This implies that when candidate artifacts are generated, they include the member set[27300] as a basis. In such a loop the stress value[26245] could be based on the number of candidates[20430] found, how distinct those candidates [20430] are and so on. The specific model[26225] and trajectory analyzer[26230] will depend on the exact strategies used. For example, in embodiments using a pre-selected pool of significant members, the stress values[26245] reported might consist of members[20420] that show up in a large number of artifacts. The trajectory analyzer would adjust the model by removing those members[20420], and the control model[26225] would issue a processing instruction to this graph[26240] indicating the removal from the pool. If at a later point we wish to increase the number of candidates[20430] generated, the model controller[26225] could go to its history[26220] and re-instate members that had been previously removed.

The second strategy is to prune candidates[20430] heavily. Due to the heterogeneous nature of observations[27010], the methods used vary. However, most embodiments will seek to eliminate candidates[20430] that are not internally consistent. For example, if the observation[27015] creation times should be close together. Any number of characteristics could be used, such as consistency of topic, or sentiment, etc. . . . where they can be found. In the general case there would likely be a list of tests, which are either not applicable, pass or fail. Candidates with failing tests are pruned. These tests could also be used for producing stress values for the control loop.

Artifactual or Indirect Evidence of Participation in Campaign[150]

This is a subtle reason[50445] intended to trap cases in which no narrative[155] has been detected—and therefore no campaign[150] on this basis—but one or more of the same identities[220] who have been substantially active in multiple unrelated locations[405] since time t have each seen an unusually rapid and/or high degree of transformation in sentiment polarity[11065] towards a given topic[165], or similarly a change in belief about the truth of a particular assumption. The more rapid and greater in degree, the greater the targeting strength[51705]. This case is likeliest to occur when the targeted audiences[910] are on the smaller side, with the result that any narrative[155] is likely to be repeated less frequently.

To take a concrete example, there could be N completely unrelated arguments that could be advanced about why Crimea should be considered legitimately part of Russia, each targeted at a different demographic. One argument might relate to the costs of reintegration with Ukraine, suggesting that the money should instead be spent on improving health care. Another argument might focus on security-related concerns. And so on. The arguments may be partially or even totally disjoint, the end conclusion the same.

Almost all embodiments will assign extra targeting strength[51705] to any cases in which the locations[405] in question demonstrate an inflammation in negative sentiment [50510] on multiple topics[165]. The "fake news" example elsewhere cited in this document in which the U.S. government allegedly made an exorbitant cash payment deal on the tarmac of a Chinese airport that had the effect of sending a large jet of covid-related medical equipment to the U.S. rather than to its original destination of France is a compelling example of this. It fanned strong negative sentiment [50510] on a number of topics[165] including anger at the French government for the massive equipment shortages, disappointment at American mercantilism and America as an ally, and frustration over French dependence on other countries. The greater the extent to which every substantial source of resentment within a given population is fanned by a small group of identities[220], the greater the likelihood of it not occurring naturally. This is illustrated in FIG. 6.

In practice various embodiments will seek to limit the scope(s) to which this analysis is applied (for example by only examining posts containing certain topics, or certain locations, or any number of other characteristics).

First candidate locations[405] need to be identified, i.e. locations[405] that have undergone a shift in polarity[11065] on at least one topic[165]. this can be done by projection from the initial graph[28000]. For each location[405] we need to build a running distribution (i.e. a versioned list of the distribution, updated at periodic intervals) of sentiment [50510] values against each topic[165] that is detected in posts[195] for the location[405]. Detecting shifts in this can be done in many ways. A simple method used in some embodiments is to calculate a sum of squares of differences between successive distributions, and then look for spikes in the resulting sequence of values. When a shift is detected, post[195] edges[20415] from that location[405], going back for a period of time (based on a configuration parameter), will be sent to a projection[26240] where candidate artifacts [20430] can be computed. As with other analytics, measures of the rapidity and the degree of the instigating shift need to be added to the generated events[20205].

Candidate artifacts can be found by first computing edge overlaps for each identity[220]. Retain edge overlaps that contain multiple unrelated locations. (Note that system knowledge bases contain a hierarchy of locations as described in FIG. 7, relatedness of locations can be inferred from the hierarchy, i.e. channels in a channel group are close, but common membership in higher levels is much less close). Aggregate the remaining overlaps by location[405] (as described for computing edge clusters, the difference here is that we add the extra step filtering on multiple locations). Create artifacts containing identities[220] from the resulting clusters. Score the strength of the artifact based on the rate and magnitude properties passed through in observations[27010].

Content-Related

Individual Account Distributing or Promoting Tainted Content Transmission

Identities[220] who repeatedly post or reference content [950] that has been marked as "tainted" based either/both on its origination with the adversary[265], and/or co-occurrence with tainted content[950] in a post[195] or conversational thread[51940], and/or its distribution or promotion by identities[220] flagged by the targeting system[10000] as being in the control of the adversary[265]. Almost all embodiments will also allow text that is similar but not identical as established by text similarity assessment measures. This taint is strengthened in nearly all embodiments if the content[950] in question is present in a flagged coordination behavior occurrence. Some embodiments may opt to allow "probably tainted" content[950] to be counted as well as certainly tainted content[950]. Note that many useful idiots[295] and just regular users[220] may unwittingly distribute such content[950] as well, but they should not principally transmit such content[950], and if innocent, generally should not have other evidence reasons[50445] accrue against them.

The first stage of computation consists of identifying content[950] that is tainted by association with already tainted content[950]. The main issue is that content[950] may not be known to be tainted until some time after it has already been seen in the data set. Therefore large numbers of messages[20210] containing affected posts[195] will have to be sent out of time order. The main impact of this is that it may cause cascades of graph queries from downstream projections[26240] that have to fall back to accessing storage[10005]. Content[950] is initially tainted by either association with an adversary[265] or later promotion by identities[220] found to be in the control of the adversary[265]. In turn those identities[220] may not be flagged until some point after their introduction into the data set.

Figure 22:
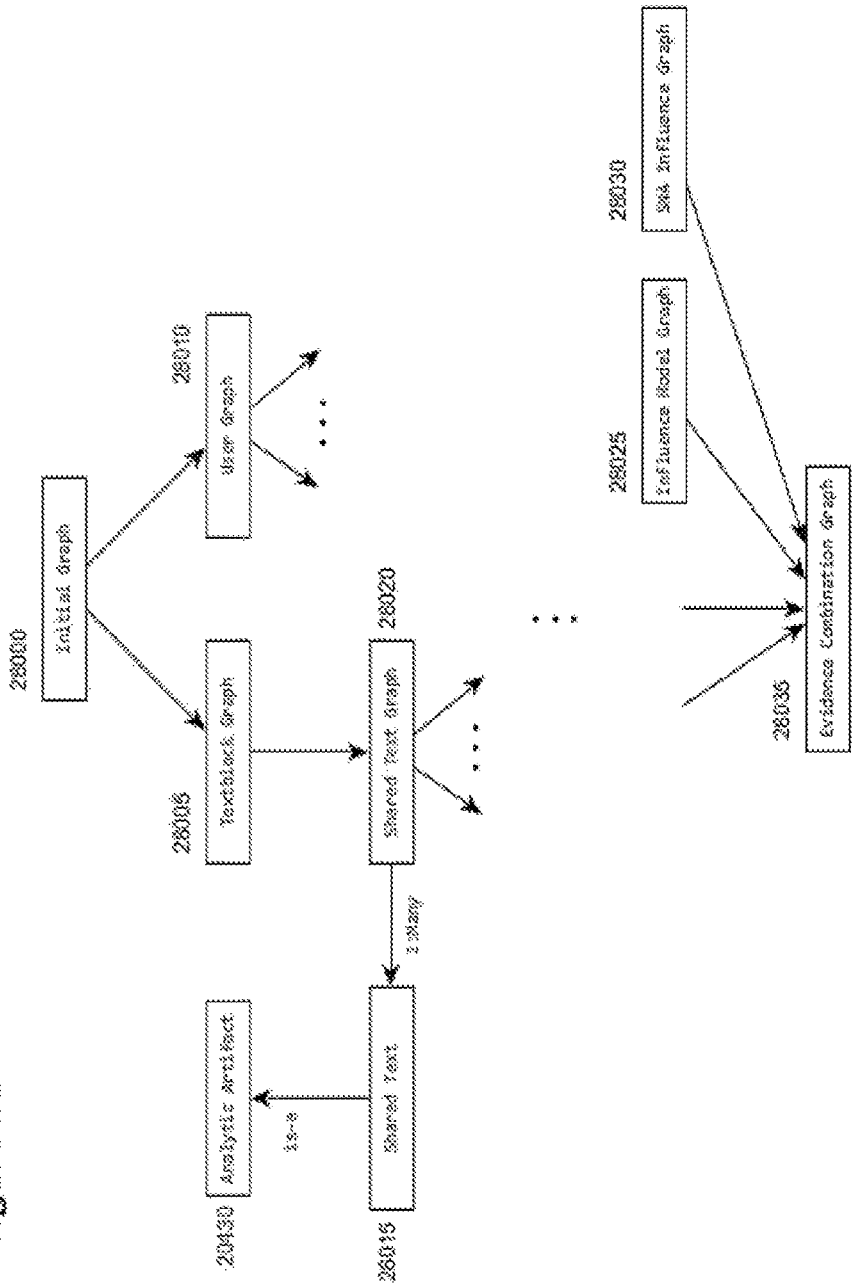

Given these considerations, a graph[26240] will be set up which is a projection from the initial graph[28000] and the user graph[28010], as shown in FIG. 22. Individual embodiments will choose whether this graph[26240] is a projection [26240] from the textblock graph[28005] or will issue graph queries[26810] to the textblock graph[28005]. When content [950] from the adversary[265] enters the initial graph [28000], a graph query[26810] will be issued to the textblock graph[28005] to find any textblocks[10050] in the content[950], then copies of posts containing those textblocks[10050] will be projected to the local graph[26240]. Similarly when flagged identities[220] are entered/updated in the user graph[28010], prior posts[195] from that identity [220] are projected to the local graph[26240].

The intent is that observations[27010] in the local graph [26240] contain associated textblock artifacts[20430]. Depending on how the prior projection operators[26020] have been configured, observations[27010] may or may not have had textblocks[10050] attached. For each observation [27015] that has not yet been so updated, graph queries [26810] are issued to attach a possibly empty list of textblocks[10050].

Candidate artifacts[20430] contain an identity[220] and a selection of posts[195] containing tainted content[950]. They are generated by computing edge intersections[27305] for each identity[220] in the local graph[26240]. Edge intersections[27305] that contain a sufficient number of posts[195] (possibly with further constraints, such as being distributed over multiple channels[140], etc. . . . ) are used to generate candidates[20430]. Resulting candidates[20430] are further refined by issuing graph queries[26810] to see if their identity[220] participates in any coordinated groups.

Toxic Content Transmission

Most embodiments allow system administrators or analysts[250] to specify particular content[950] that they find to be so extraordinarily objectionable in nature that they wish the system to be especially aggressive in combatting it. Examples of such highly toxic or radioactive content[950] might include a high quality "deep fake" video of a top government official engaging in a pedophilic sexual act, or a highly sensitive document that has been leaked—or simulated with changes that make it highly inflammatory. Because such a designation is highly context-specific, most embodiments will treat this as necessarily a human decision. As with the prior reason[50445], users[220] may innocently transmit such content[950] because of its sensational nature, but that by itself should not be sufficient basis to target them.

Candidate artifacts[20430] are simply items[20200] containing content[950] that has been flagged as toxic. The initial graph contains a projection operator that passes these items on without further pruning. Human operators[250] will be responsible for issuing processing instructions that specify items[20200]/content[950] to flag.

Regularity of Content

This reason is intended to find content[950] made suspicious by certain regularities found within it. The first of these regularities is the presence of markers indicating the content is a product of a writer with poor language competence, machine translation, or automatic generation. The presence of these markers is indicated by annotations added to items[20200] during content analysis. The annotations contain a label for the type of the marker. The second of these regularities is whether content has been produced by form filling. This is used to capture cases in which the instances of text content[950] in question are neither semantically similar nor will be assessed as similar by most text similarity metrics but they share traits that suggest that they were generated by the same text generation engine and/or from the same template. In the most common case, there will be multiple spans of shared tokens that will be shared among all of the posts[195] in question, followed by a series of distinct tokens which correspond to either contextual details being filled in or synonyms being swapped in so that the logically same post[195] can be posted by different identities[220] within a short time span without it being obvious.

The system does not compute groups of identities[220] for marker based regularities. Using machine translation in posts[195], for example, does not imply much, if any, coordinated relationship between identities[220]. Since this is a weak targeting reason[50445] to start with, its used to support the strength of other targeting reasons[50445] in a targeting request[50435]. Some embodiments delay scanning to see if labelled artifacts[20460] lead back to content [950] with markers in it until targeting requests[50435] are being constructed. If identities[220] are found that use these markers frequently, labelled artifacts[20460] can be added to the candidate targeting request[50435] and its weight is strengthened. Other embodiments may choose to generate labelled artifacts[20460] for identities[220] that use the markers frequently and project them to the evidence combination graph[28035]. Some embodiments may choose to create templates in the sense described below, for frequently occurring combinations of these markers. The latter case can be implemented via a projection operator[26020] from the initial graph[28000], where identity[220] sets can be found by computing edge clusters[27510] starting from member sets[27300] each consisting of marker atoms[20410] in one of the marker classes. The markers (including the text span for the marker instance) are used to construct a template as described below.

For the form based of regularities, the overall implementation strategy consists of deriving templates, matching posts[195] against those templates, and deriving groups of identities[220] that use the template frequently. The candidate artifacts[20430] contain member[20420] identities [220], and the template matched.

Templates are computed via projection from the shared text graph[28020]. In some embodiments, the projection operator[26020] computes edge clusters[27510] with a member set[27300] for each shared text[28015] updated in the graph. If an edge cluster[27510] contains multiple shared texts[28015], then posts[195] containing the shared texts [28015] are retrieved. This can be done by computing an edge intersection[27305] starting with an member set [27300] composed of the shared texts[28015]. The member posts[195] from the resulting edge intersection[27305] must then be divided into subsets, each representing a different template (remember a template specifies a list of shared texts[28015] that must be matched in order). This can be done by constructing a prefix tree over the shared texts [28015]. Each full path through the tree represents one ordering of the shared texts[28015]. Each path that matches some minimum number of posts[195] will be used as the basis for a template.

The same process used to derive templates also computes the set of matching posts[195] for each template, and the identities[220] that frequently use a template can just be read off the set of posts[195] (just compute a frequency distribution over identities[220] and take the high frequency ones). Construct candidate artifacts[20430] around each resulting set of identities[220] and prune them as usual.

Excessive Novelty

This is used to capture the case in which a single identity [220] appears to be producing so much genuinely new content that it is difficult to believe that it is the work of a single person. Novelty is important, since it is little effort to repost lengthy and detailed content written by someone else, even if a few words are changed here and there. The novelty measurement in a default embodiment is discussed in another section.

The simplest approach is just to project identities[220], from items[20200] with novel content[950], to an intermediate graph[26240] that converts them to edges with a counter. The counter is updated each time one of these edges is updated (i.e. each time an identity is reported). When the frequency passes some threshold, a labelled artifact[20460] is projected to the evidence combination graph[28035]. In some embodiments the frequencies in the intermediate graph are reduced over time, so that a labelled artifact[20460] may be produced for that identity[220] when it produces a burst of novel content.

Content Original Broadcaster

This forensic reason[50445] catches the case in which a particular identity[220] is apparently the first to post or reference particular content[950] which is later determined by whatever means to have originated with the adversary [265].

This is handled very similarly to the "Excessive Novelty" case as above, except that we are projecting identities[220] whenever they have content[950] that's been identified as originating with the adversary. However to support this, there needs to some kind of supporting search index. Minimally the system could construct a large lookup table using a wide hash (for example a 256 bit member of the SHA family of hashes) as a key and containing an (identity id,post time) pair as value. As new content comes in the table would be updated if it did not already contain a key, or if the post time for the new content is earlier. In order to reduce the hashes eligible content could be qualified in many ways, such as meeting a minimum length, containing an appropriate topic, etc. . . . . Embodiments can choose from many existing methods for implementing large, distributed lookup tables.

Inauthenticity Reasons

Controlled Account Set

This catches the case in which there are N many identities [220] each of which are associated with a different human name in their profiles, but lexical fingerprinting and the hours of activity suggest that the accounts[220] in question are being controlled by the same person.

Candidate artifacts[20430] are generated during the construction of the user graph[28010], containing accounts[220] associated with a set of at least N compatible entities. Candidates can be pruned and labelled as per usual.

Identity Shedding

This reason[50445] is for the case in which one identity [220] replaces another in a given location[405], but the second identity[220] essentially picks up where the first one left off—for example, with the next portion of a framed narrative[180]. Some embodiments will also require lexical fingerprinting matches as well, with the aim of trying to ensure that it is the same person behind the proverbial curtain as well as the same adversary actor[280].

This reason can only be determined to apply over fairly long periods of time, because to determine that an identity has left the location their needs to be a fairly large gap between posts (assuming for example that they leave, and at some later point they come back). The candidate artifacts [20430] are derived via a analytic component[26010] that works similarly to a synchronization detector. The analytic needs to be based off of behavior that is strongly associated with the adversary[265] and follows a pattern. We describe the case where identities[220] promoting a narrative[155].

Identity shedding can be calculated in any graph[26240] that receives all items[20200] from a given location[405] (or at least those items[20200] containing assertions from identified narratives[155]). The analytic component[26010] uses an associated interval tree based on time spans. The analytic [26010] allocates fixed-width, adjacent and non-overlapping buckets (we use a tree, because of the possibility that the graph could receive out of order events). Embodiments may also choose a minimal approach, where the analytic component[26010] keeps a list of the last N buckets[27110], and deposits new posts in the last bucket[27110] (dropping any out of order items that fall outside the interval defined for the last bucket[27110]). The interval width is a fraction of the minimum time necessary to decide that an identity[220] has exited the location[405]. For example, if the exit condition is 8 hours without activity, the interval width might be set to 1 hour, and we would retain the last 10 buckets[27110] (or more if using an interval tree). Since we are keeping a fixed number of buckets[27110], when a new bucket[27110] is added we drop the oldest one. At the point we drop a bucket[27110], we compute the difference between the set of identities[220] derived from posts[195] in that bucket [27110], and the set of identities[220] in the following N−1 buckets[27110]. This gives us the identities[220] that have exited and entered a location[405]. (Note: as for other synchronization analytics, we must subdivide the buckets [27110] if there are multiple locations[405] appearing in the graph[26240]). Out of the resulting set of entries and exits (presuming there is more than one identity[220] in either set), we need to find compatible and non-overlapping pairs of identities[220]. This compatibility can be determined by shared characteristics, such as lexical fingerprinting, hours of activity, and so on). Some embodiments may use a brute force, simple approach, i.e. calculate compatibility between all entry/exit pairs, and take the most compatible, non-overlapping pairs, so long as they meet minimal conditions (such as sharing ANY common characteristics in the first place). If the entry and exit sets start to get large, then embodiments may have to use a more efficient algorithm (such as is employed in computing edge overlaps[27405]).

Candidate artifacts[20430] are generated for each qualifying pair, and will minimally contain as members[20420] the pair of identities[220], the narrative(s)[155] from any assertions[11070] they used, the posts[195] containing the assertions[11070], and the location[405]. The presence of additional conditions, such as involvement of a UKR Bot [100] in the location[405] during the time period in which the first identity[220] was last active, negative statements made towards the first identity[220], negative statements made by the first identity[220] and so on, will raise the strength of the candidate[20430]. Remaining candidates [20430] are labelled and projected to the evidence combination graph[28035].

Linguistic/Cultural/Location

This catches the scenario in which an identity[220] claims to have specific demographic properties that are false. These will often be based on heuristics to capture things like what kinds of errors in grammar suggest that the writer is a native speaker of whatever language that they claim to be.

Most of the work for this case already happens as a side effect of the construction of the user graph[28010]. For some embodiments, the candidate artifacts[20430] can be generated either by performing a periodic sweep through the user graph, or on each update to a user[220] edge[20415]. Inconsistencies are detected by the presence of anomolous properties, such as language (in)competence markers, and other heuristic tests. Other embodiments choose to defer computation of these artifacts until construction of individual targeting requests. These embodiments require a graph query software component which selects user[220] edges[20415] by performing an edge intersection[27305] on a member set[27300] provided from a processing instruction [20225] message[20210] (i.e. a graph query message). Embodiments may choose to perform the work of testing the user[220] edge[20415] for inconsistencies within the query component[26810], or by returning the edges[20415] for the caller to deal with. In either case the tests consist of a list of heuristics, obtained from system knowledge bases, or by configuration messages sent to the graph[26240] or both.

More precisely, in some embodiments, the heuristic is specified by an identifier for the software component which implements a test, and parameter values to be passed to the component. The simplest example would be a test comparing an OSF value[20000] parameter to a slot[20005] value specified by a path[20010] parameter. Candidate artifacts [20430] contain as a member the user[220] edge[20415], and a list of the anomalies detected. Some embodiments may attach a score instead. Its not likely that any candidates [20430] will be pruned, but some embodiment may specify additional tests.

Education/Professional or Domain Expertise

This is for the parallel case of professional or domain knowledge. Most embodiments will also consider the particular vocabulary used to see if it is consistent with the standard professional usage. For example, most lawyers will identify another lawyer as an "attorney" rather than as a "lawyer" unless the noun is modified (e.g. "a smart lawyer", "a divorce lawyer.") This is handled similarly to the Linguistic/Cultural/Location" reason above.

Viewpoint

This reason[50445] captures the case in which either/both the attitudes[51750] expressed by the identity[220] are so mutually inconsistent so as to effectively have a nearly zero probability of co-occurrence and/or one or more of these attitudes[51750] is grossly inconsistent with the purported demographics of the identity[220]. This most frequently occurs with either unsophisticated text generation or a troll who lacks important cultural, political, or historical knowledge of the country that they are targeting.

This is handled similarly to the Linguistic/Cultural/Location" reason above.

Bot Pretending to be Human

In most embodiments, this is assessed by a variety of metrics that measure the range of the discourse associated with the identity[220] in question in conjunction with any evidence of sock puppet transfers. This is discussed in more detail in the NLU component section.

This is handled similarly to the Linguistic/Cultural/Location" reason above.

Human Pretending to be a Bot

This reason[50445] is to capture the uncommon case in which a human is driving a bot account either to avoid accountability or to deceive an adversary as to the capabilities of its bots. It is thus the reverse of the prior reason [50445]; it will get flagged if an identity[220] whose profile identifies it as being a bot has a range of capabilities that suggests that it is in fact a human.

This is handled similarly to the Linguistic/Cultural/Location" reason above.

Failed a Ukrbot Challenge[19000]

Most embodiments will treat any bad response to a Ukrbot challenge[710] as evidence of inauthenticity, whether it's a person who isn't what they claim to be or a bot posing as human. This includes any attempt to distract or dissemble to avoid responding to a question that, assuming it is properly designed, should be both very easy and fast to answer.

A feedback message from the SDS[50000] will be treated similarly to the Linguistic/Cultural/Location" reason above. That is, it will be treated as an item containing an anomaly, and converted to a user graph update.

Ambiguous Ukrbot Challenge

Many embodiments will similarly treat ambiguous outcomes of Ukrbot engagements[125]. The logic is that because the questions should be very easy to answer if the identity[220] is legitimate, ambiguity in a response is reason for suspicion.

This is handled similarly to the "Failed a Ukrbot challenge" reason above.

Actor Presence Model

A standard set of sanity checks for things like time zone relative to what is asserted in a user profile, the presumption that someone will be off the air for several hours a day to sleep at about the same time.

This is handled similarly to the Linguistic/Cultural/Location" reason above.

Probable Impostor Account

This is another forensic reason[50445] that identifies user[220] records looking for anomalies such as multiple accounts on the same medium[135] that appear to be associated with the same person, for example:

Dr. Maxine Fishbourne, Chelsea Michigan

Maxine Fishbourne, M.D. Chelsea Michigan

Or in which the ostensibly same person posts[195] in different languages on different media[135]. (While there's nothing at all inherently wrong with this last, it is statistically unusual.)

The first case above requires addition of higher level edges[20415] to the user graph[28010] when similar accounts are found. Various heuristics can be used, and are triggered when a user[220] edge[20415] is first entered into the graph, and when certain properties of a user[220] edge [20415], such as changing of the user name[335]. Some embodiments may detect versions of the same name, and other account identifying properties by adapting the alias clustering technique, as described in U.S. Pat. No. 8,887, 286. Other embodiments may use existing near duplicate record detection techniques as used in relational databases. There are a number of existing techniques that have been employed at scale.

The second type of case is handled similarly to the Linguistic/Cultural/Location" reason above.

Suspected Account Swapping

This reason[50445] captures the case in which the same account[220] seems to be used by more than one person despite the user profile indicating the name of a single person, and only one name is ever used in posts[195]. The logic is that since social media accounts are generally freely and easily to be had, there's no legitimate reason for people to share accounts—or for that matter to conceal it if for some reason they are. Thus the only reason to surreptitiously share accounts[220] is to boost the visibility and influence of a single account[220] by making it more prolific. Some embodiments will not apply this test to media[135] for which one must pay for an account[220]. Most embodiments will use lexical fingerprinting to establish that such swapping has likely occurred.

This is another case where most of the work has been done as a side effect of maintaining the user graph[28010]. This is handled in a similar fashion to the Linguistic/ Cultural/Location" reason above. Additionally, this reason [50445] can be triggered when inconsistencies are detected in updates to user[220] edges[20415] (i.e. a reported user [220] artifact[20430] does not unify with the existing user [220] instance). In this case we may have to invoke special handling, such as the extra edges[20415] added for imposter accounts. In this case we might create an extra edge[20415] that contains as members the user account, and constituent atoms[20410] from updates that were found to be inconsistent with the user[220] edge[20415] (for example, lexical finger printing evidence).

Suspected Account Transfers

This reason differs from the just-above one in that the account[220] is only transferred away from a bot or inadequately equipped human to an adequately equipped human when the identity[220] in question is confronted with a specific and immediate need. This could be a Ukrbot challenge[710]. But it could also be caused by interaction with regular users[220]. Once the need is past, control of the account[220] will generally return to the most economical option. Because this case is about dealing with immediate needs, most embodiments will consider the time lag between a post[195] and a response in addition to the tests described in the NLU section for whether an identity[220] is (usually) a bot vs a human, or posts content[950] that is consistent with their advertised demographics. Otherwise put, a sudden but temporary improvement in any type of competency, for example domain competence, language competence, breadth of vocabulary, is highly suspicious. Most embodiments will also avail themselves of lexical fingerprinting.

This is another case where most of the work has been done as a side effect of maintaining the user graph[28010]. When user[220] edges[20415] are updated, and the change added in the update is of the types of properties mentioned above, the system first looks at the previous version of the user edge[20415] to see what kinds of changes have happened in some time window. Some embodiments may provide a graph query component that supports running this check at a later time, in order to reduce usage of computational resources. As always this has the effect that the reason is only considered when the presence of other evidence triggers the construction of a targeting request.

Content in Aggregate from Identity Unfingerprintable

This reason exists to capture instances in which there is little to no detectable similarity in the content[950] posted by the identity[270] by any method, or collection of methods including those described elsewhere in this document, used to lexically fingerprint or otherwise identify individual authors of content[950]. In other words, it is as if just about every post[195] or article[11080] posted by the identity[270] was written by a different person. Almost all embodiments will exclude content[950] that is directly quoted or ascribed to someone else.

This case presents the problem of detecting a negative, which is very difficult to do. Its expected that the user graph[28010] will provide a graph query component[26810] that triggers this calculation for identities[220] related to a candidate targeting request[50435] during its construction.

Narrative/Event-Related Reasons

Note: Many embodiments may not require as fine-grained targeting reasons[50445] as the below. This set of reasons [50445] reflects tests at different points in the event lifecycle [11020].

Note: The common issue with the lifecycle[11020] cases below is that incremental computation is going to be quite expensive and/or complicated. Some embodiments may be configured to periodically update computations, or to defer calculation altogether until something triggers a need to do it. The descriptions below will be oriented to continuous computation.

Initial Reporting Different in Fact

This reason[50445] is used to identify articles[11080]/comments[51615] about an emerging event[170] that contain "extra" facts[11050] that are not generally present in reports about the event[170], and so to target the identities [220] associated with them. The "extra" fact[11050] may in some cases be a contradiction of facts[11050] that appear elsewhere that could not be automatically identified as such.

"Not generally present" will be defined by most embodiments by scanning for the assertion[11070] of fact[11050] across a wide number of sources relevant to the region or domain, and testing how many times it appears. Most embodiments will have thresholds for this purpose, though some may choose to assign different weights to different publications[360], media[135], authors[210], etc. It will not be defined in the vast majority of embodiments by how many times the assertion[11070] of fact[11050] appears, as that is extremely easy to game.

Computations will be performed by projection from the initial graph[28000], updated for all events[20205] detected by the system. Lifecycle edges[20415], storing a list of frequencies by time interval, will be maintained for each event[170]. Additionally frequency by time interval distributions will be created for all facts[11050] detected on posts[195] associated with an event (resulting in one distribution per event). Another frequency by time distribution will be created for all occurrences of the fact[11050]. As mentioned above the frequency values may be weighted, in the sense that each occurrence is multiplied by its relevant weight and added to the total frequency for the interval being updated. On each update to a distribution, the "extra" fact tests above are evaluated and a candidate artifact[20430] is produced when they succeed. In this case we care about a time period at the beginning of the lifecycle, say, while the frequency curve is still rising to its initial peak, so a lifecycle will no longer be tested after the first peak (or whatever criteria is used by an embodiment). However the distributions will be reused by some of the cases below, so they will be maintained indefinitely.

Initial Spin Difference

This is a parallel reason[50445] to the above one, but relates only to differences in subjective types of assertions [11070]. Some embodiments may opt to combine the two reasons[50445]. The argument to keep them separate basically is one of degree: spinning facts is different from suppressing or inventing them.

In either case this is computed similarly to the "Initial reporting different in fact" case.

Prolongment

This reason[50445] is for the case in which an event[170] that has one or more known adversary narratives[155] associated with it is continually referred to by an identity [220] even as the mention curve[11040] for the event[170] is asymptoting to zero. The logic is that events[20205] that have been useful for the adversary[265] for propaganda are likely to have their natural lives extended to the extent possible by the adversary[265]. As noted elsewhere, most embodiments will build in certain common sense exceptions to this, such comments[51615] or articles[11080] marking the anniversary of an event[170], or the recent occurrence of a related event[170], either one that is the same kind of event[170], or which generally co-occurs in articles[11080] with the event[170] in question—that is, not just those associated with the adversary[265].

This uses the same computation model as the "Initial reporting different in fact" case above, but only those events associated to adversary narratives[155] are tested, and only when the "long tail" portion of the lifecycle has been reached. For most embodiments a simple frequency threshold will work well enough to detect the start of the tail.

Maintenance of Narrative Differential

This reason[50445] and the one following it respectively catch the cases in which a) assertion(s)[11070] in one or more narratives[155] are retained by some identities[220] and authors[210] despite these assertion(s)[11070] being explicitly rejected, disproved, and/or quietly disappearing in the posts[195] and articles[11080] of others, and b) assertions[11070] change in lockstep—that is, synchronously, within a specified time window—with those of the adversary [265] as it changes its assertions[11070] in ways that other sources do not within the same time window—or ever. Different embodiments may define different measures for how "fringe" the assertions[11070] in question are so as to limit this reason[50445] to apply to only more blatant cases. Technically, these are two different reasons[50445], since the former involves staying the same, while the latter involves change in the narrative[155]. Some embodiments may divide these reasons[50445] into instances of assertions [11070] of fact[11050] vs subjective ones.

This is computed similarly to the "Initial reporting different in fact" case. The tests above can be implemented by comparing the different lifecycles. Since the distributions are split into time intervals, its easy to determine synchronous changes between distributions.

Narrative Synchronization/Lockstepping

See above. Most embodiments will assign a greater targeting strength for each lockstepped change that is detected.

Adversarial Behavior

Attempt at Gaming Targeting System[10000] or SDS [50000]

Any malicious feeding of information to the system [10000] will be counted by almost all embodiments as evidence of adversarial behavior. While different embodiments may handle this a bit differently, common behaviors that will be flagged include, but are not limited to, the following providing large amounts of duplicative or clearly garbage (unparsed-able) content through any available public feedback mechanism, providing feedback that is clearly malicious (e.g. curse words, insults, tagging Ukrbot [215] or official friendly government accounts[220] as being under the control of the adversary.)

Feedback messages will be subject to content analysis as for any other item[20200] entered into the system. However there may be extra content analyzers applied for feedback items. In any case, the annotations above and similar will be pushed to the user graph[28010] and handled as for the Linguistic/Cultural/Location" reason above.

Strong Ukrbot Detractor[51560]

Identities[220] who repeatedly either/both insult the Ukrbots[215], and/or who try to interfere in Ukrbot engagements[125] by trolling the Ukrbot[215] will be presumed by most embodiments to be acting on behalf of the adversary [265]. Different embodiments may use different forms of topic[165]/sentiment[50510] detection to establish when such trolling or insulting is occurring.

This case is handled similarly to the "Attempt at gaming targeting" reason above.

Attack on Adversary-of-Adversary[265]

Similarly, most embodiments will treat repeated participation in swarms, or "bursts" [10045] of negative polarity sentiment[50510] against particular identities[220] and/or real world persons as evidence of adversarial behavior. Different embodiments may have somewhat mechanisms, including (but not limited to) lists of prominent adversaries of the adversary[265], inferring a rolling list based on comments[51615] by the adversary[265], labeling the burst [10045] on the basis of the participation of a certain threshold number or percentage of known and suspect adversary identities[220].

This case requires a burstiness computation, which is just a variation on the basic synchronization detector[27100]. As noted in the description of the detector, parameters can be set so that the detector[27100] is heavily biased towards detecting bursts of activity. Items[20200] flagged with negative polarity sentiment[50510] will be projected to an intermediate graph and burst detection applied. The usual admonition of sub-dividing buckets by location applies. Since keeping track of bursts on negative sentiment is generally useful, we calculate the bursts without first trying to filter observations[27010] in other ways. Each relation edge [20415] produced as a result represents one burst.

The next step involves determining whether the burst is directed towards identities[220]/real world persons as defined above. This is determined via the accumulated weight of various heuristics. For example, if one of the known identities[220] recently posted before or during the burst, whether one or more of these identities[220], relevant topics[165], counter-narratives, known adversary identities [220], and so one are mentioned in content from items [20200] contained in the relation edge[20415]. These tests can be computed with an edge intersection[27305] starting from a member set[27300] composed of these elements. It should be noted that the edge intersection[27305] will contain edges from across the graph, so some additional bookkeeping will be needed. The presence of these elements will have to be tallied up in a table of the bursts. Depending on the implementation strategy (batched, continuous, etc. . . . as discussed in the description of edge intersections [27305], et. al.), that bookkeeping may be kept in a temporary structure, or entered as another edge in the graph.

A candidate artifact[20430] will be generated when a relation edge[20415] accumulates enough weight. Since the relation edge[20415] can be very large, the candidate artifact will contain as a member a reference to the relation edge [20415], so that the edge can be queried for at a later time if necessary.

Miscellaneous

Countermeasure Response

Any identities[220] who change their behavior within a specified time window from the application of a countermeasure[12000] that targets that specific behavior will be determined to be adversaries[265].

This is another case where the user graph[28010] does most of the work, while the graph[28010] does not maintain trajectories[26600] per se, it is built with back references to prior versions of the edge. This case requires a feedback message[20210] (i.e. a processing instruction) from SDS [50000], sent to the initial graph[28000], which indicates that a countermeasure has been launched, the location(s) [405] involved, and a description of the countermeasure. These processing instructions are batched up to be processed at a later time, after the time window has expired. User identities[220] that have been active at any of those locations[405] are retrieved via a graph query to the initial graph (i.e. retrieve the set of references to identities[220] from all items[20200] posted at the location(s) within a time interval). For those identities we scan through prior versions looking for differences in behavior. As in other cases a score is accumulated based on successful heuristic tests, such as has the user started referring to a new narrative, and so on. User[220] edges[20415] that accumulate a significant score are marked as adversaries[265].

Charge-Bearing

Any identities[220] whose appearance and sustained activity level[50100] on multiple locations[405] is associated with trailing substantial increases in polarization and/or fragmentation will be considered by most embodiments to be exerting influence[51620] in some otherwise not currently detected form. By "polarization and/or fragmentation," we mean SNA changes in the audience[910] such that either a pre-existing structure (for example, hub-spoke) is replaced, or a largely sparse and random set of sparsely or unconnected graphs is replaced with small densely interlinked structures. Link types used by different embodiments may include, but are not limited to: textblock[10050] or textual similarity, topic[165]/sentiment[50510], reference by one identity[220] to another, quote of one identity[220] by another, references to the same named entities[20725], use of the same assertions[11070] and narratives[155], same URL's posted, same non-textual content[950] posted and co-temporal links.

Activity level[50100] may be determined differently by different embodiments. A default embodiment combines measures of number of posts[195] by the identity/ies[220] in question per unit of time, the saturation level for the location [405] (e.g. what % of all posts[195] this is) and the interactivity of the posts[195] (e.g. how many responses or references to them?) The idea is to establish that the identity/ies[220] in question were "present" enough on a given location[405] that it is reasonable to attribute structural SNA changes within the relevant audience[910] to their activities.

In order to identify changes in SNA structure, some form of group detection, using existing incremental group detection methods, is run on the SNA graph, different embodiments may limit the edge types which are used in the computations to match those above, or similar sets. Parameters will be set to keep the groups small and tightly defined. The groups will then be stored in trajectories in a projection graph[26240]. The criteria for matching group updates to trajectories will be based on the amount of overlap between the group artifact and the trajectory head[26605]. Splitting, dropping and merging of trajectories will be used to detect change in structure. Some embodiments may use another of the group detection methods discussed in the application, such as synchronization based groups. When recording changes, we simply take all the locations that are highly represented in the group, Some embodiments may go back to the source graph and scan relation edges for the locations they reference.

Once locations with high levels of change are found, we issue graph queries to trigger the activity level calculations. The presumption is that its far less expensive to calculate activity levels on demand for the much smaller set of identities found these groups.

HUMINT—Official Channels

Virtually all embodiments will accept data from official channels such as intelligence agencies so as to allow the system to profit from such knowledge. However, most embodiments will choose not to place 100% reliance on such data, and will prefer to require the analyst[250] to provide the closest available evidence reasons[50445] if any apply, along with a certainty factor that expresses the confidence in the accuracy of the intelligence. That will cause the targeting system to assign a non-zero evidence value for the "HUMINT—Official channels" reason[50445] (according to the certainty factor provided) and to augment the targeting strength[51705] for the other evidence reasons [50445] provided.

This case requires human operators[250] to manually create events. The target graph will be determined by the system based on which evidence reason is provided. If an evidence reason is not provided, then operators may have to manually specify a target graph. The system will handle the event as normal. Which means that it may trigger a targeting request[50435], or may simply provide supporting evidence [50445]. The extra considerations concerning the "HUMINT—Official channels" reason[50445] and modification to the targeting strength[51705] will be applied during construction of targeting requests[50435] (i.e. by scanning through the various constituent artifacts[20430] looking for supporting targeting reasons [50445]).

HUMINT—Ukrbot Supporters[51575]

Feedback from trusted supporters[51575] as to the malign nature of an identity[220] will be accepted by most embodiments. However, most embodiments will treat such information with a greater level of skepticism. As noted elsewhere, even diligent supporters[51575] may simply sometimes be wrong, for example, wishing to target the accounts[220] of cranks or people who are posting things that may be in poor taste. Thus most embodiments will require the potentially malign identity[220] to either/both already be being followed by the targeting system[10000] and/or to be identified by multiple supporters[51575]. Many of these embodiments will discount multiple reports that occur within the same short time span so as to limit the number of cases in which multiple supporters[51575] backchatter and report the same identity[220] based on the belief of one of the supporters[51575].

These feedback messages[20210] will be sent to the user graph[28010] and transformed into identity artifacts[20430] containing atoms[20410] representing the report. Some embodiments may allow users to choose from one or more lists of values which is reported back in the message. This case results in yet another member atom type[20020] (or types[20020]) that can be associated with user[220] edges [20415]. As with other supporting evidence types[20020] this will be handled during construction of targeting requests [50435].

Empirically Observed Regularity

Since each embodiment will have its own evidence handlers, and since new structures in the graph may be discovered over time, most embodiments will support a catch-all category targeting reason[50445] for regularities that are detected but which do not fall into one of the common categories. Most embodiments will generate an operator/analyst[250] alert when such a regularity appears more than N times, where N is a system parameter.

Excessive Influence Accrual

Most embodiments will seek to identify identities[220] who have garnered an unusual amount of influence[51620] rapidly within one or more particular locations[405]. Most embodiments will combine shallow medium[135]-specific measures (e.g. retweets, likes, etc.) when available and deeper measures such as quoting and referencing of an identity[220]. This is because the idea is to identify any account[220] that seems to be advancing in both real influence and visibility much faster than the norm as measured at different levels of definition of location[405] (see FIG. 7). Most embodiments will waive this test for any new medium [135], since some users[220] will bring already-acquired influence or celebrity to the new platform and hence be starting off with a large advantage.

The notion of excessive levels of influence probably makes more sense in the SNA senses of influence rather than the influence model, but embodiments may use either or both. SNA measures are calculated based on a identity's [220] direct impact on the graph, and because of the global nature of the computation, provide a natural definition of excessive. The influence model based measures less directly relate to each identity[220]. The influence model[51875] is useful for calculating change over some location, while there is some merit in the idea that a identity[220] that can be tied to changes across a location has more influence, the level of change its possible to measure is inherently limited.

The SNA influence graph[28030] accumulates social relation edges[20415] between users[220] from various sources. Most graphs that produce such edges will project to the SNA influence graph[28030]. So called shallow measures are based on properties of the identity[220] itself, and information available in its immediate neighborhood (such as number of relations, number of related identities[220], etc. . . . ). Deep measures account for things like reach, authority in the traditional SNA sense and so on. These measures will use existing methods such as incremental page rank algorithms, or other incrementally calculated centrality algorithms. This class of problem is well studied at scale and there are any number of techniques available.

The graph will be required to participate in a control loop (e.g. as in FIG. 14) to maintain baseline models. Essentially these models would be based on maintaining a frequency distribution of rates of change in the various measures. We would expect these distributions to match a power curve as is standard for this kind of data (almost any measurable property in social networks follows this distribution, e.g. node degrees, length of shortest path to other nodes, etc. . . . ). Therefore we are looking for rates that are in the long tail of the distribution (the higher the rate, the lower the frequency).

Determine and Prioritize Targets

The evidence combination graph[28035] is the target projection[26240] of all graphs[26235] that label artifacts [20430] with targeting reasons[50445]. This graph basically stores all incoming artifacts[20460] and uses a projection operator[26020] to construct candidate targeting request [50435] artifacts[20430], prune candidates[20430] with insufficient evidence to trigger a targeting request[50435], and send the remaining candidates on to a projection that computes trajectories[26600]. That projection performs the some final steps, such as assigning a targeting id, based on whether the reported artifacts[20430] are added to an existing trajectory or entered into a new trajectory[26600].

The criteria for determining whether a candidate[20430] contains sufficient evidence is largely empirically driven, though there may be some reasons[50445] or combinations of reasons[50445] that are deemed sufficient by design. This section describes methods for assessing the combined significance of labelled artifacts[20460]. These methods are parameterized via a control model[26225], and we assume that the system needs a startup and testing period to build a working control model[26225]. Once the targeting system [10000] is running normally it is subject to a control loop, as in FIG. 14. While it is tempting to invoke machine learning techniques for solving this problem, they must be adaptive themselves, they must be auditable (in the sense that some description of the decision can be entered in the auditability log), need to work with hierarchically structured input data of arbitrary size, need to handle combinations of discrete and continuous data, and incorporate externally specified parameters (such as reasons[50445] that are deemed significant by design, reasons or combinations of reasons[50445] with significance boosted by association to current real world events, and so on). While its possible that embodiments may find an ML method (or combination of methods) that is effective, the preferred embodiment described here is rule based. Some embodiments may apply ML techniques in place of different rules.

The control loop accepts stress values[26245] from a few sources. As normal the trajectory analyzer[26230] receives stress values[26245] from updates to targeting request [50435] trajectories[26600]. Additionally feedback messages from the SDS system[51575], human operators[250], and potentially feedback[90020] messages generated from the general public. In embodiments using public feedback [90020] will have to implement a filtering method to public feedback[90020] to translate them into usable form. SDS [50000] success/failure of a Ukrbot[100] engagement[125] will be treated as a stress value for the initiating target request. Human operators will generally provided feedback directly concerning targeting requests[50435], such as validity of individual evidences in the targeting request[50435], errors in target characteristics and so on. For simplicity, the stress values will be generated as positive/negative marker applied to an atom reference. stress values[26245] will also be passed to upstream trajectory analyzers[26230] as appropriate. For example the success ratio will be passed back to the originator of each of the labelled artifacts[20460] in the targeting request. Positive/Negative stress values[26245] will be passed back to the originator of the affected atoms [20410].

Following the approach used for graph queries[26810], hueristics[26805], etc. . . . combination rules[26815] are implemented via heavily parameterized software components[26800]. Rules[26815] implement a comparison between an atom[20410] of some type[20020] (most rules [26815] apply to an identity[220]) and one or more other labelled artifacts[20460]. The purpose of the rule[26815] is to update or retrieve a table of strength and significance values. As described in FIG. 23, a combination rule[26815] consists of an OSF value[20000] including the following: a software component identifier[30000], a rule priority value [30005], a data element descriptor[30010], and a list of one or more reason descriptors[30015]. A descriptor is an OSF value[20000] used for matching, usually consisting of an OSF type[20020], but may be any OSF value[20000]. An atom[20410], or rather the OSF value[20000] representing an atom[20410], matches the descriptor if it can unify with the descriptor and is explicitly declared to be a type[20020] or subtype[20020] of the descriptor's type[20020]. Combination rules[26815] may be found in system knowledge bases or declared via processing instruction[20225] messages[20210] or both. In most embodiments, the combination graph[28035] will internally cache a list of current combination rules[26815] for efficiency.

Figure 23:
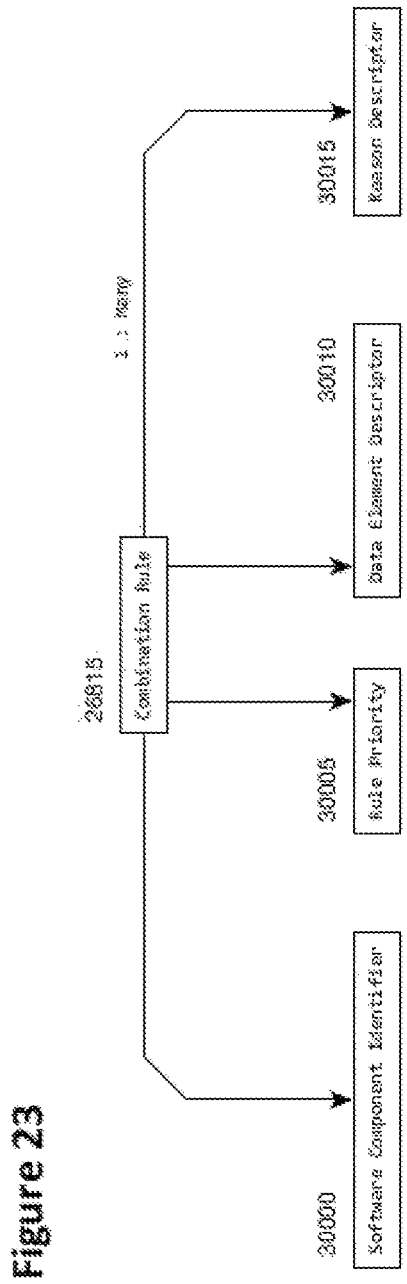
FIG. 23 is a block diagram illustrating the structure of evidence combination rules.
Figure 24:
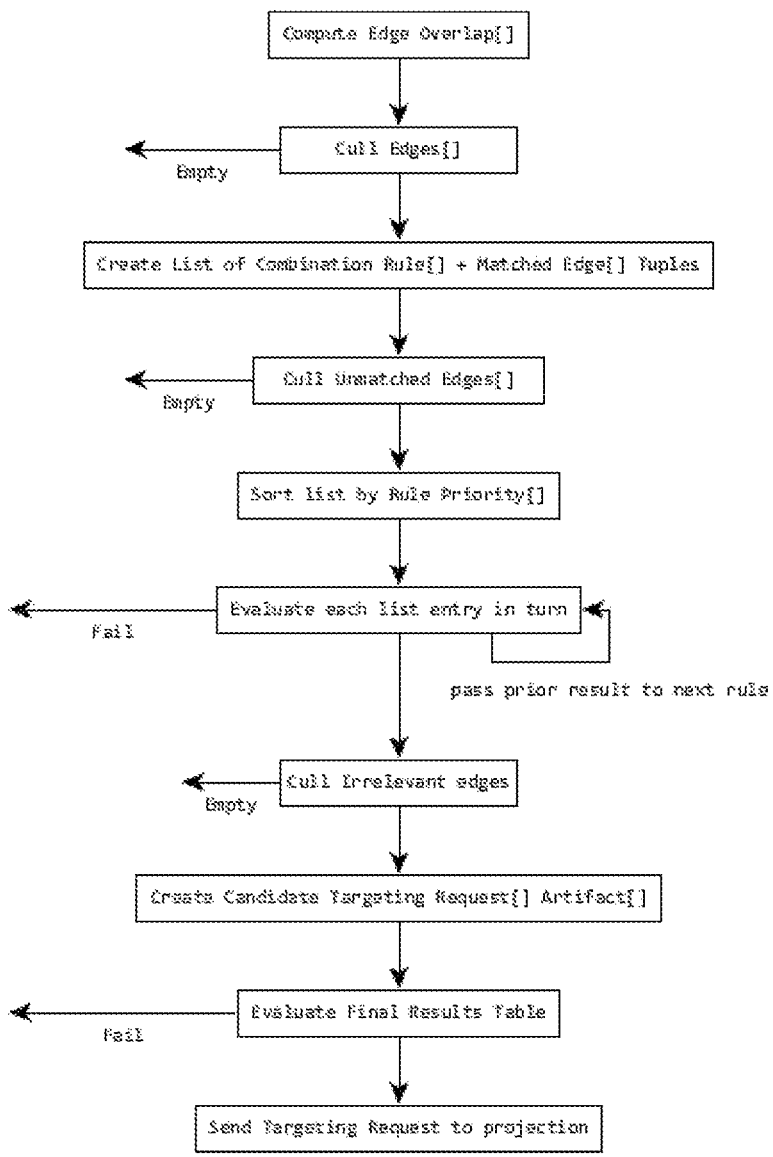
FIG. 24 is a block diagram illustrating the process by which evidence is aggregated to create targeting requests

The overall process for evaluating evidence combination is described in FIG. 23. For each labelled artifact[20460] entered into the graph[28035], compute an edge overlap [27405]. Some embodiments will use a list of heuristics [26805], taking an edge[20415] and the overlap's[27405] edge set[27420] as arguments, to cull irrelevant edges [20415], by removing any edge for which the heuristic [26805] test fails. Additionally, older edges will be culled from the edge set[27420]. If any edges remain, for each edge and each rule accumulate into a list a tuple for each unique combination of edges that the rule matches. Next cull edges that have not been matched by any of the rules. If any edges remain, create a targeting request candidate artifact, as detailed below. Sort the list of rule[26815] matches by priority[30005]. Create an initial empty results table and evaluate each rule in the list in turn. Rules return one of three possible values, a failure value, an irrelevant value, and a success value. If the rule fails, exit the process. Keep track of edges for which at least one rule succeeds. After evaluating all rules, cull any edges that did not have at least one success. If any edges remain, create a candidate targeting request[50435] artifact[20430]. The creation process may make additional updates to the results table. Afterwards evaluate the results table. This evaluation process is heavily dependent on the combination of analytics, parameters, etc. . . . that an embodiment uses, as well as characteristics of the overall data set. Therefore we cannot provide an explicit rule here. Note that the evaluation process is heavily influenced by the current control model(s) supplying parameters.

Embodiments may choose any of several different strategies, for example computing a weighted sum of table values, applying a statistical model, applying a set of heuristics, etc. . . . . The keys used in the results table will have defined meanings to the evaluation rule. For example the presence of a value for some keys may indicate that the request should be triggered/updated no matter the state of the rest of the results table. However the final goal of the evaluation process consists of three results, is the request valid, an overall strength and an overall significance. The strength and significance are in addition to any of the other targeting attributes required by the SDS system[51575]. If the request[50435] is determined to be valid, attach the strength and significance scores and attach the results table, and emit the request.

In the projection graph[26240], potential trajectories are matched by the target[s] contained in the request instance. Different embodiments may employ different strategies about whether trajectories are combined or split, or new ones created. But they are all based on the target set. The main issue for the targeting system is that it must be able to distribute feedback to the correct trajectories. Therefore, the targeting system will attach an edge to the targeting request which contains past target request ids from which the current trajectory is derived. In order to compute this, an edge intersection[27305] is computed from a member set composed of the targets found in the request. The resulting edge intersection will contain potential trajectory[26600] matches.

When creating the candidate targeting request[50435] artifact[20430], we need to first fill out supporting reasons [50445]. The candidate is created around a list of labelled artifacts[20460]. First the artifacts[20460] in this list are scanned for labelled artifacts[20460] that were not reported to the combination graph[28035]. Scanning consists of following all the membership references down through an edge and all of its member edges. For each such artifact found, rules are matched and evaluated. If a rule succeeds, the artifact[20460] is added to the list of candidate reasons (and the results table updated). If during the scan artifacts are encountered that are involved in a deferred reason computation, a graph query[26810] message[20210] is issued to trigger computation of any labelled artifacts. Typically the target graph query operator will handle the rest of the deferred computation and return any labelled artifacts that result. These are handled the same way as the non-reported labelled artifact[20460].

Following the inclusion of supporting reason[50445] artifacts[20460] (and the attendant updates to the results table), the candidate request is finally constructed. Since there may be multiple targets, a list of target edges is constructed which will be attached to the targeting request. A list of targets is composed by scanning the final list of reasons for associated user[220] instances. For each target we look up the user [220] edge[20415] instance stored in the user graph[28010] in order to get the most up to date and authoritative description of the user[220]. Most of the target attributes can be taken directly from the user edge with the exceptions noted below:

target id—the user[220] id target interaction history[51820]—updated within the targeting request when we receive feedback messages from SDS target overall value[50430]—computed from at least user [220] characteristics+role+influence+priority based on embodiment target influence level[60520]—can be retrieved from influence graph[28025]

target ringleader status[50270]—(re)computed according heuristics such as: the target's position in any coordinated groups, are they a hub (ie they start sequences of actions) target influence level relative to other targets in the request, the target's priority level. Different embodiments may consider additional factors.

Most Recent Triggering Content[995]—issue a graph query to the initial graph that scans recent posts for tainted content.

Target Certainty[51500]—calculated from results table generated by evaluation of combination rules[26815].

Sophistication Level[51710]—quite complex, and computation method is discussed later in this document. Retrieved via graph query[26810].

Following the construction of the target list the targeting request[50435] edge[20415] is finally created. The main work remaining at this point is the allocation of a budget. The factors that go into determining the budget are described in the SDS section. By this point all of the the underlying characteristics have been calculated and can be retrieved from the influence graph[28025]. Note that the influence graph has estimates for audience size[50110], potential influence gains[50455] in an abstract sense. These need to be combined for the set of expected locations seen for the request[50435] targets. Some embodiments may choose to update the budget as the campaign commences, but the decision to go forward with an engagement[125] will have already been made on the initial budget. As noted above, the target request id will not be assigned until the target request [50435] artifact[20430] has been assigned to a trajectory in the projection. This id is different from the atom id assigned to the artifact.

There are additional calculations that will be required if the request[50435] triggers an engagement[125]. The projection graph[26240] will be configured with graph query operators for triggering and returning these results.

The Dialog System

Most embodiments can use any existing dialog system as a base, so long as it is programmatically extensible and of state of the art performance level. The overall design of the Ukrbot system[10000] is intended to limit the reliance on any sophisticated NLU and NLG to the extent possible. This is in part because of the inherent difficulties and lack of fidelity, and in part because savvy adversaries will know how to trip up such systems, for example with the use of culture or region specific metaphors and idioms. Different embodiments may choose their own dialog systems[40000] and/or separate NLG[60035] and NLU components[10100], so long as they are able to provide the capabilities specified throughout this document. Beyond commonly understood NLG and NLU capabilities, these include, but are certainly not limited to: providing an interpretation certainty, supporting multiparty dialog scripts[50475] (dialog scripts[50475] in which multiple Ukrbots[100] have distinct roles, and extensibility to both recognize text with specific linguistic aspects such as register[51845], and generate text accordingly.

One of the methods of limiting this reliance is to rely on the use of customizable dialog script templates[50477] to the extent possible. This reduces the NLG needed in most interactions to performing (usually) relatively simple transformations on one or more dialog scripts[50475] so as to customize it appropriately for the specific engagement[125]. In the context of engagements[125], it aids the NLG component[60035] by providing templates for the target's [50425] expected responses[50525].

Figure 25:
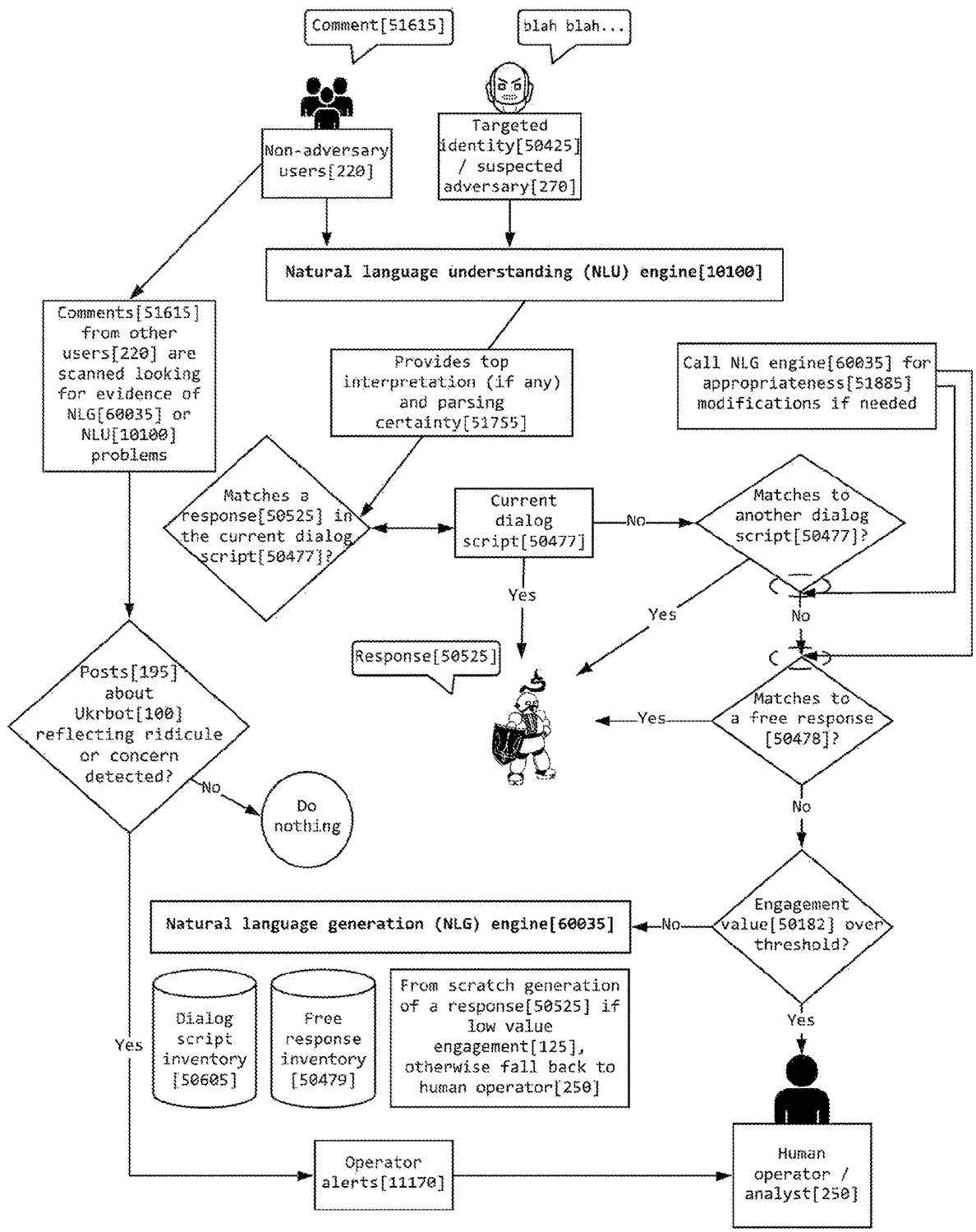
FIG. 25 is a block diagram showing a process flow for embodiments of the Natural Language Understanding (NLU) and Natural Language Generation (NLG) subsystems in determining responses to targets in an engagement.

As indicated in FIG. 25, when the target[50425] goes off script, most embodiments will search for a related dialog script[50475] or template[50477] that may be swapped in that does contain an apparent match. (As noted elsewhere in this document, most embodiments will prefer highly modular dialog script templates[50477] that link to one another rather than individual dialog scripts[50475] with forests. There will in many cases also be more than one dialog script template[50477] that could be used for any given engagement[125].) If that too fails, almost all embodiments will also have a "free response" portion of the knowledge base[10270], the free text inventory[50479], with general response-reply pairs (e.g. "thank you"/"you're welcome") that may be consulted. In both the case of dialog scripts [50475] and the free text responses[50478], the NLG engine [60035] will be called to adapt any linguistic aspects such as dialect[50500] and register[51845] for contextual appropriateness. For most embodiments, this means adapting to the most common cases for the relevant audience[910]. In other embodiments, the NLG engine[60035] will match the linguistic aspects of the user[220] who made the post[195] that the Ukrbot[100] is responding to.

Figure 26:
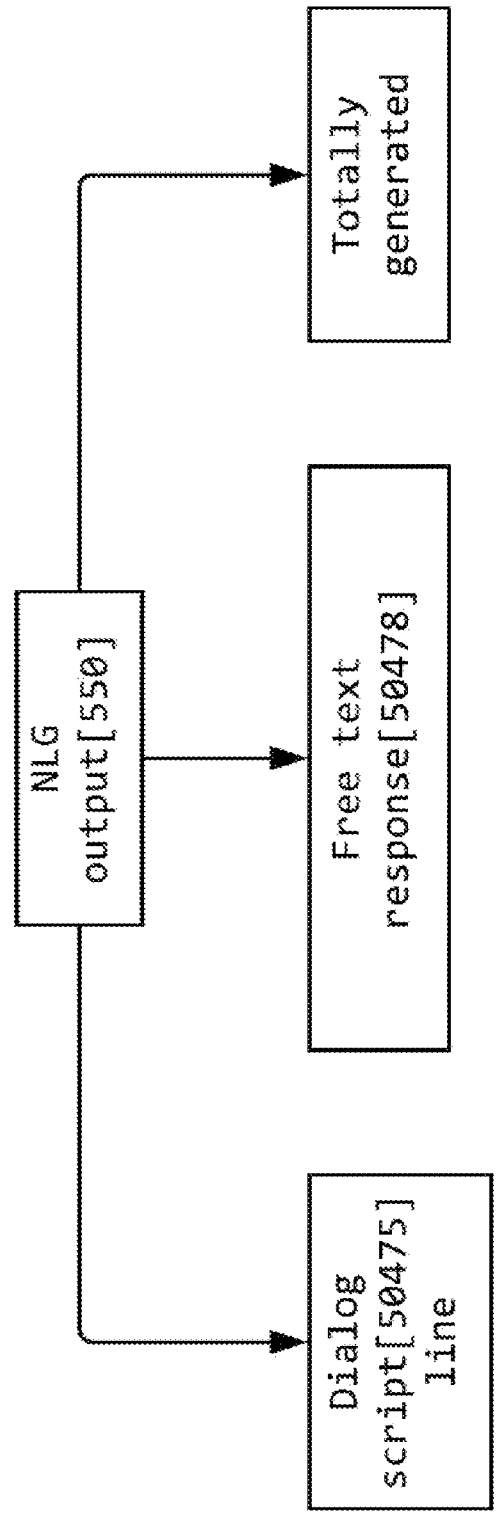
FIG. 26 is a block diagram showing examples of NLG engine output which typical embodiments of the Ukrbot will use as responses in non-higher value engagements.

In higher value engagements[125], when it fails, an operator alert[50560] will be automatically sent to an operator[125] with the requisite language[50495] and other specified skills or requirements imposed by the engagement parameters[51625]. In lower value ones, the NLG component[60035] will do its best to generate an adequate response—which is what most such systems as of this writing have to do. The value threshold will be specified in most embodiments as a configuration parameter. The three types of NLG engine[60035] output are indicated in FIG. 26.

While this is not realistically intended to work more than a good percentage of the time despite the multiple layers, even despite significant amounts of user[220] testing with the UDTS[90000] and any ML techniques brought to bear, it will still reduce the load on operators[250] considerably.

As noted elsewhere in this document, in almost all embodiments, the SDS[50000] will continuously pull processed data from the NLU component[10100] on channels [140] where an engagement[125] is underway. One of the key reasons for this is to quickly identify instances where the NLU and/or NLG has made errors bad enough to provoke ridicule from Ukrbot detractors[51560] and/or concern from Ukrbot supporters[51575].

Apart from the context of engagements[125], in most embodiments the NLU component[10100] is continually analysing the incoming content[950] on all contested locations[405]. Whenever possible, most embodiments will try to determine at least the following linguistic properties:
Topic(s)[165]
Sentiment(s)[50510]
Tone(s)[50502]
Language(s)[50495]
Dialects(s)[50500]
Register(s)[51845]
Style(s)[51645]

And for articles[11080] (longer items), most embodiments will also try to determine novelty[45100] and sophistication level[51710]. This information will be sent to the targeting system[10000] and placed in the active data store [10235]. It will be used for a variety of different purposes, including but not limited to:
If the content[950] belongs to an identity[220] who becomes a target[50425], the extracted values will be used by the NLG component[60035] to modify the dialog script(s)[50475] that will be used in the engagement[125].
Likewise, a target[50425] who demonstrates a greater level of sophistication[51710] is more dangerous and may have a higher cost to pursue (because human operator[125] invention becomes likelier and higher quality collateral[50040] may be needed)
Lexical fingerprinting[20780], to help determine the correspondence of individual human trolls[305] to identities/accounts[270]
To be able to better match users[220] in the various audiences[910] to focus group users[220] tested with the UDTS[90000]

Figure 27:
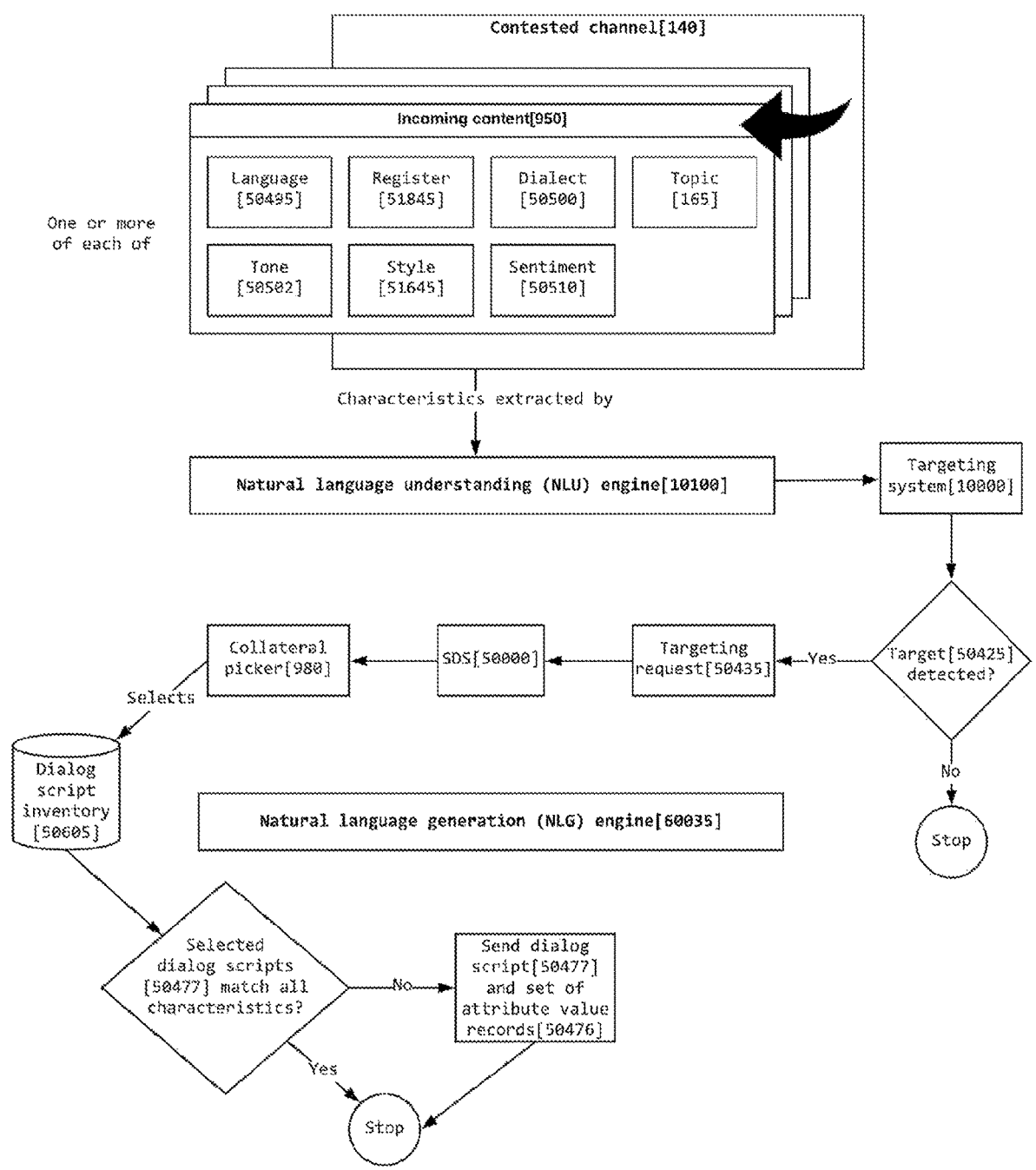
FIG. 27 is a block diagram illustrating a system architecture for embodiments of the NLG and NLU subsystems.

As shown in FIG. 27, each time the targeting system [10000] identifies a new target[50425], it will send the SDS[50000] a targeting request[50435] that will result in a new engagement[125] being packaged (absent conflicting or unsatisfiable parameters). As part of this process, the collateral picker[980] will identify one or more dialog scripts [50475] and/or templates[50477] for use in the engagement [125]. If any of these do not match the appropriate values (see section on appropriateness[51885]) for the required attributes, the NLG component[60035] will be invoked to modify the dialog scripts[50475] so that they match up. These required attributes may include but not be limited to: register[51845], language[50495], dialect[50500], style [51645], and tone[50502]. As noted in FIG. 28, while in some cases the response attribute should literally match that of the original post[195]—such as language[50495] for example—in other cases such as tone[50502], this is not necessarily the case.

In order to support all of this, most embodiments will avail themselves of three clusters of linguistic evidence to perform a variety of tasks throughout the system. These usages include:
NLG for what the Ukrbots[110] say, and continuous improvements therein
NLU for understanding posts[195], articles[11080] and other types of text and text-related content, and continuous improvements therein. This has numerous applications throughout the system including identifying assertions[11070], assessing the exertion of influence, identifying toxic content[50200], and user[220] reactions to the Ukrbots[110].
Estimating the cost to the adversary[265] of creating specific pieces of content[950] by assessing different linguistically-related aspects of that content[950]
Assessing the expense incurred for each troll[260] based on their linguistically-related prowess, and similarly assessing their threat or effectiveness level
Trying to assess whether an adversary identity[270] is a bot[255] or a troll[260] of some kind
Trying to assess whether an identity[220] has the demographic features they claim The three clusters are:
1. Standard linguistically-related categorizations such as topic[165], sentiment[50510], and tone[50502]
2. More complex and/or system-specific linguistic types of categorization, such as complexity[51780], specificity[51785], novelty[45100], appropriateness[51885], style[51645], and sophistication[51710]
3. Identification of linguistic markers[51890]

The following section provides more detail for each of the evidence clusters.

1. Topic, Sentiment, and Tone

This evidence cluster encompasses the content of the message and the emotional and attitudinal component the author intends to deliver.

A topic[165] is the standard IR definition: Sentiment[50510] likewise, though different embodiments will choose their own sentiment[50510] sets based on their particular needs. Some embodiments may choose more fine-grained sets to include sentiments[50510] such as concern, fear, confusion or anger rather than positive vs negative.

Mentions of topics[165] will be associated with a sentiment[50510] whenever possible, and vice versa. In most embodiments, a topic[165] may be transmitted through means other than normal text, including but not limited to, hashtags, image captions, text embedded in images or video, video titles and/or links, depending on the specific medium[135] in question. Some embodiments may also allow topics[165] and sentiments[50510] to be inferred from non-textual evidence. Examples include, but are not limited to: interpreting facial expressions or body language in images or video, and recognition of objects in images or video.

For topic[165] and sentiment[50510] detection, most embodiments will use standard IR methods. However, definitions for topics[165] that are considered to be very important and/or toxic[50200] will be determined and provided by an analyst[250] in most embodiments.

For the next tier of importance of topic[165], some embodiments may use a combination of manual and automatic topic[165] detection. In some embodiments, the high value topics[165] will be manually implemented using a query system[40300] such as CQE (as described in U.S. Pat. No. 8,887,286). In most embodiments, such topics[165] will be indirectly tested with topic[165]—focused dialog scripts[50475] with user focus groups through the UDTS[90000] to ensure they perform as expected; some embodiments may even go so far as to require the UDTS[90000] output. The initial list of manually defined topics[165] will be under constant review due to changing circumstances. For this reason, most embodiments will provide mechanisms to detect automatically identified topics[165] that are surging in frequency, and "blobs" of apparently related text that fail to coalesce into a topic[165] using fully automated means.

Uses of topic[165] and sentiment[50510] categorization are detailed throughout this document. Although not especially high fidelity in most real world cases, such categorization is very important in key system tasks such as correctly identifying assertion occurrences[11089] and more generally interpreting posts[195] and other content[950].

Most embodiments will assume a difference between sentiment[50510] and tone[50502] in a language. In most embodiments, sentiment[50510] is defined as the inner state of a person, which may be reflected in the expression of anger, joy, fear, sadness, disgust etc. Tone[50502], on the other hand, is defined in most embodiments as the manner in which individuals decide to communicate their emotions, opinions and/or ideas in order to intentionally affect and influence one or more members of their target audience[820]. Tone[50502] recognition is applied by most embodiments in at least two use cases: 1) assessing how well an adversary identity[270] uses tone[50502] to influence the target audience[820], and 2) the NLG system[60035] choosing the right tone[50502] in targeting the adversary identity/ies[270] while simultaneously exerting influence on one or more users[220]. An important corollary to the first use case is using this assessment as a source of evidence w.r.t. to whether that identity[270] is a bot[255] or a troll[260]—and if a troll[260], what broad level of troll[260].

Most embodiments will apply existing ML methods to recognize tones[50502] that are conveyed in a post[195] or across posts[195] if sufficient training data is available. If sufficient training data is not available, in some embodiments human annotators will label a set of representative comments[51615] with their corresponding tone[50502] and using bootstrapping, unclassified comments[51615] will be labelled until sufficient training data is available. The training data will then be used to cluster and classify unseen data into the corresponding tone group[50503]. The larger the cluster and the more clusters there are for a given identity[270], the more skilled they are found to be at using tone[50502] in most embodiments.

In many embodiments, the effect of an adversary identity's[270] use of tone[50502] on the audience[910] will be measured by analyzing the reaction of the users[220]. Most embodiments will begin with a presumed set of effects, so as to be able to measure the effectiveness of different dialog in achieving those effects to the extent that they are measurable. For example, if an expression "gratitude" is the expected effect, search filters can be put in place to catch such expressions.

Most embodiments will have mappings for tone[50502] and observed effects[51895] on users[220]. In some embodiments, this may be use-case-dependent. Below is a simple example of such a mapping table. Such tables are used so that user[220] responses to the adversary identity[270] can be assessed with whatever categorizer of choice so as to determine whether or not any of the desired effects seem to be being achieved—and likewise for the Ukrbots[110]. This information will be used to help assess the effectiveness or seniority level of the adversary identity[270], including whether it is likely to be a bot vs. a troll—and hence its cost to the adversary[265]. In the case of Ukrbots[110], such data can be used to make improvements.

| Tone[50502] of troll[260]/adversary[265] | Desired effect on target audience[820] |
|---|---|
| sympathetic | rapport, understanding |
| empathetic | proximity, loyalty, bonding |
| rallying | response, action, engagement |
| calming | appeasement, conciliation, cessation (of current doings) |

However, owing to potential cultural differences in different theatres of operation, these effects may be changed in most embodiments, whether manually or with the use of ML or other automated techniques.

Tone[50502] as a tool of influence will generally be used in similar ways by the adversary[265] and the Ukrbot[110]. However, for the Ukrbot system[10000] the former case is concerned with the recognition of tone[50502] while the latter is concerned with tone[50502] generation. How well the adversary[265] uses tone[50502] is assessed by most embodiments by identifying the number of tones[50502] that a particular identity[270] has in their repertoire; other embodiments may strive to identify how effectively each tone[50502] seems to be being used. For example, if an adversary identity[270] tries to express sympathy towards a given user[220], but is met with a detectable angry reply such as "Go to hell. You don't care at all about me." that would not be considered a successful use of the sympathy tone[50502].

Most embodiments will assume that adversary bots[255] use a limited number of tones[50502] that will be expressed in relatively simple and similar ways, whereas trolls[260] can be expected to have a larger number of tones[50502] at their disposal that are expressed with greater semantic complexity[51781]. Thus, most embodiments will accrue evidence from tone[50502]-related data as to the level of a troll[260]—and whether the identity[270] is in fact a bot [255]—based upon the number of different tones[50502] he has in his repertoire, and the more semantically complex (according to existing metrics of semantic complexity [51781]) his way of expressing tone[50502] is.

For use case 2), most embodiments will consider the appropriate timing and context to express tone[50502] (for example, sympathy at the wrong time or in the wrong context can backfire), and in what manner tone[50502] is being expressed. In many cases, the correct way to respond to a comment that expresses Tone A[50502] is not to echo Tone A[50502] back but rather to use Tone B[50502]. To this end, almost all embodiments will have tone-to-tone[50504] mapping tables. In many embodiments, the UDTS[90000] will be used to test NLG component[60035] implementations of tone[50502]. In most embodiments, formulating responses with an injection of tone[50502] will follow a rule-based approach using scripted templates that can be filled in a semi-automatic manner, with phrases being shuffled around and re-combined so that the same lines can be re-used without over-saturation.

2. Complex and Custom Linguistic Categorizations

Sophistication[51710], in most embodiments, is a comprehensive term used to describe the levels on which a troll[260] or bot[255] exerts knowledge, skill and effort that goes into content[950] creation in the course of an interaction. The term will be used here for both adversary and friendly identities.

Sophistication[51710] in most embodiments is determined by a system-configured set of weights for each of N sub-categories[51900] which are likewise determined by the individual embodiment over a pre-defined rolling time window[50090] across the different locations[165] on which the identity[220] in question is present. One or more of these sub-categories[51900] may be present or absent in a particular piece of content[950]. A greater degree of sophistication[51710] is achieved, the greater the number of sub-categories[51900] for which evidence is significantly present. In some embodiments, the elements within the sub-categories[51900] may also have different weights assigned depending on what is considered most important by the embodiment. The weights will be manually set in most embodiments, but they will be configurable based on a set of rules so that weights can be adjusted if certain sub-categories[51900] are missing from the total set of available features. However, some embodiments may allow the optimal weights to be learned over time based on the apparent level of influence[51620] gained by the particular identity [220]. In most embodiments, the sub-categories[51900] are not mutually exclusive and there may be a certain degree of overlap between them; certain features in the text may be considered as evidence of more than one sub-category [51900] in some embodiments owing to inherent ambiguity. Most embodiments will assume a correlation between sophistication[51710] and cost[50005], since demonstrated sophistication[51710] generally equates to more skilled and higher-quality workers.

Figure 29:
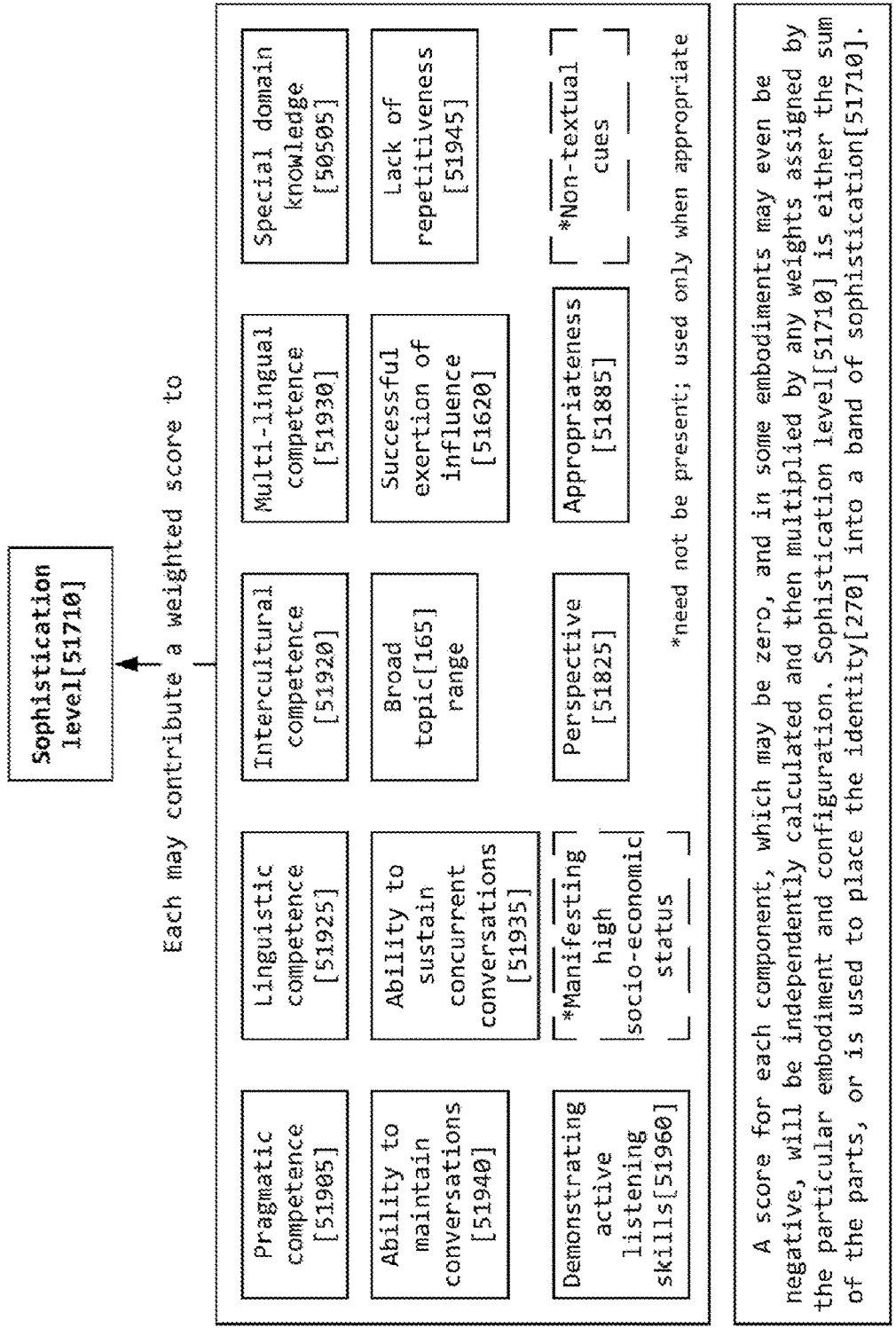
FIG. 29 is a block diagram of a set of components that contribute to a score that determines a typical embodiment's assessment of a user's sophistication.

As indicated in FIG. 29, most embodiments will differentiate between deciding sub-categories[51900] and supporting sub-categories[51900]. The deciding sub-categories are regarded as carrying more importance and weight in most embodiments, while the additional supporting sub-categories[51900] will not be used as stand-alone measures but rather to refine the sophistication[51710] level within a range determined by the deciding sub-categories. The weights will be determined by the embodiment.

The deciding sub-categories[51900] in a default embodiment are as follows:

Pragmatic Competence[51905]

This is the ability to respond to content[950] in a way that is contextually and socially appropriate. For example, if someone posts a lengthy comment about COVID-19 and how they lost a family member because of it, a socially appropriate answer would be to express sympathy/empathy and elaborate by picking up on something the poster said—for example "I'm so sorry that you lost your grandmother—how horrible that must be for you", rather than just the generic and minimal "I'm sorry." The more specific [51785] and customized such a response is, the higher the pragmatic competence demonstrated. Using the right level of tone[50502] and register [51845] adds to the pragmatic competence level [51905].

A substantial sub-category[51900] of pragmatic competence[51905] is empathy[51910] and this entails giving an appropriate response that is in attunement to a post[195] that is being responded to. For example, if someone stated that they lost a $5 bill, a response along the lines of "I'm so sorry for your loss!" would be over the top, but would be appropriate in the context of someone's beloved dog having passed away. Support for the appropriate level of empathy[51910] to demonstrate is facilitated by the fact that the number of commonly expressed grievances that are expected to be seen in relation to any one complex event[170] are limited in number and thus, it is realistically possible to construct a knowledge base that includes pragmatic information for responses in empathy-demanding situations that are common or otherwise considered important. Most embodiments will detect varying levels of badness in this context by consulting templates of commonly encountered keywords and phrases that are divided into categories based on the degree of loss in relation to the grievance. In most embodiments, this will differ across a pre-defined range of socio-economic demographics[240]. For this reason, most embodiments will treat certain components such as empathy[51910] as being demographic-dependent[240], and so will allow the insertion of rules for specific demographics[240].

For example, in a complex event[170] about financial loss due to Covid-19, not being able to afford one's car may have more dramatic consequences for someone with low income than not being able to buy the newest Ferrari for someone who is financially well off. Furthermore, the range of grievances to be encountered will differ between socio-economic classes. Not being able to afford food is unlikely to be a grievance of someone from a higher socio-economic class.

Likewise, for certain classes of generic cases that generally will not be bound to specific events[170], some embodiments may use lists of loaded words and phrases divided into categories based on the degree of loss in relation to the grievance. These will be less specific than the pre-defined high-level pragmatic contexts and be applicable in a wide range of complex events[170]. For example, the grievance "loss of a person" might include "losing a close friend", "death of a loved one", "relationship breakup", or "serious illness of a loved one." Most embodiments will cover a range of commonly encountered grievances and a knowledge base [10270] will be constructed that covers pragmatic information[51915] for responses in these situations.

Intercultural competence[51920]: demonstrating non-trivial knowledge about countries, cultures, and histories. Some embodiments will choose to assign additional weight to first person references, such as having travelled to a certain place, met a certain person of note, etc. For example, someone making a comment on the "yellow vests" in France may know nothing about France, whereas someone discussing the different dialects of Ukraine with some degree of specificity has likely spent a reasonable amount of time acquiring this knowledge, even if they are Ukrainian. Thus, most embodiments will exclude named entities and assertions relating to recent complex events[170] from consideration for this sub-category[51900]. How far back in time to go with this restriction, and the level of saturation required to consider a named entity "related" to an event[170] will be determined according to a corresponding system parameter. Additionally, most embodiments will have a knowledge base[10270] that includes information about common culture references in the given country and region to measure intercultural competence[51920]—for example an association between beer and Germany.

Linguistic competence[51925] Demonstrating a high level of both syntactic and semantic complexity[51781] as well as semantic specificity[51786]. Any existing methods may be used as metrics. Usage of large and complex vocabulary, which by most embodiments is identified based on a high type/token ratio that exceeds a pre-defined threshold. Words from a specialised domain that are rarely used add to the linguistic competence level in most embodiments.

Multi-lingual competence[51930] Demonstrating the ability to speak and understand at least rudiments of multiple languages[50495] at the low end and fluency at the high end. In most embodiments, fluency includes being able to sustain a pre-defined number of turn-takings with one or more users[220] in the language in question, and in most embodiments is further characterized by high syntactic and semantic complexity [51781] and semantic specificity[51786] over a pre-defined threshold in all languages[50495] used. Most embodiments will not assign any score to language [50495] combinations which are common, such as Russian and Ukrainian. Some embodiments will assign a higher level of sophistication[51710] to a user[220] demonstrating competency in languages[50495] in linguistically unrelated language[50495] groups, for example, someone who can manage in Italian and Spanish may be regarded as less sophisticated than someone who is fluent in Italian and Serbian, and someone who demonstrates capability in Russian, Chinese, and Italian, and is proficient in all three alphabets, may be regarded as multi-lingually sophisticated on the higher end of the spectrum. Almost all embodiments will look for markers[51685] suggesting machine translation, and disqualify any instances in which it appears to have been used.

Specific domain knowledge[50505] Demonstrating in-depth knowledge of a specific domain. For example, in the context of Covid-19, someone making a comment about long-term immunity and whether or not it exists will be considered more sophisticated if the vocabulary used and degree of specificity[51785] suggests that they are a doctor or medical researcher—and better yet if a relevant specialist. In most embodiments this will be done with statistical or ML methods which use exemplar corpora of the domains of interest.

In most embodiments, additional weight will be given based on the number of posts[195] coming from the source up to some maximum specified value, so long as these are over a pre-specified level of novelty [45100]. In many embodiments, the reaction of other users[220] who likewise appear to demonstrate competence in the given domain will be factored in as well. Specifically, some embodiments will seek evidence of either positive responses from such users [220], or greater than a pre-set number of conversational turns; if the user[220] in question can carry out conversations with domain experts, he is reasonably likely to be one himself.

Ability to Initiate and Maintain Intelligent and Inquisitive Conversations

Asking questions about posted content[950] to elicit further information and so appearing interested. The number of turn-takings an identity[220] is able to sustain and how many questions are asked of a specific identity[220] will be measured by most embodiments.

Number of Concurrent Conversations Sustained[51935]

The number of conversations an identity[220] is able to sustain at the same time that exceeds more than one instance of turn-taking. Keeping a number of unrelated conversations going concurrently is a skill that is likelier to be associated with more senior trolls [260] as long delays in response, non-specific responses, or mixing up details from one conversation to another are all likely to lead to termination of the thread. Different embodiments may have different definitions of "the same time" but most of the definitions will require multiple instances of posts [195] by the identity[220] in question to the different conversations with a specified interval that is best measured in minutes rather than hours.

Rapid and Well Informed Responses in a Number of Different Situations

Being able to respond to a variety of topics[165] with high specificity[51785] and complexity[51780], both semantically and syntactically. Most embodiments will also include a novelty[45100] test, since it is easy to appear well-informed by copy/pasting. Rapidness of a response matters, since it suggests that the person already had the knowledge in question rather than having to look it up. Rapidity tests will necessarily vary with the particular medium[135], and what types of information are knowable, for example when a user[220] saw a particular message, or whether a user[220] is "present" on a channel[140] at a certain time. In some embodiments, some allowance will be made for the identity[220] being in other conversations at the same time. The higher the number of topics[165] on which the identity[220]

can sustain this behavior, the higher their sophistication level[51710] is considered to be in most embodiments.

Ability to broadly exert influence[51620] Demonstrated ability to move users[220] through the user states [50315] defined on different dimensions[50335] in the influence model[51875].

Quotability/Projecting Authority/General Knowledgeability/Superior Intelligence and Wit Projecting superior intelligence, knowledge and humor by providing high value content[950]. This may be done either with very good curation or by generating original content[950] or a combination. "High value" is defined by most embodiments to mean with high specificity under one or more definitions and/or high semantic complexity[51781]. Many embodiments will also consider the notion of informational value (as described in "Analytical System for Assessing Certain Characteristics of Organizations," U.S. Pat. No. 10,445,668 B2, granted Oct. 15, 2019, herein incorporated by reference in entirety). The number of times content[950] from an identity[220] is referenced or quoted by others is an indication of the value of their content[950], which may be ascribed to wit, intelligence, or simply being articulate. Some embodiments may add tests which measure the demographic breadth of the users[220] who are quoting or otherwise referencing the content[950].

Engaging effectively with the audience[910] Effective storytelling or engagement with the audience[910] is measured by most embodiments by extent to which the identity's[220] posted content[950] elicits some kind of response from users[220]. Some embodiments will not distinguish based on the sentiment[50510] of the reaction; what's deemed more important is that there is one. Different embodiments may measure user[220] engagement differently. These approaches include, but are not limited to: counting the number N-or-greater turn conversations, comparing the distribution curve of N relative to other users[220], counting the number or percentage of users[220] who were likely present on the channel[140] when the relevant posts[195] were made who responded to it.

Lack of monotony/repetitiveness[51945] This differs from novelty[45100] in that some embodiments will treat novelty[45100] as a property of the pair of author [210] and content[950]—in other words, an author [210] may repeat his own novel content[950] and it will still be considered novel as he is the originator of it. More broadly, this feature measures how frequently an identity[220] more or less repeats itself, regardless of the source of the repetitive content[950]. The methods of measuring repetition may differ by embodiment. These will include, but are not limited to: textblocks [10050] or any kind of text distance metric, However they will generally be defined on a per-medium[135] basis.

Active listening skills[51960] Demonstrating actively listening to users[220] by referring to things they have previously said by either summarising their content [950] or asking questions about something they had previously posted[195], for example inquiring about the status of a sick relative.

The following socio-linguistic characteristics may be regarded as additional supporting sub-categories[51900] of sophistication[51710] used by some embodiments, but will not generally be imperative for a user[220] in order to be scored as having some sophistication. For example, a researcher may be highly skilled and knowledgeable when it comes to their subject expertise, and have superior education, but they may not own superior financial assets or be a member of a higher social class.

Using highly educated and/or upper class vocabulary, mainly adhering to a formal register[51845]

Referencing superior upbringing/education/social status

Referencing superior financial assets and/or property and/ or ownership of luxury items In most embodiments, these socio-linguistic features will be measured using lists of pre-defined keywords and markers that are considered important in this context.

Register[51845]

In most embodiments, the register[51845] in the NLG output[550] will be adapted to that of the adversary[265] comment[51615] by echoing its register[51845]. Different embodiments may have different register[51845] sets. However most embodiments will at least make a distinction between formal and informal register[51845] based on certain syntactic and morphological features that are characteristic in a particular language[50495], for example formal and informal ways of addressing persons, such as "du" and "Sie" in German.

Any standard mechanism for detecting register[51845] may be used. Most embodiments will apply existing ML methods to recognize registers[51845] given that sufficient training data is available. Other embodiments will use rule-based approaches to identify the register[51845]. Some embodiments may use a combination of ML methods and heuristic approaches.

In most embodiments the formal register[51845] will have a combination of some of the following features:

uncommon vocabulary words;

formal-tone-specific vocabulary: no slang, idioms, exaggeration (hyperboles), cliches, jargon, colloquialisms, sexist, racist, obscene or derogatory language (including all linguistic means used in pejorative sense);

complete sentences; using a capital letter to start a sentence, using a full stop to finish an affirmative sentence (unless there is an exclamation mark or an ellipsis);

no contractions;

no emoticons;

"loud talking" as defined in U.S. Pat. No. 10,445,668 B2, which includes use of excessive punctuation, all caps, repeating letters, words and phrases, and other non-lexical methods of expressing emphasis;

no romanizing text fragments in languages with non-Roman alphabet.

Most embodiments of the informal register[51845] will have some of the following features in common:

informal-tone-specific vocabulary: slang, idioms, exaggeration (hyperboles), clichés, jargon, colloquialisms, sexist, racist, obscene or derogatory language (including all linguistic means used in a pejorative sense);

fragments, incomplete sentences (elliptical); starting a sentence with a lower-case letter, leaving out a full stop to finish an affirmative sentence (unless there is an exclamation mark or an ellipsis);

prevailing use of simple sentence structures;

contractions;

tone-specific emoticons;

CapsLock to emphasize one's idea;

incorrect spelling and punctuation (extra punctuation, e.g. It is true!! !!! !

romanizing text fragments in languages with non-Roman alphabet (reverse transliteration).

Adapting to the Register

Any dialog script[50475] in any supported language [50495] will be automatically checked against two corpora of vocabulary specific for each register[51845] of the language[50495], i.e. formal and informal. See the example for two registers[51845] in English below, but generally the enablement should be able to apply similar rules in all languages[50495]. ML approaches amount to the same thing.

| Informal | Formal |
| --- | --- |
| a lot of, lots of | many, numerous, a large number of |
| a couple of | several |
| big | large, great, high, major |
| huge (e.g. velocity) | high (e.g. velocity) |
| small, tiny | minute, insignificant |
| hard | difficult, arduous, laborious |
| to tell, to let know | to inform, to notify |
| to talk about | to discuss |
| to start | to commence |
| thanks . . . | I am grateful . . . |
| good | suitable, appropriate, effective, efficient, beneficial, advantageous |
| bad | poor, inappropriate, unsuitable, ineffective, inefficient, unsatisfactory, defective |

In the case of adapting a dialogue script[50475] to the formal register[51845], all words or word combinations of the informal register[51845] in the template[50477] will be substituted with the formal ones, and vice versa in case of adaptation to the informal register[51845]. It can be done on two levels: inflections-independent substitutions and inflections-dependent ones. The former will be implemented with those parts of speech of any language which don't require changing inflections to be used with other parts of speech (like adjectives and adverbs in English). The latter will require a conjugation model to enable the appropriate inflections change.

Some embodiments of the informal register[51845] will contain automatically-added pragmatic markers. Pragmatic markers are detached from the syntactic structure of the clause, and they do not change the propositional meaning of an utterance but are essential for marking the speaker's attitudes to the proposition being expressed as well as for facilitating processes of pragmatic inferences. Besides, the meaning of pragmatic markers acts as types of instructions or "linguistic 'road signs'" 1 to guide the addressee toward the intended interpretation, which will contribute to the effectiveness of the content posted. A corpus of pragmatic markers will be created according to the function they have in an utterance, e.g.:cognitive pragmatic markers used to denote thinking processes (e.g. well, I think), hesitation (e.g. it's like/sort of, well let me see, well let's see now), reformulation (e.g. in other words);

Hansen, M. 1998. The function of Discourse Particles. A Study with Special Reference to Spoken Standard French. (Pragmatics and Beyond New Series 53.) Amsterdam: John Benjamins.

structural pragmatic markers used to open, or close a topic (e.g. ok, well, right, now, look here, just to update you, by the way), to sequence topic shift (e.g. anyway, so, before I forget, on a different note, that reminds me), to continue or to return to the topic (e.g. and so, plus, speaking of Ukraine, back to my original point, returning to my point);

interpersonal pragmatic markers used to mark shared knowledge (e.g. you see, you know), to indicate speaker's attitude and to show emotional response (e.g. ok, yeah, really?) etc.

In some embodiments, to adapt a dialogue script[50475] to the informal register[51845] in general, and to a specific tone[50502] in particular, the NLG engine [60035] will use interjections of surprise (or shock) depending on how radioactive[50200] the targeted content[950] is. The intent is to make it look as if the Ukrbot[100] came across something so surprising (less radioactive content[950]) or so shocking (more radioactive content[950], in any embodiment which supports multiple levels of radioactivity of content[950]), that he cannot keep his emotions under control, and so exclaims "Oh!", "Oh dear!", "Oh no!", "Wow!", or "Hey!", etc. Some embodiments may use emoji either instead of, or in addition to, such interjections. In most of these embodiments, when a Ukrbot[100] encounters some radioactive content[950] for the first time, it will react in this fashion. However, in most embodiments, all subsequent encounters with it will elicit a different reaction such as anger or sadness (depending on the embodiment), much as with a person when hearing something highly inflammatory to them for the first time and then hearing it again in subsequent encounters.

In some embodiments of the informal register[51845] there will be shorthand writing, in which the Ukrbot [100] starts using logograms (e.g. ampersand), logos, symbols, etc. as are associated with a given language [50495] or country. To enable such an adaptation, the NLG engine[60035] will check the formal texts for the words and phrases on the list and will substitute them with the abbreviation mechanisms.

In the case of responding to Loud Talking as described in U.S. Pat. No. 10,445,668 B2, some embodiments of the informal register will respond in kind, for example by including interjections typed in all-caps or interjections used with extra punctuation such as "!! !", "?!!", or "???" to emphasize the emotion of surprise, shock or disbelief, e.g. "Really???", "That's a surprise!!!", "I can't believe it!!!", or "Do you really think so?!!" Extra punctuation may be used to close the dialogue, e.g. "!!!" may be used with the final affirmative statement, and ""?!!" or "???" with the interrogative one. For example, the below is an example comment that includes multiple instances of Loud Talking: "Why ever are you worrying about Ukraine so much? Well, everything is, kind of ok over there!!! Moreover, a huge burden has been thrown off the caring shoulders of the independent in the form of the Crimea and Donbass. The next step is to dump Kharkov and Nikolaev . . . AND LET THEM LIVE FOR THEIR PLEASURE"

Most embodiments will provide free text responses [50478] in all registers[51845] in the register[51845] set being used, e.g. "Hi!"—for the informal register, and "Good evening!"—for the formal register.

Not switching to the correct local keyboard language settings is becoming increasingly common for users of non-Roman alphabet languages, e.g. the sentence "It's not true." may be spelled in two ways in the following languages:

| Language | Language settings switched accordingly. | Language settings NOT switched. Latin alphabet used. |
|---|---|---|
| Ukrainian | Це неправда | Tse nepravda. |
| Russian | Это неправда. | Eto nepravda. |
| Chinese | 这不是真的。 | zhe4 bu1 shi4 zhen1 de4 (where numbers mean tone as pitch variation) |
| Hebrew | אטו נפרבדה | Ze lo emet |

Dialect[50500]

The dialect[50500] will be adapted by the NLG component[60035] to that of the adversary[265] comment [51615] by echoing its dialect[50500] on the levels the dialect[50500] is manifested in each language[50495], e.g. vocabulary, grammar, pronunciation, etc. Since pronunciation is one of the main areas of dialect [50500] variations in many languages[50495], this level of dialect[50500] variation and dialect[50500] adaptation will be used in most embodiments for analyzing and outputting audio content.

All dialog scripts[50475] and free text responses[50478] in any supported language[50495] will be automatically checked against corpora of vocabulary and grammar specific for each dialect[50500] of the language [50495] in question; alternately, an ML, approach will be used. In order to adapt to a specific dialect[50500], any terms or phrases in the current dialect[50500] (or standard version such as Standard High German) will be substituted with the dialect[50500]-specific vocabulary or grammar structures. As with register[51845], in most embodiments it will be done on two levels: inflections-independent substitutions and inflections-dependent ones. The former will be implemented with those specific variations of a given language[50495] which do not require changing inflections/syntax to be used in a coherent speech. The latter will require developing a conjugation model which will enable the appropriate inflections change.

Ukrainian Western dialect, for example, is most explicitly represented on a vocabulary level. The inflections-independent vocabulary adaptations will be possible with adverbs, adverbial participles, cardinal numbers, prepositions, pronouns (except for demonstrative pronouns), particles, and conjunctions, while inflections-dependent adaptations will be required for nouns, demonstrative pronouns, adjectives, verbs. Interjections in this dialect[50500] are inflection-independent.

In some embodiments, in the case of inflections-dependent parts of speech, it will be possible to implement the dialect[50500] adaptation not by means of developing a conjugation model, but by means of changing a corresponding letter in a specific dialect[50500]-signaling word, e.g., in the Volhynian dialect of the Ukrainian language the verb "мандрувати" ("to travel") differs from the standard Ukrainian by one letter (the initial letter), "вандрувати". When such differences between dialect[50500] and standard forms occur without influencing the conjugation of a word (usually at the beginning of a word or in the mid position), it is possible to make the necessary substitutes without using a conjugation model by adding the corresponding pairs of words to the corpus of dialect [50500]-specific vocabulary.

In other embodiments the NLG engine[60035] will add a dialect[50500]-specific morpheme to a standard language[50495] template. For example, in the Hutsul dialect of the Ukrainian language[50495], the comparative forms of some adjectives are formed not in the regular synthetic way (by means of inflections), but both in the synthetical and analytical ways (by means of auxiliary words), e.g. "май ліпший" 2 (Eng. "more better"). Thus, by adding "Ммай" (Eng. "more") to the comparative forms of some adjectives (the corpus of which be developed prior), the NLG engine[60035] will enable this kind of dialect[50500] adaptation.

[2] http://rakhiv-mr.gov.ua/hotsulskvj-hovir/

In the case of audio data, adapting speech to a dialect [50500] will be based (apart from the aforementioned levels) on the pronunciation patterns specific to a given dialect[50500]. In some embodiments, exemplars of pre-recorded speech in any language will be automatically checked against corpuses of vocabulary, grammar, and pronunciation means specific for each dialect of the language. Other embodiments will use ML techniques to identify and authenticate the dialect [50500], presuming that sufficient training data is available. The speech text component being used will convert the dialog script[50475] audio to the appropriate dialect[50500].

Such dialect[50500]-specific pronunciation patterns may include (compared with the standard pronunciation of a language) but are not limited to:

substitution of some sounds;
omission of some sounds;
adding some sounds, for example epenthesis (inserting a vowel to break up a cluster);
vowel reduction or lengthening;
palatalization (softening) or depalatalization of consonants;
voicing or devoicing of some consonants;
affrication or deaffrication of some consonants;
nasalization or denasalization (substitution of a non-nasal consonant with a nasal one and vice versa);
assimilation of sounds different in a standard variant of a language and its dialect;
different number of syllables (syllable reduction, omission, repetition);
different emphasis;
different tones (as pitch variation), e.g. in Chinese, etc.

A preferred embodiment also includes an assessment of perspective[51825], as described in U.S. Pat. No. 10,445,668 B2 which combines the assertion of any of a set of specified complex relationships between concepts (e.g. causality rather than is-a) with knowledge templates that specify very specific types of relationships that someone should demonstrate an understanding of to be considered to be at a certain level of sophistication[51710] w.r.t. a particular domain.

Sophistication[51710] in many embodiments will also include non-textual features for image, video and audio applications. These can be applied to content[950] involving either real people or avatars[525]. Most embodiments assume the following visual and auditory traits, which in most embodiments will be achieved by assessing against training data of real people with different levels of sophistication[51710]:

Sophistication in appearance: for example, well-groomed and neat look, high-fashion oriented: wearing clothing of superior look and feel, with upscale accessories.
Mastery of body language: for example, open and upright posture that expresses confidence, consistent eye contact with the camera, Good vocal techniques: Some of the defining characteristics include, but are not limited to speech being well paced and articulated, sounding calm but not monotonous, varying speed and sometimes inserting pauses, presumably so as to emphasize important points and keep the audience interested.

Note that any of these may be culture-specific, so most embodiments will allow for separate rules to be defined per region.

Appropriateness[51885]: A key aspect of sophistication [51710], as well as bot-or-not assessment is the degree of appropriateness[51885] of an identity's[220] response to a post[195], in those situations in which the identity[220] has chosen to respond to an existing comment[51615]. Note that in most embodiments, the degree of interactivity or how often an identity[220] interacts with other users[220] is separately considered an indicator of an account[270] being that of a bot if it is low.

The unfortunate reality is that it is very difficult for most people to say exactly the right thing, much less to automate a bot doing so across a broad range of contexts. Thus in most embodiments, appropriateness[51885] is really best understood as measuring a lack of inappropriateness.

Most embodiments will consider appropriateness[51885] to be comprised of the following elements: topic[165], tone[50502], register[51845], style[51645], dialect[50500] and pragmatic appropriateness[51885]. The register[51845], dialect[50500], and style[51645] of a response should match that of the original comment[51615] as detected by the NLU component[10100]; the language[50495] as well, though it can generally be presumed to do so. As noted in the section on tone[50502], most embodiments will use a mapping table to determine the tone[50502] of a response based on the tone[50502] of the original comment[51615]. While few embodiments will require the exact same topic[165], most embodiments will require a topic[165] that is related to at least one of the original topics[165]. That relationship may be an ontological one expressed in a semantic net, topic[165] tree or similar, or it may be empirically determined based on the co-occurrence of the topic[165] with other topics[165]. This flexibility reflects the fact that topic[165] boundaries are often not bright lines and that some topic[165] definitions may be exceedingly narrow.

Pragmatic appropriateness[51885] relates to what one is expected to say in certain conversational contexts—a "you're welcome" in response to a "thank you." (Note that there are often many equally good pragmatically appropriate responses, not just one.) Such pragmatic expectations or limitations do not exist in all situations, and may well not be defined in the system[10000] for all situations in which they do exist. However, they are likely to be defined in most embodiments for scenarios of particular interest to the adversary[265]. For example, if a user[220] expresses anger about how their government handled some aspect of the covid crisis, an adversary wishing to fan resentment against the government might ask whether anyone close to them had died of the virus—and if so, whether they think that the death had been caused by failures in government policy. Likewise, if a user[220] mentions that a loved one died during the period of the pandemic, it would be pragmatically appropriate to express sympathy and then ask what the person died of. In essence, the tree of pragmatically appropriate responses within contexts of interest are like the dialog scripts[50475] used by the Ukrbots[100], but in this case are being used to model the behaviour of the adversary [265].

Figure 28:
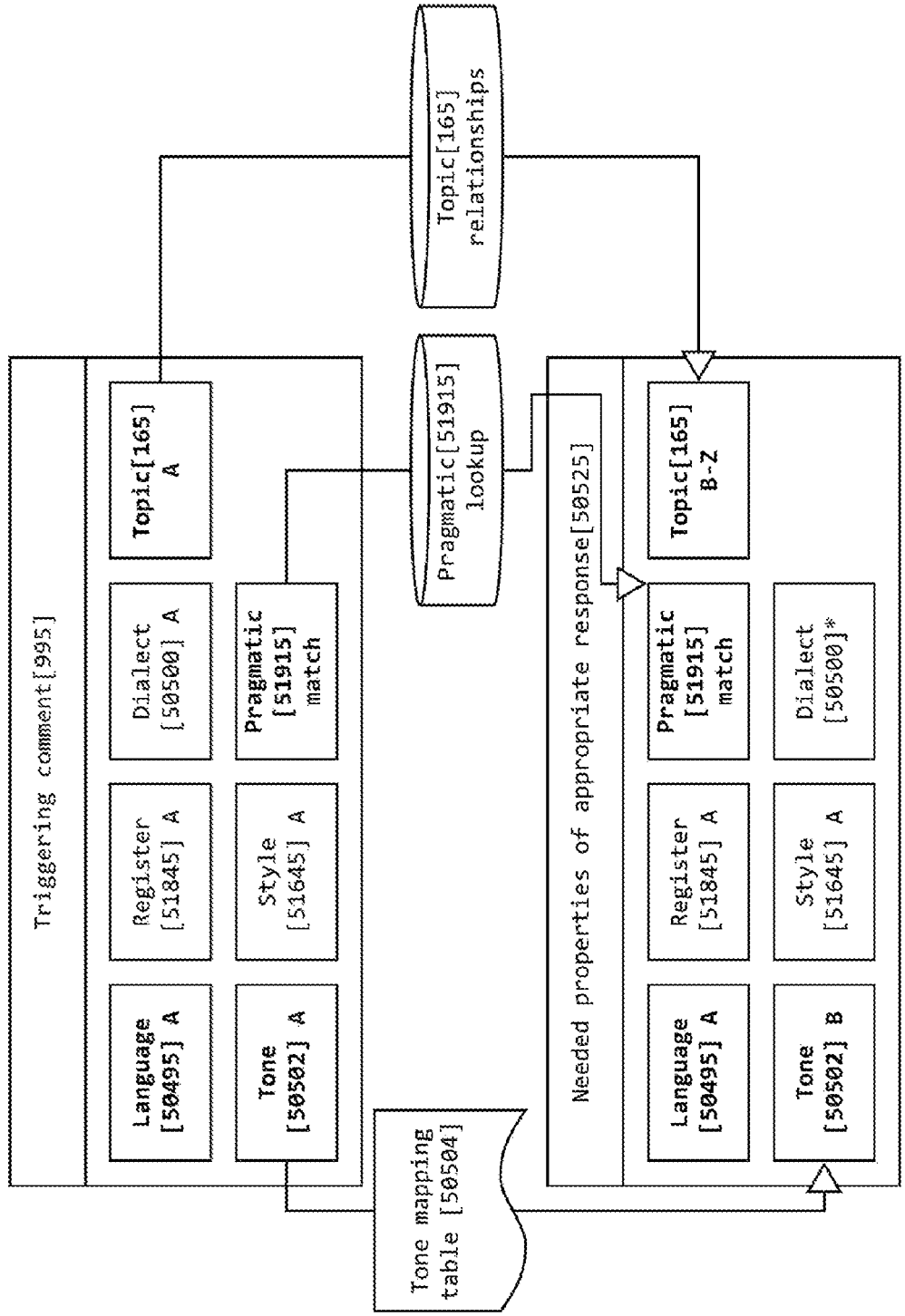
FIG. 28 is a block diagram of requirements used to determine appropriateness in a default Ukrbot embodiment's response to an adversary.

In order to consider a response as "appropriate," a default embodiment as pictured in FIG. 28 will minimally require the tone[50502] used to be consistent with what is expressed in the tone[50502] mapping table, a topic[165] that is ontologically related to one or more of the original topics [165]—different embodiments may choose to specify limitations on what relationships count—and the content[950] to be within what is specified in the pragmatic appropriateness tree (if it is specified.) The additional vectors of style [51965], dialect[50500], and register[51845] are considered pluses that if matched can cause the response to be considered "highly appropriate" in some embodiments. Most embodiments will use a coarse-grained scale given the modest fidelity of the method. Note that while the number of conversational turns of discourse in which an identity[220] participates can be used as an indirect proxy for appropriateness[51885]—few people will stick around for multiple turns if the responses from the other user[220] are inappropriate—it is not exclusively a proxy for it since as noted in the section on sophistication[51710], other aspects also contribute to conversation length. Indeed, sometimes what makes text memorable or funny is its wild inappropriateness.

(Writing) Style: Some embodiments will support the construct of style[51965] as another element for the NLU component[10100] to catch and the NLG component [60035] to match in generated responses. The motivation for this is that certain sub-populations may have writing styles [51965] that are associated with them, and/or to which they respond especially well. Individual styles[51965] are comprised of one or more stylistic elements. Examples of stylistic elements include, but are not limited to: posing questions and then answering them (e.g. "What did I do then? Well, I'll tell you what I did"), having short refrains follow many longer sentences (for example, "Yeah—right,") repetition of words (e.g. No. No. No.), and very short paragraphs or sentences. As style[51965] tends to be linked to culture, each embodiment will define its own set of styles[51965], or opt to do without. However, most embodiments will choose to support style[51965].

Embodiments that support style[51965] will have computational definitions of different stylistic elements[51950] so that they may be identified in incoming content[950]. Most stylistic elements[51950] can easily be echoed by the NLG component[60035] such as refrains and repetitions.

Specificity[51785]: While different embodiments may implement the notion of specificity[51785] differently, a default embodiment requires frames and slots in the standard IR sense to be identified for any topic[165] of importance. The level of specificity[51785] of a given piece of content [950] is determined by how many of the available slots have any content[950] associated with them and to what extent each slot is full. For example, the concept of a car might have slots for model, year, engine type, type of car, and color. Some of these slots have greater opportunity for different levels of specificity than others, and would be coded accordingly. A color name is not likely to be modified by more than a single adjective, and a year, none (though a decade or other range would be less specific than a single year.) However, there are many things that can be said about something like engine type, which indeed may have its own frame.

Informational Value[51970]: As described in U.S. Pat. No. 10,445,668 B2, this is the notion that a piece of content[950] has greater informational value[51970] both to the extent that it is specific[51785] and that it provides new or contrary information. For example, one fully expects employees to opine that they should have a higher salary. By contrast, any instance in which an employee writes that she should have a lower salary is quite unexpected and therefore more interesting and valuable.

Novelty[45100]: In most embodiments, the degree of novelty[45100] can be best understood as a measurement of the amount of probable human effort (if any)—and hence cost—required to generate a given piece of content[950] from one or more previously existing pieces of content[950]. It is not a measure of novelty in an intellectual or conceptual sense but rather in a literal one. It is not intended to be precise, but rather to provide a means of coarse categorization of how much human effort likely went into the creation of the particular content[950].

Most embodiments will assume that users[220], whether bot or human, have access to NLG capacity that can perform numerous transformations[51955] on content[950] that leave its original meaning largely intact. For this reason, most embodiments will not consider the number of transformations applied to get from Article A[11080] to Article B[11080] in determining novelty level[45100]. Examples of such transformations[51955] include, but are certainly not limited to:

Swapping synonyms or near synonyms
  Inverting or otherwise modifying the order of any lists (e.g. "Chicago and Detroit"/"Detroit and Chicago")
  Adding or deleting items from a list
  Modifying the order in which statements appear
  Adding or deleting statements It should be noted that a lack of novelty[45100] by itself does not imply anything sinister. In fact, in many cases, when talking about a particular much discussed but fairly simple event, it may be quite difficult to come up with a novel comment. But this is exactly the point: we are trying to measure relative human effort. Nor, for the same reason, does the existence of one or more transformations[51955] which allow Article A[11080] to be entirely generate-able from existing articles[11080] necessarily mean that Article A[11080] was in fact generated (or manually copied with deliberate variation) from one or more of them. Indeed, it may often just signal a minimum effort bit of human created or altered content[950], which may differ little from similar automatically generated content[950] in quality. Even the delta in cost between the two may be bounded, if still significant, given that the cost of less than say 5 minutes of the time of a junior troll will generally be small.

Figure 30:
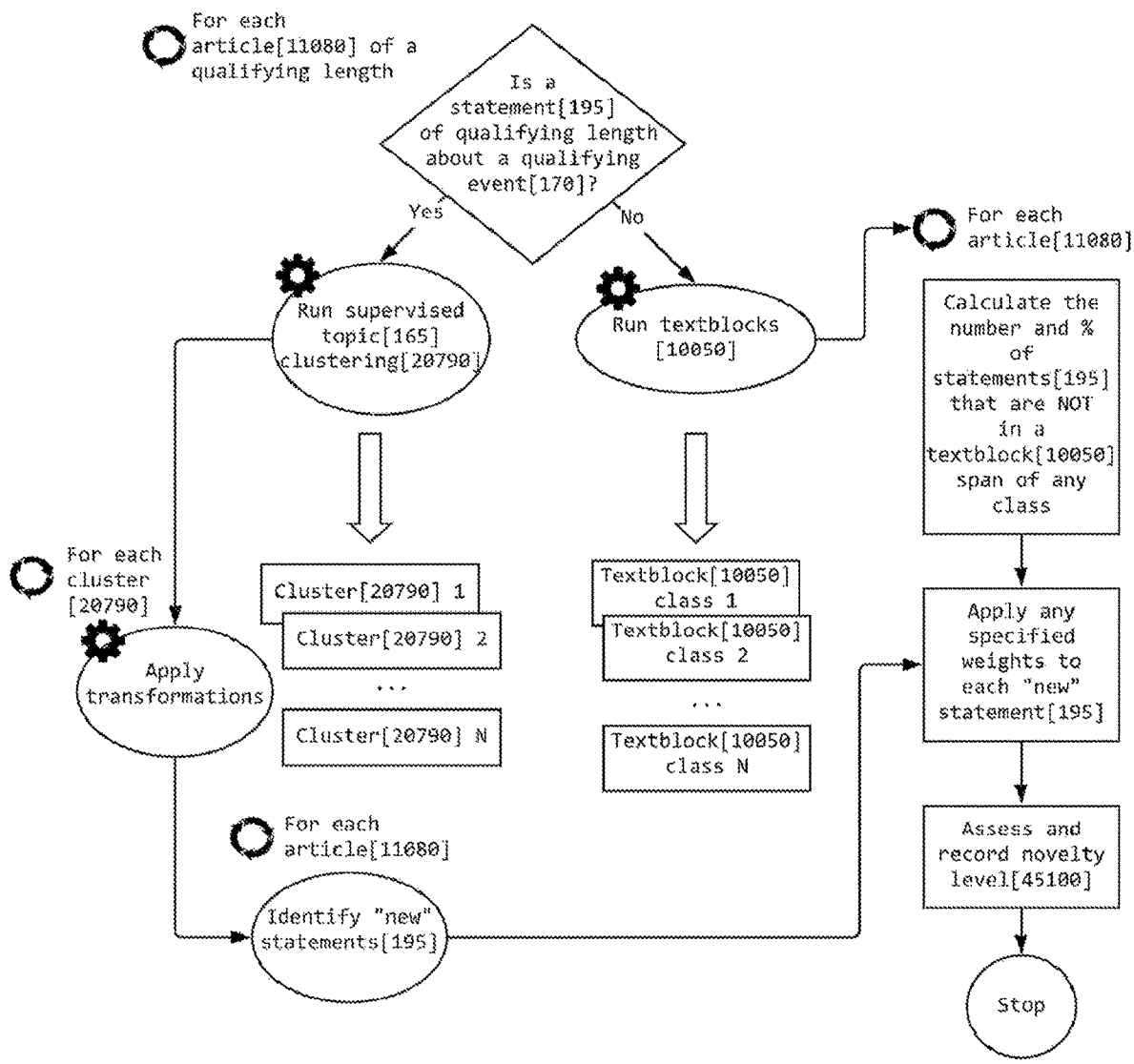
FIG. 30 is a block diagram illustrating the process of novelty detection in one embodiment of the NLU engine.

If an article[11080] is initially deemed to relate to an event[170], either because of the combination of named entities in it, and/or the similarity of its text to articles [11080] already labelled as relating to the event[170], and/or its logical equivalence to an assertion[11070] about the event[170]—or through any other means supported by the particular embodiment, it will be handled in a different way in most embodiments than if it is not. However, some embodiments will prefer to treat all articles[11080] as is indicated in the "non-event[170]-related case below. A high-level example of the logic for assessing novelty[45100] is depicted in FIG. 30.

Most embodiments will remove any quoted text from any analysis of novelty[45100], as it is by definition presumably not original content. However, some embodiments will also attempt to match the quoted content in the hope of confirming that it is a real quote. If the quote or something similar to it cannot be found, these embodiments will include the quoted content in the analysis of novelty[45100].

Assessment of Novelty[45100] for Statements Relating to Events[170]

In most embodiments, the assessment of novelty[45100] begins with topic clustering or any method suitable for grouping closely related content[950] together that allows the application of heuristics and which supports a max cluster size input. This enables rapid comparisons of the statement being examined with existing data within what can be regarded as the same equivalence class[51975].

Transformations[51955]

As noted above, synonyms or near-synonyms including different ways to refer to the same named entity, are very easily swapped for one another by either human or machine. Likewise, as noted in the section below on semantic specificity[51786], a word that is either lower or higher in the same knowledge hierarchy may be swapped for one another without losing much meaning (e.g. Nuremberg, Bavaria, Germany, EU, and Europe could all be used to refer to an event that occurred in Nuremberg.) Also as noted elsewhere in the NLG component[60035] section, transformations relating to dialect[50500], register[51845], and style[51965] are generally quite automatable. This is also the case for other elements, including but not limited to: transliteration, and names for different physical locations in different languages[50495].

For purposes of novelty[45100] assessment, differences in any numeric data won't be scored since one number is very easily changeable for another—and in the case of some types of events[170] may anyway change very rapidly. (In most embodiments, the rate of expected change of numerical and other specified fact[11050] slots will be specified at the event group[11025] level via the definition of a fact template [20735] that specifies the expected degree of change in the particular variable.) By the same reasoning, a change in polarity won't change the novelty[45100] in most embodiments (although in practice this transformation may not occur all that frequently for practical reasons). Further, in many embodiments, the substitution of named entities that only occur in a X percentage of articles[11070] about the event[170] will be allowed, where X is intended to be very small but the setting of the value is left to embodiment. In a default embodiment X=1. This is to handle cases such as changing the name or location of a patient talking about their experience with covid—in other words, selected instances of stories relating to the event[170] in question, but not a matter of individuals who impact events who will be seen in articles[11070] about the event[170] again and again. Thus such details can easily be changed without changing meaning. Many embodiments will have a range of such rules that will be applied based on their specific needs.

Most embodiments will avail themselves of any types of currently known NLG transformation[51955] that bounds lossiness to a level that is considered acceptable by that embodiment. However, most embodiments will not require Article A[11070] to be obtainable from a set of transformations on a single existing Article B[11070]; all that will be required by most embodiments is that Article A[11070] be obtainable from a set of existing articles[11070] in order for Article A[11070] to be considered as probably "refurbished" content. Nonetheless, some embodiments may decide to consider the number of different articles[11070] from which content[950] was taken in assigning a novelty[45100] level just in case manual effort was involved, and will select a novelty level[45100] to be assigned on the basis of the smallest number of existing articles[11070] from which Article A[11070] can be reconstructed. However, most of these embodiments will first test for the presence of any type of regularity or other evidence that the content[950] in question was automatically generated. This may be done by heuristics based on knowledge of known system limitations at the current time, but ML and other approaches may also be used. If such evidence is present, no novelty points will be assessed for the combining of N articles as there can be presumed to be no incremental human effort in it (apart from that of the programmers.)

Expressed in a more mathematical manner, a set of pre-determined transformations[51955] will be performed on Article A[11070], at both a statement-by-statement and atomic level in order to try to obtain a set of other articles [11070 in the same event[170]-related equivalence class [51975] (e.g. cluster or the equivalent) that contains the smallest possible number of articles[11070] that allows a total covering of Article A[11070] (e.g. that all statements contained in Article A[11070] have been successfully mapped to statements in one or more other articles[11070].) Some embodiments may impose requirements on the set of these transformations[51955] such as orthogonality.

Note that the order in which transformations[51955] are applied may matter, though most often a non-optimal order will result in inefficiency rather than an incorrect result given the limitations that will generally be placed by different embodiments on the types of transformations[51955] that it will allow. Some embodiments will use algorithms similar to those used in concurrent multiple person editing of documents, since once articles[11070] have been sorted into highly self-similar groups that approximate different versions of the same logical document, the two problems are quite similar to one another.

Most embodiments will assess novelty level[45100] according to the number of "new" statements in the content [950], where "new" is considered to be a statement which was not obtainable by transformations[51955] on existing statements. Some embodiments may prefer to use percentages. However, almost all embodiments will award a greater weight in assessing novelty[45100] for new statements that are either/both highly specific[51785] and/or highly complex[51780] using one or more of their favoured definitions. However other embodiments may decide to weight according to different criteria.

Most embodiments will impose a floor on the number of tokens for a qualifying statement; statement boundaries will generally be set by punctuation, and it would not be desirable for very short sentences or phrases to be considered "new." Likewise, almost all embodiments will impose a minimum token count on the entire article[11070]. Some embodiments may stipulate a maximum number of transformations that can be applied.

Many embodiments may either choose to not assess novelty level[45100] when the mention curve[11040] for the event[170] in question has a slope greater than X, or alternatively, to recalculate novelty level[45100] with a trailing window[50090], as specified in system configuration rules. Events[170] that pass any such tests imposed by the given embodiment are considered to be "qualifying" events [170]. This is to avoid falsely giving credit for novelty [45100] to what the first observed instance of content[950] in a cluster that follows seconds or minutes later. (In most embodiments, repeatedly being the apparent originator of tainted text[185] is separately handled as a targeting reason [50445].)

Assessment of Novelty[45100] for Statements not Relating to Events[170]

In this case, lacking a bounded comparator set on which a computationally tractable number of transformations may be applied, most embodiments will fall back to their preferred textual edit distance mechanism. A preferred embodiment uses textblocks[10050]. Textblocks[10050] or similar mechanisms are a reasonable strategy to employ because most of the content[950] being analysed in the non-event [170]-related bucket generally will have little reason to have a significant overlap of instances of the same textblock classes, as described in U.S. Pat. No. 10,445,668 B2.

Some embodiments may perform only aggregate analysis of pieces of content[950] in this case, rather than a statement-by-statement one. Some embodiments may still opt to perform certain transformations such as synonym swapping in this case. Novelty level[45100] will be determined by most embodiments according to the percentage of tokens that are not in a text span that has been identified elsewhere. Other embodiments may prefer to instead use the number of statements, given that all of the statements being processed are already guaranteed to contain at least a minimum number of tokens. Because of the limited ability in this case of identifying any transformations that may have been applied to the text, most embodiments will require a fairly high threshold. In a default embodiment, this will be 80%.

In either of these cases, in order to avoid overshooting the fidelity of the measure, most embodiments will prefer to use coarse-grained scores for novelty[45100]. Further, many embodiments will associate the construct of novelty[45100] not only with individual pieces of content[950] but also with individual authors[210] and various aggregate groups. For example, a troll[260] whose content[950] is generally determined to have a high novelty level[45100] is more sophisticated[51710] than an otherwise comparable one with a lower overall novelty level[45100].

Conceptually analogous approaches to assessing novelty level[45100] will be taken to non-textual content[950] as well by most embodiments; for example, images[555] can also be compared to other images[555] based on their similarity, and can have transformations of different kinds applied to them.

Semantic specificity[51786] in most embodiments is largely tied to a hierarchy of hypernyms and hyponyms. For common terminology, most embodiments will use an open source semantic WordNet to establish the level of semantic specificity[51786] based on the position a term occupies in the topology. Terms are more specific as they traverse further down the hierarchy. Most embodiments will assign a semantic specificity score[51980] depending on the level a term occupies in the hierarchy. For more domain-specific terminology, some embodiments will derive the semantic hierarchy from heuristics. Some embodiments will use existing automated methods to deduce the semantic relationships of terms from the data. These include, but are certainly not limited to: sentence-level surface features, lexical features, word identity, word embeddings and Brown clusters into account for computing semantic specificity. Many embodiments will use a combination of heuristics and statistical or ML approaches.

Most embodiments will use existing Information Retrieval approaches to infer the topology of named entities. Because there may be a certain amount of ambiguity and varying interpretation around what constitutes a synonym or hypernym, some embodiments will specify their own rules for determining what types of references to named entities should be considered as more specific vs less. For example, in most embodiments "Mr Smith" will be considered less specific than "Mr John Smith"; "Mr John Q Smith" more specific still. By contrast, in almost all embodiments, referring to people with proper nouns will be regarded as more specific than referring to someone by their affiliations or roles.

While posts[195] on most media[135] are typically short and not as rich in content, the co-reference model may be trained on a large corpus of related text sources in most embodiments. The named entities may then be extracted and clustered according to, but not limited to, their part-of-speech tags (e.g. proper nouns being more specific than place names), whether or not they are a compound, semantic typology level of terms that are included in the semantic network etc. In some embodiments, sources such as Wikipedia may be automatically mined for articles about famous people to deduce "is part of" relationships. This will be straightforward to do since most articles follow a specific pattern, with the person introduced at the beginning: X is/was a [nationality] [occupation], a member of [organization/party], etc. It will very likely be the case that many more people will have a specified nationality or occupation than specified memberships in a certain political party or organization. Most embodiments will thus deduce semantic specificity from the level of frequency of such mentions.

An additional source for determining the level of "is part of" relationships are open source ontologies, which some embodiments may use to gather additional evidence. For example, it is straightforward to extract information such as a list of members affiliated with party X, or a list of people with nationality Y. As is the case with mining Wikipedia or similar articles, most embodiments will assume a correlation between inverse frequency and specificity of the mined items.

Most embodiments will take technical terminology, for example scientific jargon, into account as an additional measure for semantic specificity[51786]. These will be extracted by most embodiments using standard ML and IR methods.

Semantic complexity[51781] The exact definitions of this element may vary by embodiment, but in general it relates to the number and inter-relations of semantic entities present in the content[950]. Most embodiments will look at a variety of features to determine semantic complexity[51781].

Some embodiments may consider lexical diversity as a type of evidence for semantic complexity [51781] by computing the type/token ratio of a post[195] (vocabulary size/text length). The closer the type/token ratio is to 1, the greater the lexical diversity of the post[195]. A more diverse vocabulary may entail a higher semantic complexity [51781].

Some embodiments may also measure the diversity of identified topics[165]. The more topics[165] that are mentioned in a post[195], and the greater the complexity of these topics[165], the higher is the semantic complexity[51781] of a post[195], regardless of their specificity[51785]. However, most embodiments will implement some kind of specificity threshold for very frequently occurring and/or manually defined topics[165] so as to eliminate generic expressions of sentiment[50510] (e.g. "TopicX is a national disgrace.").

Many embodiments will include perspective[51825], as described in U.S. Pat. No. 10,445,668 B2, in this measure if it is not already included in the computational definition of sophistication[51710], or if it is being used in a context that is outside of sophistication[51710].

Most embodiments will use a combination of semantic web approaches, semantic entropy measures and semantic graph networks in order to establish the relationships among the named entities, topics[165], events[170] and other elements contained in a post[195] or article[11080]. Most embodiments will take a span of posts[195] into account to properly assess complexity—the wider the span of a semantic network, and the more history is required to decode a certain message in a single post[195] (for example, if a substantial number of co-references are present that refer back to an entity, topic[165], event[170] or idea that is/are not part of the current post[195]), the more semantically complex[51781] will this span of posts[195] be regarded as by most embodiments. This span may be determined in different ways by different embodiments. They include but are not limited to: the thread, the discussion as described in U.S. Pat. No. 8,887,286, a span of time that begins with the first appearance of a topic[165] or event[170], and all posts[195] made by that author[210] on a given medium [135] or channel[140]. The presence of idiomatic expressions and metaphors is another feature that may be considered as evidence of semantic complexity[51781] by some embodiments. Metaphors and idiomatic expressions may take the average reader longer to decode, or they may only be recognizable to a particular target audience[820], thus they can arguably be regarded as semantically more complex. Most embodiments will use existing metaphor recognition methods34. In some embodiments these may be supplemented with heuristics, with the option to add new metaphors to the knowledge base[10270] manually when encountered.

[3] Bracewell, D., Tomlinson, M. & Mohler, M. (2013). Determining the conceptual space of metaphoric expressions. In Computational Linguistics and Intelligent Text Processing (pp. 487-500), Springer.
[4] Michael Mohler, Bryan Rink, David Bracewell, and Marc Tomlinson. 2014. A Novel Distributional Approach to Multilingual Conceptual Metaphor Recognition. In Proceedings of COLING 2014, the Syntactic complexity[51782] is predominantly characterized by most embodiments by the length of sentence units, frequency of coordination and subordination and use of complex nominal groups. Most embodiments will use existing methods and tools in order to assess syntactic complexity[51782] of a post[195], a common tool for English at this time is the L2 Syntactic Complexity Analyzer (L2SCA) developed by Professor Xiaofei Lu at The Pennsylvania State University5. For languages that have a similar structure to English, most embodiments will apply a similar methodology. For languages that are syntactically different from English, in most embodiments a set of syntactic elements that are characteristic of complex structures will be identified and used as features.

25th International Conference on Computational Linguistics: Technical Papers, number 2, pages 1752-1763.
[5] Lu, Xiaofei (2010). Automatic analysis of syntactic complexity in second language writing. *International Journal of Corpus Linguistics*, 15(4):474-496.

Assessing Costs of Content Production

For assessing the probable cost[50005] to the adversary [265] of producing a particular piece of content[950], sophistication[51710] will be combined with novelty [20775] in almost all embodiments. Specifically, sophistication level[51710] will be used as a proxy for the goodness of the content[950], and novelty level[45100] for the amount of probable work performed. In most embodiments, this becomes a simple calculation of the general form:

$$B \times Rt + N \times A \times Rt = C$$

Where B is the assessed baseline amount of time in seconds for a troll[260] to post content[950] on a given medium[135], Rt is the estimated pay per hour for the particular pay grade of troll[260]—the method of assessment of this will be discussed below—N is the novelty level[45100], and A is the number of "new" statements found in the content[950]. Sophistication[51710] and its various subcomponents are indirectly represented as in most embodiments it is a significant weight of determining Rt. However, other embodiments may choose to perform different calculations.

Note that Rt is a function of the specific piece of content [950] rather than of the identity[220] that actually posted the content[950]. This is because the content[950] still costs the same $X to produce regardless of which identity[220] appears to have posted it first. For example, scientific content written by a domain expert will often be posted by adversary identities[270] without understanding its meaning. Thus for any situation in which it may be desirable to have an Rt that is associated with a particular adversary identity[270], most embodiments will consider a broad range of posts[195] made by the identity[220].

Some embodiments will weight high specificity[51785] responses in any such determination, as responding to a specific post[195] is more difficult than blindly blasting out content[950]; if a given identity[220] is highly interactive with other users[220] involving any particular type of content[950], such as content[950] with significant amounts of scientific jargon, it is likely that that identity[220] in fact possess the type of knowledge in question. Since scientific and technical jargon is an important special case, many embodiments will do dictionary lookups for terms that appear in multiple posts[195] from multiple users[220] in a given channel[140] but which do not appear in a standard dictionary (which most very technical terms will not.) When more than a threshold number of such terms appears in any given post[195], or if relevant, conversational thread, most embodiments will label the content as "domain-specific."

If there is a pay rate in the system that is associated with similar content—that is, content that contains a similar distribution of terms—in most embodiments, that is the rate that will be used for Rt. Many embodiments will allow analysts[250] to add cost premiums for language[50495] or other specific skills that are scarce but important in the given theatre of operation.

In addition to the quality and capabilities of individual trolls[260], there is the matter of estimating how many trolls[260] are being used by the adversary[265]. Specifically:

1. How many trolls[260] are controlling the same account [270]?
2. How many trolls[260] are kept on standby for sock puppet [50538] duty?
3. How many trolls[260] are creating content[950]?
4. How many accounts[270] are (usually) controlled by bots vs trolls[260]?

It should be noted that the bot vs. troll distinction is as a practical matter far from being black or white—what's far more important is the foe identification. Human trolls are likely to have access to increasingly powerful tools to generate and transform content[950], as well as to easily post content[950] on many channels[140] and at different time intervals. And of course bot accounts can be taken over temporarily by human trolls when needed, the so-called "sock puppet" scenario.

In order to perform these assessments, many embodiments will follow logic similar to that indicated in FIGS. 31a, 31b, 31c, 31d, and 31e. In most embodiments existing ML-based methods including, but not limited to, lexical fingerprinting[20780] and/or authorship identification will be applied to each piece of content[950] that contains more than N tokens, where N is set by a configuration variable, on all contested channels[140]. If this analysis is retrospective in nature, most embodiments will set a maximum lookback period. Such techniques to identify unique authors may include, but are not limited to, choice of lexicon, syntax, register[51845], style[51965], and punctuation. Some embodiments may use a bag-of-words approach using a query system[40300] such as CQE, as described in U.S. Pat. No. 10,445,668 B2, to identify typical dialectal terms that may occur in the context of certain topics[165], as well as variations in register[51845], or any of the other linguistic features noted in this document, as additional support to the ML methods described above.

In many embodiments, each lexical fingerprint[20780] is represented by a set of features derived by PCA, k-means clustering or some other similar type of method that will be continuously applied to incoming content[950]. It is assumed in most embodiments that a cluster[20790] represents a distinct human troll. New content[950] will be classified on the basis of these clusters[20790] using these distance measures as it appears, with mechanisms in place to force the creation of new clusters[20790] when a specified threshold distance level is exceeded for N pieces of content [950]. This may be a human troll with its own identity[220] that is uniquely used by that person—that is, a 1:1 mapping—or it may be the case that there is an M:N mapping between human trolls and online identities[220]. Since such clandestine account[220] sharing is obviously of interest to the system[10000], nearly all embodiments will seek out evidence of it.

In most embodiments, the cluster[20790] will by default be assigned to the identity[220] that posted the content[950] unless the content[950] in question is non-novel (e.g. has been assigned a very low novelty level[45100].) Almost all embodiments will continuously reassess the novelty level [45100] of content[950], essentially performing a look-back, so as to verify that in fact there is a 1:1 relationship between fingerprint[20780] and identity[220]—if there is—and that there are not for example several identities[220] or more who post highly similar content[950] that would all map to the same cluster[20790]. Most embodiments will provide a threshold for the percentage of content[950] that must be exceeded in order for (only) a single troll[270]—or conceivably, bot—to be assigned to an account[270]. Different embodiments may have somewhat different calculations with respect to percentage of content[950], for example determining percentage based solely on the number of distinct pieces of content[950] versus the number of statements that they contain.

In the event that there are two or more distinct fingerprints [20780] that show up significantly (that is, >Y %, where Y is specified in a configuration parameter) in the same account[270], most embodiments will label the account [270] as a probable shared account[1000]. In both this case and the 1:1 case, most embodiments will calculate at least the following properties for each fingerprint[20780]/troll [260]: sophistication[51710], novelty[45100], apparent educational level[20785], and apparent demographics[240]. These derived attribute values will be added to the record for each identity[270].

If this too is not the case, most embodiments will label the account[270] as a probable bot[255]. Most embodiments will perform slightly different checks in this case. These may include, but are not limited to: novelty[45100], sophistication[51710] and whatever preferred bot heuristics detection mechanisms, most often non-lexical ones. Most embodiments will specify thresholds for novelty[45100], sophistication[51710], and/or some or all of its subcomponents individually below which an adversary identity[270] will be presumed to be a bot[255], rather than being in the control of one or more human trolls[260]. Similarly, many embodiments will also set a level above which an account[270] is highly unlikely to be largely controlled by a bot. If this level is exceeded, most embodiments will label the account[270] as unknown in type. In some embodiments, this will generate an exception or human operator alert[11170]. In others, it will be used to help analyse system performance. Still other embodiments may prefer to implement conditional logic based on specific aspects of the accounts[270] in question.

Many embodiments will also apply their preferred set of bot detection heuristics. These may include, but are certainly not limited to: considering unusual precision in either temporal characteristics or the order of operations in which content[950] is based along or coordinated, (although human-level inconsistencies in such things could of course also be programmed into bot management systems) and many medium[135]-specific metrics. For example, on Twitter, this might include measuring things such as tweeting characteristics (e.g. time intervals between tweets, frequency, proportion of hashtags) and other meta-data (e.g. follower-to-friend ratio, usage of a default or no profile photo etc.)6.

[6] Stukal [et al.] (2019). The Use of Twitter Bots in Russian Political Communication. PONARS Eurasia Policy Memo No. 564.

Although some embodiments may go through the process to this point for all identities[270], at this point in the process, any account[270] for which there is no evidence of adversary[265] involvement will be dropped from further processing. This is both because it is unlikely to be necessary, and so as to avoid false positives on innocent shared accounts[1000]. If the account[270] has been labelled as a dedicated/single inhabitant account[270], most embodiments will perform consistency checks which are described in the next section. The intent of these checks is to capture instances in which either a bot[255] or troll[260] fails to consistently manifest the same demographic[240] attributes. In many embodiments, if the error score with respect to consistency is below a specified threshold, which in general will be very low (e.g. in a default embodiment, 1 such presumed error per month) will move to the last step of processing for that account[270], which is the assessment of each of the trolls[260] in questions pay grade. Most embodiments will allow for more than a literally zero rate since false positives will occur (e.g. a typo causes a word from a different dialect[50500] to randomly appear.)

For those accounts[270] for which the rate of error in consistency exceeds the specified threshold, a final test will be performed by many embodiments. Thus far, the tests have involved trying to determine how many different trolls[260] and maybe bots[255] (plural, in the event that there are different types of bots) share control of the same account [1000]. However, the case in which individual human trolls [260] spend their time among different accounts[270] also must be dealt with.

This will be handled by most embodiments by comparing the set of accounts[1000] that have an over-the-threshold consistency error rate to the set of accounts[1000] that have been associated with clusters[20790] that in turn are associated with multiple other accounts[1000]. Note that some embodiments may prefer to do this for all shared accounts [1000] that are still in the process. Except in the improbable case in which the number of shared accounts[1000] is negligible in a given theatre of operations, most embodiments will impose a fairly low upper limit on this however, so as to deal with error cases involving runaway clusters [20790]. Some embodiments may opt to specify a percentage threshold per range of shared accounts[1000]. If the accounts[1000] in question have not already been associated with distinct troll identities[260], this will be done now.

In cases in which the same account[1000] is matched in both sets, in most embodiments the targeting engine[10000] will increase the targeting certainty[51500] of the account [1000]. Lastly, the probable pay grades of each of the trolls[260] in question will be estimated and stored. This information will be used by the metric recorder[990] to estimate the total costs that are being incurred by the adversary[265] by the Ukrbot system[105].

If the account[270] has been labelled as a probable shared account[1000], shift[19600] detection will be performed by most embodiments, unless the current shift[19600] schedule is already known. Note that most embodiments will periodically perform shift[19600] detection, since troll[260] work shift[19600] schedules could change over time. If evidence of consistent shifts[19600] is detected, the fingerprinting[20780] and clustering processes will be reapplied per shift[19600]. If the fingerprint[20780] changes match up with different work shifts[19600], this will be considered as further evidence that the account[270] is a shared-by-shift [19600] one and consistency checks will applied to all of the corresponding identities[270].

Failing this, most embodiments will check whether the fingerprint[20780] changeovers correspond instead to situations in which the identity[270] became more interactive for some reason. This is because interactivity requires achieving at least a minimum amount of appropriateness [51885] and perhaps also sophistication[51710], both of which are difficult for bots[255]. And also because in such situations, the adversary[265] stands to lose if their bot[255] fumbles.

This case corresponds to the sock puppet [50538] case, which is a special case of the shared account[1000] case. The presumption will generally be that there is a set of conditions under which the account[1000] will switch from a bot[255] to a human troll[260] and vice-versa. This includes the sock puppet[50538] case, but there are other cases as well. For example, an account[1000] may be handled by a particular human troll[260] during peak hours, and by a bot[255] during the off hours—in essence shifts, with the bot[255] taking a shift[19600]. This case is logically identical to the above-mentioned one that involves an account[1000] shared among multiple human trolls[260] with the exception that one of the fingerprints[20780] should ideally be fingered as being a bot[255].

The sock puppet[50538] scenario is likely to have less content[950] associated with a human troll[260] than the prior one, and so it is less likely to be readily fingerprintable. In order to compensate for this, some embodiments will "cheat" and create a temporary collection of posts[195] from the account[270] in question during periods of higher than usual interactivity with other users[220]. Most embodiments will apply fairly simple tests to determine a "period of interactivity", for example any period in which the identity [270] in question was a participant in a conversation of at least N turns[750], in which it was responsible for at least X % of the turns[750], where the values of N and X are both established by configuration parameters.

However, other embodiments may prefer to use—or at least more heavily weight—any periods of time in which a Ukrbot engagement[125] has begun against that account [270] until it terminates. This is under the logic that a confrontation with a Ukrbot[100] is an excellent time for the adversary[265] to transfer control from a bot [255] to a human troll[260]—or for that matter from a more junior troll[260] to a more senior one. Some embodiments may extend this logic to cover confrontations with known Ukrbot supporters[51575]. The fingerprint[20780] of this collection will be compared against a collection of content[950] from the target[50425] to test for consistency between the two. Most embodiments will seek other probable triggers and treat them similarly. Note that depending on their implementation, bots[255] may demonstrate no consistency at all with respect to lexical fingerprint[20780], for example if they are posting content[950] that comes from a wide variety of different sources. Thus in such cases their account[255] lacks a stable fingerprint[20780]. This case, which also can apply to troll accounts[260] will be a targeting reason [50445] in many embodiments.

If the fingerprint[20780] changeovers also do not correspond to periods of increased interactivity, the preferred set of bot[255] detection heuristics will be run on the accounts [270] in question. If the score suggests that the account[270] is that of a bot, it will be relabelled as such. If the scoring fails to suggest this, the account[270] will be labelled as being of unknown type.

It should be noted that almost all embodiments will allow the assignment of two or more lexical fingerprints[20780] to the same troll[260] if the troll[260] regularly posts content [950] with a non-zero novelty level[45100] in multiple languages[50495], one fingerprint[20780] per language [50495] used. However, apart from this one case, the number of distinct fingerprints[20780] will be presumed to be a good approximation of the number of human trolls[260] currently employed in a given theater of operations. Lexical fingerprinting[20780] does have limitations, particularly in the event that the different humans in question have very similar backgrounds and training. But it is worth doing, and will anyway be combined with other evidence sources.

Troll[255] Paygrade Determination

Figure 31B:
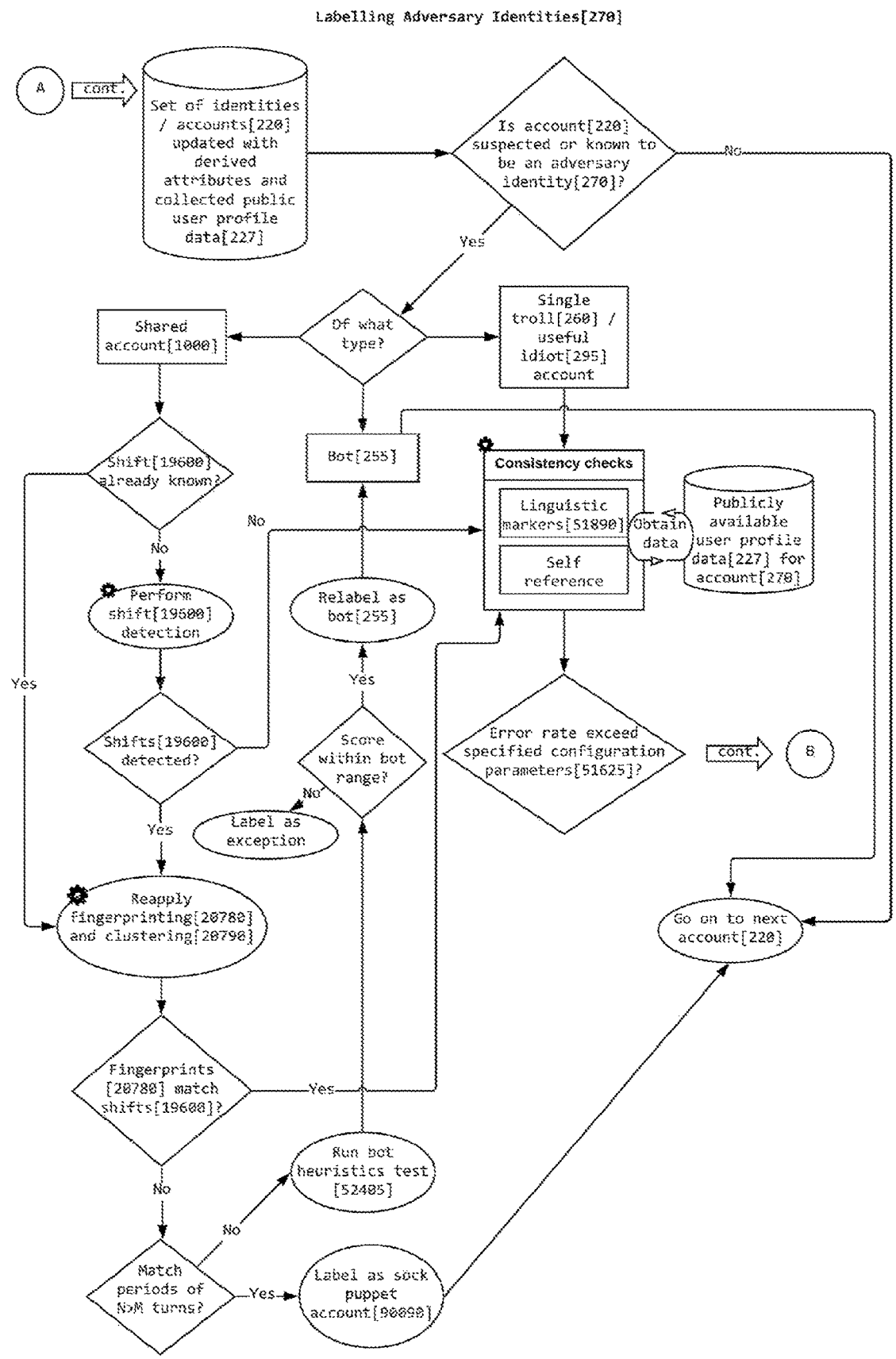
FIG. 31b is the second of a set of five block diagrams illustrating how adversaries can be identified, continuing on by labelling their identities.
Figure 31D:
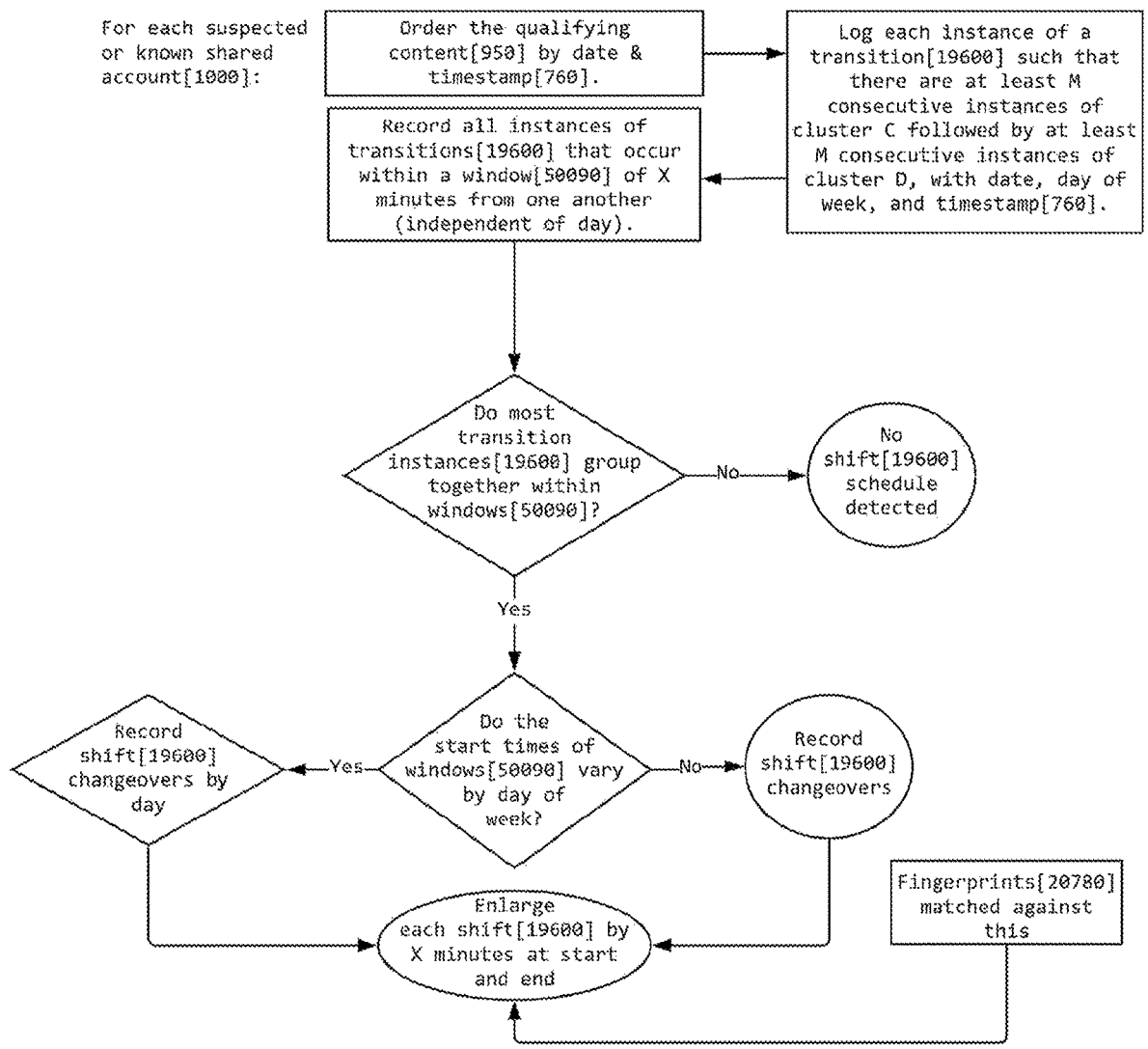
FIG. 31d is the fourth of a set of five block diagrams illustrating how adversaries can be identified, here detecting multiple users inhabiting the same account according to shift schedules.
Figure 31E:
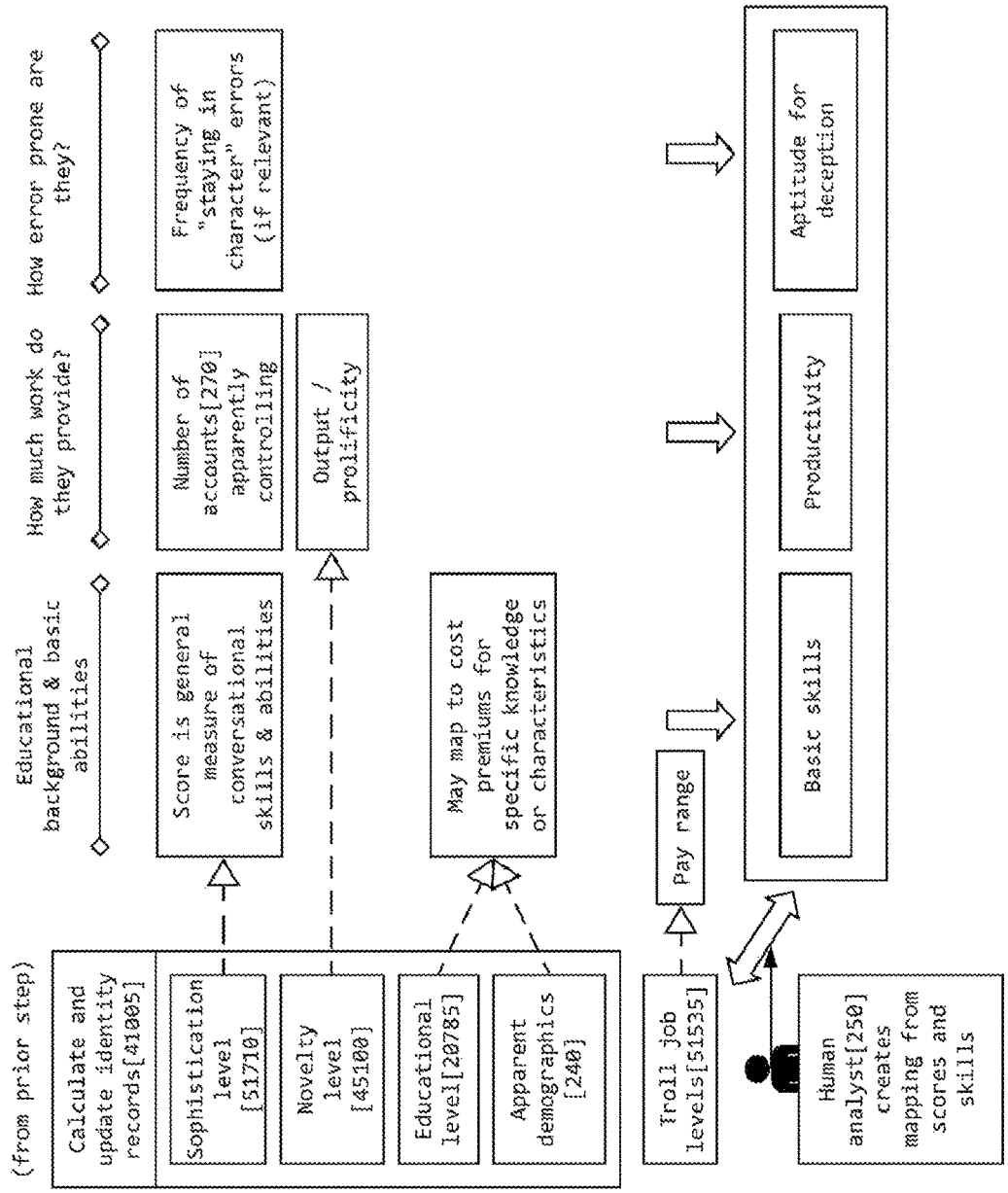
FIG. 31e is the fifth of a set of five block diagrams illustrating how adversaries can be identified, here assessing the level and pay grade of identified trolls.

Although the idea is to capture any human intelligence on the particular adversary's[265] compensation of trolls[260], most embodiments will estimate troll[260] pay rate according to the following building blocks, which are illustrated in FIG. 31e:

Basic Skills/Attributes: The skills may include, but are not limited to: mastery of languages[50495] and dialects [50500], a professional or technical domain of knowledge, knowledge of a given region's history and culture, and sophistication[51710]. Attributes may include but are not limited to: gender, ethnicity, religion, education level, age, and socio-economic class. Otherwise put, these are the sorts of characteristics that would likely appear in a job description, and so determine the pay range or grade for any given job applicant. This will be a coarse-grained scale in most embodiments as only so many of these aspects will be relevant or calculatable in any given case, and at any rate, the number of different troll[260] pay levels is not expected to be large. In most embodiments, a human operator[250] creates a map of skills and attributes to pay grades based on the best available intelligence, which in some cases may literally be published job postings.

Productivity: In most embodiments, this will be assessed by how many accounts[270] the system[105] associates with the troll[260], and how many total posts[195] are made per work period. Different embodiments may weigh these two differently, however almost all embodiments will choose to weight content[950] generated by the troll[260] by one or more of the measures used elsewhere for scoring content, including but not limited to sophistication[51710], novelty [45100], specificity[51785] and different forms of complexity. Most embodiments will not directly incorporate a measure relating to influence, since in the case of shared accounts[1000], it would be difficult to know which troll [260] to credit for any influence or following obtained. However, some embodiments may choose to weigh the more simple measure of the number of user[220] responses to posts[195] made by the troll[260] in any of the accounts [270] they inhabit.

Ability to Deceive: Especially for those trolls[260] who are associated with multiple accounts[270], and/or who inhabit accounts[270] for which the presented demographic is very different than their own, the ability to "stay in character" consistently over the long haul is an aptitude that some individuals are likely to possess to a greater degree than others. Those trolls[260] with greater capabilities in this regard are of greater value to the adversary[965], and presumably over time will be compensated accordingly. Some embodiments will apply a negative score for errors, while others will prefer to apply a positive score for a lack of errors. However, most of these latter embodiments will require the troll[260] to be associated with multiple accounts [270] so as to avoid the risk of rewarding those trolls[260] who are more or less playing themselves on a single, dedicated account[270].

In some cases, there may be a detectable difference in educational level[20785] between different trolls[260]. Most embodiments will use indicators, including but not limited to, grammatical errors that are not indicative language competence issues, frequency of common spelling errors (e.g. confusing your/you're or there/their/they're or equivalents in other languages), frequency of vulgarities, frequency and correct usage of punctuation, correct use of the subjunctive and past perfect and syntactic complexity in order to assess probable educational level.

Many embodiments will look for inconsistencies in how an identity[220] presents its demographics [242]. This is tantamount to assessing a human troll's[260] ability to stay in character, a task which increases in difficulty with the number of accounts[220] that they may inhabit concurrently. To this end, most embodiments will count markers[51890] in which wording, spelling, explicit or implicit references to own gender (such as using the masculine vs feminine form of adjectives with respect to themselves in languages[50495] which have such distinctions), profession, region, age, and anything else that is not consistent with the purported demographics[242] of the identity[220] as expressed either/ both in user profiles on different media[135], or prior assertions. Many embodiments will also consider the distribution over time of these "mistake" markers[51890] in assessing the level of the seniority of the human in question for costing purposes. If such error markers are highly concentrated in time and rare—or better yet, non-existent altogether—the individual is likely to be senior and/or higher-performing.

Some embodiments will use the latter two of the above groups to assess where a particular troll[260] falls within the pay band that has been determined by basic skills and attributes. Others will set thresholds for numbers of accounts [270] controlled and use it as a factor in determining pay grade. In either event, trolls[260] will be scored against other trolls[260] who have been presumed to be in the same pay band. Since these are intended as estimates, most embodiments will use a simple model for placing trolls[260] at salaries within the given band, for example fitting a bell curve to the bounds of the salary range for the band.

Most embodiments will assume quasi-periodicity in the change-overs of shared troll identities[260]—essentially that there are different shifts[19600] of workers. Thus, clusters [20790] that are broader than the norm, but still arguably mappable to the same human, can be potentially refined by grouping the content[950] by apparent shift[19600] and re-rerunning the particular distance measure used. This assumes that the adversary[965] will do its best to assign trolls[260] with similar abilities and demographics[240] to share accounts[1000], so as to make the shift[19600] transitions more difficult to notice. (Note that these clusters [20790] will in most embodiments be enhanced with additional measures that fall outside of standard lexical fingerprinting[20780], for example sophistication[51710].)

Shifts[19600]

The shifts[19600] and hence shift[19600] changes can be detected on the basis of identifying a cluster[20790] of identities[220] with transitions from one apparent, stable fingerprint[20780] to another at or around the same time on as many non-holiday days within an N-month window [50090] of the current day as possible. In a default embodiment, N=6. (In most embodiments, work holidays in both the target country/ies and that of the adversary[965] will be considered, as either one might reasonably impact the work schedule). If this is not observed, then most embodiments will do likewise on a per-day-of-the-week basis. By "stable" we mean that the first fingerprint[20780] transitions to the second, which then sticks around until the end of the shift[19600]—as opposed to multiple transfers[19600], alternating fingerprints[20780] or various other such possibilities, as these would indicate something other than a troll[260] work shift[19600] schedule. The overall reasoning is that if there are N such trolls[260], and N is a reasonably large number, at least some of the transitions will be detectable as it is unlikely for large values of N that every pair of human trolls[260] who share accounts[270] will have nearly identical fingerprints[20780].

Most embodiments will opt to tack some slop onto the beginnings and ends of shifts[19600] so as to not be tripped up by the odd outlier who is more than a few minutes late for example. In a default embodiment, this is 20 minutes. Some embodiments may restrict this analysis to suspected or known adversary identities[270].

3. Identifying Linguistic Markers

The third group of evidence involves the identification of specific linguistic markers[51890] such as code-switching, general language[50495] competency and evidence of the use of machine translation. These include but are certainly not limited to the following markers.

Culturally-Related Markers

Most embodiments will accomplish language[50495] and dialect[50500] identification using existing ML methods, such as naive Bayes using n-gram features, logistic regression, support vector machines, or some equivalent method. In most embodiments, transliteration when needed can be recognised using a combination of a spellchecker and a set of rules. For example, although both alphabets are largely the same in the case of Russian and Ukrainian, there may be regularity in the replacement of certain letters. Ukrainian "i" is often replaced with Russian "1H" in a transliteration, and Ukrainian "H" is often replaced with Russian "sl".

If a set of rules can be applied to the replacement of letters, and the replacement of letters results in a valid Ukrainian word (or a token that is identifiable as such even if misspelled), the message can be successfully decoded. If the NLU component[10100] has identified a negative sentiment[50510] in the content[950], the transliteration will be considered a marker of disrespect or ridicule from that point onward by that particular identity[220], if the socio-linguistic rules for the given country include such transliteration as a means of expressing ridicule (as in fact is the case with Ukraine.) If, however, the replacement of letters is mostly random, this is likelier to be an issue of language competency, autocorrect or other issues and so will not be considered a marker.

Language & cultural competency[51920] Textbook language[50495] competency issues may be assessed in most embodiments via a combination of approaches including using a spell checker in combination with a grammar checker. While a spell checker operates on the world level only, a grammar checker typically takes the context of a whole sentence into account. In most embodiments, this will be achieved with standard technology.

However, not all cases of language[50495] incompetency can be detected this way. In fact, some human Russian trolls[260] may have merely textbook knowledge of Ukrainian for example, but use it in an artificial way that is more alike to Google Translate output rather than how a native speaker would communicate. A human troll[305] may pose as someone from Western Ukraine but uses certain words that are more prominent in the East. Disguising as someone from a dialectal region also requires additional cultural competence skills that can be assessed.

Most embodiments will apply existing ML methods to detect language issues[51890] that are tied to cultural knowledge. Given that significant data from real users[220] will generally be available that ties them to a specific region and dialect[50500], language models can be built for each dialectal group. Insofar as a considerable amount of data is available from a given human troll[305] who claims to be from a certain region, the probability of that human troll [305] coming from this region can be computed using the existing language models. This can in some embodiments be combined with heuristics, for example, if certain words are known to be used in region X but are relatively rare or non-existent in region Y, these terms can be added to the knowledge base[10270] in a geofenced way for the specific region. In almost all embodiments, if a troll identity[220] makes a reference to being an immigrant or from an immigrant family, or having lived in another country or region, this type of evidence would render too weak to use and thus has to be discarded.

Figure 32:
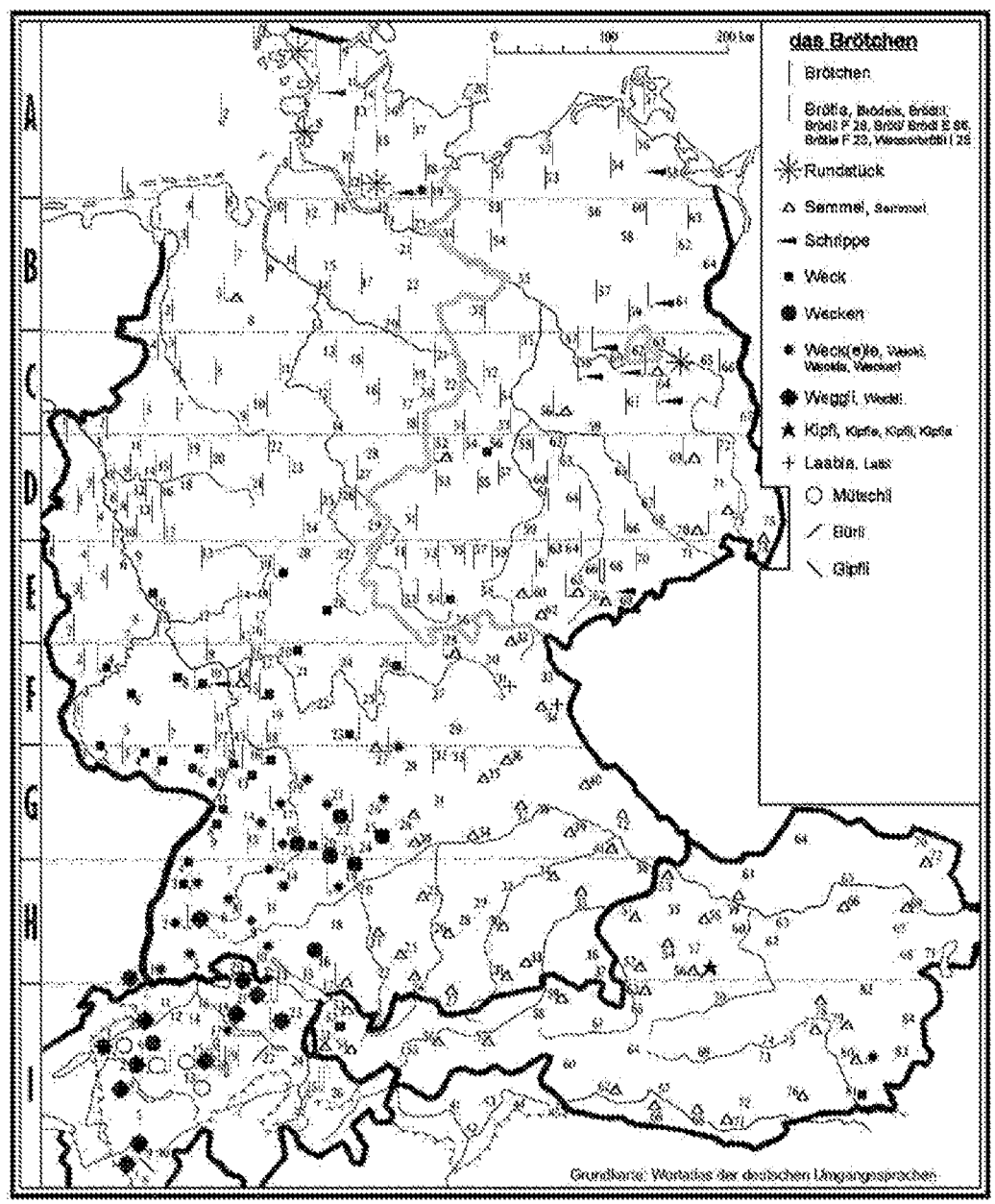
FIG. 32 is a block diagram of a dialectal map showing variations in linguistic usage for the word "bread roll" in Germany as an example of terminological differences as markers for a user's geographical origin.

Dialectal maps, such as the one in FIG. 32, which shows the variations in linguistic usage for the word "bread roll" in Germany provides an idea of how much of a marker such terminological differences can be. The fact that there are a great many such examples makes it that much more probable both that there will be holes in any training, and that individuals will make mistakes from time to time.

Some embodiments will offer human operators and analysts[250] a visualization of the dialectal map to help them more clearly see from how far afield certain terms have come vis-à-vis the alleged demographics[240] of the troll [260]—or bot[255] programmer.

Markers for Machine Translation

Most embodiments will have either/both heuristics or ML methods to identify specific markers that are suggestive of machine translation between pairs of languages[50495] that are relevant for the given theatre of operation. Such markers are likely to be quite language to language specific, especially in cases where the mappings between the two languages are unclear.

For example:
1) In Ukrainian (as well as in other Slavic languages), there are three third-person pronouns as opposed to one (it) in English. The three third-person pronouns have category of gender and are used both for animate and inanimate objects. Google translate does not define the gender of "it" in a separate sentence like this.

Where is my phone? I put it on the table—Де мій телефон Я поклав це на стіл.

It translates "it" as "this", which is not a natural construction.

2) There is no "gerund" in Ukrainian. This is likely why Google Translate often translates an English gerund as a tense form or an infinitive, for example: my doing . . . —моє робити . . . (meaning: my to do)

In most embodiments, a content analysis engine[10090] is responsible for performing the text analysis needed to identify knowledge objects such as assertions[11070], narratives [155], and events[170]. This can be thought of as an analytic layer above the NLU engine[10100].

Almost all embodiments will recognize three types of event objects: Simple Events[11005]: These are events in a fairly shallow, standard named entity sense.

Simple events[11005] correspond to any real world event—real or widely alleged—that may be worth taking note of for either analytical or HCI reasons. Simple events [11005] range from calendar events such as holidays, to sports championships, historical events of importance, current events and known upcoming ones, such as elections.

These events[11005] will have one or more common names or manners of being referenced, directly or indirectly, including in many embodiments with specific imagery, for example the twin towers burning on 9/11. They will also have dates, which may be as expressed as date ranges if appropriate to the specific event. Most embodiments will allow a wide range of granularity of date so as to accommodate both recent and historical events, for example from minutes to centuries.

Simple events[11005] will be stored in the knowledge base[10270] so that references to them in posts[195] may be recognized, but also so that temporal analyses can properly account for them. (For example, perhaps there is much less activity on most channels[140] on New Year's Day due to hangovers.) Most embodiments will choose to profit from existing lists of such events[11005] that are tailored to the theater of operation, making additions or changes as needed. Additionally, most embodiments will reference these events [11005] in visualizations[11030] as appropriate, including in customizations of Ukrbots[100]. There are many reasons to do this, including as a visual cue in temporally-oriented visualizations[11035] to reinforce that, for example, a particular troll[260] has been pushing the same narrative[155] for a year. Or to help remind a user[220] when they saw a certain post[195] if they are trying to locate it at a later point.

Figure 33:
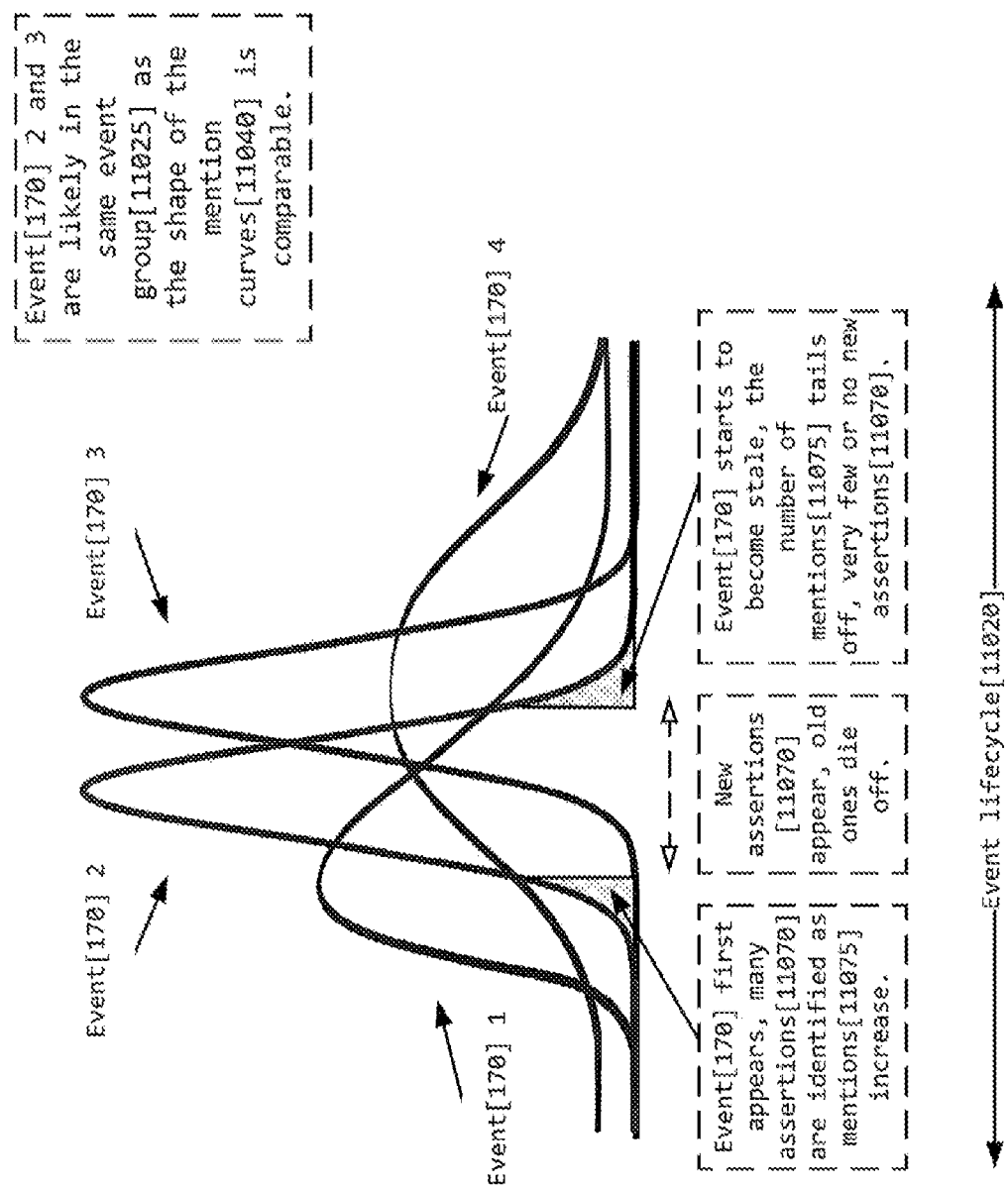
FIG. 33 is a block diagram illustrating event lifecycles and how discussions of events form mention curves, whose shapes are used by the NLU system to compare against suspected unnatural event lifecycles.

Complex Events[170]: These are by contrast extremely complex and dynamic knowledge objects. Complex events [170] have an event lifecycle[11020] in which they first appear, are discussed publicly to whatever degree, and then largely die out unless rekindled by some related event, or for certain really important classes of events, anniversaries. We will refer to this as the mention curve[11040]. As depicted in FIG. 33, different types of events[170] will have different shapes; generally events[170] of the same type will have similar shapes. For example, events[170] of natural catastrophes will almost immediately have a very large number of mentions[11075] but will usually fall off sharply a few days later. However, events[170] such as trials or political scandals are likely to start off quite slowly and may have multiple peaks in their mention curves[11040].

In many embodiments, the emergence of these events [170] will be detected through ML techniques, though some embodiments will prefer clustering or other methods. Many embodiments will employ a supervision layer to help ensure that the "burst" of references to a given event is consistent with a breaking news story in terms of temporal and SNA/transmission characteristics—that is, to avoid being successfully spoofed by a very large number of identities[220] all suddenly referencing a particular thing within a short window of time[50090]. Almost all embodiments will thus have requirements for the shape and amplitude of the mention curve [11040] so as to avoid minor events [11015] being captured. However, almost all embodiments will support strategically important topics[165] as defined by the system administrator[250]; these topics[165] will often imply events[170] which will be given special priority, for example protests in Crimea in the case of Ukraine. In such cases, requirements relating to the mention curve[11040] will be reduced, or in some embodiments, eliminated altogether.

Complex events[170] have all of the properties of simple events[11005], but unlike simple events[11005], their main purpose is as a container of assertions[11070] related to the particular event—and differences in these assertions[11070], including their timing—made by different actors[210]. Such assertions[11070] about an event[170] are commonly in one of the following general categories or types[11085] in most embodiments:

Predictions in direct relation to it

Consequences of it on other things, either assessed current ones or anticipated future ones Assignment of blame/credit for it (to a person, organization, or state actor)

Assignment of causality

Assertions of whether it is good or bad, how good or how bad

Assertions of whether it is true or untrue (whether good or bad)

Assertions of importance—or lack thereof

Assertions of who benefits from it, or is harmed by it

Assertions regarding quotes (e.g. Person X said Y, where both X and Y relate somehow to the event in question.)

Assertions regarding statistics or any kind of numeric comparison

Assertions of other types of specific fact that is either part of the event[170] itself, or clearly related to it. Each fact[11050] can itself be treated as its own event[170] in terms of having the same kinds of assertions[11070] about it, if it is of sufficient import—that is, if there are assertions[11070] about the particular fact[11050] rather than the event[170] to which the fact[11050] pertains. To take a very simple example, an assertion that "Fact X is untrue" would be an assertion[11070] about fact[11050] X. Almost all embodiments will support the notion of a fact template[20735] for situations in which the values of certain slots change very quickly—for example, the number of cases or deaths in a pandemic. A fact template[20735] has zero or more instance of itself, each instance has its own slot values, a date and timestamp, and a version number/unique ID. This mechanism in essence allows for the (logically) same fact[11050] to be updated as new information arrives, rather than forcing the creation of N new facts[11050]. In most embodiments, slots[11060] may have a specified "stale by" date or offset that is used to help the NLU engine[10100] disambiguate statements as being a new fact[11050] or an expected update to an existing fact[11050]. Many embodiments will allow de facto versions of this instead of or in addition to a formal mechanism; one need not take the time to define an explicit fact template[20735] for an NLU engine [10100] to recognize frequent patterns such as "number of new covid cases in <area X> this <day|week|month> is <Y>" such that the value of Y keeps changing for the pair of "area X" and the specified time range.

Figure 34:
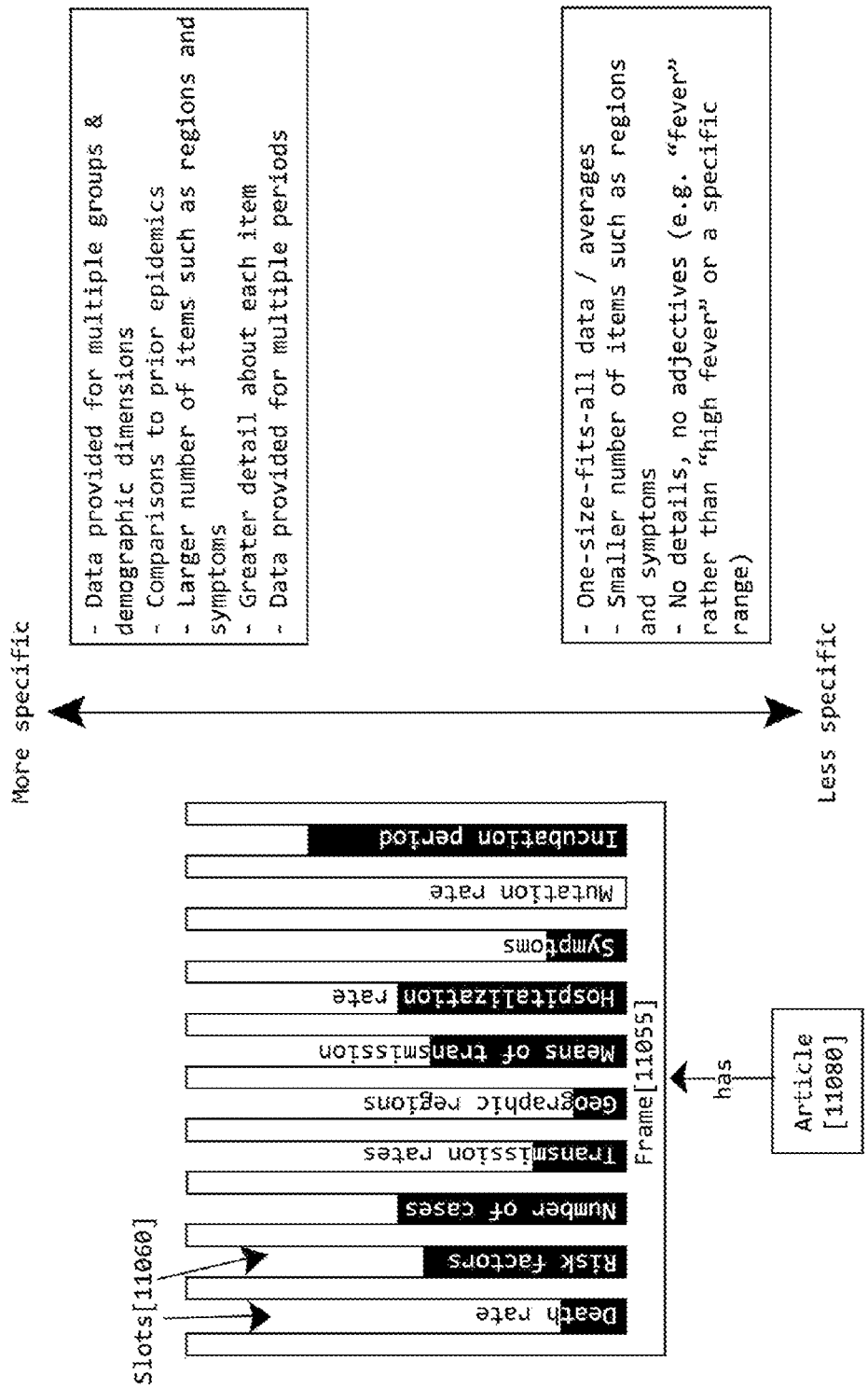
FIG. 34 is a block diagram using an epidemic as an example to illustrate how many embodiments of the NLU engine will use frames and slots to categorize and interpret assertions.

Moral or conceptual comparison to other events
Interpretations of its meaning
Suggestion of the best actions to take in light of it
Analysis of the actions already taken—or not taken—to date Apart from assertions[11070] of specific fact, in most embodiments the remaining types of assertions[11085] will have frames[11055] with slots[11060] to be filled or the equivalent. In the case of assertions[11070] of fact, different embodiments may avail themselves of their preferred fact extraction techniques. Some embodiments may attach specificity[51785] requirements to certain slots[11060] so as to eliminate more generic assertions[11070]. Common scenarios in which this might be done include but are not limited to: requiring references to increases or decreases in a statistic to include actual numeric information (both percentage and raw data), time range information, method of measurement, sample size (if relevant) and the source of the data. An example of this is depicted in FIG. 34.

It should be noted that almost all embodiments will concern themselves with categorizing and interpreting assertions[11070] rather than with trying to ascertain or judge any kind of real world ground truth. The underlying "event" here is the assertion of the existence of the real world event, not the real world event itself. In other words, whether or an often alleged event actually happened in reality or not, the assertions[11070] of it are both real and measurable.

Figure 35:
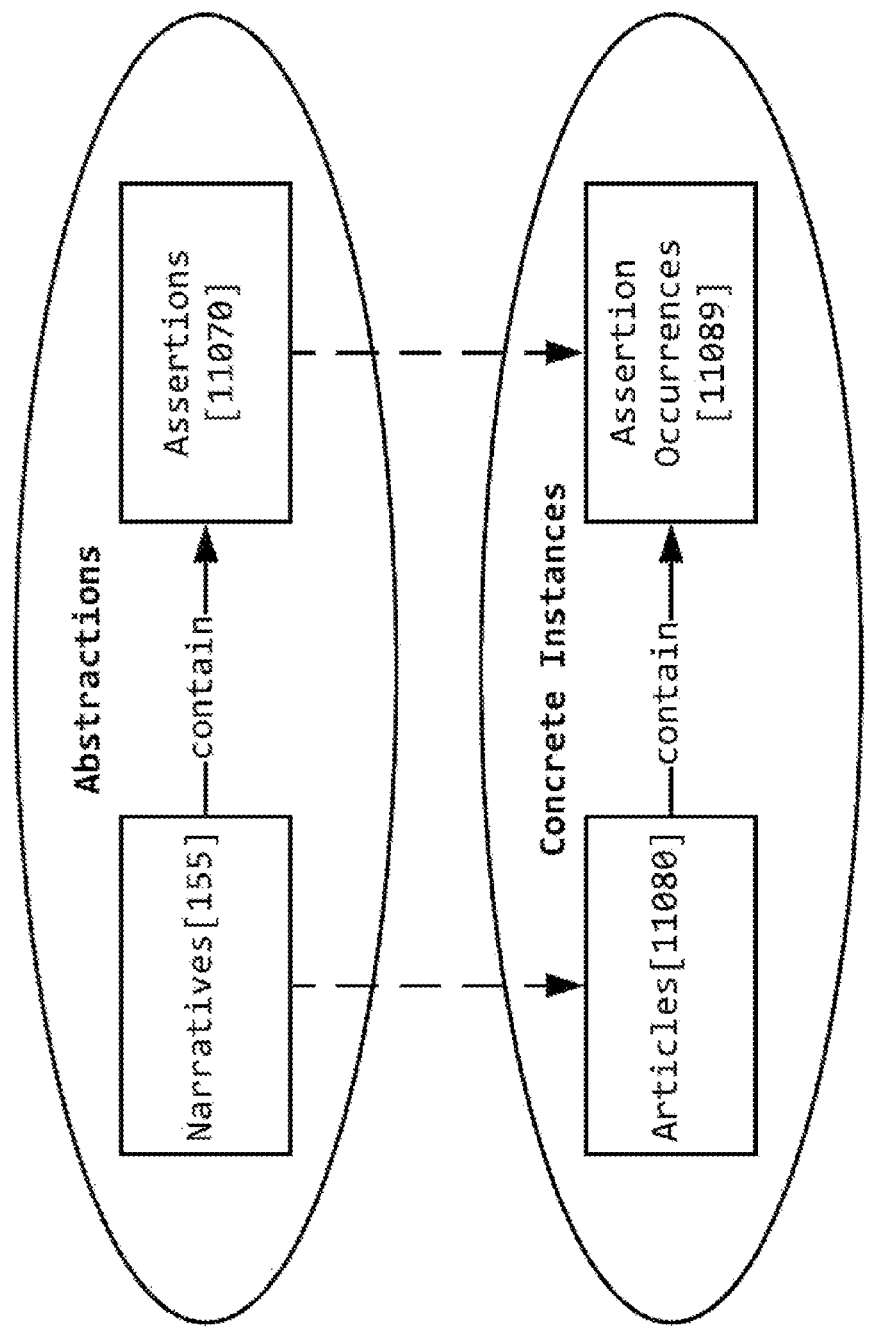
FIG. 35 is a block diagram illustrating the relationships among narratives, assertions, articles, and assertion occurrences as defined in embodiments of the system.
Figure 36:
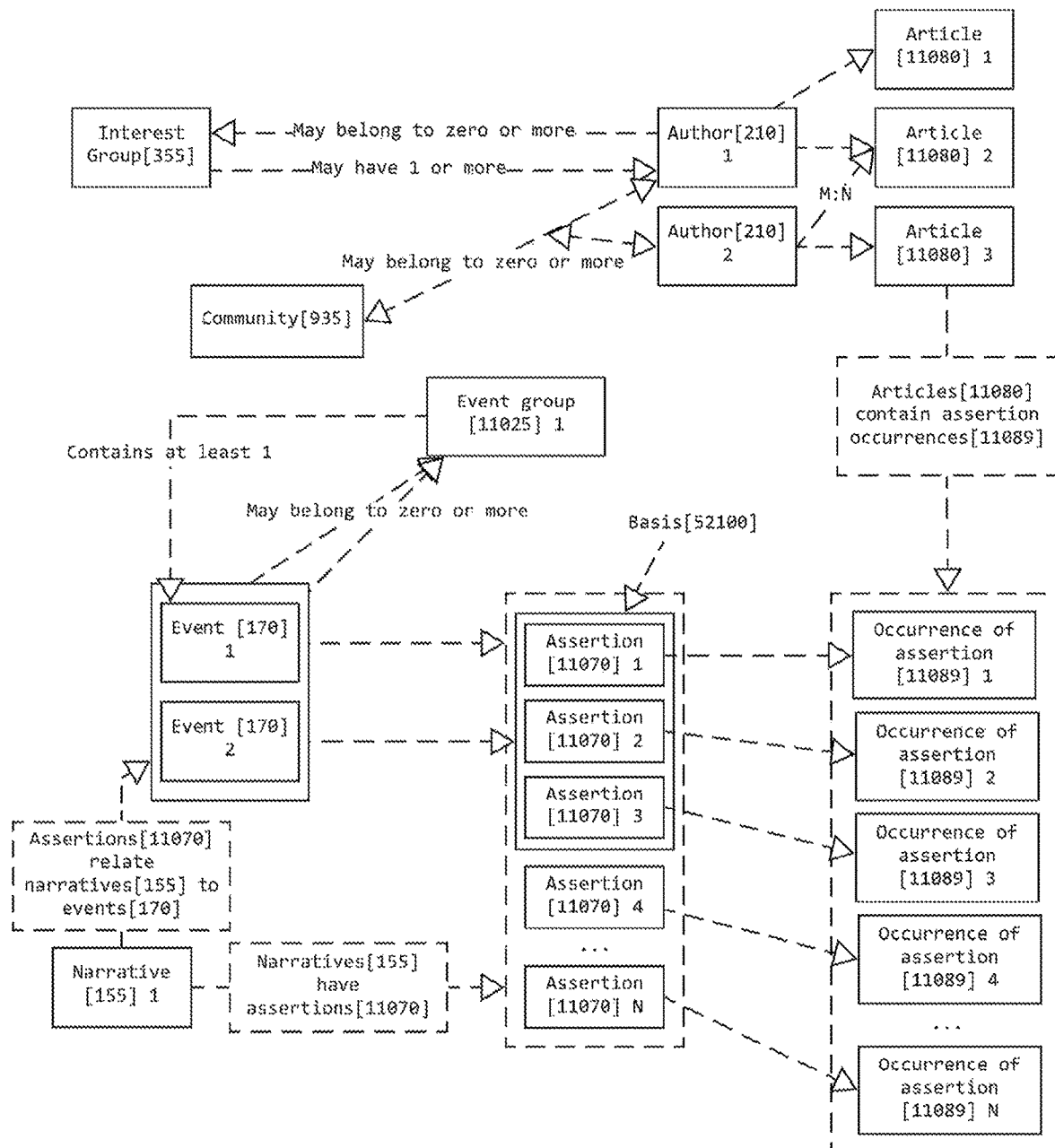
FIG. 36 is a block diagram illustrating assertion relationships as defined in embodiments of the system.

Narratives[155] are defined by the assertions[11070] they contain, as well as by those they omit. This is because while narratives[155] may have M:N relationships to events[170], as a practical matter, any one narrative[155] P will be related to a bounded number of events[170], each of which will have a bounded number of assertions[11070]. As a result, the set of assertions[11070] that could in theory be contained in P is likewise a bounded set. Thus it makes sense to think of each narrative[155] as containing a subset of this set of assertions[11070], and the rest of the set as its complement. Narratives[155] are an abstraction in the same way as an assertion[11070] is. Articles[11080] and other content[950] are how narratives[155] are concretely instantiated. Assertions[11070] likewise have occurrences[11089] or expressions of themselves which appear in articles[11080] or any kind of text or text-translatable content[950]. These relationships are depicted in FIG. 35 and FIG. 36. Examples are provided in a subsequent section.

A framed narrative[180] is a special kind of narrative [155] which has different distinct parts to it. In general, framed narratives[180] will be used in situations in which the ground must be laid in advance for the later parts so as to make them more credible seeming to the audience[910]. These parts will generally be delivered by different identities [220] so as to further enhance credibility. An example of a framed narrative[180] is referencing a (real) WWII atrocity in a town in Nazi-occupied Ukraine in the first frame, and by the Nth frame, assert that there are Nazi rallies in this town in the current day. Since framed narratives[180] require coordination, they will be sought by the targeting engine [400], and will be treated by the content analysis engine [10090] as a single logical piece of content.

Identifying Assertions[11070]

Different embodiments may choose to recognize assertions[11070] and instances of their occurrences[11089] using different methods or combinations of methods to identify the topic[165] and/or event [170]—the topic[165] may be the event[170]—of a statement, whether or not it is an assertion[11070] in linguistic form, what type of assertion [11085] it is if so, and its polarity[11065]. In order to have any categorizations be meaningful, almost all embodiments will impose a minimum number N of tokens for a statement to be assessed as potentially being either an occurrence [11089] of an already known assertion[11070] or the initial occurrence[11089] of what will become identified as a new assertion[11070].

Figure 37:
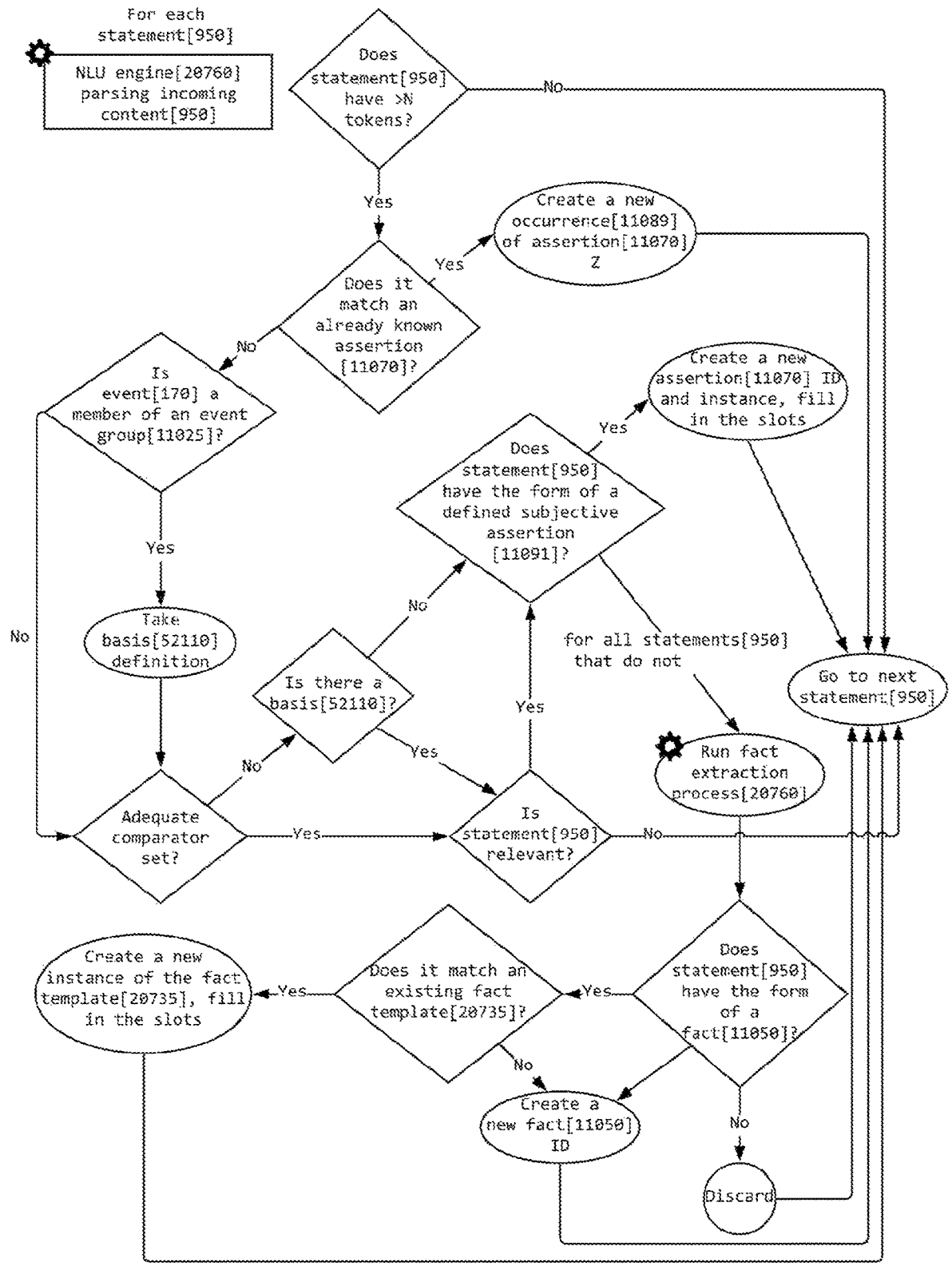
FIG. 37 is a block diagram illustrating the process by which a default embodiment identifies assertions and their occurrences.

The logic of identifying assertions[11070] and their occurrences[11089] in a default embodiment is illustrated in FIG. 37. Most embodiments will require the statement to be an assertion[11070] of one of the types[11085] supported by the particular configuration. Apart from any topics[165] that have been designated and designed by system administrators as having special strategic importance, in most embodiments, most topics[165] will be detected by ML based on their salience relative to the event[170] in question (or a named entity related to it), though many embodiments will prefer to use supervised approaches.

In either event however, in most embodiments, the topic [165] of the statement must be considered to be relevant to—or actually be—the event[170] that is one of the assertion's[11070] target events[170] in order for the statement or sentence in question to be treated as relevant. For example, the statement "I blame John for not taking the dog out enough" is clearly a statement expressing blame, and so matches the blame assertion type[11085]. However, until/ unless it relates to the event[170] at hand, it will be not considered as an assertion[11070]. In most of these embodiments, this will be determined by information in the knowledge base[10270] in the best case, and by relying on topics[165] or similar statements that have occurred in articles[11080] to date identified as being about any event [170] of the same event group[11025] in the worst case. If a basis[52100] has been defined for the relevant event group[11025], this will be used in addition, or instead, based on the particular embodiment. If the emerging event[170] really is novel, with the result that it has no event group [11025], most embodiments will waive this relevance test until a pre-set number of articles[11080] about the event [170] have appeared.

However, these embodiments will generally recognize one common sense exception to this: in the event that there are sentences that can be computationally determined to be related to one another by methods including but not limited to textblocking[10050], near-deduping, fuzzy matching, stemming and stop listing which show up frequently in articles[11080] about the event[170], and which are not all determined to be from the same author[210], an exemplar from this set will be inserted into the set of assertions[11070] related to the event[170] in question even if there is no other match to the event[170]. This is to deal with the real world case that will occur when, for whatever reasons, the topic [165] categorization is insufficient or malfunctions.

In most embodiments, the NLU component[10100] will be used to identify occurrences[11089] of existing assertions [11070]. Each time one is identified, a new occurrence [11089] instance will be instantiated. If a statement passes all of the tests other than corresponding to an existing assertion[11070], a new assertion[11070] ID will be created for it in most embodiments; some embodiments may prefer to wait to do this until a certain selected number of other occurrences[11089] have been detected.

However, most embodiments will choose to retrospectively strip out candidate assertions[11070] if after a certain number of other articles[11080] about the event[170] have appeared, the assertion[11070] has no further occurrences [11089]. Some embodiments will prefer instead to do this on the basis of a specified slice of the mention curve[11040] so as to avoid assertions[11070] being incorrectly stripped out only because they appeared so early on in the event mention cycle[11020]. This stripping out is done is with the aim of removing low value, one-off statements from the set of assertions[11070]. For example, a statement to the effect that "Mr. So-and-so showed up in a crisp blue suit and tie next to Ms. WhosIt at the press conference" may technically be an assertion[11070] about any event[170] in which Mr. So-and-so is a key actor/significantly co-referenced named entity. But it is unlikely to be frequently occurring, and indeed is likely to be a one-off. Since the overall goal is to detect coordinated disinformation, almost all embodiments will perform some kind of filtering so as to remove such one-offs.

If the statement does not match a valid assertion type [11085], and does not correspond to an existing assertion [11070] of fact[11050], or fact template[20735], the fact extraction process[20760] preferred by the specific embodiment will be run. (Some embodiments may run the fact extraction process[20760] earlier instead of relying solely on the NLU component[10100].) If the statement is determined to match an existing fact template[20735], the content analysis engine[10090] will create a new instance of the fact template[20735] and fill in the relevant slots. All other statements will fall through the process.

Many of the above categories of assertion[11070] are inherently subjective in nature or otherwise unprovable. This reflects the fact that such unprovable statements are very attractive from a coordinated disinformation perspective for numerous reasons. For one thing, it is more difficult for ethical fact checkers to flag them as literally factually incorrect even if they are wildly improbable. For another, the more inherent complexity there is in the real world event, the more most users[220] simply want a synopsis of it from a source that they believe to be trustworthy. Synopses often naturally include unprovable statements. And of course unprovable statements generally have far fewer constraints in terms of believability. For example, it is much easier to dispute a statement about what will be true in a year from now than one that concerns 100 years from now. Since the proportion of such unprovable types of assertions[11085] is of interest, most embodiments will calculate this proportion for different actors[210], and some will opt to use it as a weak targeting reason[50445]. Similarly, most embodiments will consider this proportion as an important attribute of events[170] as it is often indicative of a highly contentious event when high.

In almost all embodiments, each distinct assertion[11070] will have at least the following properties, and may have additional ones in many embodiments:

Assertion UID

Assertion type(s)[11085], as above or according to the specific embodiment. Note that most embodiments will permit the same statement to be typed[11085] more than once if appropriate. For example, assertions [11070] of blame assignment will often simultaneously express negative sentiment[50510] and/or assert significant importance to the related event[170].

Assertion target(s) (code for the event[170] itself, or event-fact UID[20765]). Some embodiments will not require assertions[11070] to have a target, if some other relevance assessment strategy is being used.

Assertion polarity; the sentiment set[20740] will vary by embodiment; other types[11085] may have slots [11060] with polarity, for example whether or not an event[170] is asserted as important.

Assertion name: in most embodiments automatically generated with a summarization technique of the particular embodiment's choosing that allows limiting to a small number of tokens for purposes of display. Most embodiments will allow human editing to correct for unfortunate generated names as desired, as they may appear in visualizations[11030].

Attributes which will vary by embodiment, but which capture the characteristics of the set of occurrences [11089] of the assertion[11070]. These may include, but are certainly not limited to, the following:

An SNA concentration score[11090] which indicates the degree to the assertion[11070] is restricted by social network community[11100] boundaries.

Similarly a temporal concentration score[11095] which measures how spread out occurrences of the assertion[11089] are over time from the point ("burst") of the initial occurrence[11105]

Saturation level values[20730], for example what percentage of articles[11080] or authors[210] discussing the event[170] contain an instance of the assertion [11070] at different points in time starting from the initial occurrence[11105] until the end of the event cycle[11020]

Text variability values[11115], similarly, the degree to which the text in different occurrences[11089] is self-similar over time, using textblocking[10050], near-deduping, or any other accepted textual similarity measure Ontological variability values[11120], likewise but for the normalized values that are put into slots [11060]—in other words, similarity in what is being said ideally without reference to the how exactly it is said. Note that there can be variability in this regard across occurrences[11089] of the (more or less) same assertion[11070]. For example, an assertion[11070] might be a list of likely presidential candidates for a subsequent election cycle that includes candidates X, Y and Z. In most embodiments, if there are separate existing assertions[11070] that X is a probable candidate, and that Y likewise is, a single statement to the effect that X or Y and others are candidates would count both as an occurrence of both X-as-candidate and Y-as-candidate.

Overall "organic-ness" score[11125]: measures the likelihood that the assertion[11070] is spreading in a mostly natural way versus mostly as the result of coordinated effort, as assessed by the targeting system[10000].

It should be noted that in most embodiments these scores will be normed according to the particular assertion type [11085] (apart from the "fact" ones) rather than according to the set of all assertions[11070]. This is because there are likely to be gross differences by assertion type[11085], both in general and according to point in time. For example, assertions[11070] which assign blame or credit are likely to be very frequent—and particularly so during the run-up to a major election—since they are directly political, and in most cases the number of common candidates to blame or credit for a particular thing is small. They are also comparatively simple semantically, and so are likely to have lower text or ontological variability than assertions[11070] involving consequences of the event[170] for example.

Figure 38:
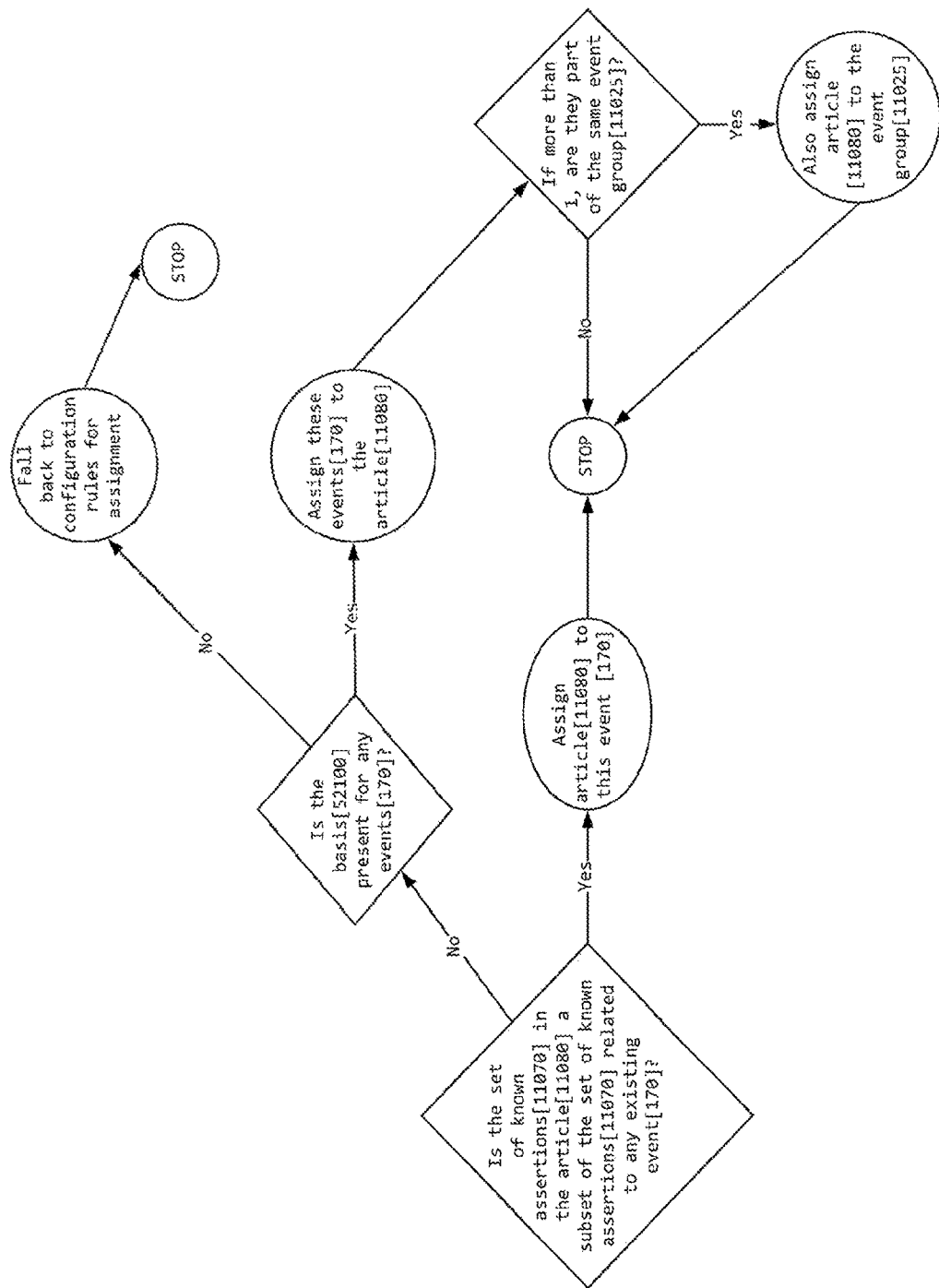
FIG. 38 is a block diagram illustrating how articles can be associated to events.

It should also be noted explicitly that some assertions [11070] will be related to more than one event[170], just as articles[11080] may be. One common example of this involves the assertion type[11085] of "comparison," as the comparison may involve comparing multiple events[170] to one another. More generally, this situation is likelier to occur with events[170] that are in the same event group[11025]. As indicated in FIG. 38, in a default embodiment, the content analysis engine[10090] checks to see if the assertions [11070] present in the given article[11080] are a subset of the known assertions[11070] for any events[170] —that is, there are no extraneous assertions[11070] are present. If not, it will check to see if the assertions[11070] form a basis [52100] for any events[170]. If so, the article[11080] will be associated with each of these events[170]. If not, the assignment will be determined by the configuration rules in place for handling weak and ambiguous assignments. However, if the set of assertions[11070] in the article[11080] is a subset of the set of known assertions[11070] about an event[170], it will be assigned to it, and also to any event[170] for which there is a basis[52100]. In most embodiments, if multiple events[170] of the same event group[11025] are associated with the article[11080], the event group[11025] will be as well.

Assertion Occurrence[11089]: for each occurrence
UID[220]
Actor/Author[210] (in certain cases, could be more than one, such as co-authors of an article)
Channel/Medium/Publication (in certain cases, may be more than one, for example a publication cited on a given channel[140])
Date and Timestamp
Slot-value pairs as determined by the structured assertion type(s)[11085]. In the event that an assertion [11070] has more than one type[11085], it will have the union of slots[11060] from the various types [11085] to which it belongs.
Raw text (or in some embodiments, relevant spans of the raw text, such as quotes)
Assertion Alteration/Revocation? Boolean value. This is to allow for the case in which an actor[210] either altogether retracts their previously made assertion [11070], or significantly alters it without the majority of other actors[210] also doing so within a brief window of time[50090]; in the event that a majority of actors[210] do the same, it presumably signals the arrival of a new event[170] or fact[11050] that is in effect the reversal of a prior one. While individual reversals of position may be fairly uncommon—especially in a way that lends itself to automated parsing—it will sometimes occur as new facts are brought forward. Unless it appears to be part of a lockstep pattern[11130], in most embodiments the targeting system[10000] will view such changes in position as evidence that the actor[210] is an independent one (which is not to say that it may not be outweighed by greater evidence to the contrary.)

Even events[170] of medium importance typically end up with a fairly large number of assertions[11070] and occurrences of these assertions[11089] before the curve of mentions[11040] of it starts trending towards zero. Thus in almost all embodiments, complex events[170] will have a significant number of derived attributes that describe the differences and similarities among these assertions[11070] and assertion occurrences[11089], as well as the patterns they demonstrate. These may include but are not limited to:

The relative proportions over time of the different assertion types[11085] supported by the particular embodiment
The degree of conformity of co-occurrence of assertions [11089]
How many distinct transmission paths of assertions [11070], and how much variability in each
How many distinct narratives[155] or sets of co-occurring assertions[11089]
The average number of times that any one assertion [11070] is repeated within the same article[11080]
How many directly contradictory assertions[11070]? (e.g. X is good/bad or true/untrue)

Figure 39:
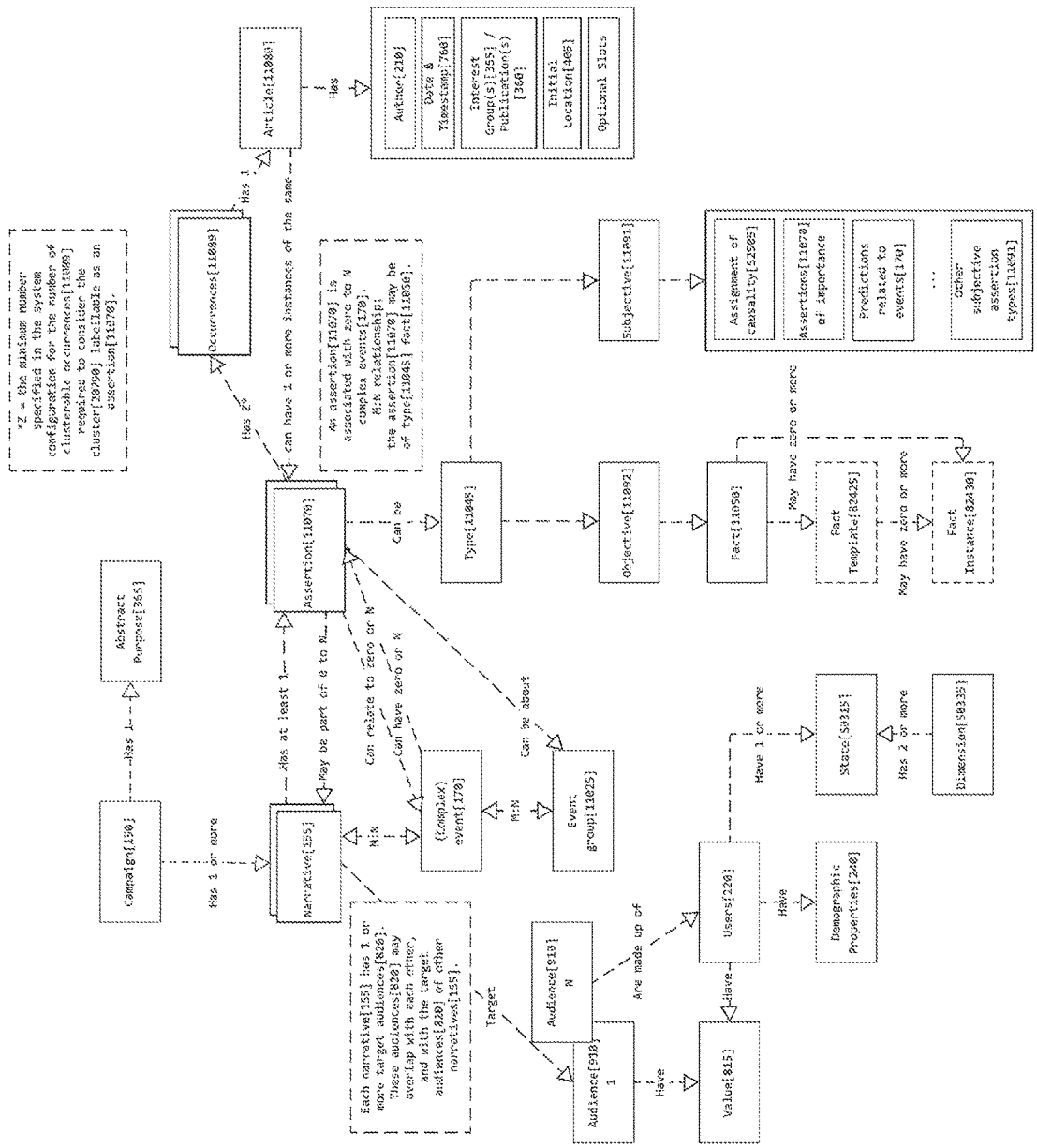
FIG. 39 is a block diagram illustrating the relationships of narratives.

The relationship among narratives[155], events[170], articles[11080], assertions[11070], and assertion occurrences[11089] is non-trivial. These are depicted in FIG. 39 and FIG. 36. These relationships can be summarized as follows:

Events[170] have one or more assertions[11070] related to them.
Narratives[155] likewise
Articles[11080] have one or more occurrences[11089] of these abstract assertions[11070]; for this purpose any content[950] long enough to contain at least one assertion[11070] can be deemed an article[11080]
Events[170] may share a subset of assertions[11070] in common
Narratives[155] may also do so
Narratives[155] may relate to zero or more events[170]
Narratives[155] generally have target audiences[820] which can be empirically inferred based on observing in which locations[405] the narrative[155] is observed on
Narratives[155] may belong to zero or more campaigns [150], or groups of narratives[155] that are applied to different audiences[910] with the hope of influencing them all in the same broad way, for example friendliness to a particular foreign power or policy idea
Events[170] may have a basis[52100] which is a special subset of the assertions[11070]
Events[170] may belong to event groups[11025], which provide comparator sets for events[170] of the same general type (e.g. missile attacks, pandemics, fires, etc.)
Articles[11080] may be about zero or more events[170] and may contain zero or more occurrences of assertions [11089]. Many embodiments may have different levels of association to events[170]. These may include but are not limited to: a) "mention" [11075] which would literally be the mention of the event[170] as a named entity only, b) being "about" the event[170], or c) being only about event[170]. FIG. 38 indicates the logic of assignment of articles[11080] to events[170] in one embodiment in the case of b); other embodiments may impose stricter requirements in the case in which no basis[52100] is available for a given event[170]. c) would be similar, with the change that all of the assertion occurrences[11089] contained in the article [11080] must be associated with the event[170] in question.
Articles[11080] may have zero or more authors[210]; embodiments may differ in their handling of anonymous authors[210]. Since the same article[11080] may be republished in toto or with minor changes, each article[11080] instances in most embodiments will have its own date and timestamp[760], publication

[360], initial location/ID of initial occurrence. Logically same articles[11080] will be identified by textblocks[10050], as described in U.S. Pat. No. 10,445,668 B2; other embodiments may use other methods. Some embodiments may add further attributes to articles[11080].

Authors[210] write multiple articles[11080], and may belong to zero or more each of (empirically identified) communities[935], interest groups[355] and professional affiliations/employers/publications[360]; assertion occurrences[11089] may be rolled up from individual articles[11080] to any of these aggregate actors and/or to a collection of all articles[11080] written by the author[210]

Articles[11080] may contain one or more narratives[155]

Assertions[11070] have different types[11085], which can be grouped into objective/fact[11050] and subjective types[11085].

Audiences[910] are comprised of users[220] in a particular location[405]. The audience value[815] in most embodiments relates to the sum of its user[220] values [817]. However, different embodiments may vary in their methods of assessing this. These methods include, but are not limited to: summing the value of all users [220] present in the particular location[405] at the time that an engagement[125] is launched on it, taking the average sum over a specified window[50090], and taking the average of the specific time of day and day of week over a specified time window[50090].

Figure 40:
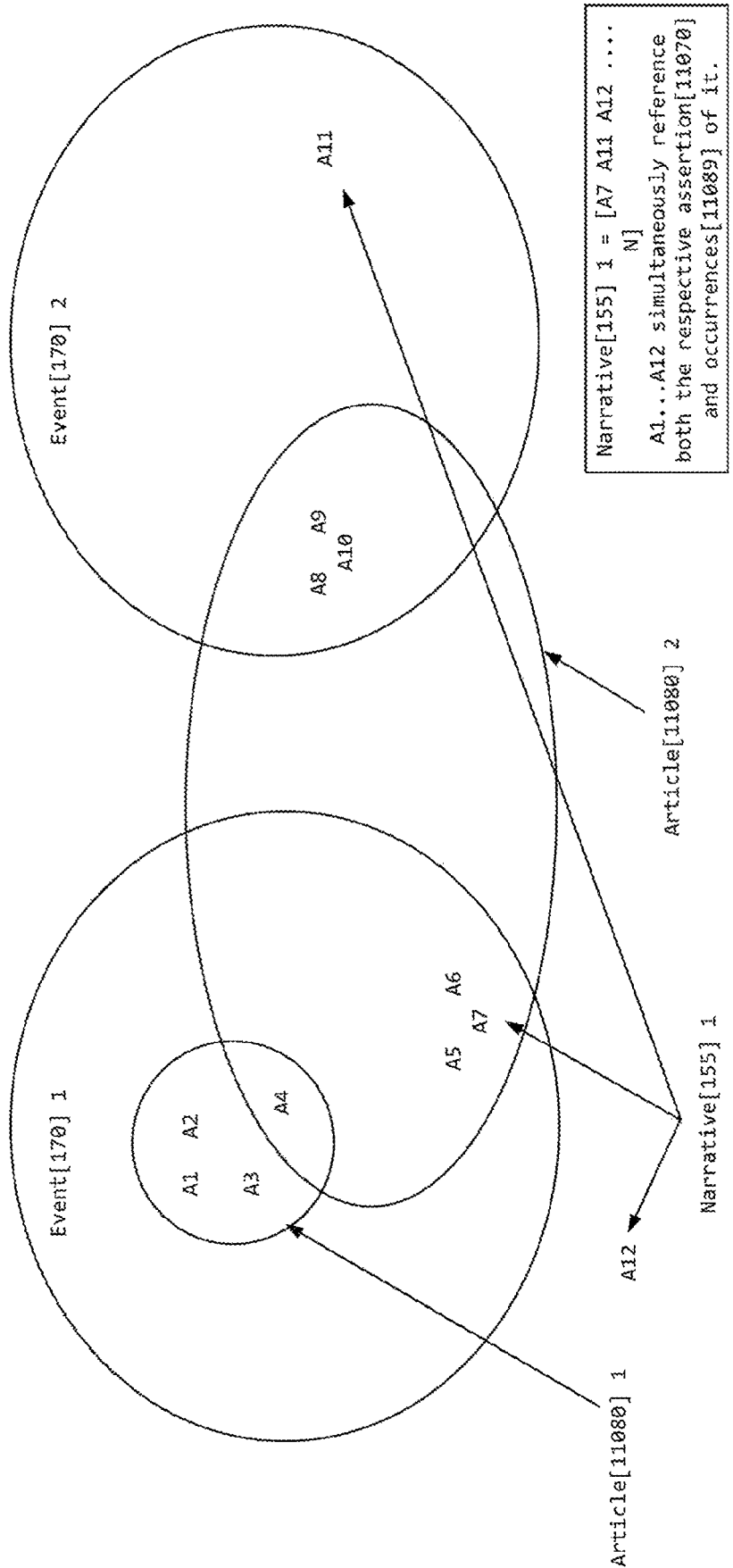
FIG. 40 is a block diagram using a Venn diagram to show an abstract simple example of the relationships among articles, events, and narratives.

The Venn diagram in FIG. 40 demonstrates an abstract, simple example of these relationships. Note that Article 2[11080] would not be considered to be about Event 1[170] by some embodiments even though it contains more of its assertion occurrences[11089] than Article 2[11080] because Article 2[11080] also contains assertion occurrences[11089] related to Event 2[170]. Note also that Narrative 1[155] in this example simply cherry picks the assertion occurrences [11089] that it wants. While these may sometimes correspond to particular events[170], there is no requirement that this be the case. And in fact, in many instances, it will not be the case. For example, a narrative[155] that is seeking to undercut a particular political policy is likely to touch on the relevant single aspect of prior events, and so in many instances would not have the basis[52100] (if defined) or otherwise a sufficient number of assertion occurrences [11089] to be associated with any of the events in question.

Different embodiments may handle the question of when a new narrative[155] should be instantiated differently. For example, some embodiments will opt to allow one narrative [155] to be a proper subset of another in the event that there is such a subset that occurs with sufficiently large frequency, while others will not. Similarly, as a practical matter, how many assertions[11070] are required to form a narrative [155] is likely to vary by the adversary[265].

However, most embodiments will want to assure themselves that the particular combination of assertions[11070] is not a one-off. Thus almost all embodiments will require the combination to be repeated some number of times before considering it a narrative[155]. In addition, they may place further requirements, including but not limited to: saturation in relevant articles[11080] (e.g. those about the same events [170] or which are detected as being similar) within a system-specified window of time[50090] or slice of the mention curves[11040] of related events[170] and appearance in more than one channel[140] or medium[135].

Event Groups

Most embodiments will support the notion of event groups[11025]. These are groups of structurally or semantically similar events[170]; many embodiments will also choose to impose some restrictions with respect to co-occurrence within the same pre-set time interval for some event groups[11025], specifically in those cases in which the circumstances of the particular period substantially color certain types of events[170]. Event groups[11025] may be detected automatically based on their ontological similarities, specified in a template by a human operator[250], or any combination of the two. Event groups[11025] are very important in certain specific scenarios for identifying more dangerous narratives[155].

To take a concrete example, in the earlier days of the COVID-19 pandemic, there were numerous distinct events in which one state or country was caught bargaining against other states and countries for shipments of scarce masks and other PPE and medical equipment. There were also multiple reports of instances in which one government blocked the shipment of such equipment from its territory to a different country or state who had placed an order for it. These (probably mostly true) stories were especially aggravating to those states and countries who believed that they were being shortchanged of what was perceived as life saving equipment.

A particular instance of such a case gained great currency in France. The event in question was the US government allegedly making a bargain on the tarmac, offering to pay a greatly elevated sum in cash for a jet-load of equipment with the result that the jet packed full of corona virus-related medical supplies ended up taking off for the US rather than France. While it was arguably quite similar to events that did in fact occur, the particular elements of very-large-amounts-of-cash-on-the-tarmac made it more newsworthy and upsetting. It was however untrue, as was subsequently noted by the French government.

While the cash-on-the-tarmac event[170] was structurally very similar to dozens of other reported events[170]—specifically, multiple government actors bargaining for the same items at the same period of time in sometimes unseemly ways—what made it different in a way that could be automatically detected is exactly the fact that it was mentioned vastly more in France than other comparable contemporaneous events[170], and that it also generated noticeably more negative sentiment[50510].

The construct of event groups[11025] provides a means of automatically detecting cases in which one (or a small minority of) events[170] is engendering a quantitatively different reaction from specific audiences[910] than is the case with other structurally similar contemporaneous events [170]. While this by itself does not imply that the event has been manufactured or greatly distorted by a narrative[155], most embodiments will consider it evidence[535] of suspicion that one or the other is likely the case. This is because the "hiding in the pack" strategy is a very good one for achieving credibility of any assertions[11070] or narratives [155] that in a different context would be very difficult to sell to the specific audience(s)[910] in question.

Super-events[11145]: A super-event[11145] is a type of complex event[170] of such magnitude and/or novelty that new channels[140], ecosystems[915] and potentially even media[135] are created in significant numbers—and become well populated with users[220]—because of it. Such generation of new locations[405] is very important because it creates unusual opportunities for a state actor to achieve large levels of influence[51620] quite quickly, and relatively easily if they are able to mobilize fast enough to capitalize on it. Although it would be possible to automatically identify a super-event[11145] as a question of degree relative to a regular complex event[170], because super-events[11145] are by definition both rare and important, most embodiments will prefer to have a system administrator[250] explicitly define the super-event[11145] object.

In most embodiments, super-events[11145] have the additional properties of the locations[405] and (fresh) identities [220] that are dedicated to them.

A regular complex event[170] may create partitions in existing audiences[805], with the result that disagreements become more prevalent on impacted channels[140], and some users[220] will switch, or at least explore, new locations[405]. By contrast, the emergence of a new super-event [11145] creates a situation that is an old-fashioned land-grab. By definition, SuperEvent X is extremely important, so a great many people wish to know more about it. But because, again by definition, it is something new, there are no well-established channels[140] with well established existing pecking orders, nor particular "experts" who inhabit and dominate these channels[140] whose influence must chipped away at. It's thus wide open for the nimble to exploit.

Further, because there are only so many hours in the day, the new channels[140] etc that are dedicated to SuperEvent X are siphoning off users[220]—or at least user[220]-hours from existing channels[140] and media[135]. And even after the mention curve[11040] for the event[170] has flattened, some of those users[220] will still remain influenced by those identities[220] who achieved a significant level of influence[51620] in these newly created locations[405], and who may now transition to posting on fresher events.

COVID-19 is an example of such a super-event[11145]. By contrast, sexual assault allegations are usually regular complex events[170]. This is because while there may be a very large number of mentions[11075] of it, it is unlikely that new ecosystems[915], large number of new channels [140] etc. will come into being as a result. That's in part because such stories are unfortunately the next entry in a well-known category.

As assertions[11070] and assertion occurrences[11089] accrue to an event[170], clear correlations will emerge among individual assertions[11070] in terms of their co-occurrence in the same articles[11080] as well as between the actors[210] of different kinds and affiliations that mention them rather than avoid or suppress them. Although the same assertions[11070] are likely to be asserted over and over again, additional assertions[11070] are likely to be made about an event[170] throughout its entire event cycle [11020], albeit at a slowing rate towards the end of the cycle[11020]. The number of distinct assertions[11070] is in fact a measure of the importance of the event[170] and in a sense can be considered its dimensionality.

Many embodiments will decide to perform filtering on the set of assertions[11070] to prevent very large, if very sparse, matrices of assertion[11070]-related data. Most of these embodiments in filtering will consider a combination of the influence level[51620] of the actor[210], his or her organization[320] or affiliation if there is one, and the frequency of the assertion[11070] on the part of apparently unrelated actors[210]. The focus on influence level[51620] reflects the fact that important assertions[11070] may be overlooked by a great many actors[210] if they are considered unpleasant or risky, even despite having a source who has attained a certain level of influence[51620]. This last matters since it means that, by definition, a significant number of people will see the assertion[s] and because the stature of the actor[210] in question differentiates what he says from some random anonymous social media user. It is extremely important for any modeling to take into account that given facts[11050] or assertions[11070] were out in the public as of a certain date, yet were generally ignored for some significant period of time. Disinformation is after all about acts of omission as much as acts of commission.

By the same token, in most situations it is not desirable to limit the set of assertions[11070] to only those actors[210] who are already influential. However, it is also not reasonable to assume awareness of every unique assertion[11070] about an event[170] made by literally anyone on the Internet. Otherwise put, one way or the other, an assertion[11070] must be at least be reasonably visible to be counted as a dimension of a narrative[155]. Different embodiments may choose to achieve this in different ways. However, most of these ways will require the assertion[11070] to appear in a number of different communities[11100] or to have been authored by someone whose assertions[11070] typically appear in the pre-set number of communities. In other words, simple frequency of occurrence counts will be eschewed by most embodiments.

The set of assertions[11070] and their number of occurrences[11089] made about a particular event[170] in most embodiments will be represented as a matrix such that each assertion[11070] that any actor[210] has made in relation to the particular event[170] that has survived any filtering performed by the particular embodiment is a column (unless withdrawn retrospectively as noted above.) Each row in the matrix represents a distinct article[11080]. If the author[210] of an article[11080] A has made assertion[11070] #1 about the particular event[170] N times, the first value in the row representing A will be N.

Most embodiments will allow system administrators[250] to define a basis[52100] for complex events[170] that are deemed of special importance. This will be considered a human task by most embodiments because it involves judgment. This basis[52100] will define which facts[11050] must be explicitly mentioned for the article[11080] to be considered an at least minimally accurate reporting of the event [170] for within a specified window of time[50090]. Some embodiments may endeavor to define bases[52100] automatically via their preferred statistical or ML approach. Further, as noted below, specificity[51785] requirements for particular slots[11060] may be required. In either event, most embodiments will either encourage or require certain specified information elements to be present in the basis [52100] definition based on the event group[11025] to which the event[170] belongs.

Figure 41:
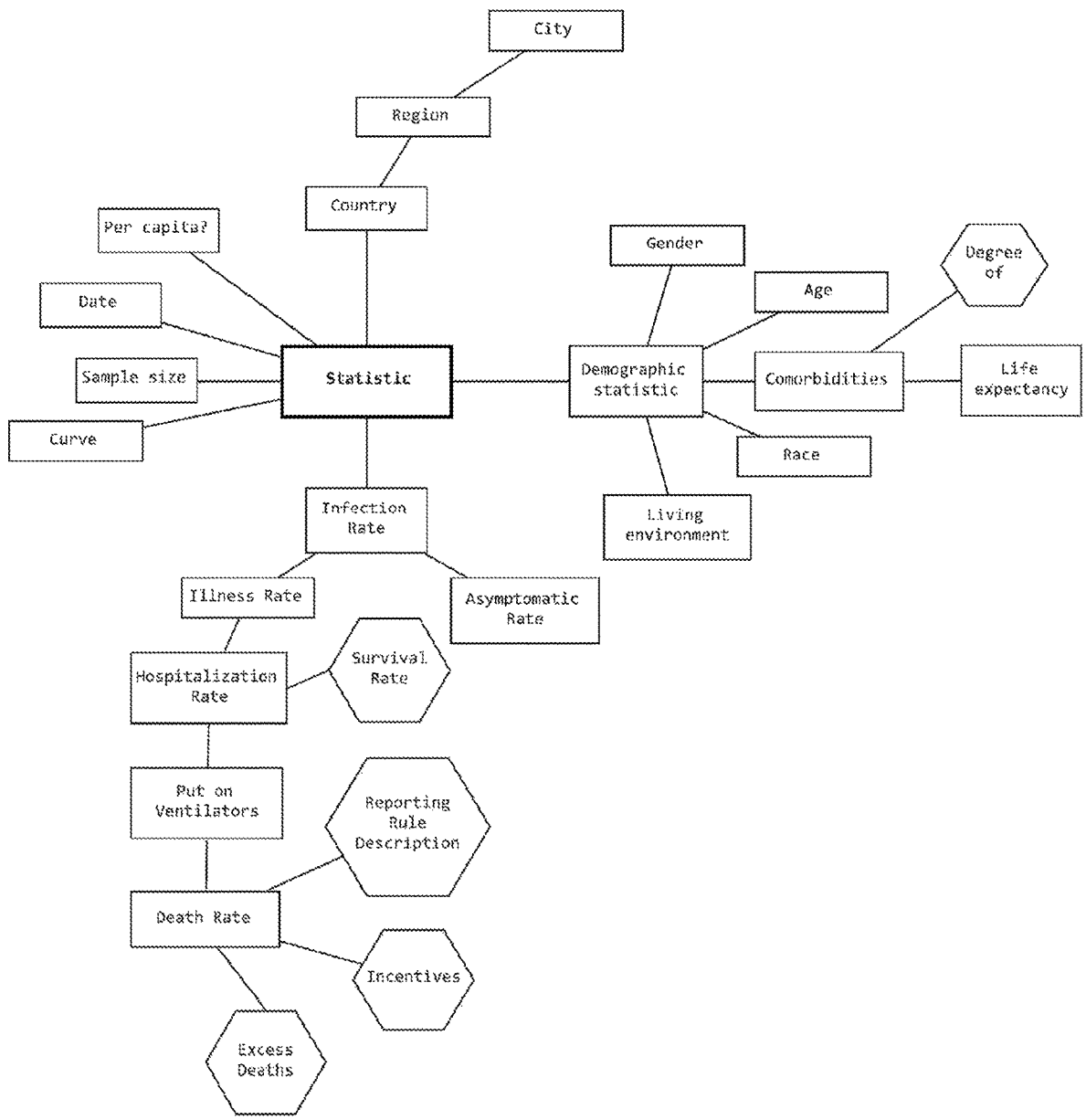
FIG. 41 is a block diagram illustrating an example of assertable elements of COVID-19 statistics.
Figure 42:
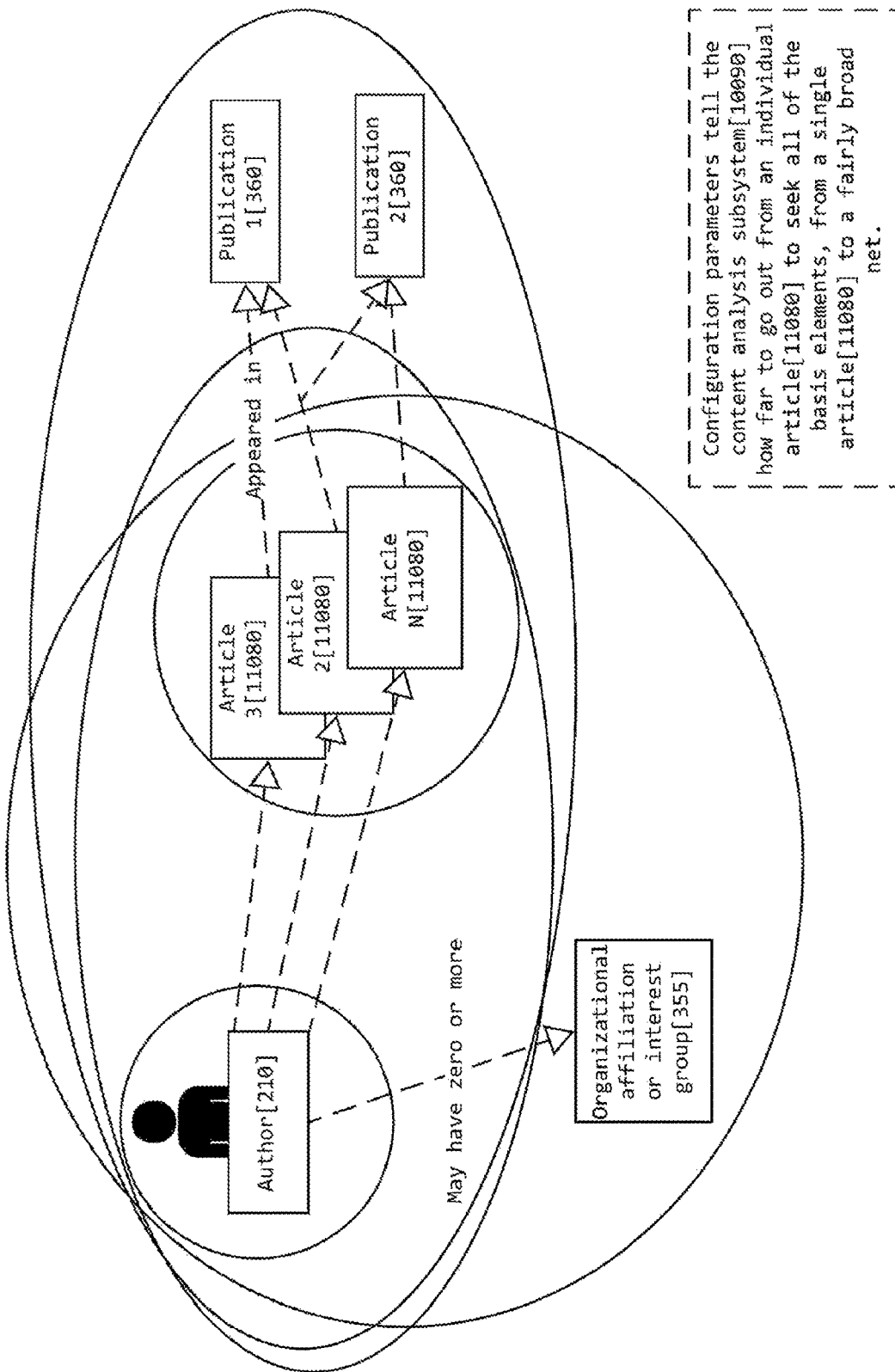
FIG. 42 is a block diagram illustrating an example of an embodiment's content aggregation for seeking basis elements.

For example if the real world event is a viral epidemic, statistical comparisons to prior viral epidemics, or to the situation in other countries, might be a required element. However since different articles about a topic[165] have different purposes or sub-topics[165], and because articles [11080] will be of varying sizes, most embodiments will choose to assess which elements are present based on the collection of articles[11080] associated with the given author[210] about the particular event[170], rather than judging solely on a single article[11080]. Some embodiments will likewise extend the coverage to the interest group[355]—that is, any formal or informal affiliation of authors[210] to one another, or to some organization—or publication[360] under an aggregate actor logic. Other embodiments may prefer to require M of the N facts[11050] to be present. Still other embodiments may prefer to establish rules based on the number of assertions[11070] that are related to the given event[170] given that this number can vary considerably by the type of event[170]. For example FIG. 41 provides an idea of how many facts[11050] there are even for statistics on Covid. The exact policies will be specified via configuration parameters. A conceptual example of this logic is pictured in FIG. 42.

Different of these embodiments will use such information in different ways. These include, but are not limited to: assessing the objectivity of different publications and organizations, and providing reports on the dominant narratives [155] about the event[170] that exclude one or more facts [11050] that are deemed to be critical.

Decontextualization[41010], or the deliberate suppression of certain facts[11050] within a given ecosystem[915] or region, is a known and very effective disinformation technique. Many embodiments will thus either provide templates or guidance for defining such bases[52100] to capture basic ontological knowledge about an event[170] of a given type[11045]—things including but not limited to things like "how much?", "how common?", "improving or worsening?", "is it new or has it happened before?" and so on—so as to facilitate the identification of instances of decontextualization[41010]. For example, fact #8 above, that FARA prosecutions are extremely rare is an important contextual point for those making the case that the prosecution was politically motivated. Many of these embodiments will have different templates for different types of real world events, for example public health-related or criminal case-related.

Figure 43:
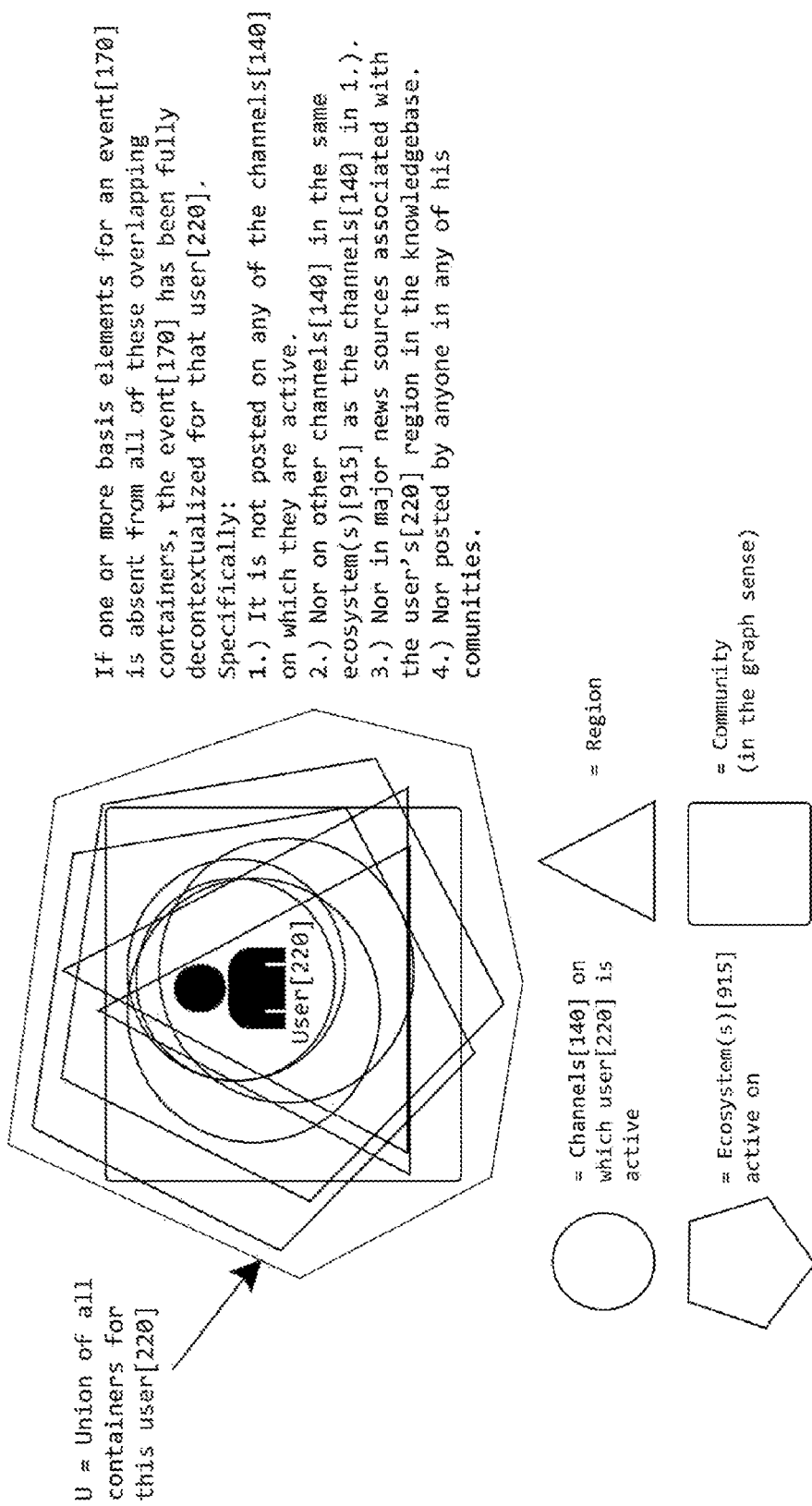
FIG. 43 is a block diagram illustrating the process of decontextualizing events for a user.

Decontextualization[41010] is inherently an observer-relative notion, since by definition the "missing" facts [11050] are known to some set of people. Thus many embodiments will provide data on ecosystems[915] or regions in which one or more events[170] are being decontextualized. This amounts to trying to determine what the probability is that a typical user[220] in the ecosystem[915] would have seen a reference to the "missing" facts[11050]. As noted in FIG. 43, most embodiments will determine that the probability is effectively zero if the facts[11050] do not appear in the union of the set of channels[140] on which a canonical user[220] is active, the ecosystem[915] as a whole, the set of empirically detected communities[935], and the set of news sources associated with the region. Some embodiments may prefer to define N canonical users[220] so as to get a larger union. Different embodiments will specify their own configuration rules for assessing the probability when references to the fact(s) in question are rare and/or only occur in a sliver of the union.

Although most embodiments will allow for an article [11080] to have co-authors, and will attribute any assertions [11070] made to each author[210], the general assumption is that there is one author to an article[11080]. An article [11080] will be defined by most embodiments as any instance in which the actor[210] had the opportunity to make multiple assertions[11070] about an event[170]. This may be an article in a newspaper, a blog post, an interview, a series of related posts[195] in a bounded period of time, or anything else that meets the aforementioned criteria on a given medium[135]. The rows thus often correspond directly to one or more narratives[155]—and where not, the row can be broken apart to exclude extraneous assertions [11070]. In most embodiments, equivalent row blocks must occur a certain threshold of times in order to be considered a narrative[155] that is worth tracking as part of the active set of narratives[155].

If the particular article[11080] does not include a particular assertion[11070], the entry in the row for that article [11080] in that column will be zero. Zero is perhaps the most important value. Omissions of facts[11050] or assertions [11070] are as much a feature of a narrative[155] as what is included; sometimes the omission of a single important fact fundamentally alters what a reader will believe to be true based on it.

A simple example of this can be found in the number of big media articles in June of 2020 about the increase seen in identified covid cases, while failing to mention at all that the death rate from covid was either flat or declining during this period.

Figure 44:
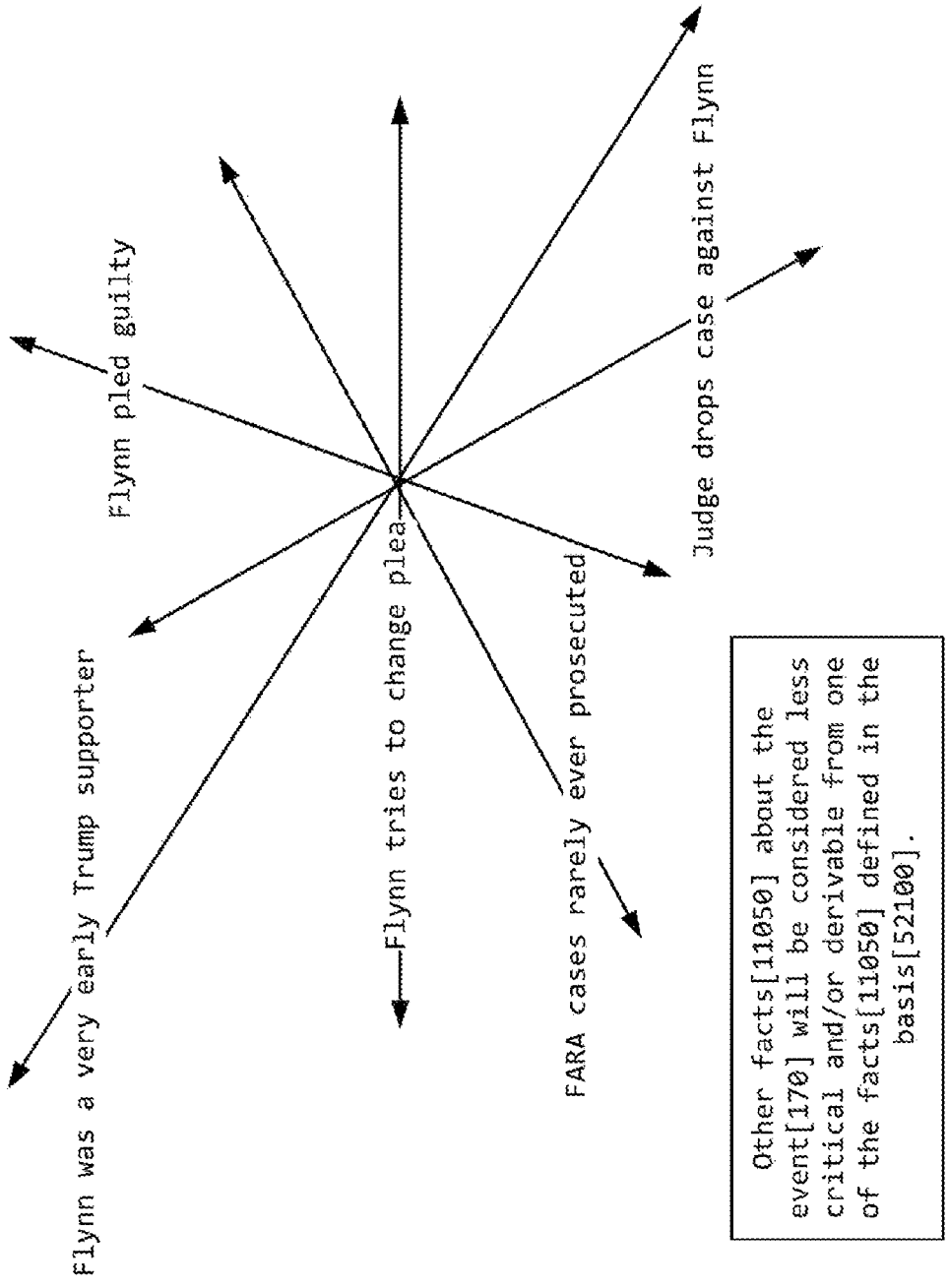
FIG. 44 is a block diagram illustrating an example of one embodiment's definition of a basis taken from the late 2010s General Michael Flynn case.

A much more complex real world example is the case of General Michael Flynn. A normal sized article[11080] would lack the space for even all of the important facts related to it. However, for purposes of example, here are some sample facts:

1. Flynn had pleaded guilty
2. Flynn later tried to withdraw the guilty plea
3. The case was dropped
4. Flynn changed lawyers
5. Prosecution of his son had been threatened
6. Flynn's legal expenses were such that he was forced to sell his home
7. An internal FBI memo questioned the legitimacy of the investigation
8. One of the laws Flynn was prosecuted under is almost never enforced
9. Flynn was an early supporter of Donald Trump's presidential candidacy
10. A judge threw out a related case against his business partner FIG. 44 depicts one example of how an analyst[250] might define a basis[52100] for this event[170].

Articles[11080] appearing just after the case against Flynn was dropped would often contain mention[11075] of the first 3 of these. However, articles[11080] in more conservative publications would generally resemble the matrix below, assuming that any of the above facts[11050] that are mentioned are mentioned only once per article[11080]:

[1 1 1 1 1 1 1 1 0 1]
[1 1 1 1 1 1 1 0 0 0]
[1 1 1 1 1 1 1 0 0 1]
[1 1 1 1 1 1 1 1 0 0]

while the articles in left-leaning ones appear more as:

[1 1 1 0 0 0 1 0 1 0]
[1 1 1 0 0 0 0 0 1 0]
[1 1 1 0 0 0 1 0 1 0]
[1 1 1 1 0 0 1 0 0 0]

The more consistent differences are easily explained by the sympathies or biases of the publications. For example, facts[11050] #5 and #6 are potentially the causes for #1. There are still some differences within the two like sets. But these are likelier to be due to factors such as lack of space, or a related article[11080] elsewhere in the same publication—and the fact that not all facts[11050] are seen as equally important even among authors[210] with similar leanings and incentives.

Once one gets to the unprovable assertions[11070], the contrast becomes even greater, as these (actual) example headlines at the time show:

Flynn Walks: Trump's Betrayal of America Continues
Those Who Framed Flynn Must Be Held Accountable Flynn Case Wasn't a Legitimate Counterintelligence Probe
Dropping Flynn Charges First Step in FBI, DOJ Cleanup
What FBI Did to Flynn Was Worse Than Entrapment
Michael Flynn Was Railroaded by Comey's FBI
Mike Flynn and the FBI's Assault on American Democracy
Prosecution of Michael Flynn an Utter Travesty of Justice
Justice Department Decision To Drop Case Against Flynn "Boggles The Mind"
DOJ drops Flynn's criminal case. And cronyism is the only reason.
Criminalizing Politics: The Investigation of General Flynn
William Barr's Corrupt Decision Points to Trump's Moral Rot of our Institutions
The Appalling Damage of Dropping the Michael Flynn Case These headlines clearly imply the support of quite different narratives[155], all of which relate to the legal case brought against General Flynn. They are very typical of the titles of articles[11080] about the Flynn case in American news sources at the time. They provide good anecdotal motivation for why many embodiments will choose to give additional weight to assertions[11070] of the unprovable types[11085] in any categorization decisions involving narratives[155] or campaigns[150]. Otherwise put, while the inclusion or exclusion of a given fact[11050] in any particular article[11080] can, by itself, be considered ambiguous in many cases, subjective assertions[11070] are usually anything but ambiguous in terms of the author's[210] intentions.

They are also different types of assertions[11085]:

| Headline | Assertion Type[11085] |
|---|---|
| Flynn Walks: Trump's Betrayal of America Continues | Interpretation of Meaning |
| Those Who Framed Flynn Must Be Held Accountable | Prescriptive Action |
| Flynn Case Wasn't a Legitimate Counterintelligence Probe | Analysis of prior actions |
| Dropping Flynn Charges First Step in FBI, DOJ Cleanup | Prediction |
| What FBI Did to Flynn Was Worse Than Entrapment | Assertion of how bad something is |
| Michael Flynn Was Railroaded by Comey's FBI | Assertion of blame |
| Mike Flynn and the FBI's Assault on American Democracy | Assertion of importance |
| Prosecution of Michael Flynn an Utter Travesty of Justice | Interpretation of Meaning, Assertion of how bad something is |
| Justice Department Decision To Drop Case Against Flynn "Boggles The Mind" | Assertion of how bad something is |
| DOJ drops Flynn's criminal case. And cronyism is the only reason. | Assertion of Causality |
| William Barr's Corrupt Decision Points to Trump's Moral Rot of our Institutions | Interpretation of Meaning |
| The Appalling Damage of Dropping the Michael Flynn Case | Assertion of how bad something is |

Many embodiments will also heavily consider the matter of how specific the information provided in an assertion [11070] is. For example the below paragraph is one telling of fact[11050] #7 above:

Then-Assistant Director for Counterintelligence William Priestap wrote in handwritten notes that he feared the bureau was "playing games" with the Flynn interview in an effort to get the national security adviser to lie so "we can prosecute him or get him fired."

This is an excellent example of a case in which having the greater level of specificity to illustrate the fact[11050] makes a substantial difference in how serious it is likely to be seen as being by many in the public. An attributed, exact quote will be regarded as highly specific by most embodiments. It can be expected that some version of the above quotes will appear heavily featured in those narratives[155] and articles [11080] that were Flynn-friendly, but will be far less so in any that were not as for them it constitutes what attorneys call a "bad fact." That is, less of the quote may appear, the statement might be alluded to in vague terms (e.g. "The director expressed some concern")—or simply not mentioned at all.

This extra weighting for specificity[51785] may be accomplished by automatically breaking out the quoted text as its own fact[11050] once it has been encountered some threshold number of times (either raw or by saturation, depending on the embodiment) in different articles[11080] relating to an event[170]. As in other similar situations, almost all embodiments will allow variations of the quoted text through the use of any accepted mechanism for detecting the morphing of text/identifying highly similar instances of text.

Partial Quoting

However, almost all embodiments will handle the case of "partial quoting" as a special case. Occurrences of partial quoting will be detected by most embodiments by using textblocks[10050], as described in U.S. Pat. No. 10,445,668 B2, as follows. When the NLU engine[10100] encounters a quote it will look for further instances of the same text span occurring within quotes. It will identify the containing quote with largest number of tokens. This will then be assumed to be the full quote, absent any definitive source for the full quote that might exist in a given case. Many embodiments may add an additional step of requiring the containing quote to be attributed to the same person as was the partial quote[20770].

Partial quoting is important because by selectively loping off part of a quote in an article[11080], critical context can sometimes be lost. On the other hand, owing to space limitations of various kinds (including commonly followed guidelines on different media[135] for the optimal number of words in a post[195]) and the fact that some quotes are of a length that objectively does warrant some kind of editing, even the most newsworthy of quotes will not always be reproduced intact. Ellipsis or otherwise shortening quotes can also be appropriate when the quote contains details that will not be of interest to the particular target audience [820]—for example, the exact location of a given event in a foreign country. Thus, differing partial quotations are by themselves not necessarily a signal of anything.

It is another matter when different clusters stemming from sub-spans of the same real world quotation appear in different articles[11080] and these different clusters align with different narratives[155]. For example, the case in which there is a significant cluster which minimally contains non-overlapping text spans X and Y from the quote, but other clusters which contain X but not Y is a common one. (Certain embodiments may require X and Y to be contiguous spans, so as to avoid the case in which one large quote is arguably about multiple topics[165], while other embodiments may prefer to preemptively segment longer quotes on the basis of topic[165] queries that identify a text span. Still other embodiments may likewise decide that a quote above a certain length, such as a long speech, must be broken down into smaller segments in order for partial quoting to be relevant.) In such cases, most embodiments will infer that the absence of Y signals a deliberate attempt to suppress what is considered by the author[210] as a "bad fact," the equivalent of a "0" in a narrative[155] array. This is because if "Y" is frequently mentioned, it is considered of consequence to someone. Some embodiments will determine that partially overlapping partial quotes[20770] A through N from the same larger quote are logically the same if and only if both a) there are one or more non-null intersections among them and b) their non-intersecting portions are not shared with other partial quotes[20770] (at all, or generally, depending upon the exact embodiment) that have been extracted from the identifiably same original quote. In other words, they must share the important elements but may have unimportant differences in snippets that others have generally seen fit to ignore. For example, most partial quotes [20770] of a given original quote X from a politician may share a particular text span that is essentially a soundbite. But what surrounding text spans are provided—or not—in any given article[11080] may differ tremendously by the political affiliation of the author[210]. However, with a longer quote, all sides are likely to leave some bits on the floor unless they include the entire quote in which case all of this is moot.

Figure 45:
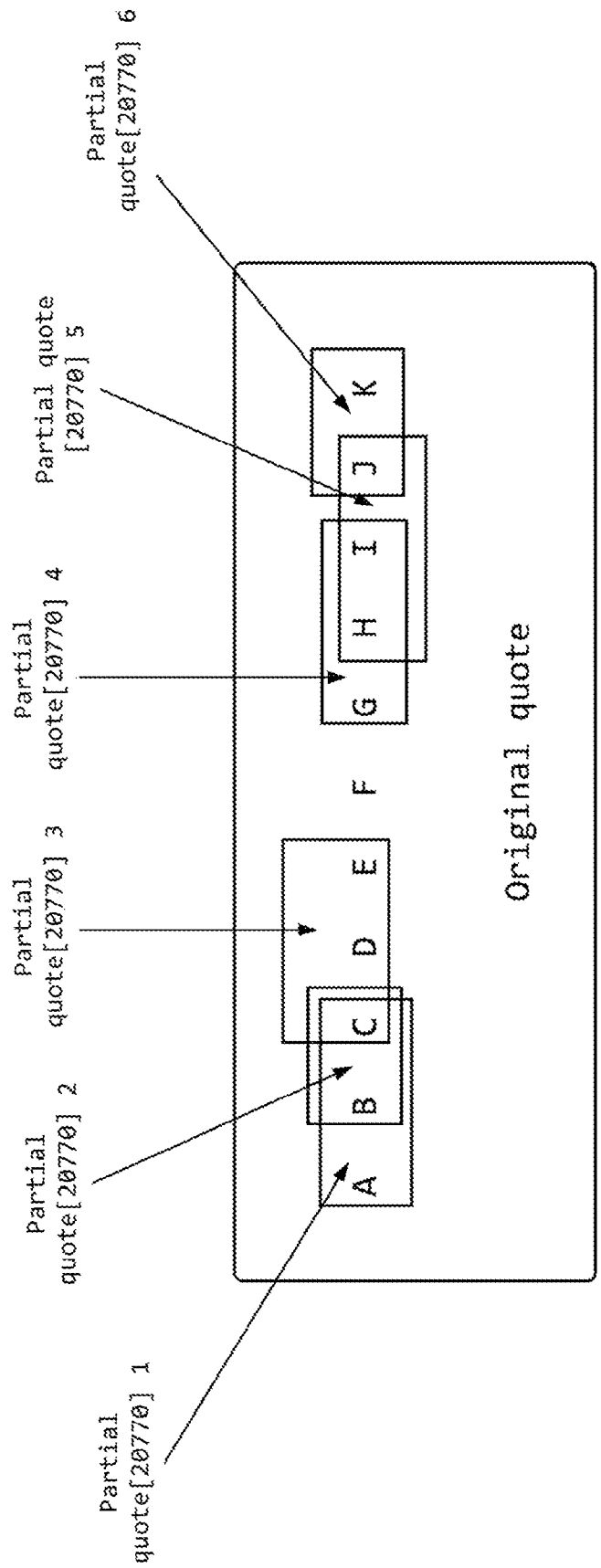
FIG. 45 is a block diagram illustrating an embodiment of overlapping text spans shared by partial quotes.

Equivalence is not just a matter of what key soundbites or phrases were present in each partial quote[20770] but also which ones were absent. This approach has the advantage of avoiding a dependency on being able to interpret the content of quote, but rather relies purely on empirical observation of how different parties cherry pick or discard certain phrases. This is illustrated in FIG. 45. That said, many embodiments including a variation on this one will strip out stop words so as to limit a source of potential error (e.g. small differences arising from poor transcription resulting in things like 'these' being confounded with 'those.')

Figure 46:
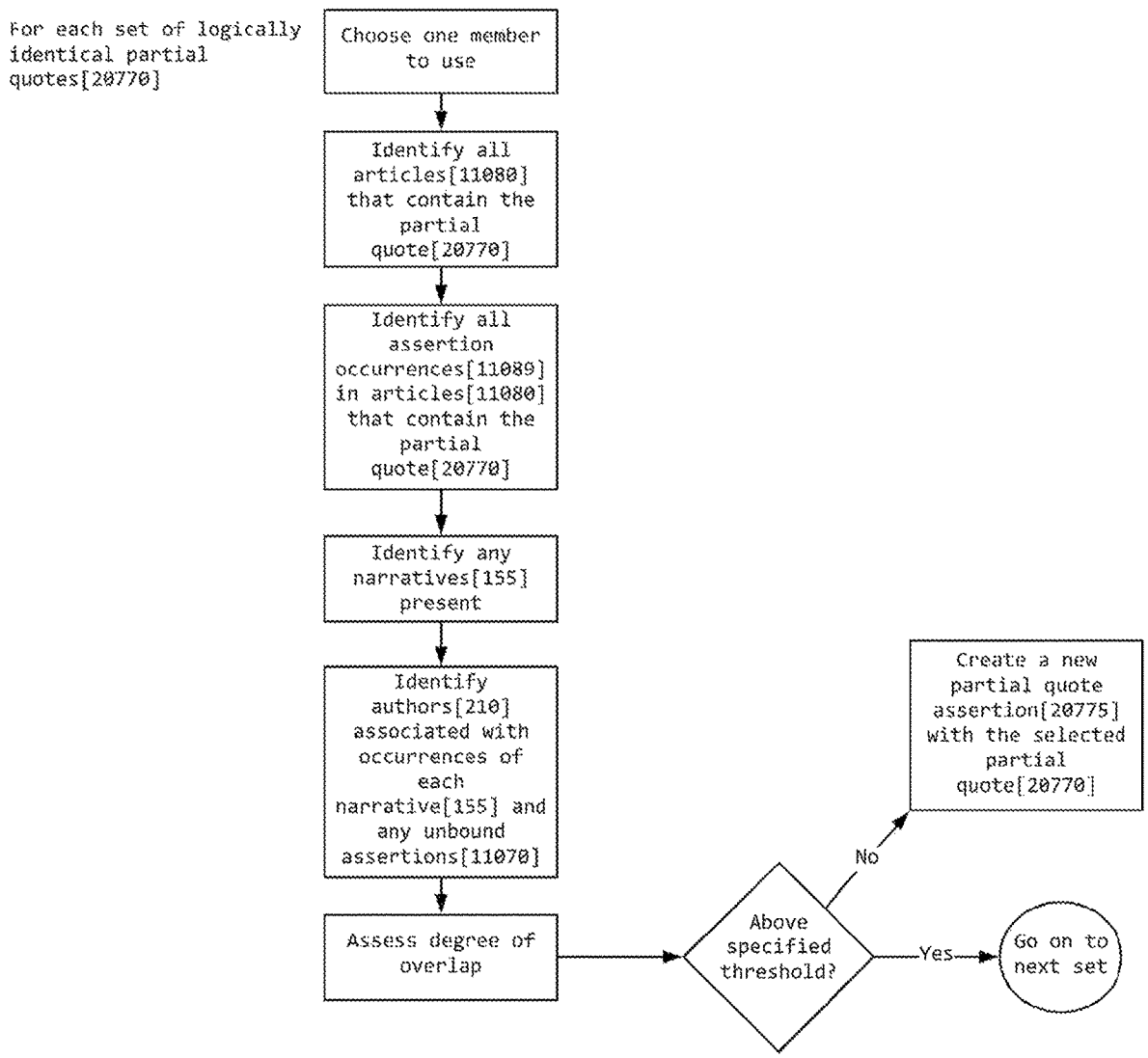
FIG. 46 is a block diagram illustrating the process flow of how an embodiment of the system could determine intent from instances of logically distinct partial quotes from different contents.

Some partial quotes[20770] will simply be more inclusive than others, not only cherry picking the essentials. Note however that this does not imply that the non-identical partial quotes[20770] have different intentions or should be associated with different narratives[155]. The question of intent will be dealt with in the test applied in FIG. 46 in which all instances of logically distinct partial quotes [20770] in different content[950] are identified so that the assertions[11070] that co-occur with them can be identified, and in turn the relevant narratives[155] and authors[210].

First, all instances of articles[11080] that contain an identifiable subset of the original quote are identified by textblocks[10050], as described in U.S. Pat. No. 10,445,668 B2, or a different preferred mechanism; note that that includes the entire quote itself. Next all assertion occurrences[11089] in these articles[11080] are identified. From this, any narratives[155] present may be identified. Next, the authors[210] who are associated with these narratives[155] or unbound assertions[11070] are identified. Different embodiments may assign different weights to narratives [155] vs individual assertions[11070] present. In most embodiments, if individual authors[220] are too tightly correlated to different partial quotes[20770], the content analysis engine[10090] will simply treat these partial quotes [20770] as logically the same, which is to say a reference to the full original quote. That is, if partial quote[20770] 12 is used only by author[210] X, it is essentially a one-off, some embodiments may extend this logic to the author's[210] publication[360]. If however a given partial quote instance is used by many different authors[210], most embodiments will create a new partial quote assertion[20775]. Many embodiments will then check this set of authors[210] for shared relationships for the purpose of trying to correlate the different partial quote[20770] instances to a political party or other special interest group, including the adversary[265]. These include but are not limited to: employment, publication or platform, special interest group, and an observed tendency to lockstep narratives[155.]

FIG. 47 provides a real quote example in which all 3 partial quotes include one key phrase, "Floyd was foaming at the mouth" but the first partial quote only includes that key phrase, the second includes it and another key point while a third contains the first key phrase, most of the second partial quote and tacks on more clarification. The first partial quote[20770] 1 example, which omits the time-placing element that immediately precedes it "When approached by the police", may take on an entirely different character, depending on what it is replaced with.

Some embodiments will just cluster according to the text spans that are present in each partial quote[20770]. In still other embodiments, the spans of the quoted text must be matchable by a text similarity metric suitable for shorter sequences of tokens, and which penalizes for additional semantic information in order to be considered the same fact[11050]. These embodiments must therefore parse the text fragments of each partial quote[20770]. Doing so has the added benefit of being able to score particular types of omission, for example clipping a linguistic hedge, and/or making any kind of edit that results in flipping the sentiment polarity[11065] of the statement. For example, "I sympathize with the motivation. However, what he did was wrong." changes meaning substantially—and arguably reverses polarity—if the second sentence is omitted.

Non-overlapping, non-contiguous spans taken from the same real world quote can by definition not be logically equivalent to one another and so will be assessed in many embodiments on the basis of whether their occurrences align with specific narratives[155] and unbound assertions [11070]. Some embodiments may again prefer to apply text distance metrics. Many embodiments may additionally impose a distance between two such spans, so as to deal with the just-above example correctly (since the "what he did was wrong" span is not literally contiguous to "I sympathize with the motivation." Almost all embodiments will also employ heuristics to handle special quote treatments such as ellipsis.

Once the these partial quotes[20770] have been matched, their usage will be correlated to the set of other assertions [11070] that co-occurred with them in the article[11080]. Many embodiments will choose to aggregate articles[11080] to the author[210] level so as to do the right thing when, for example, the author[210] has written N shorter articles [11080] rather than a single longer one. In those cases in which the inclusion of a particular partial quote[20770] strongly correlates to a particular narrative[155], most embodiments will create a partial quote assertion[20775] instance for it and add it to the narrative[155]. The required degree of correlation will be expressed in a configuration parameter. Some embodiments will treat this partial quote [20770] class of assertion[11070] as a targeting reason [50445].

Campaigns[150]

Campaigns[150] are composed of narratives[155] that are designed to collectively further a particular objective of the adversary[265]. This objective may be quite abstract in nature. Unfortunately, it is not necessarily the case that narratives[155] in the same campaign[150] will manifest any kind of detectable regularity. Indeed, they may well arrive at the desired high level conclusion by very different, and perhaps even disjoint paths. In the worst case for example, different narratives[155] or sets of narratives[155]

within the same campaign[150] are managed by different organizations, and will have very different characteristics accordingly.

Again to take a concrete example, from "Conclusions of 2019: National Poll by Democratic Initiatives Fund jointly with Razumkov Center" (https://dif.org.ua/uploads/pdf/11959295625e040cd8aca726.53964640.pdf), following the election of Volodymyr Zelensky in Ukraine, a poll found that a noticeable majority of Ukrainians believed that corruption was either at the root of a variety of very different specific problems, or at the very least was greatly exacerbating them. Among the harder to believe examples, corruption was ascribed as a factor in Ukraine's inability to eject the vastly better armed Russians from the parts of the country that they are occupying. Other examples however were mainstream in this regard.

Yet in general those people polled were unable to provide even a single specific example of corruption. Whether or not this was the result of a Russian campaign[150], the result of effective political messaging in Ukraine or some other reason, it is great example of the type of abstract objective that a campaign[150] would have. Specifically, one could imagine that there was a campaign[150] whose purpose was to convince different target segments of the Ukrainian population—very different audiences[910]—that whatever aspects of their national situation that were upsetting them the most were largely the result of corruption. The individual narratives[155] for such a campaign[150] well might have been created by different groups of people who either/both had relevant domain knowledge and/or were of the same demographics as the particular target audience[820]. At any rate, this would make it much harder to detect as a unified campaign[150] were it the case. Thus most embodiments will attempt to use indirect or artifactual methods to group narratives[155] into campaigns[150].

In face of such large practical difficulties, most embodiments will endeavor to group narratives[155] together into campaigns[150]—or at least into logically-related groups—according to a multi-evidence model of their choosing. This model will generally include artifactual analysis but may also add other dimensions. The different evidence vectors [20755] used by different embodiment may include, but are not limited to:

Detection of regularities in the reactions of the one or more target audiences[820] to different narratives[155]

Detection of regularities in the transmission patterns among different narratives[155]

An unusually quick or high degree of change in attitude about the same topic[165] across different audiences [910]; many embodiments will impose their own metrics and requirements for what counts as sufficiently different Reuse or templating of content across narratives[155]

Lexical or other fingerprinting techniques that suggest that the same identities[220] are creating the narratives [155] in question.

Co-referencing of most or all of the different narratives [155], for example articles[11080] that reference N of these narratives[155]

It should be noted that there's no guarantee that any resulting groupings of narratives[155] will correspond to what the adversary[265] specifically construes as a campaign[150], but the groupings may nonetheless still have analytical value, as by definition the narratives[155] in question will be related in some way. Indeed, the aim is to identify logically sensible sets of related narratives[155] with respect to apparent high level purpose rather than to try to read the adversary's[265] mind. It should be noted that there is also no guarantee that campaigns[150] will be logically distinct from one another, which further complicates any computational partitioning.

In part for this reason, most embodiments will allow a human operator[250] to create a campaign[150] object and either (or both) specify narratives[155] that are to be assigned to it and/or any rules to assign narratives[155] to the campaign[150]. If intelligence becomes available as to the particulars of a given campaign[150], this allows the system[105] to profit from it.

Strategic Dispatch System (SDS)[50000]

The overall goal of the SDS[50000] can be thought of as maximizing the ROI of the Ukrbot instances[110] across the domains that are being monitored by the targeting system [10000]. Specifically, the SDS[50000] tries to distribute the resources that it has available to maximize the costs of different kinds inflicted on the adversary actor[280] across the set of all contested channels[140] or other electronic ecosystems[915]. To this end, most embodiments will calculate the expected ROI and other cost/profit-related metrics from a Ukrbot engagement[125] prior to deciding to launch it, and calculate the actual observed values after the engagement[125]—and any tail effects from it—has concluded so as to allow for optimization over time.

Almost all embodiments will incorporate cost[375] assessment in most of its operations, and also estimate the operation's impact on the adversary's[965] cost[375]. Many embodiments will separately consider the concept of ROI (X dollars spent in order to achieve a concrete estimated cost inflicted upon the adversary[265] of Y dollars) and gain [50455] where gain[50455] measures either only "soft" inflicted costs such as reputation damage to the adversary [265] or a combination of soft and hard costs[375], depending on the exact embodiment. It should be noted that either of the metrics could be a negative number in theory.

The SDS[50000] can properly be thought of as a technical targeting system insofar as it is targeting and executing on targets[50425]. However the scope—and generally specific identity—of the targets[50425] is being selected for it by the targeting system[10000]. An analogy would be that the SDS[50000] is lower in the command chain than the targeting system[10000] and so is left the task of determining which of the bad guys it was assigned to try to shoot in which order, rather than to assess who—or where—the bad guys are, or how important they are in the big picture.

In most embodiments, the main activities of the SDS [50000] are as follows:

4. To reprioritize the targets[50425] provided by the targeting system[10000] if appropriate, factoring in considerations such as the available resources of different kinds
5. To package optimal Ukrbot engagement[125] components according to the constraints which include staying within the provided budget[50450] for each target [50425] that is pursued, according to considerations which include the set of targeting reasons[50445] provided, prior knowledge of the particular target[50425], the characteristics of the audience[910] in question, the available collateral[50040], and the up-to-date activity on the channel[140] or ecosystem[915]
6. To launch and recall different kinds of Ukrbot instances [110], thus starting and ending engagements[125]
7. To provide a means of managing the Ukrbots[110] including cases where human operator[250] intervention is desirable or necessary, and also identifying these cases 8. To gather reporting metrics and other statistics to improve future system performance.

SDS System Overview

Figure 48:
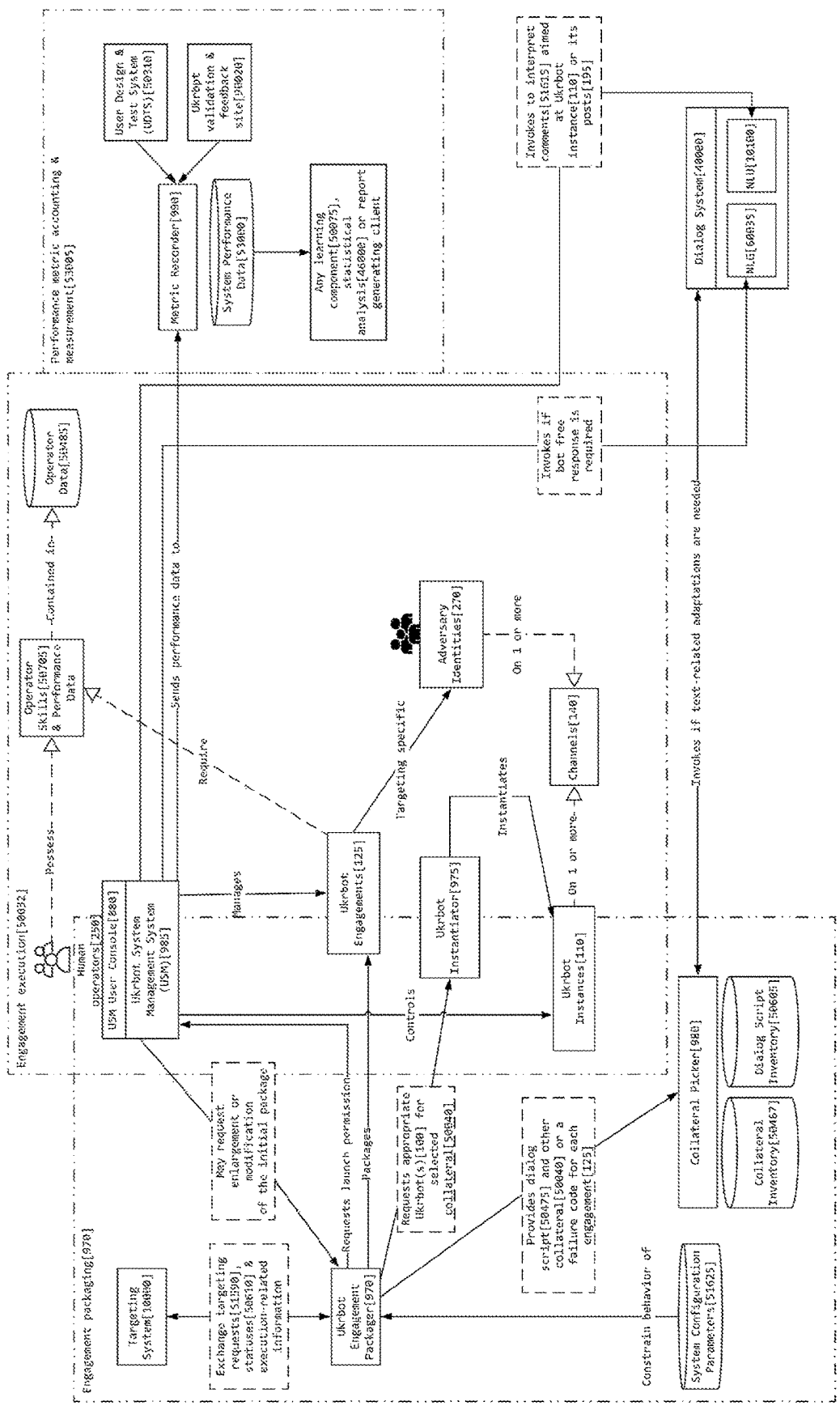
FIG. 48 is a block diagram illustrating a system architecture of most embodiments of the Strategic Dispatch System (SDS).

In most embodiments, as depicted in FIG. 48, the main subsystems of the SDS[50000] are as follows:

- Ukrbot Engagement Packager[970]: Responsible for accepting the targeting requests[50435] from the targeting system[10000] and assembling engagement packages[50030] within the constraints specified by the system parameters[51625] if possible. When not possible, it is responsible for prioritizing effectively conflicting engagements[125] and, in most embodiments, generating Ukrbot System Management Console[880] alerts in the event that a targeting request[50435] cannot be honored with a window of time specified in a system parameter[51625]. It also requests final engagement[125] launch permission from the USM [880], and will deal with any engagement[125] modification requests from the USM[880].
- Ukrbot Instantiator[975]: Responsible for instantiating the one or more Ukrbot instances[110] needed for a specific engagement[125] including but not limited to any customizations appropriate for the selected collateral[50040], updates to their appearance for security reasons or to reflect seasonality or current events.
- Collateral Picker[980]: Responsible for selecting all of the collateral[50040] that will be used in an engagement [125], which requires satisfying a large number of constraints to the extent possible.
- Ukrbot System Management System (USM)[985]: Controls the engagements[125], including initiating and terminating them, as well as causing and facilitating the transfer of control of a given Ukrbot instance[110] to and from a human operator[250] as needed; determining when a transfer of control to a human operator[250] is likely needed.
- Ukrbot System Management Console[880]: The application used by the human operators[250] and other personnel to manage the engagements[125] and to generate and view performance reports.
- Metric Recorder[990]: Records all of the outcomes of an engagement[125] including but not limited to: the assessed outcome[720], actual costs[50005], estimated actual costs inflicted on the adversary[265], number of users[220] engaged in supporting the Ukrbot[110], and the number of users[220] likely influenced. In some embodiments, the metric recorder[990] will be within the SDS[50000] system boundary.

Also, in some embodiments, the Security Subsystem [50085] will be considered to lie within the SDS[50000] system boundary. In most embodiments, the SDS[50000] also interacts significantly with other system[107] components specifically the targeting system[10000] from which it receives targeting requests[50435] and provides a backloop of feedback, the metric recorder[990] to log and analyze system performance data, and the dialog system[40000] for a variety of NLU and NLG tasks.

Although the incremental computational cost of each additional Ukrbot instance[110] will be quite negligible in the majority of embodiments, resources such as good, situation-dependent comic dialog for the Ukrbots[110] to use do have a cost—both a cost of creation[375], and a cost of use[380]. Simply put, most jokes become less funny each time they are told, especially if told frequently, and that is no less true in this scenario.

Using similar logic, oversaturation of Ukrbots[110] will be considered undesirable by most embodiments for a number of reasons, starting with the fact that few people will be so eager to stop to watch a show that seems to be on whenever they look. Therefore most embodiments will choose to calculate measures of Ukrbot saturation level [50185]. Because such saturation[50185] is largely a per-user[220] consideration, most embodiments will assess saturation level[50185] for different units. As pictured in FIG. 7=Locations, these include, but are not limited to the following, which will be collectively referenced for brevity as a "location" [405]:

- 5. Medium[135]: Any electronically accessible medium in which users[220] may interact with one another.
- 6. Channel[140]: A specific area or group within a medium[135] in which particular topics[165] or interests are discussed.
- 7. Channel Group[145]: A set of channels[140] with significant crossover in one or more of audience[910], topics[165], or cross-references.
- Ecosystem[915]: Any grouping of channels[140] or media[135] that share either/both a substantial amount of audience[910] or which have substantially overlapping audience[910] demographics.
- Community[935]: An interconnected group of users[220] the interconnectedness of which is assessed by graph calculations in the targeting system[10000]. While not literally a location[405] per se, communities[935] will often have one or more locations[405] that are largely their own. In other words, communities[935] are a means of referencing locations[405].
- (National) Information space[90075]: This essentially refers to the Internet as it pragmatically exists in a given country
- Per-user[220]: If the medium[135] facilitates it, calculating how many times a given user[220] has likely seen a Ukrbot[110] within some period of time.

Most embodiments will allow more than one measure of time to be used for saturation level[50185] calculations. Examples include, but are not limited to: literal clock time, clock time spent on a relevant channel[140], number of posts in the channel[140] since the last appearance of a Ukrbot instance[110].

Many embodiments will also support a number of levels of granularity of saturation level[50185] calculation. One reason for this is the fact that Ukrbot instances[110] should not generally be seen as identical. There will be differences in a variety of appearance and behavior characteristics—as well the particular visual collateral[505] and comic dialog [50470] it uses. Users[220] might thus tire of one style of Ukrbot[110] but not another. Moreover, to the extent that users[220] are genuinely entertained by the Ukrbots[110], saturation level[50185] may not be much of a practical concern. For this reason, most embodiments will carefully track user[220] response by demographic not just to the Ukrbots[100] generally, but also to specific kinds and instances of content[185] used by the bots[110] so as to know when content[185] is starting to age, or when new content[185] isn't hitting the mark. Otherwise put, individual pieces of content[185] can also be said to saturate a given channel[140]. The best way to measure saturation level[50185] may also be medium[135]-dependent or audience[910]-dependent in certain cases such that even taking apparent user[220] enjoyment into account may not compensate for. One theoretical case of this would be a scenario in which there was an appreciable cost to the user[220] for each piece of content he viewed on a given medium[135]. Saturation level[50185] handling will be discussed further in a following section.

In most embodiments, the SDS[50000] will receive a continuously updated targeting list[51635] from the targeting system[10000]. Note that most embodiments will support multiple targets[50425] in the same targeting request [50435], assuming that the identities[270] in question are coordinating in the same location[405]. For each target [50425] on the list[51635], most embodiments will chose to provide information that includes, but is not limited to, the following: System-derived Targeting Attributes

- Target ID
- Target request ID
- Target Real Person Name(s)—Null if unknown
- Target User Handle(s) [User handle[340], channel[140]]
- Target Avatar Image(s)[275]: Image(s) used by the presumed adversary[265] for its accounts. Null if none are available; N if N are available
- Target Presumed User Type[50440] (usually one of: bot [255], troll[260], sock puppet[90090], unknown, useful idiot[295], or HVTAP[10290])
- Target Presented Demographics[242] (as available, for example alleged gender, profession, location, etc.)
- Target Priority[51720]: a value that provides a means for a human operator[250] to specify a fixed priority if needed. Used to designate a target[50425] that is considered strategic. This will often be a High Value Actual Person Target or HVTAP[10290]—in other words, a signed online identity that corresponds to a known person, for example a political figure or a journalist.
- Target Priority Reason[50455]: Depending on embodiment, either a free text description or a choice from a set of codes provided.
- Targeting Evidence Reason(s)[535]: At least one instance of one evidence type[540] that suggests that the proposed target[50425] should be considered a probable adversary[265]. In almost all embodiments, each such reason[535] will have a confidence level[51700], in many embodiments a strength[51705] level, and possibly other reason[535]-specific attributes.
- Target Interaction History[51820]: In most embodiments, a score that provides information as to the success/failure ratio of the particular adversary identity[270] against Ukrbot instances[110] in the past. In most embodiments, this will be based on the presumed actor[280] overall, not just the specific user handle [340]. In many embodiments, if experience is lacking with the specific identity[270] or actor[280], a different identity[270] that has the same or similar assessed sophistication level[51710] may be used as a proxy. It is used mostly to predict the probability that a human operator[250] will have to intervene to help the Ukrbot [110] and therefore the potential concurrent demands on human operators[250] with the needed skills.
- Target (Overall) Value[50430]: As calculated automatically by the targeting system[10000], based on the information it has available as of the last update; most embodiments will continue to update until the target [50425] has been invalidated (either because it disappeared, or had been targeted in error.) Some embodiments will incorporate the target priority[51720] field value if set. This value will be used in various cost and value related calculations including in most embodiments the budget[50450] that will be assigned to the engagement[125].
- Target Influence Level[60520] (per channel[140])
- Target ringleader status[50270] (per channel[140]) This variable is used to indicate whether there is a individual adversary identity[270] operating within the channel [140] either apparently by itself, or as the clear leader of a group of cooperating adversary identities[270] operating in the channel[140] during the same time interval, or whether the initially targeted adversary identity[270] is a more or less equal participant with other such identities[270]. If there is more than one adversary identity[270] concurrently active on a channel[140], none of whom have ringleader status, some embodiments may decide to confront more than one of the adversaries[965] concurrently, while others may decide to wait until a clear ringleader emerges. Different embodiments may handle this determination in different ways.
- Most Recent Triggering Content[995]: The most recent content[995] posted by the target[50425] that has been tagged as being tainted content[185], including the channel[140] on which it appeared. This will be used to assess the start of the window of opportunity for a Ukrbot[110] to respond. In some embodiments, it may also impact the selection and construction of the collateral [50040]
- Targeting Certainty[51500]—In most embodiments this will be a set of values. For example, there could be high certainty that the account[270] in question is a valid target[50425] but much lower certainty as to the interpretation of specific pieces of content[185].
- Sophistication Level[51710]: In most embodiments, a coarse-grained scale that evaluates the ability of an identity[270] to deal smoothly with a variety of situations. The higher the sophistication level[51710] of an adversary identity[270] the greater the probability that human operator[250] intervention in an engagement [125] may be necessary. Sophistication level[51710] is discussed in a subsequent section.<ADD SECTION NUMBER>.
- Budget[50450]: In most embodiments, budget[50450] is the prioritization mechanism for engagements[125] that compete for resources. In most embodiments, the budget[50450] for an engagement[125] will be determined based on the value of the target(s)[50425] and the opportunity for influence gain[50455] on the audience[910] at the location(s)[405] where the engagement[125] would take place. Some embodiments may also consider the potential gain[50455] from users[220] who would see content[185] from the engagement[125] reposted on other channels[140] or media[135]. Some embodiments may also factor in the nature of any tainted content[185], allocating greater budget for certain topics[165], including those classified as radioactive or toxic[185]. Many embodiments may choose to add variables that factor in considerations that include, but are not limited to: required ROI, risk of failure, and targeting certainty[51500].

User-Supplied Targeting Data

In some embodiments user[220] feedback involving the proposed target[50425] will be manifested in one or more additional target[50425] attributes. Most embodiments will allow users[220] to provide feedback on any identity[270] that operates on a channel[140] that is being monitored by the system[10000]. However, this is a complex issue since even known supporters[220] may incorrectly flag (or dismiss out of hand) a target[50425]—whether from honest error, or for example out of dislike/disapproval of another user[220]. And of course adversary identities[270] could coordinate to provide negative feedback about either random users[220] or supporters[51560] simply to overwhelm or mislead the system[10000]. Since Ukrbots[100] are themselves identities[220], in most embodiments this will also be a mechanism for users[220] to provide feedback on various aspects of Ukrbot instances[100]. Note that most embodiments will design feedback input UI's so as to try to separate user[220] feedback on the Ukrbots[100] in general from feedback on specific Ukrbot engagements[125], personae [115] or collateral[50040]. The general feedback in most embodiments will be processed by the NLU engine[10100] and then routed to the UDTS[90000] for the benefit of the HCI people.

Figure 49:
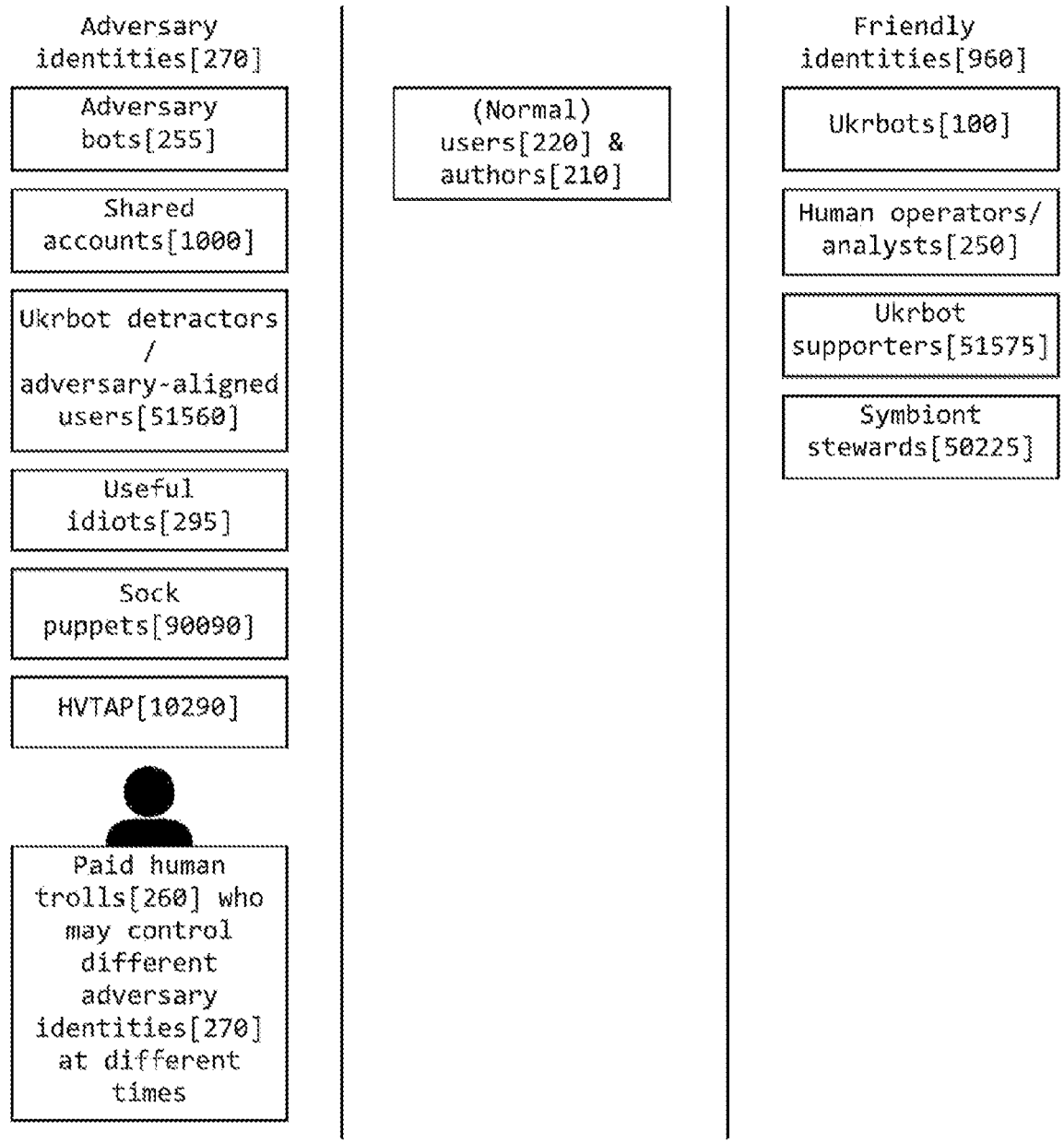
FIG. 49 is a block diagram illustrating the types of identities as categorized by a typical embodiment.

In part because various aspects of the user[220] providing feedback may be important for correctly handling the feedback, most embodiments will define an array of identity [270] types. These may vary by embodiment to some degree. However, as illustrated in FIG. 49, a default embodiment defines the following types of identities[270]:

Adversary Identity[270] Types:
Bots[225]
Trolls[260]
Shared accounts[1000] that may be shared among different trolls[260] or even among trolls[260] and bots[225]
Useful idiots[295] (in the intelligence sense of the term; someone who is being unwittingly manipulated to do the adversary's[265] bidding
Adversary[265]-aligned Users and/or Ukrbot detractors [51560]
HVTAPS[10290], or High Value Target Actual Person. This designation refers to a public figure in a given theatre of operation who is secretly under the control of the adversary[265].

Friendly Actor Identity Types:
Ukrbots[100]
Ukrbot supporters[51575], users[220] who have either/both shown support for the Ukrbots[100] and/or actively participated in an engagement[125] in some way Symbiont Stewards[50225]. These are a special type of Ukrbot supporter[51575] that act as a form of surrogate human operator[250]. Symbionts[50225] are explained in a subsequent section
SDS[50000] authorized users such as human operators [250], analysts[250] and system administrators[250]
"Average" user[220]: These are regular users[220] who either seem to manifest no strong leanings towards either the friendly actor or the adversary[265] or about whom little is known Most embodiments will not consider feedback that is being provided by adversary identities[270], as it will be presumed to be inherently untrustworthy. Conversely, most embodiments will assign a higher trust factor to feedback being provided by users[220] who are known Ukrbot supporters[51575] or better.

In most embodiments, the NLU engine[20760] will be sent and process both:

Any free text-containing feedback or reports from users [220] made through any available mechanism. In most embodiments, these users[220] may range from strong Ukrbot detractors[51560] or worse to human operators [250] and other friendlies. These will be treated very differently in most embodiments depending on the assumed trustworthiness of the reporting user[220]

Searches made, again through any available mechanism, that are attempting to validate a particular Ukrbot instance[110]. Often, this will be an attempt to determine whether or not a "real" Ukrbot[100] really said X. When such searches indeed match something said or done by a "real" Ukrbot instance[110], it can reasonably be construed as a form of negative feedback (at least the vast majority of the time.) Most embodiments will generate operator[250] alerts if the number of total queries about a particular engagement[125], Ukrbot persona[115] or specific collateral[50040] template or instance surpasses a preconfigured threshold.

The NLU Engine[20760] will attempt to parse each record it receives. In most embodiments, even if the text is unparseable, any other data (e.g. fielded and meta-data) will be logged, since (for example) a large number of such cases in a short period might signal a denial of service attack. If the data input mechanism associated with the specific record is such that it likely required a human to make the entry, some embodiments will accrue a cost to the adversary[265] for the cost of the time that it took a troll[260] or similar to go through the form and provide the feedback.

For records that contained interpretable text, that text will be added to the record and the updated record will be placed in the designated part of the data store. It should be noted that a single feedback record could conceivably contain several distinct pieces of feedback. As noted in FIGS. 50*a*, 50*b*, and 50*c*, at least three different tests will be applied to detect specific types or aspects of feedback. Many embodiments will have heuristics that cause certain combinations of user[220] type and comment characteristics to result in notifications being sent to the targeting system[10000] and/or to the UMC [880]. For example, a symbiont steward[50340] whose comment contains a reference to a spoofing attempt would like result in one or more notifications being sent in most embodiments. Lastly, the resulting data will be normalized in the usual way: fields that don't exist in a given entry format will have their values set to null, and search terms will be massaged and/or be swapped for the actual search result (if non-null.)

In most of these embodiments ordinary user[220] feedback will be used only in the case in which the account[270] in question was already considered a potential target [50425]. User[220] feedback to the effect that an identity [270] is in fact a valid target[50425] will, in most of these embodiments, raise the targeting certainty[51500]. In most embodiments, users[220] may submit other information, such as linking an unsigned account[229] to an identifiable human user. This type of further information will be treated similarly in most embodiments, which is to say insufficient on its own, but can tip the balance if the system[10000] had already accrued significant evidence of the fact on its own.

Most embodiments will not treat multiple ordinary users [220] providing information on the same account[270] as indicative of the information being more likely to be true. This is especially the case if this occurs within a limited time window, the length of which would be specified in a configuration variable initially; some embodiments might also wish to use ML techniques as and if there is sufficient data available to do so. This is a necessary defense against the adversary[265] using this feedback capability to create chaos. In fact, some embodiments may decide to treat a surge of such feedback comments as evidence[535] that the identities[270] providing such feedback are either literally or essentially under the control of the adversary[265]. And so the feedback will be presumed to be untrue.

For similar reasons, most embodiments will not consider ordinary user[220] feedback to the effect that a particular account[270] is not a valid target[50425] unless such feedback is provided during or within a short window after a Ukrbot engagement[125] with that target[50425] and the targeting certainty[51500] was below a threshold provided in the system configuration. This is because asserting that an account[270] that isn't being publicly targeted is not a valid target[50425] is an unnatural, and therefore suspicious, thing to do.

However, most embodiments will treat supporters[51575] who are known to the system[10000] and especially symbiont account stewards[50340] quite differently, as it is assumed that at least deliberate sabotage is unlikely. In most embodiments, this will include cases in which the group of users[220] providing the same feedback about the same account[270] includes one or more known supporters[51575] along with ordinary users[220]. Even so, few of these embodiments will treat such feedback as fact. This is for the simple reason that coordinated disinformation[150] techniques are evolving so as to be increasingly subtle and complex. Any individual user[220] is likely to have a view of fairly limited scope, relative to a sophisticated targeting system[10000] that is monitoring a large number of media [135]. And of course user accounts can be hacked.

Different embodiments are likely to make different decisions in how exactly they weigh the feedback provided by supporters[51575]. This is because it will be in large part based on how much information is available about the supporters[51575] in question, either at a system design or individual user[220] level. As a general rule however, feedback provided by active symbiont stewards[50340] will be evaluated according to their record of engagement outcomes [720], and their feedback will given more weight than regular supporters[51575].

In the case of supporters[51575], most embodiments may allow assertions that a given user[220] is not a valid target [50425], without imposing any contextual restrictions. Note however that even in the case of supporters[51575], most embodiments will not treat multiple reports as making the feedback more likely to be true. This is because of the sheep or follower effect: once one supporter[51575] provides such feedback on a given user[220], other supporters[51575] are likelier to follow suit. (Note that different embodiments will provide different literal mechanisms for providing feedback, and that these mechanisms are likely to vary by trust level of the user[220] providing the feedback. This includes whether that mechanism is public or private. However, even in the latter case, some amount of informal chatter among supporters[51575] through other communication mechanisms should generally be assumed out of prudence.)

When there is conflicting user[220] feedback on the same account[270] with respect to whether or not the target [50425] is a valid one, in some embodiments this will create an exception[51715] that is placed in the human operator [250] review queue. A common exception to this is the case in which supporters[51575] are disagreeing with ordinary users[220]. In this case, most embodiments will choose to disregard the feedback from the ordinary users[220] unless the latter is more consistent with existing targeting evidence [535]. However, different embodiments may make different decisions on how to handle this case, as there may be peculiarities to the given theater of operations.

However for more detailed target[50425] information, such as trying to link an account[270] to a particular human—or multiple accounts[270] to the same troll[260], as noted above, most embodiments will see things as more nuanced. For one thing, in the majority of real world cases, such information, even if wrong, causes little harm. More harm would be caused if the targeting system[10000] is dissuaded from linking an account[270] to a particular HVTAP[10290], as this would result in an incorrect targeting priority[51720]. But even then, the target[50425] remains a target[50425]. For another, very arguably there is benefit in encouraging supporters[51575] to engage in some sleuthing about presumed adversary accounts[270]. Indeed, many embodiments may opt to gamify such activity. However, any conclusion that requires sleuthing is by definition at least somewhat non-obvious. Sometimes these conclusions will thus be wrong, Most embodiments will therefore just opt to store all such information that is provided.

Many embodiments will keep counters, for the case in which multiple users[220] provide the same "guess." Many will store the ID of the user[220] who provided the information, along with whether they are a supporter[51575], a symbiont steward[50340], etc. However, in most embodiments, this information will just be used as a "hint" to the targeting system[10000]. In most of those embodiments that allow most types of users[220] to provide free text reasons to support their hunch, the feedback will be placed in the human operator[250] review queue[50565]. In the event that there are too many such instances to manage reasonably, most embodiments will provide thresholds to filter against on values such as the target value[50430], and how correct the user[220] has proven to be in the past.

When the feedback being provided presumptively involves a Ukrbot instance[110], most embodiments will focus on filtering the feedback provided by regular users [220]; feedback from adversary identities[270] will be filtered out altogether, and feedback from symbiont stewards [50340] in good standing will not be filtered at all by many embodiments. In most embodiments, the system[10000] will first determine whether or not the feedback in reality relates to a Ukrbot instance[110] as opposed to some other identity [220] that can be located—or whether it is linkable to any identity[220] at all. In the case that a non-Ukrbot[100] identity is located and the comment is assessed as having a negative sentiment polarity[11065], most embodiments will flag a possible spoofing incident, and send a notification to the SDS[50000] accordingly. If it is positive sentiment [50510], there is no action to take. Likewise for the case in which the feedback doesn't seem to correlate to anything.

However, if a specific Ukrbot instance[110] can be identified, a notification will be sent to the metric recorder[990]. In most embodiments, the notification will contain any sentiment polarity[11065] tags and whether or not an NLU and/or NLG failure seems to have been the culprit. Most embodiments will enable this by implementing search filters that trap common references to such errors.

Content-related Targeting Attributes

Although Ukrbots[110] challenge other identities[270] rather than directly challenging content[185], content[185] is being targeted as much as the identities[270] are, and presumption of "badness" or taint flows in both directions between content[185] and identity[270].

Note that posts[195] and articles[11080] are both types of content[950] that differ only in their average length. Different embodiments will set the threshold for the number of tokens that divide the two classes of content[950]. In most embodiments, the distinction will matter only insofar as different NLU and text analytics techniques may be applied to content[950] in some cases based on the number of tokens that they contain.

Most embodiments of the targeting system[10000] will provide tainted content[185] attributes that include, but are not limited to, the following:

Content type(s)[945]: 1–N types of content such as text, image, video, sound clip, etc that are embedded or included, attached to, or in some embodiments linked to a root piece of content[950]

Language(s)[50495]: If text, sound, or an image containing text, one or more languages[50495] that appear; null if no language present Dialects(s)[50500]: Similarly, but for dialects[50500]

Sentiment(s)[50510]: Used in standard IR sense. Different embodiments as well as different configurations may opt to use different sets of sentiment[50510] tagging. In most embodiments, this will include a "null" sentiment[50510] for the case in which there is no evidence of any particular sentiment[50510]. Some embodiments will attempt to sentiment tag[51725] all content types, not just text. For example, an image or video may show someone crying, a sound clip may do similarly.

Topic(s)[165]: Used in the standard IR sense; any method of topic categorization may serve Narrative(s)[51510]: A story being promoted by the adversary[265], which may be presented in multiple parts. Narratives[51510] will typically contain a number of named entities, topics[165], a number of textblocks[10050] and imageblocks[11180] and evidence of sentiment[50510].

Textblock(s)[10050]: As in U.S. Pat. No. 10,445,668 B2, snippets of text that are sufficiently similar to one another that there is likely some ancestral or other relationship between them. In most embodiments, textblocks[10050] may be formed from audio tracks via speech→text mapping, or from text extracted from images[530], in addition to regular text. Null if no textblocks[10050] present.

Imageblock(s)[11180]: A similar concept as applied to regions of images[530], as described in "System and Method for Detecting and Analyzing Digital Communications," U.S. patent application Ser. No. 16/576,736, filed Sep. 19, 2019, herein incorporated by reference in entirety.

Taint reason(s)[187]: One or more evidence types[535] provided by the targeting system[10000] as to why the content[185] in question should be regarded as suspect. As noted elsewhere these range from purely "guilt by association" to inherent aspects of the content[185] itself, depending on the particular embodiment. However, many embodiments will choose to support the following evidence types for content[185]:

Text or image similarity match to officially issued propaganda and/or known disinformation. In most embodiments, this taints the content[[950].

Radioactive content[185], or expression of attitudes [51750] associated with the adversary actor[280]. Different embodiments will handle this differently with respect to the taint level that is produced. A default embodiment will consider the content[950] tainted.

Co-occurrence in postings, including threads and similar constructs, with content[185] that has been determined by the targeting engine[10000] to be tainted. Most embodiments will treat this as adding taint.

Similarly, but with respect to co-occurrence with content [185] that is suspicious—that is, is being assessed by the targeting engine[10000] but has not yet been labeled as "tainted." Most embodiments will treat this as adding taint, albeit to a slightly lesser degree.

Postings on the part of known adversary identities[270]. Most embodiments will determine taint level based on the number of such postings and/or on the targeting certainty of the identities[270] in question.

Postings that occur in the context of coordinated efforts. Most embodiments will determine taint level based on the number of such postings and/or on the targeting certainty of the identities[270] in question.

Taint strength[188]: In most embodiments of the targeting system[10000], most evidence types[535] will have the notion of strength[188] or a score[50250] rather than just being Boolean. Insofar as multiple evidence types [535] may often be at play to taint the same content [185], different embodiments will opt to combine these scores[50250] in different ways as best fits the properties of the theater of operations[11030]. However, in many embodiments it will not just be additive, since the more different types of evidence[535] are present to some degree in a given case, the taint[188] increases very substantially.

As noted in FIG. 51, in most embodiments some of the above taint reasons[187] are enough to make content [950] that is associated with them tainted. For example, if a piece of content[950] is virtually identical to either distinctly identifiable statements from official organs of the adversary[265] or to radioactive content[50200], in most embodiments it will be considered tainted without any further evidence being required. By contrast, the "guilt by association" taint reasons[187] will not be sufficient by themselves unless there are a good number of them in most embodiments. This is because nearly anyone can unwittingly post bad content[50200] from time to time; conversely, bad people may sometimes post untainted content[950].

However, few embodiments will require matches to be exact, as opposed to similar by whichever text similarity mechanism is being employed. Thus if the similarity mechanism being used gives a match of 70%, the taint strength would be 70% in most embodiments. Until/unless there is further evidence of taint, this would make the content[950] in question suspect, but not yet tainted[185]. However, different embodiments may prefer to use different levels of taint. A default embodiment will employ four: highly tainted (e.g. really repeatedly), tainted, suspect, and clean/no taint. Some embodiments will opt to assess taint level by determining the relative probabilities of the content[950] being posted or referenced by untainted identities[220]. Other embodiments may combine methods.

Content Interpretation certainty[51755]: In most embodiments, an aggregate measure of the confidence levels in the interpretation of all distinct pieces of content, of any type, that are present in the given piece of content[185]. Some embodiments may decide to assign a higher weight to content[185] that doesn't require additional navigation to see.

Marker(s)[5685]: Any specific markers[51685], or features that carry specific connotations, from the knowledge base[10270] that are present in the content in question, for example any grammatical constructions that suggest that text was machine translated.

Presumed Author[210]: The name or user handle[340] of an apparent author based on methods which include but are not limited to the following: explicit inline references to the author, textblock[10050] or other analysis that determines the authorship based on the first identifiable appearance of the content, lexical fingerprinting of relevant known adversary actors[280]. Failing any of these, the name or user handle[340] of the poster.

Named/Pictured Entities: As in the standard IR sense

Complexity[51780]: A measure of how much effort and conceptual complexity or domain knowledge is reflected in the content[185] as discussed further in another section. Most embodiments will heavily weigh assertions of causality; some embodiments will also seek and favor other specific types of relationships, for example those involving risks. Some embodiments may also factor in the notion of "perspective[51825]," as described in U.S. Pat. No. 10,445,668 B2.

Specificity[51785]: How much detailed, specific information is provided. Some embodiments will prefer to use ontological frame slot filling to measure for this for important topics[165] as described in U.S. Pat. No. 10,445,668 B2. However most embodiments will support measures of both syntactic complexity[51780] and inverse word frequency that they use in conjunction with specific references such as those to named entities and dates.

Novelty:[45100] A measure of the newness of the content [185], specifically the estimated effort that was needed to create it from any existing content[185] or from scratch. This is discussed further in another section. Complexity[45200] and novelty[45100] used in combination are a proxy in many embodiments for the adversary's[265] cost of creating the content[185].

Radioactive[50200]: An optional human operator[250] labeling of specific content[50200] considered so objectionable or toxic that combatting it is considered very high priority, regardless of other factors such as the size of the current audience[910]. In most embodiments, this may be specific content[50200] or one or more topic[165] specifications. In most embodiments, radioactive content will have its own query or classifier that is evaluated for accuracy over time. Note that most embodiments will consider this value to cascade down from a campaign[11175] or narrative[51510] object to any participating individual post[195]. It will be Boolean in some embodiments, though other embodiments may prefer to use an N-point scale. This is essentially a parallel attribute to target priority[50150] for identities[270].

The values of these attributes are used to determine whether the Ukrbot engagement[125] will be more focused on combatting the specific content[950], the behavior of the adversary[265]—or in some cases, equally aimed at both. However, in most cases, the idea is to attack the more attractive target. Consider for example that if someone were caught distributing very graphic terrorist content that promoted mass beheadings, the nature of the content is far more compelling and eye-catching than any amount of evidence as to the coordinated, repeated nature of its transmission. Likewise, the lengths to which the adversary[265] was willing to go to promote a petty narrative[155] can be far more interesting than the content itself.

Multichannel Targeting of Targets[50425]

It will often be the case that a target[50425] is concurrently active on more than one channel[140], such that a targeting request[50435] includes triggers[995] occurring on multiple channels[140]. In this case, most embodiments will select the channel[140] that is estimated to lead to the higher/est value outcome, assuming that there is a meaningful difference in value. This is especially the case if the channels[140] in question are related by channel group[145] or ecosystem[915], since in this case there is an issue of redundancy—and possibly of Ukrbot oversaturation [50187]. However, some embodiments may opt to pursue an N-channel[140] engagement—if they have in their collateral inventory[980] an appropriate dialog script[50475] for the situation at hand—for example, one that makes jokes about the need to chase the bad guy across different channels[140]. Otherwise put, most embodiments will try to treat such a case as a single engagement[125] spread over multiple channels[140] rather than as N separate parallel engagements[125].

In the event that the target[50425] is concurrently active on unrelated channels[140], more embodiments will be inclined to tackle it is an N-channel[140] engagement (rather than choosing the most advantageous channel[140]), with the aim of demonstrating to the presumably disparate set of users[220] that coordinated, inauthentic or other bad behavior is occurring in parallel elsewhere—the more different places the better.

The dialog scripts[50475] or templates[50477] used in such N-channel[140] scenarios will be designed for either the case of one Ukrot instance/persona[115] chasing the adversary identity[270] across the different channels[140], or for multiple coordinating Ukrbots[110], depending upon the specific embodiment—and, if available, user[220] testing data on which approach is more effective in a given theater of operations[11030].

Processing the Targeting Requests[50435]

Most embodiments will not assert an ordinal execution priority for each targeting request[50435] since in many cases there will be literally no trade-off cost between the Nth and the N+1th item on the targeting list[51635]. In most embodiments, the target request[50435] attributes provided will be rich enough that a number of different prioritization strategies can be applied via configuration by either the targeting system[10000] or the SDS[50000]—for example, expediting any targeting requests[50435] for which the currently available audience[910] is much more valuable than expected for the given day and time of day.

However, to the extent that there are targeting requests [50435] in the same list[51635] that would have indirect trade-off costs—for example, that they all may require the assistance of a human operator[250] with uncommon language or domain skills, or would pose bot saturation level [50185] risks—some embodiments may choose to specify an ordinal priority, especially within related sets of targeting requests[50435]. The availability of computing resources in any given situation may also influence this choice.

In most embodiments, unfulfilled targeting requests [50435] that are not temporarily deferred by the SDS[5000] will be either aged out automatically by the targeting system [10000] as it updates the targeting list[51635], or else updated with additional triggering behavior[50480] on the part of the specific target[50425], thus in essence prolonging the validity of the targeting request[50435]. In some instances, a targeting request[50435] may be withdrawn by the targeting system[10000] if it has subsequently been determined that a user[220] was incorrectly targeted as the result of something like incorrect human actor attribution for the account[229].

While the targeting system[10000] is designed to take a broad and comprehensive view of the information space [50010] it is protecting, the SDS[50000] has the job of determining what is practical and worthwhile to do in any given window of time. There are a number of different dimensions to this. These include, but are not limited to any of the following within the current time window: competition for the same resources, an inadequate or unfavorable audience[220], the particular adversary[265] either not being active, or posting clearly unobjectionable or irrelevant content, or inability to configure a sufficiently tailored bot engagement package[50030] based on available inventory.

Again to make a simple analogy, you don't want to take a bad shot now if a little patience will likely provide the opportunity for a much better one. It's not only a matter of wasting ammo—or in this case, content[950]—but rather that too many missed shots have a cost in the minds of the users[220] watching. Further, the more of a stretch any given targeting attempt[50447] is, the greater the probability that human operator[250] intervention will be required. This creates both additional cost and the opportunity for bottlenecks, which in turn ups the chances that a struggling Ukrbot instance[110] might just need to be recalled rather than requiring assistance from a human operator[250] to get to a good outcome.

Note that different embodiments may opt to make different system boundary choices with respect to assessing audiences[910]. In many embodiments, the targeting system [10000] will value the abstract audience[910], but the SDS [50000] will refine this value based on actual user[220] activity at the time that the engagement package[50030] is being assembled and prioritized. In other embodiments, a third system component may exist that concerns itself largely with this. By "abstract" audience[910], we mean either the audience[910] that is associated with the particular channel[140], channel group[145], medium[135] or ecosystem[915], or a comparable average day-and-time slice of the audience[910], depending on the particular embodiment. Since the adversary identities[270] are likelier to be more active during peak user[220] hours, these proxies may often be good enough. However, whether or not this is the case will often depend on the specific needs of the engagement [125].

For example, if a particular dialog script[50475] is crafted with the expectation of the participation of supporters [51575], in most embodiments the SDS[50000] will find it prudent to inspect the number of known supporters[51575] present on the channel[140] at the time that the engagement package[50030] is being assembled. If a sufficient number are present, the engagement[125] can be packaged with the script[50475] in question; if not, either another conforming dialog script[50475] must be used instead, or the targeting request[50435] will have to be put on hold or canceled. Such "micromanagement" will be left to the SDS[50000] in most embodiments.

Many embodiments will analyze new targeting requests [50435] in parallel. There is little loss of efficiency in doing so, since an optimal bot engagement package[50030] must be estimated for each targeting request[50435] before it is possible to know where there will be potential conflicts in resource needs or opportunity costs.

In most embodiments, once the targeting system[10000] has tagged a target[50425], the designation will be permanent except in those cases in which there was clear targeting error identified—for example, one arising from a case in which two totally unrelated people have the same somewhat unusual name, and one of the individuals was incorrectly targeted. However, if a targeted account[270] successfully responds to a Ukrbot challenge question[41600], the targeting certainty[51500] for the target[50425] will be reduced— but the target[50425] nonetheless still remains a valid target [50425]. This however is a largely theoretical point, since if the target[50425] stops behaving in a concerning way—or disappears altogether—no additional targeting requests [50435] will be made against it. (Note that while some embodiments may opt to just age out targets[50425] that haven't been on the radar for a long time, the observed fact that many accounts[270] go dormant between presidential election cycles for example but then reappear in time for the next one provides excellent motivation not to do this.)

By contrast, from the POV of the SDS[50000], to be valid a target[50425] must be currently active. This implies both that it is posting on one or more channels[140] and that it has an audience: as for any "performer," a performance requires an audience[910]. The reason for this is very simple: a Ukrbot engagement[125] requires an adversary[265] to confront. Otherwise it is a very one-sided conversation that will not be very interesting. Nor would it be at all natural from the standpoint of users[220] of a channel[140] to have a Ukrbot instance[110] show up days after the fact to retroactively challenge something.

To this end, most embodiments will support the notion of a reaction window[50090], or an interval from the latest triggering action[50345] within which a new Ukrbot engagement[125] may still be launched in relation to it. After that, it will be deemed too late, and the target[50425] will have to demonstrate additional triggering behaviors [50480] to be targeted again. Some embodiments will measure this reaction window[50060] in absolute time, while others will prefer to measure it by a number of intervening posts[195]; still others may use some combination of these.

Logically, the triplet of the target[50425], the audience [910], and the particular tainted content[185] being posted is what drives the SDS[50000] strategy for selecting the optimal bot engagement package[50030]. This is because a Ukrbot engagement[125] will be very largely wasted if the audience[910] is inadequate in size or inappropriate in composition. The Ukrbot[100] too requires an audience [910] to make giving a performance worthwhile—and an audience[910] which contains enough users[220] who want to see the show. The particular content[185] matters since, for example, there would be little profit in confronting even a clearly coordinated band of trolls who were currently extolling the benefits of exercise or fine weather. In the language of marketers, that's no way to get ratings.

Furthermore, in order to seem "intelligent" and natural, the Ukrbot[100] should explicitly respond to the tainted content[185]. This in turn requires a high degree of certainty that the content[185] was properly interpreted by the dialog system[40000], and that there is stored dialog[41100], collateral[50040] or some other available means of having the Ukrbot[100] respond in a contextually appropriate manner. Note however that in many embodiments, the importance of the Ukrbot[100] providing such a semantically appropriate response will be linked to the specific reason(s)[535] that triggered the targeting.

For example, if the primary evidence reason(s)[535] involved coordination[51690], or repeated transmission of tainted narratives[185], it could be considered entirely reasonable for the Ukrbot[100] dialog to focus on that fact. On the other hand, if the main evidence reason[535] at hand relates to the posting of specific bad content outside any history of coordination—content that has been identified by textblocks[10050] or other similarity mechanisms but which does not have a dominant parse—the success of a Ukrbot engagement[125] would be reduced and/or human operator [250] intervention will likely be required.

The practical need to optimize on the basis of this triplet within the constraints posed by available collateral[50040], allocated budget[50450], and human resources[51695] is generally what causes the SDS[50000] to dynamically reprioritize the targeting order. Contrary to the target system [10000], for the SDS[50000], it is the audience[910] rather than the target[50425] itself that is generally the primary focus. This is because, in most embodiments, a good part of the damage to the adversary[265] inflicted by a successful Ukrbot engagement[125] is a function of the number of users[220] who are made either/both more receptive to the Ukrbot[100] and/or more distrustful of the adversary[265].

Conversely however, just as an ill-considered ad can cause consumers to wish to avoid a particular brand, a Ukrbot engagement[125] gone south can alienate users[220].

While a preferred embodiment will use adaptive control system techniques, different embodiments may choose to avail themselves of different kinds of optimization techniques for determining which of the concurrently proposed engagements[125] will be executed when, and with the use of which collateral[50040], so long as the method selected seeks to do one or more of the following:

- Optimizing the gain w.r.t. users[220] who are measurably changing their behaviors or views in a favorable way
- Maximizing the direct cost[50005] to the adversary actor [280]
- Optimizing the ROI with respect to cost[50005] of the engagements[125] vs estimated costs[50005] inflicted on the adversary[265]
- Optimizing the aggregate ROI of the engagements[125] including influence exerted, which is to say the difference between the gain[50455] and the estimated costs [50005] that will be inflicted on the adversary and the total cost[50005] of the engagements[125] in question, where the gain[50455] is determined by assigning a dollar value to each user[220] state change.

Audience[910] Attributes

The notion of an audience[910] is an inherently quite complex one in our context. This is in part because what exactly is knowable about the members of the audience[910] is unavoidably very specific to the individual medium[135] in many of the details. The reliability of the information also differs by medium[135]. However, at the end of the day, under our definition, an audience[910] is composed of human users[220], most of whom regularly—and concurrently—use multiple different media[135] and specific channels[140] in their areas of interest. Furthermore, few media [135] are islands unto themselves, so users[220] are exposed to bits of content from far more media[135] and more channels[140] than they actually directly use. And of course within a particular medium[135] there can be many channels [140], including overlapping and quite similar ones, the content[950] from which often will not remain distinct in the memory of the users[220]. Thus there is no neat hierarchy of users[220]—or even content—by channel[140].

Each medium[135] will have its own definition within the system[10000] of what it means for a user[220] to be engaged on it at any given point in time. By "engaged" in this context, we mean that there is at least a reasonable chance that they are at least scanning the posts[195] within an administrator-specified time window of when they were made. Note that almost all embodiments will opt to provide their own definitions for audience[910] measurements wherever possible since many of the media[135] are incented to lie or at least exaggerate in this regard.

Unfortunately, it isn't trivial—and in some media[135] not even possible—to get an accurate idea of the number of engaged users[220]. The viewing on and off, flipping back and forth nature of online media[135] usage means that one can only estimate how many users[220] actually saw a given thread, post[195], etc.; glancing quickly at a crowded window that only occupies part of a computer screen does not necessarily imply actually seeing for example.

Of course actual participants in a thread or similar can be presumed to have at least read portions of it; those who create artifacts such as "likes" etc. can be treated similarly. But on many media[135], passive users[220] probably constitute the majority. Some of these passive users[220] are paying close attention, while others are just flitting around.

In cases in which content from a relatively low traffic channel[140] or medium[135] is prominently referenced on a much higher traffic channel[140] or medium[135], the number of such "indirect" users[220], the vast majority of whom will be passive, is very likely to dwarf the total number of users[220] who were present in the original channel[140]. Thus just tallying up the active users[220] won't yield any kind of accurate idea.

Much as is true for advertisers, all users[220] of a medium[135] are not of equal value here. Most embodiments will thus support the notion of a user value[50145] that is distinct from user influenceability[50555]. In these embodiments, the idea is users[220] with particular demographic attributes[242] and/or certain types of measurable, exhibited behaviors may, for whatever reasons, be considered of higher value for the Ukrbots[100] to connect with. For example, a user[220] who is influential in a standard SNA sense across a number of different media[135] is, all other things being equal, more valuable than a user[220] who lacks such influence. The user value[50145] variable allows this differential in perceived value to be expressed.

Since such user[220] demographic value assessments are highly situational, and arguably subjective, almost all embodiments leave the system administrator[250] to determine the set of demographic attributes[242] and to provide values according to demographic attributes[242] of each individual user[220]. By default in most embodiments, the user value[50145] of an individual user[220] is the sum of the user values[50145] assigned to each demographic attribute[242] value. For example, a virologist might be worth $10, being a resident of a certain area might be worth $1; a user[220] who is both would have a user value[50145] of $11, assuming no other demographic attributes[242] had values assigned to them. However, most embodiments will allow more complex rules if desired. It should be noted that most embodiments will not assume that the user value [50145] for a given identity[270] is static. It can change because more information is available about the identity [270], because the administrator-assigned values[242] have changed, or because the user[220] has changed his behavior in some way.

By contrast user influenceability[50555] is a variable intended to express the probability that an individual user's [220] susceptibility towards particular kinds of disinformation or manipulated beliefs can be changed. Otherwise put, the value of achieving a particular result has nothing to do with the probability of actually achieving it: indeed these two things are orthogonal. Some embodiments may however decide to combine the two variables under the idea that, for example, a low probability of being able to modify a user's[220] views by definition makes her less valuable. Those embodiments who keep the two variables separate will require user value[50145] calculations to exclude measures related to influenceability.

Many embodiments will not consider users[220] who are already supporters[51575] to be influenceable under the above definition. Those that do will consider it in a negative sense, meaning that a supporter[51575] could be misled or manipulated by disinformation. In most embodiments, users [220] who are neutral or worse but are estimated as possibly being influenceable are the most sought after ones—and of course better still if they also have a high user value[50145].

That said however, most embodiments will consider it important to have a certain number of supporters[51575] active in a channel[140] in many circumstances, whether absolute or relative, so as to make it well suited for a Ukrbot engagement[125]. In particular, it will depend largely on the specific dialog script[50475] that is being used, which of course is also a function of the available budget[50450]. For example, as elsewhere noted, some dialog scripts[50475] will be constructed for supporters[51575] to play certain supporting roles. Certain dialog scripts[50475] could even be written for an overwhelmingly hostile audience[910]. However, such a hostile audience[910] makes success, or the exertion of influence much more difficult to achieve even for a skilled human operator[250], much less a Ukrbot[100].

This is especially the case when dealing with more difficult adversary identities[270], such as those identities [270] or actors[280] that have caused Ukrbot engagement failures[50460] or required human operator[250] intervention in the past, adversary identities[270] which have gained influence according to any type of SNA, or identities[270] which are of unknown adversary type[265]. In these cases, having a network of supportive users[51575] can both favorably alter the engagement outcome[720], and keep the cost of the engagement[50005] lower by minimizing, or avoiding altogether the need for human operator[250] intervention.

Most embodiments will determine user influenceability [50555] with standard machine learning or similar techniques. However, until sufficient data has been aggregated to make this a realistic possibility, most embodiments will determine user influence-ability[50555] by using the observed degree of homogeneity of viewpoint (e.g. topic [165]/sentiment[50510]) across the channels[140] where that user[220] is active or engaged, depending on the exact embodiment, as a proxy. Most embodiments will avail themselves of data from the User Design & Testing System [90000] (UDTS) for this purpose, not just data from full public operation. Many of these embodiments will choose to assign the UDTS[90000] data a higher weight in influence-ability calculations. This is due to the fact that the UDTS [90000] data should be more reliable in terms of things like user[220] demographic information[240], and that additional types of measurements are available for test users [220].

Influence Model[51875] & User States[50315]

Of course influence must have a means of being measured, and influence has many different dimensions; obtaining influence over someone in one dimension often does not imply the ability to do it in others. Furthermore, only some dimensions of influence are important—or even interesting—to measure in any given case. Complicating matters further, the means of measuring when influence has been attained is cultural-specific. For these reasons, almost all embodiments will make use of an influence model[51875]. This is a definition of the following:

Which attitudinal dimensions[50335] are worth measuring

How many user states[50315] will be defined along each dimension[50335]—that is, how many points on the scale How arrival at each of these user states[50315] will be measured. For example, in the case of an election, a distinction might be made between a post[195] that says "I'm thinking of voting for Candidate X" and one that asserts it with certainty—and one that indicates being undecided altogether. This unfortunately will often be medium[135]-specific owing to differences in what can be measured in different media[135]

What the value of a user[220] of given demographic type(s)[242] arriving at each state[50315] from the N previous states[50315] is; in most embodiments, if a user[220] reverses course, that same value is subtracted. This may be expressed in some embodiments as a constant multiplier on the overall user value [50145] except in special cases in which a small number of demographic types[242] may have greatly outsized value, or in which many different demographic types[242] have quite disparate values.

A very simple example of an influence model[51875] in such a circumstances is that for an election; one with a single dimension is depicted in FIG. 52. FIG. 52 takes the example of two types of voters, a college student and a 40-50 year old professional. While each of these can presumably only cast one vote, each of these two classes is likely to contribute different other types of value to the campaign. For example, a college student is far likelier than a professional to volunteer to canvas neighborhoods; a professional is likelier to make a meaningful financial donation. Thus the value of a user[220] of one type demonstrating a particular observable/measurable behavior that indicates that they have moved to a different (positive from the POV of the candidate) user state[50315] can differ greatly from a different demographic of user[220] doing so. The key point is that arrival at a new user state[50315] is clearly measurable, even if the fidelity of the measure is not optimal. These are intended to be estimates, rather than exact figures. In most embodiments the calculations for the influence model [51875] will be performed by the Metric Recorder[990]; other embodiments may choose to place it elsewhere.

Each instance of the system[10000] will require its own influence model[51875] as each theater of operation will have its own needs. The model will be created by analysts [250], however most embodiments will provide plugins to the Ukrbot Management System Console[880] to aid them in the task by proposing some standard dimensions[50335] and assessing existing user[220] behavior data in order to determine which types of measurements are practical (e.g. the measured actions actually occur in reasonable quantities.)

Different embodiments may choose to make different choices with respect to defining both the relevant dimensions[51790] and the set of possible discrete user states [50315] within each dimension[51790], both in terms of what exactly these states[50315] are and in their exact definitions per medium[135]. Different dimensions[51790] and user states[50315] may be defined for different types of media[135] in some embodiments, owing to limitations in what kinds and levels of detail are available from different media[135].

A dimension[51790] that will be supported in almost all embodiments is that of "Ukrbot supporter↔detractor." Typical user states[50315] for this dimension[51790] include, but are not limited to, the following:

Ukrbot super supporter[51650]: A user[220] who frequently cites, reposts and otherwise positively references elements of Ukrbot engagement packages [50030] and/or assists Ukrbot instances[110] either in interpreting an adversary[265] post[195] and/or in helping to attack an adversary[265] that a Ukrbot instance[110] is in the act of challenging. Different embodiments will set their own threshold for what qualifies a supporter[51575] as a "super supporter" and use different weights and exact models.

Ukrbot active supporter[51655]: A user[220] who has demonstrated support for the Ukrbot[100] more than once, but less than the threshold required to be considered a super supporter[51650].

Ukrbot passive supporter[51660]: A user[220] who does none of the above things a sufficient amount to be considered as "active," but either/both takes supportive single click actions, such as "liking" content and/or (if knowable on the given medium[135]) a user[220] who repeatedly becomes engaged once a Ukrbot engagement[125] has started on a channel[140] of which they are a user[220].

Strongly supports the friendly state actor[960]: Unrelated to the Ukrbot[100], the user[220] has either/both frequently created, reposted, or favorably referenced content that supports the friendly state actor[960] and/or is a user[220] of multiple channels[140] in which users [220] significantly are favorable to the friendly state actor[960]. SNA analysis may also be brought to bear. Some embodiments may also consider the channels [140] that the user[220] frequents, for channels[140] that have a strong orientation on a relevant dimension.

Leans towards supporting the friendly state actor[960]: Similarly, but with even fewer, less frequent supportive actions.

Neutral/unknown: No clear opinion or views on relevant areas expressed.

And the opposite states:

Leans towards supporting the adversary state actor[965]

Strongly supports the adversary state actor[965]

Ukrbot super detractor[51665]

Ukrbot active detractor[51670]

Ukrbot passive detractor[51675]

Other common dimensions[51790] will include (but certainly are not limited to) those for opinions on specific issues, people or entities, for example, a political candidate, a ballot measure, or a country. The different dimensions [51790] defined need not be orthogonal and generally will not be. This does not mean however that they are redundant. For example, someone could be for a Russia-free Ukraine, but find the Ukrbots[100] to be annoying.

Most embodiments will allow a separate value to be either specified or calculated for each possible—or at least each common—state change[50320] based on the attributes that they define for users[220]. These values will be defined for each dimension[51790]; the value of influencing users[220] with different demographic attributes[242] varies widely with the matter at hand. For example, influencing the opinion about Covid-19 mutations of a virologist at a well known medical institution has a much higher value than influencing the opinion of a college student if the dimension [51790] in question relates to the government handling of Covid. Most state transitions[50325] can be assumed to be to from the Nth to N+1th state[50315] (or N−1th) but this is not a restriction and there will be exceptions.

To arrive at the estimated audience value[50105] for a potential Ukrbot engagement[125], most embodiments will first compare the current level of user[220] activity observed on the channel[140] in question to a comparable time-sliced view of the activity of that channel[140]. It will also extrapolate the current audience[910] to the audience[910] for the full window in question. In most embodiments, the length of the window will be max(predicted length of time of adversary[965] appearance in channel[140] if no Ukrbot engagement[125], predicted length of time of the Ukrbot engagement[125].) In other words, from the SDS[50000] POV, only the current window of time is relevant. If for whatever reasons, the audience[910] is unusually small on the given channel[140] or medium[135] for the particular time and day, all other things being equal, it's not the optimal time to launch a Ukrbot[110]. Better to wait for another day: the adversary[265] likely isn't going anywhere.

If the audience[910] size or value[50105] can be expected to markedly increase within a time window that the relevant adversary[265] is still likely to be around in, the SDS [50000] will attempt to reschedule Ukrbot engagement[125] with the appropriate time offset. If not, usually the SDS [50000] will notify the targeting system[10000] that it is deferring the targeting request[50435] with an appropriate deferment code[50330]. The main class of exception to this would come from either highly radioactive content[185] being at issue, or similarly an especially high priority target[50425]. Almost all embodiments will also support a human operator[250] override.

In most embodiments, the estimated value of the audience [910] is determined by the sum of the value of all user state changes[50320] that can be expected on the basis of execution of the engagement[125]. Most embodiments will calculate this estimate based on probabilities. By "execution" we mean literally that the engagement[125] is fully executed, and that whatever content[950] was supposed to be posted for it was, not necessarily that the engagement [125] has a successful outcome[50537]. However, some embodiments may only include the notion of user value [50145] based on the assignment of value to different user attributes[240] while ignoring their influenceability. Other embodiments may define the value of a user[220] as the sum of the values of all positive state transitions[50325] for a user[220] of those particular characteristics. Still others will factor in the probabilities of a user[220] of that type reaching a particular state[50315]. Note that since it is possible for engagements[125] to backfire, negative values are theoretically possible. Subsequent to the end of each engagement [125], the actual audience value[50105] will be re-estimated for purposes of future optimization.

But audience[910] size or value[50105] are not the only important considerations. For example, a large audience [910] which contains no supporters[51575] and indeed only strong detractors[51560] may not be deemed a good investment of even incremental resources by many embodiments. Thus most embodiments will make use of the user influenceability[50555] variable, though not necessarily all in the same way.

Some may require a certain threshold percentage of users[220] present in the audience[910] to be considered as potentially influenceable. Others may do this on the basis of user value[50105] rather than just raw number of users[220]. Still others may only choose to factor in user influenceability[50555] in their cost of engagement[50005] calculations, with the rationale that a purely—or even largely—hostile crowd increases the probability of human operator[250] intervention being required, which may delay the launch of an engagement[125] until operators with the right skills are sufficiently available, or require the budget[50450] for the engagement[125] to be enlarged.

Charge

Many embodiments will implement the notion of charge [51677] to characterize significant movements of users[220] to different user states[50315] within a given audience[910] within a bounded time period. A high charge[51677] is manifested by a significant number of unusually rapid user state[50315] shifts on a given channel[140], analogous to electrical current polarizing magnetizable particles in different orientations in an electromagnetic field.

It should be noted that in the vast majority of cases, an individual trigger for changes in user states[50315] will not be identifiable—if indeed there even were a single trigger. In reality what will generally be measured is correlation with Ukrbot[100] (or adversary identity[270]) activity rather than causation. In other words, channels[140] where Ukrbot instances[110] have been very active will hopefully show a significant number of positive user state[50315] changes in comparison to comparable channels[140] in which they have not been active. This will be referred to as evidence of positive "charge" [51677], and high charge[51677] if these changes are unusually rapid. By "rapid" we mean that users[220] who change user states[50315] are traversing multiple states[50315] quickly, or even apparently jumping directly from the Nth state[50315] to the Nth+2 or greater state[50315]; that is, no evidence is detected of them passing through intermediate states[50315] according to the definitions in the influence model[51875]. Different embodiments may use their own definitions for how to assess how many users[220] changing user states[50315] within a given time period, and how many states[50315] they are traversing is enough to assert that a charge[51677] is being applied, and at what point it becomes a high charge[51677].

Most embodiments will also look for indirect evidence of successful adversary[265] activity on a given channel[140] in this same way: an unusual number of user state[50315] transitions in the "wrong" direction, or apparent negative charge[51677]. An observed high negative charge[51677] on the channel[140] in question will be treated as a cost/budgetary consideration in many embodiments, as this increases the probability of human operator[250] intervention being required in the engagement[125].

Most embodiments will also support one or more targeting reasons[50455] to catch the case in which the adversary's[265] activity is not primarily directed at any of the dimensions[50335] that are being measured, but is rather creating a high degree of polarization within a location[405] and/or significant fragmentation of the existing social network structure. This will often coincide with new topics [165] or narratives[155] being introduced that take hold in an audience[910] that previously had been generally getting along with one another. While not disinformation per se, this is a particular type of mischief of interest: divide your enemy amongst itself in as many pieces as possible. In most embodiments, a high negative charge[51680] will be considered an addition risk—and hence cost—factor for launching an engagement[125] on that channel[140]. Different embodiments will use different combinations of link types in constructing the graphs to be versioned for this purpose. These may include but are not limited to:

- Links for continued communication or reference among the members of the audience[910]
- Links for increased communication or reference, likewise
- Negative weight links for decreased communication or reference, similarly
- Negative weight links for insults and ad hominem attacks, which in most embodiments will be captured by one or both of queries for different classes of ad hominem attack and MIL methods. These classes may include, but are not limited to: "tu quoque", abusive ad hominem, genetic fallacy, circumstantial ad hominem, and "poisoning the well."
- Links for indicating agreement, captured as in the just-prior point Gross changes in a particular channel[140] that significantly exceed the level of such change in other roughly comparable channels[140] during the same time period will be treated as indirect evidence of some kind of adversary[265] activity by most embodiments. Note that it is important to measure during the same time period, since periods of great unrest, such as the weeks immediately following 9/11, may produce this effect organically. FIG. 53 shows abstract examples of polarization and fragmentation respectively.

Engagement[125] Packaging

In most embodiments, in most instances, contention for use of the best/newest collateral[50040] and human operator [250] resources will by default be determined primarily (if indirectly) by the audience value[50105], factoring in influenceability[50555] in those embodiments that choose to do this. This is based on the logic that the greater the value of the particular audience[910], the greater the damage sustained by the target[50425]—and hence the state actor adversary[965]. Otherwise put, the damage to the target [50425] is mostly a function of influenceable user[220] perception of it. Thus changing the perceptions of a small, low value audience[910] won't hurt the target[50425] much, though it can still inflict some small incremental cost to the adversary actor[965]. Nonetheless, with roughly comparable audiences[910] between two potentially contending targeting request[50435], a higher value target[50425] one will prevail in almost all embodiments because the targeting system will accordingly assign it a higher budget[50450].

Figure 54:
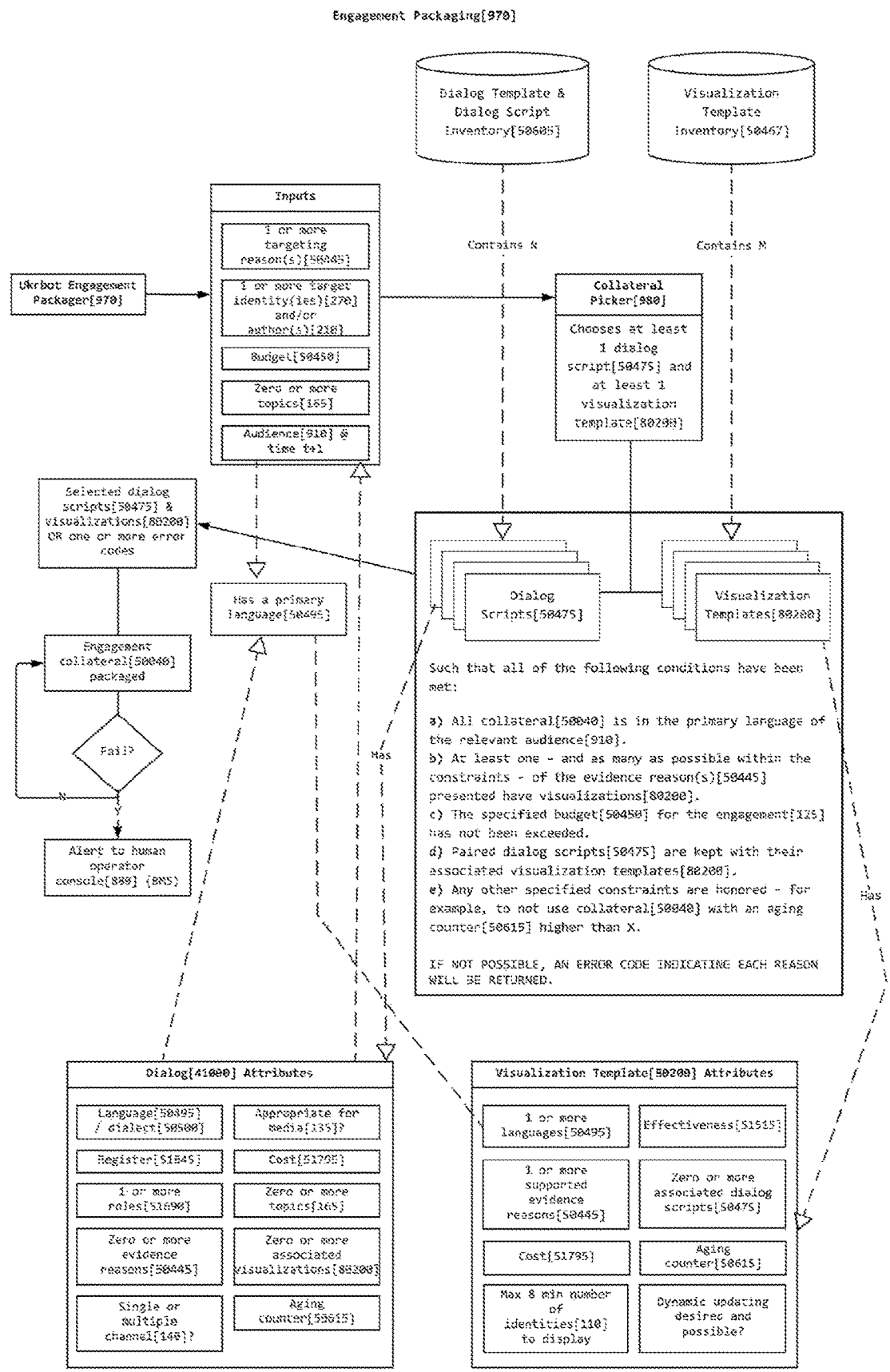
FIG. 54 is a set of block diagrams showing an embodiment of Ukrbot engagement packaging.

This process is illustrated in FIG. 54. The Ukrbot Engagement Packager[970] receives targeting requests[50435] from the targeting system[10000]. It may adjust the value of certain parameters as is discussed later in this section based on various SDS[50000] state considerations. It will then pass any parameter values that relate to the selection of dialog scripts[50475] and other accompanying collateral [50040] to the collateral picker[50468]. The collateral picker [50468] has the task of identifying the best collateral[50040] that meets the specified constraints for each potential engagement[125] currently in the processing queue. In most embodiments, this is an iterative process, owing to possible contention for collateral[50040]. Once the packages[50030] for a current batch of engagements[125] have been finalized, in most embodiments the NLG component[60035] will be passed the dialog script(s)[50475] and any other text-bearing types of collateral[50040] so that their dialect[50500], register[51845], tone[50502], style[51645] and potentially other linguistic aspects can be optimized for the target audience[820].

It should be noted that in most embodiments, any preset operating logic with respect to launching or prioritizing Ukrbot engagements[125] can be directly overridden by either a human operator[250] with sufficient permissions, or by setting the radioactivity[50430] or high priority value for a given piece of content[185] or the priority[50150] of a target[50425]. This flexibility will typically be provided because it is impossible to factor in every possible situation into the system operating logic, no matter how complex it is.

Figure 55:
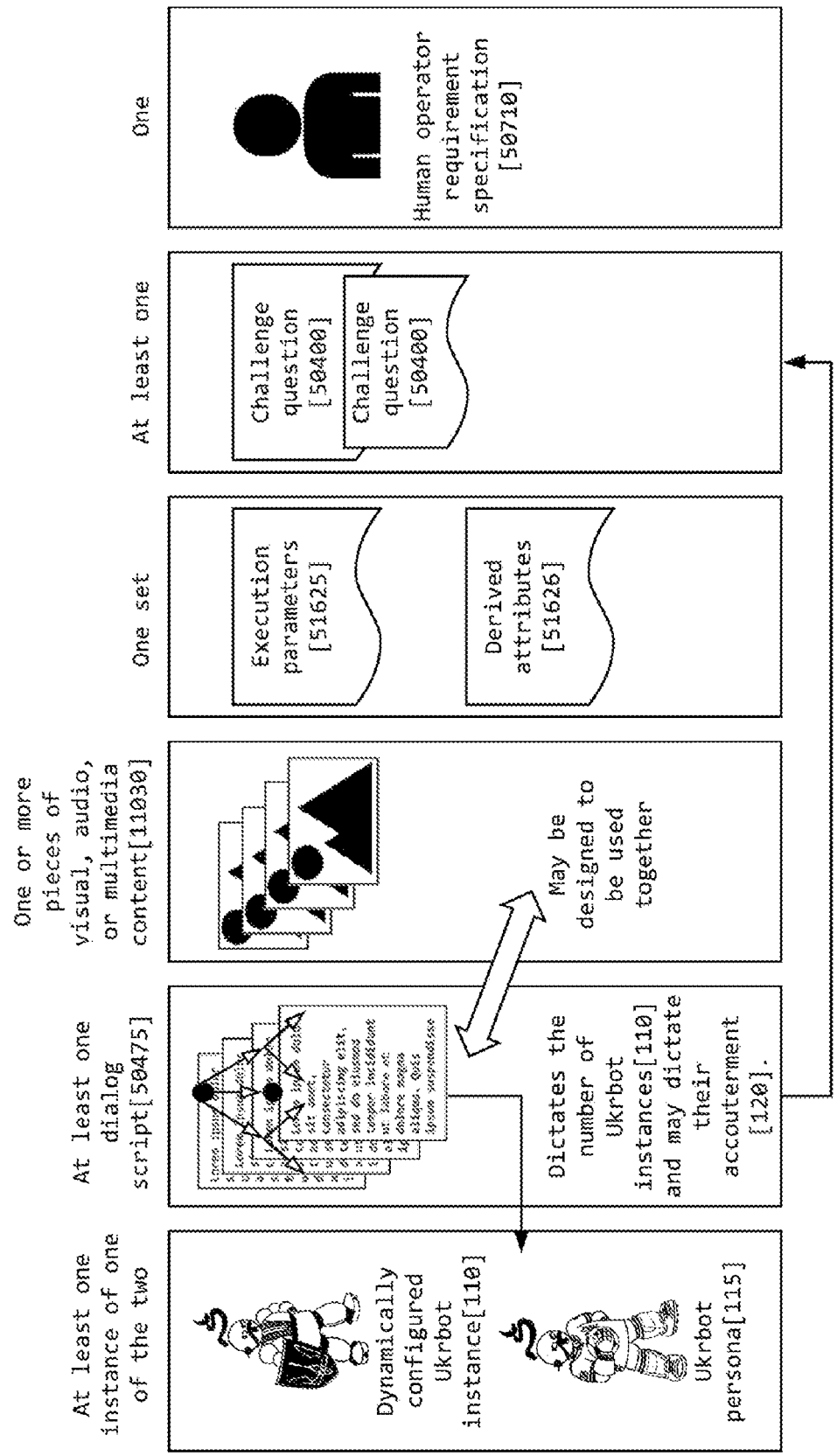
FIG. 55 is a block diagram showing components of an embodiment of a Ukrbot Engagement Package.

In most embodiments, the typical elements of a Ukrbot engagement package[50030] include, but are not limited to, the list below. These will be described in detail in following sections and are depicted in FIG. 55. However it should be noted that the conventions of the medium[135] in question necessarily play a large role in determining, for example, what types of visual collateral[505] should be included in the package[50030]. The medium[135] also greatly impacts which types of collateral[50040] are likely to have the greatest impact. For example, on an image-focused medium [135] such as Instagram, it is more important to have the benefit of a high quality/well-tested image[555] than it would with a more text or audio-oriented medium[135].

Figure 56:
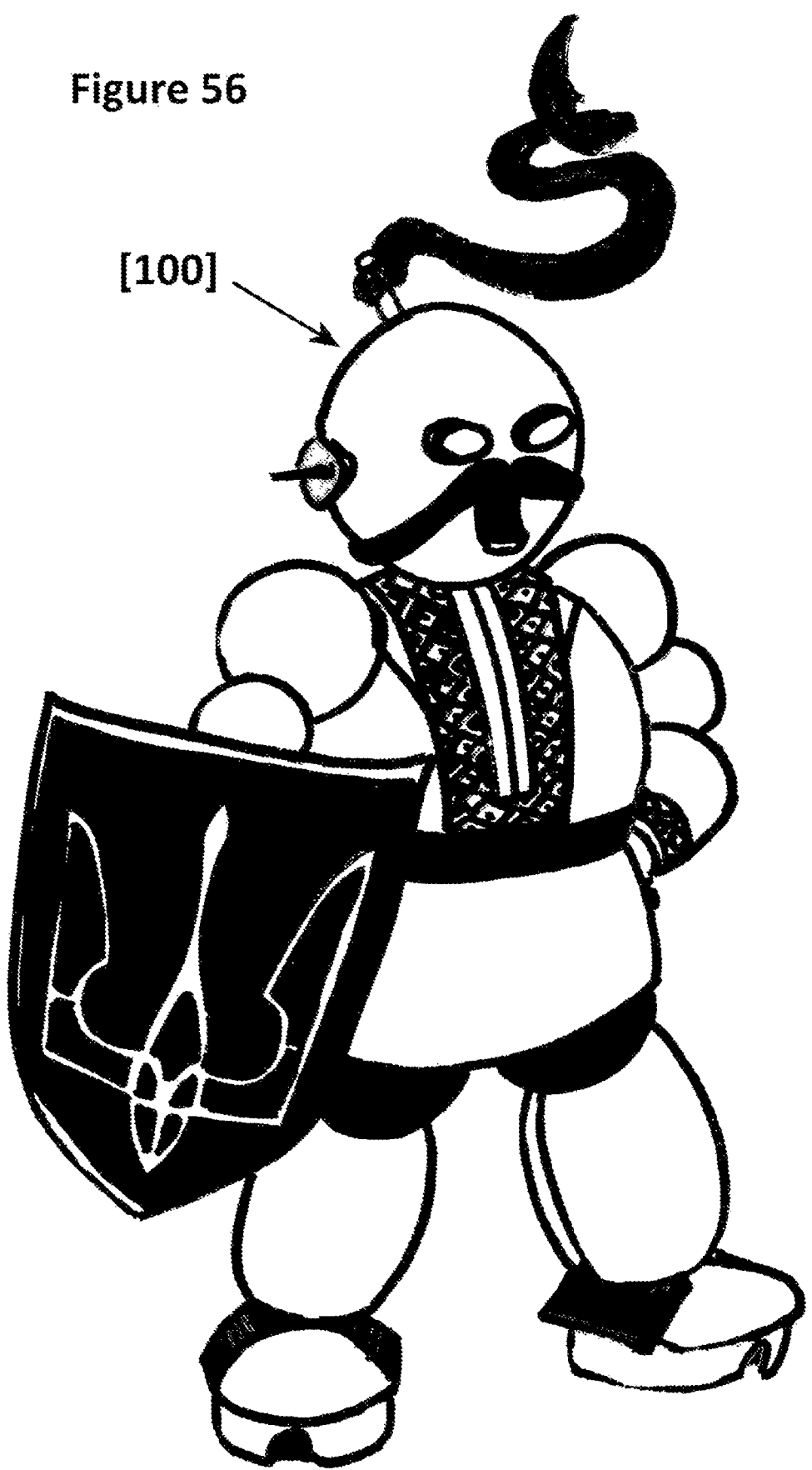
FIG. 56 is an illustration of a default instance of Ukrbot tailored for the culture and flag colors of Ukraine.

- Either a Ukrbot instance[110] with a one-time optimized set of attributes for the current engagement[125] or else a new or existing Ukrbot persona[115] which will be used in the specified location(s)[405] until it is decommissioned or modified (either automatically or by human operator[250] action.) More than one Ukrbot instance[110] can be assigned to a particular engagement[125] in most embodiments, and there can also be a mixture of Ukrbot[100] types. A default instance of a Ukrbot[100] tailored for the culture and flag colors of Ukraine is depicted in FIG. 56

At least one dialog script[50475] that will be customized by the NLG component[60035] so as to be the most effective for the particular audience[910]. A dialog script[50475] may also be customized to reflect knowledge of prior interactions with the specific adversary identity[270], for example by mocking it for having botched the response to a challenge question[41600] or having retreated.

A set of challenge questions[41600] optimized for the engagement[125], usually 5 or fewer in most cases. Questions[41600] will be selected from the store [41595] on the basis of being as obvious as possible to a good chunk of the audience[910] based on their cultural or similar knowledge, while hopefully being something that will at least require a little research for the adversary[265]. While certain dialog scripts[50475] may be designed for specific challenge questions [41600], in most embodiments the two will be independent most of the time.

One or more pieces of data-driven visual, audio, or multimedia collateral[50040] that will be used to illustrate or reinforce key points. These will often be instances of pre-defined templates[50477].

A set of execution parameters[51625] which govern the execution of the engagement[125]. These are accompanied by derived attributes such as estimated ROI.

Human operator[250] specification: One or more designated human operators[250], at least one of who must be available during the proposed time window for the engagement[125] to intervene if needed, or a set of requirements for a human operator[250] that corresponds to staff that will be available during the needed time window. Such requirements will vary by embodiment but will generally include language[50495] competence, a certain skill or experience level, or domain knowledge that is important for the target audience [820]. For especially high value[50182] engagements [125], a minimum operator[250] performance level will often be specified.

Optionally, in some embodiments, one or more mechanisms for broadcasting the engagement[125] to additional channels[140] or media[135] if such is available.

Additionally, there are derived attributes of an engagement package[50030] once packaged. These include, but are not limited to:

Estimated Cost[50005]: The total anticipated cost[50005] of the collateral[50040] and human intervention; some embodiments may also consider computational costs. In almost all embodiments, this must be less than or equal to the budget[50450] for the engagement[125] to be packaged and proceed, absent an operator[250] override.

Estimated ROI[51605]: Calculation of expected ROI, assuming this cost[50005]

Estimated Gain[50455]: The value of the expected influence[50555] to be had from the engagement[125].

Assessed Risk Level[51830]: Given the current and expected near-term audience[910] on the target channel [140], known history with the particular individual adversary[265], and the targeting certainty[51500], the risk that the engagement outcome[720] will be that of failure. Some embodiments will also have values for net users influenced—that is, risk of influenceable users[50555] becoming alienated—as this is distinct from the technical outcome[720].

These will be dynamically updated in most embodiments. However, the initial values will be retained so that the deltas between the initial estimates and the actual results obtained can be analyzed.

Different embodiments will offer different execution parameters for a Ukrbot engagement[125] based on the particular operational needs. Common parameters include, but are not limited to the following:

Maximum allowed estimated cost[50005] or budget [50450]: if the estimated cost[50005] of the proposed engagement[125] will exceed X during the current time window, cancel or postpone it. In many embodiments, this variable will by default be set automatically, based on a pre-configured percentage of the estimated value of the engagement[125].

Minimum required ROI[51605]: The % difference between engagement value[50182] and the cost of executing it[50005]. If a value for this attribute has somehow been specified (for example in a configuration file which specifies it per medium[135]), the targeting request[50435] will be withdrawn if the minimum required ROI[51605] cannot be achieved; some embodiments will prefer to create a human operator [250] alert in this case, rather than just silently pulling the request.

Minimum estimated probability of success[51835]: Based on the properties of the audience[910] in the target channel[140] at the time that the engagement package [50030] is being assembled, including adversary identities[270] present, and other changes in the period between the targeting request[50435] being enqueued and the packaging of the engagement[125], it could be possible that the estimated probability of success has changed. If it has dipped below this specified minimum, the targeting request[50435] will be postponed in most embodiments, and canceled in others. (Most embodiments of the targeting system[10000] will not issue targeting requests[50435] unless they surpass some configured minimum probability of success [51835]. This parameter if present provides an additional check at a slightly later point in time that may have a different value[50182] than the default.)

Maximum acceptable cost of failure[50600]: A parameter for the case in which the assessed risk of executing the proposed engagement[125] should be considered simply too high given the identities[270] currently present (or in some embodiments, also reasonably expected based on prior behavior.) If present, the value of this parameter will be set by configuration rules.

Maximum grade of collateral[50040] that can be used: Used to specifically limit access to fresh material that is considered to be of the highest efficacy. For example, challenging an adversary bot[255] on a channel[140] with a low audience value[50105] may not justify the use of the very best collateral[50040]. In most embodiments, this will be expressed in the price or cost of use[380] of the collateral[50040]. This parameter if present is an additional check that prevents collateral [50040] that is "too good" from being used even if there is enough budget[50450] for it. Some embodiments may further break this down by collateral[50040] type (e.g. dialog, images, video, audio, VR, etc.) Some embodiments may also decompose this further into quality and age[51800]. If this restriction results in a lack of usable collateral[50040], this parameter specifies whether the engagement[125] will be canceled, postponed, or configured without the particular kind of collateral[50040] if possible. If present, the value of this parameter will be set by configuration rules.

Minimum grade of collateral[50040] that can be used: If this level of material[50185] is not currently available, either cancel the engagement[125], put it on short term hold in case appropriate material[50185] can be quickly made available, or try to configure the engagement [125] without the use of the particular type of collateral [50040] if possible; if not, cancel or put on hold. This parameter is a check to make sure that the collateral [50040] selected is good enough for a higher value engagement[125]. In other words, while budget[50450] constrains the most that can be spent on a given engagement[1251], this parameter ensures a suitable lower bound. If present, the value of this parameter will be set by configuration rules.

Requires final permission: Requires a human operator [250] with suitable permissions to review the most up to date activity and explicitly approve launching the engagement[125]

Withdrawal protocol: A list of conditions that if encountered will cause the Ukrbot instance[110] to be automatically withdrawn by the system, for example 3 consecutive parse failures of posts[195]. Null if none.

User type prioritizations: Within the relevant audience [910], instructions on which user[220] demographic(s) to favor when confronted with the selection of collateral[50040] that may have far greater effectiveness with one demographic group than another. This is used to override default calculations such as the relative demographic composition of the audience[910]. In other words, it is used to specify who the real targets are with respect to changing hearts and minds.

Even with just the minimal number of elements, the odds are that no two Ukrbot engagement packages[50030] will be identical. This is part of the intent. While the Ukrbots[100] are intended to be openly bots, they are intended to be as anthropomorphized as possible in most embodiments. Exhibiting variety is part of this. No theater production is ever exactly the same twice, and this is part of its attraction.

Most embodiments will support both dynamically configured Ukrbot instances[110] and Ukrbot personae[115]. The persona[115] in most embodiments will be designed and focus group tested in the UDTS[90000] so as to ensure that it is a good fit for its intended audience[910]. As such, it is an additional investment of resources that will generally be used only for the higher valued types of users[220].

Most embodiments by default will assign Ukrbot personae[115] to ecosystems[915] since appearing on multiple channels[140] or media[135] that share common themes is a much more natural behavior than being bound to a single channel[140] or medium[135] and because of the investment that is entailed. Using the ecosystem[915] as the default "beat" for the Ukrbot persona[115] also has the advantage that in most embodiments, ecosystems[915] or "communities" are defined dynamically, based on any model or computation of user[220] overlap.

Both for reasons of anthropomorphism and anti-spoofing, most embodiments will continuously modify different aspects of the appearance, and in some cases even aspects of the behavior, of a Ukrbot[115] persona. However, these modifications[51555] are of a nature that still leave the persona[115] easily recognizable to users[220] who are familiar with it. And such that it remains clearly still recognizable as an "on duty" Ukrbot[110]. Examples of these modifications[51555] include but are not limited to: clothing, accessories[52555], weapons, equipment, accompanying animals, indications of being in an especially good mood—or an especially bad one, such as whistling, doing jigs etc. if the former, depending on what is culturally appropriate for the theater of operation[11030].

Security-related changes to appearance[52555] will not be allowed to interfere with aspects of a Ukrbot[110] instance's appearance that are dictated by the needs of the collateral[50040] being used in the engagement[125], or with those that are part of the definition of a particular Ukrbot persona[115]. A default embodiment of the Security Subsystem[50085] is illustrated in FIG. 3. It consists of an Authentication Server[70015] that other system[105] components, such as the public-facing Validation User Interface [71000], and external clients can access through the Validation API[70005] in order to authenticate different Ukrbot instances[110]. It also has its part of the knowledge base or data store that includes the Ukrbot engagement logs[50010] as well as user[220] and operator[250] reports of probable Ukrbot[100] spoofing attempts. (As noted in the section on User Feedback, certain cases of user[220] queries on presumed Ukrbot instances[110] will be inferred to be spoofing incident reports.) Lastly, the Authentication Server[70015] communicates with the Ukrbot instantiator[975] to modify the appearance of Ukrbot instances[110] at random intervals as an anti-spoofing measure; in most embodiments, the frequency of these modifications will relate to the number of presumed spoofing attempts within the past N many days, where N is specified in a configuration parameter.

Dynamically configured Ukrbot instances[110] may have many of these same characteristics in most embodiments, but the set of them will persist only for the length of the current engagement[125].

Many embodiments may scale the frequency of such changes to the believed number of spoofing attempts on the given location[405]. This will be determined in most embodiments via a combination of the following:

human operator[125]—and trusted Ukrbot supporter [51575]-reported instances direct reports of possible spoofing incidents from the public obtained through the validation user interface apparently good faith user-performed searches in the validation user interface seeking to ascertain whether a "real" Ukrbot[110] in fact posted particular content [950]. By "apparent good faith" we mean that the entered search contains parseable words rather than gibberish; some embodiments may impose further restrictions analogous searches performed programmatically through the Authentication API Almost all embodiments will attempt to both unique these reports/searches to the extent possible given the degree of underspecification that will be permitted by most embodiments in avoid the same spoofing incident being counted multiple times, and to identify, if possible, the probable source of the incident. This will of necessity be ballpark only in terms of accuracy, but no more is needed. For this reason however, most embodiments will only have a coarse scale of assessing spoofing risk: a default embodiment has 4 levels.

Possible reporting buckets will include but not be limited to: actual Ukrbot[110] (likely the result of an NLG error of some kind) actual spoofing attempt on the part of the adversary[265], deliberate attempts to insert incorrect data into the feedback system, relatively harmless imitation or spoofing, and user error (e.g. someone was using a somewhat similar avatar[525] to that of a Ukrbot[110].) This is worthwhile to do for a variety of reasons in addition to determining how frequently to modify the Ukrbot instance's [110] appearance. These include: properly accruing the cost of such actions to the cost inflicted on the adversary[265], identifying bugs and defects in the NLG output[510] as well as anything in the engagement collateral[50040] that may offend real users[220], to identifying areas in which the public can be better informed on how to recognize a "real" Ukrbot[110].

Figure 57:
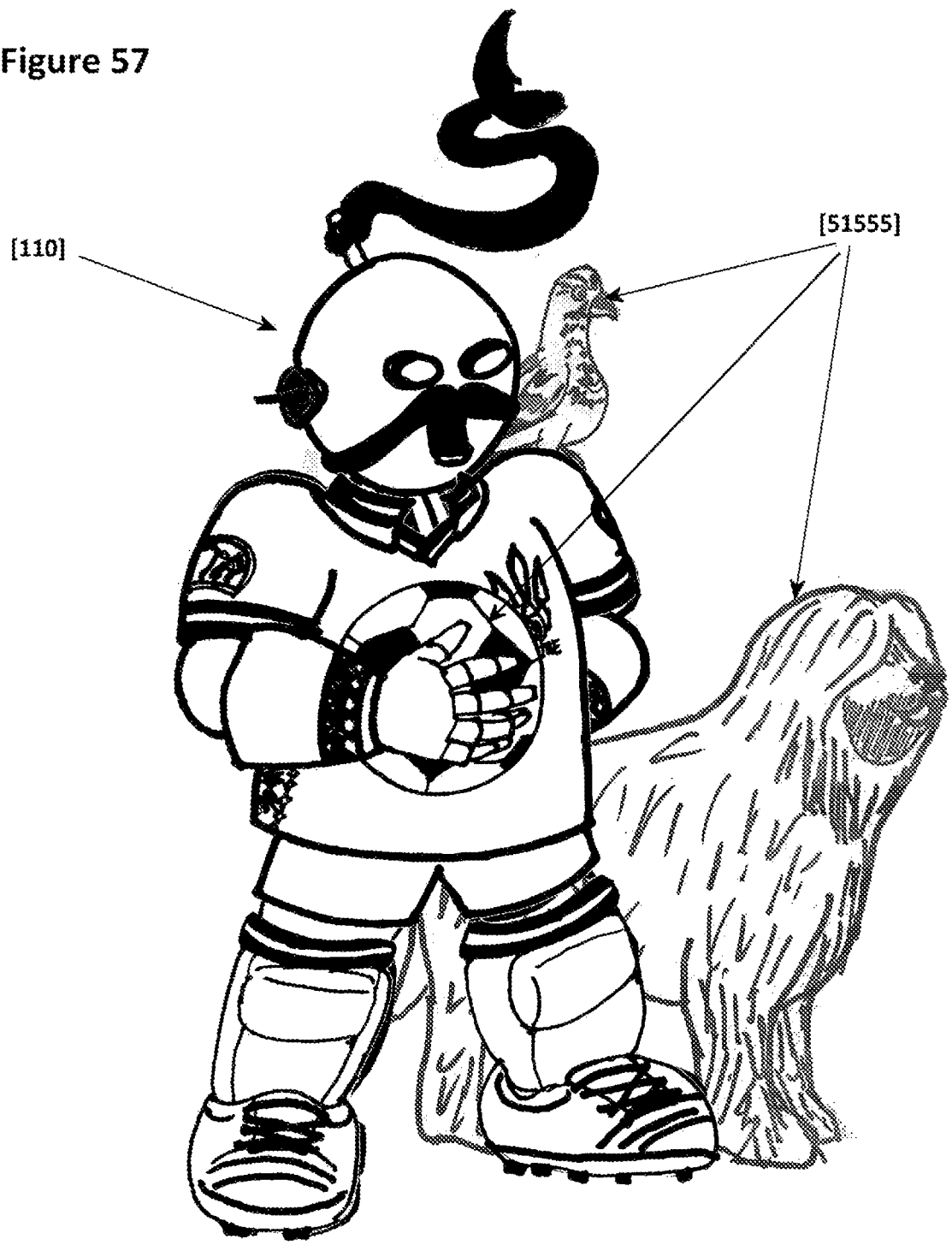
FIG. 57 is an illustration of an example Ukrbot dressed with accessories connected to real world events or circumstances, in this case a soccer match.

Some of these modifications may be deliberately tied to real world events or circumstances. For example, during a stretch of especially sunny weather, a Ukrbot persona[115] might be rendered wearing sunglasses. Or in the event of a large victory by a sports team of particular interest to the users[220] in its beat, the persona[115] might be wearing a cap, scarf or players' jersey of the team's. Certain of these, such as the weather-related ones, could be modified automatically, while others would likely be done manually. Dynamically configured Ukrbot instances[110] can likewise be instantiated with such features in most embodiments. An example of this is pictured in FIG. 57.

Almost all embodiments will initially define a set of strict but limited characteristics that any type of Ukrbot instance [110] must implement. These characteristics can include but are not limited to: color palette and specific physical appearance or accouterment[51555] elements that do not limit the assignment of different demographics for Ukrbot personae [115]. This is both so that the Ukrbot instances[110] are very easily recognized as such by the public, and so as to avoid ill thought out straying from characteristics that have hopefully been very well tested for user acceptance.

Figure 58:
FIG. 58 is an illustration of an example Ukrbot customized with a gender, distinct appearance, and accessories distinctly associated with certain cultures or geographic regions.

Because a persona[115] will have certain identifying characteristics by definition—in most embodiments, minimally a name, a gender, a distinct appearance, a culture or geographic region with which it is associated, and a language[50495] or dialect[50500]—it is also limited by these characteristics. For example, FIG. 58 pictures a female Ukrbot persona[115]. Thus if the user[220] base of a given channel[140] or medium[135] changes substantially, a persistent persona[115] can't naturally change along with it—at least not in terms of the "demographics" that have been asserted for it.

Furthermore, in the name of anthropomorphism, some embodiments will disallow a Ukrbot persona[115] from appearing to be in too many places at once—that is, actively engaging multiple unrelated adversaries[265] concurrently within the ecosystem[915] that it "patrols." Such embodiments will have a configuration parameter that determines how many is too many; the intention will be that the Ukrbot[100] be roughly human in capacity in this regard. In such embodiments, when there are multiple targeting requests[50435] the concurrent execution of which would not pose bot saturation level[50185] problems, either one or more substitute personae[115] have been defined for the "beat" in question, or a dynamically customized Ukrbot instance[110] will be dispatched to the lower value one(s). Most embodiments will offer dialog script templates[50477] for this "substitute cop" scenario. In the event of multiple substitute personae[115] being defined, most embodiments will allow a priority order to be specified for them.

The assembling of the package[50030] stage will often result in some number of targeting requests[50435] getting pulled from the queue[50507] as one or more required constraints are not met. Many embodiments will track these statistics so as to better predict future Ukrbot activity levels[50115] for purposes of saturation level[50185] and other related calculations. Similarly, many embodiments will create human operator[250] alerts if a pre-set threshold of targeting requests[50435] are jettisoned at this stage, as this may suggest that some of the constraints specified are not sensible and so should be re-evaluated.

Budget

Most embodiments will offer the budget[50450] and/or ROI parameters since these are the most direct method of associating the defined user values[50145] (and hence audience value[50105]) with the cost of the collateral[50040] being used. Given that the cost of creating collateral[50040] will be highly variable, —as will the quality—and that collateral[50040] is a bounded resource, it will generally be desirable to deploy the better collateral[50040] on the channels[140] on which it can produce the greatest projected amount of gain. In most operational circumstances, there will be significantly differing values assigned to different demographics of users[220]. (Even in the case in which the primary objective of an engagement[125] is to out a particular HVTAP[10290], it is still preferable to do it in front of a higher value audience[910].)

For one thing, some demographic groups are far likelier to be contested by the adversary[265] than others—for example, ethnic Russians living in Eastern Ukraine by the Kremlin. Some are more important than others in accomplishing a specific real world objective, for example demographic groups that tend strongly to vote vs. those that do not. Still others are highly valuable because of the influence that they broadly wield on society, for example virologists during the Covid-19 pandemic. As noted elsewhere <Add section number>, in some embodiments, certain demographics of users[220] may be considered as essentially without value if they are not believed to be influence-able in any direction. Note that most embodiments will consider behavioral aspects as demographic ones; for example, degree of influence or prolific-ness on a given channel[140].

Because of potentially greatly varying operational circumstances in different theaters, budget[50450] calculation is likely to vary substantially by embodiment. What almost all embodiments will share is the abstract notion of budget [50450] as a central construct. This is owing to the fact that in most instances, the main practical objective of the Ukrbot system[105] will be to raise the adversary's[265] costs in creating and distributing disinformation.

However, most embodiments will link budget[50450] to one or, more often both, of the direct costs that are estimated to have been inflicted on the adversary[265] based on the best available information, and the estimated "intangible" or indirect costs, such as a loss of influence. In most circumstances, the most observable direct costs will be personnel-related, as these are calculable from the amount and kind of content[950] produced and posted.

FIG. 59 depicts the cost buckets relating to a successful engagement[125] that are used in one embodiment. The indirect costs are typically related to influence. Most embodiments will include the costs of influence obtained from the influence model[51875], which is □ (user state transition[50325] values) for the set of all users[220] in the audience[910]. Some embodiments will take the sum over the duration of the engagement[125] with a fixed trailing period. Others will include any subsequent references to any of the collateral[50040] that was used during the course of the engagement[125]. Other embodiments may take a still different approach. Some embodiments will also count the costs[51600] created by the impedance[51880] being created by the Ukrbots[100].

In the default embodiment pictured in FIG. 59, there are five additional cost buckets:

Loss or diminishment of the influence established by an existing identity[270]. This varies with the value of the particular identity[270], a calculation that will often be medium[135]-specific (e.g. number of followers on Twitter.) The non-impedance[51880]-related cost can be thought of as the cost of the personnel hours to replicate an identity[270] of comparable value on the same channel(s)[140]. Additional cost of content[950] creation. This is basically to cover the cost of the extra posts[195] and any other troll[260] labor that is required to combat the Ukrbot instance(s)[110].

Intervention-related costs: This is an incremental cost to cover the sock puppet cases, but also cases in which a more senior troll[260] or supervisor is forced to rescue a more junior troll[260] who is flailing. This may be either directly because it has been challenged by a Ukrbot instance[110], or because of the need to counteract Ukrbot supporters[51575]/ or pieces of collateral[50040] that have been reposted and any other side-effects of a Ukrbot engagement[125].

Impedance[51880]-related costs: This can be thought of as the costs that come from the increased need to blast more messages—and probably more different messages—because the Ukrbots[100] are successfully interfering with both the distribution of these messages and the user[220] acceptance of them. These costs are discussed in a subsequent section.

Strategic costs: These will be highly embodiment and situation dependent. This is in essence a bucket for strategic harm that has been inflicted on the adversary[265] to which some tangible cost must be associated. Examples of such strategic harm are manifold. They include, but are certainly not limited to: publicly outing a HVTAP[10290] and the need to delay executing a key real world objective because of impedance[51880] in getting their message out to the particular audience[910] sufficiently.

Because budget[50450] in most embodiments will be linked to the costs inflicted on the adversary[265], some embodiments will try to capture information on offline costs that may have some online manifestation.

Offline Content Cost Estimation Handling

The adversary[265] is expected to rebut Ukrbot[100] by using all available media, including some that may be difficult, or even impossible, for the system[105] to do data collection on, for example physical billboards. With their specific audiences[910], non-Internet TV, radio shows, different kinds of printed material ranging from flyers and posters to offline magazines to billboards, and various formats of advertising (for example, on screens in metros and other public places) do matter. Thus some embodiments will decide to try to assess their costs so that they may be added to the calculation of costs inflicted on the adversary[265] by the Ukrbot system[105].

Those embodiments who seek to include such "brick and mortar" data will do so in one or both of two ways:

Allowing analysts[250] to input both individual instances of such spends that have been observed and an estimate of the costs[51600] involved through the SDS user console (UMC)[880]

Putting search filters in place to try to capture online references to such offline occurrences. For example, a user[220] might mention in a post[195] that they just "saw a whole show on (adversary[265]-controlled) channel X about the Ukrbots." Or "just saw a huge anti-Ukrbot billboard on Highway Y." Some embodiments may require a minimum number of such reports that appear to be about the same thing within a fixed window of time before accruing cost to the adversary [265].

Most embodiments will assign an average cost to such content by general type (e.g radio show vs radio ad vs billboard.) However some embodiments may choose to go further, for example assigning specific costs to certain TV or radio shows, or ads in certain newspapers. This cost will be a total cost in most embodiments, and will vary by the type of medium in question. For example, an anti-Ukrbot[100] commercial would cost money both to produce and to run. For certain types of offline content, online data that could be used to assign costs may exist, and will be used by most of these embodiments if so. For example, for TV show costs may be based on such criteria as television rating, daypart, and various other metrics.

In virtually all of these embodiments, the metric recorder [990] will analyze trends in both the number of instances of anti-Ukrbot[100] spends, and their total cost. Some embodiments will opt to assign an intangible "pain" penalty of their choosing for upward trends that exceed a specified rate of increase.

Almost all embodiments will allow analysts[265] with appropriate permissions to enter any kind of cost of their choosing through the UMC[880]. This includes programmatically creating models for overhead costs. However, most embodiments will show such manually entered costs separately.

Visual Collateral[505]

Dynamic Collateral Templates[50465]

Some templates[50465] will support multiple kinds of updates[51810]—if possible for the given medium[135]— particularly those for whom the relevant data is likely to keep arriving for some period of time after the initial generation. These updates[51810] include but are not limited to: simply updating the detailed data associated with objects already pictured in the collateral[50040] such as numbers and timestamps, effectively regenerating altogether with any incremental data, visualizing the changes since the particular piece of templated collateral[50465] was first generated, regenerating with a totally different, but newer and/or more compelling, or more relevant instance vis-à-vis the particular reposting channel[140].

Of those templates[50465] that do support updates [51810], in most embodiments there will be two classes. The first class supports only simple updates[51810], which is to say updates that are against the originally selected target(s) [50425], in the particular context afforded by the particular template[50465] (and so the set of evidence reasons[535] that it supports.) By contrast, the second class is more dynamic, and can be programmatically (or initially configured as) "unlocked" so as to regenerate with a different—and more recent—targeting request[50435] of the same evidence type[540], including even the choice of more appropriate targets[50435], based on its current location[405], and so the audience[910] watching. In such cases, most embodiments will make the reasonable inference that the motivation for the user[220] who posted the templated visualization[11035] was the visualization[11035] rather than the specific case— at least so long as a comparably good example can be found. These embodiments will thus by default seek to replace the original instance with a more appropriate one, setting some limit in time that it is permissible to go back.

Instances of such dynamically updating templates[50465] will call the SDS[50000], announce its location[405], and await either regenerated content[51840] or a code that signifies that none is currently available. In other words, the template[50465] itself—for example, a "mug shot view [82200]," remains the same. However, since most templates [50465] will be created for evidence reasons[535] that occur frequently, newer examples can be expected to come along fairly frequently. Further, in many cases, noticeably better, more compelling examples will also come along within some period of time.

Thus, most embodiments will allow an optional threshold for unlocking a dynamic template instance[80210] based on the strength of evidence reason[535], which may be either or both relative and absolute, so as to allow a good example of bad behavior to be replaced with an even better one if it shows up. On the other hand, some embodiments will instead to prefer to stick with a more recent targeting engine[10000] trigger event on the original targets, if there is one. If not, most of these embodiments will seek a replacement example that is more recent and/or better adapted to the audience[910] in the current channel[140]. Some embodiments will set a threshold for age of the original example from its last update; once the threshold is exceeded, even a less strong example will be preferred. Most of these embodiments will alter the template[50465] border in some way so as to cue users[220] that the content has changed. Many of these embodiments will also provide users[220] with a means of going back and viewing the earlier version(s).

When a dynamically updating template[50465] instance is placed/reposted on a medium[135] that is being monitored by the system which allows updates[51810] and other communication, it will call the SDS[50000] and request regeneration with the most recent instance available, subject to whatever rules are in place, for example constraints on what exactly constitutes a strong enough example to prompt a swap. The idea is that the instance used is likely to still have incoming updates[51810] associated with it. The high level logic of this is that is used in one embodiment is illustrated in FIG. 60.

In the event that the updating template[50465] has been posted in a location[405] where there is a very different audience[910] than the initial one, the initial instance of the evidence type[540] displayed in the template[50465] may not be the most compelling—or even remotely interesting. Indeed because different theaters of operation[11030] will have different needs, different embodiments will choose different rules to determine the replacement of one instance of a particular targeting reason[50445] with another. For example, in theaters of operation[11030] in which there is more than one commonly spoken language, it is logical to strongly prefer examples that conform to the majority language for the given audience—even at the cost of a less strong and/or less fresh example.

Many embodiments will consider the utility of the ability to update when assigning collateral[50040] to an engagement package[50030]. Since the ability to update may be very useful in some situations—for example, in the case of a target[50425] who is extremely active on an ongoing basis—but not at all in others (e.g. a medium[135] that doesn't permit updating, or a target[50425] who is only active sporadically) the use of templates[50465] with a dynamic updating capability will be prioritized for use in engagement packages[50030] accordingly in most embodiments.

An important cousin of this case involves individually personalized online or mobile ads, electronic billboards in locations[405] in which there is significant demographic [240] knowledge of the passers by population and indeed any kind of personalized or targeted communication. Public service ads for example can be automatically tailored to a given audience demographic to use material from the most compelling engagements[125] among those recently available—for example, the piece of visual collateral[505] that attracted the most positive activity on the part of the relevant demographic. This selection could be based on the most compelling specific targeting reason(s)[50445], the outcome of the engagement[125], and just the overall level of egregiousness of adversary[265] behavior, as scored by the particular embodiment.

For example, the outing of a prolific troll[260] in the east of the country who focuses mostly on local issues may be a yawn in the west of the country. Some target reasons[50445] may hit home much more in some populations of users[220] than others. Some topics[165] and attitudes[51750] may be very effective at drawing attention in some audiences[910], but not in others. And so on.

Most embodiments will help support such customizations by either/both allowing system administrators[250] to provide sets of heuristics for personalizing content, and/or ML methods, or combinations of these (e.g. supervised learning methods.) Additionally, most will provide a number of different feeds[51815] that the individual instances of these dynamically updating templates[50465] can subscribe to. These feeds[51815] may be used to either/both update the template[50465] itself, and/or to update ancillary views (e.g. the equivalent of a scrolling headline banner beneath the template[50465] content much as one sees on many TV news shows.)

Some embodiments will create after the fact collateral [50040], for example to advertise an especially high value, successful engagement[125]. Such embodiments may offer feeds[51815] of this content for purposes of advertising the Ukrbots[100] to the public. For example, the Ukrbot challenge[41600] could be recreated in animated cartoon form in a video, with the Ukrbot[110] performing whatever victory gestures are culturally appropriate in a given theater of operation[11030].

Different embodiments will have wide latitude in their approaches to non-text collateral[50040] so long as the above points are respected. In short, all collateral[50040] must be contextually relevant, and both intelligible to and appropriate for the target audience[820]. Decisions in this regard will also of necessity be medium[135]-dependent in many cases. For example, jingles, songs and music videos can be effective collateral[505] and potentially open up more media[135] for use.

Most embodiments will use well-tested, automatable templates[50465] to the extent possible so as to be assured of having an effective way of illustrating a particular point to a target audience[820]. In addition to testing with the UDTS[90000], most embodiments will endeavor to assess the efficacy of templated collateral[50040] in actual operation using the relative number of reposts by presumably different users[220]—that is, direct appearances of the item rather than links, or else references to it—by evidence reason[535], or in some cases topic[165] or narrative[155]. Any good media-specific search technology (e.g. image search, audio search, video search etc.) can be applied to this end.

Challenge Questions[41600]

A challenge question[41600] is defined as a question posed by a Ukrbot[100] to an identity[270] that the targeting system[10000] has identified as likely being in the control of the adversary[265] that is specifically designed to try to "out" it as an impostor. This may be a bot account[215] that is masquerading as a human, or a troll[260] who is asserting one or more demographic properties falsely. While these two cases differ in some ways, both types of identities have strategies to deflect questions to which they don't have a ready answer. Finding the answer takes at least some amount of time, and may need to involve a human with the right language or other skills. Thus cost[50005] is inflicted on the adversary[265].

In the case of a presumed bot adversary[255], the questions[41600] will be designed to be difficult to automatically parse and/or require knowledge that is unlikely to be in the bot's[100] knowledge base[10270] (at least the first time the question is used.) In the case of a presumed troll[260] or sock puppet[50540], the questions[41600] will usually be designed to target knowledge that the adversary identity [270] will likely not possess—for example, a second tier Ukrainian historical or cultural reference will likely be unfamiliar to most Russian trolls.

Multiple challenge questions[41600] may be needed within the context of a single engagement[125] for a variety of reasons. For one thing, in some cases the Ukrbot instance [110] will challenge more than one adversary[265] during the engagement[125]. For another, the adversary's[265] response to the first challenge question[41600] may not always be conclusive. This can be either because the substance of the response is not what was expected (though also not conclusively incorrect), the wording of it suggests that the adversary account[270] has changed hands, and/or because the response simply takes too long, though not all embodiments will use time as enough proof of a "sock puppet" transfer to issue a second challenge question [41600]. Many embodiments that do choose to use time will do so in a medium[135]-dependent way, since some media [135] provide a much better idea of when a user[220] became inactive, or started to enter a response.

Because a suspected sock puppet handover will trigger the asking of another challenge question[41600] in most embodiments, they will tag challenge questions[41600] according to dimensions that include, but are not limited to: difficulty level, dialect, geographic region, domain, gender, religion, generation, and troll vs. bot-tailored. This tagging allows for an optimized set of challenge questions[41600] to be included in each engagement package[50030].

Thus most embodiments will chose to package more than one challenge question[41600] for each engagement[125]. By "packaging" we really mean "reserving" or putting a lock on, in a database sense. This is because the challenge questions[41600] can in general only be used once—or if used multiple times, during the same "safe" short window of time as has been determined by experience with the particular adversary[265] in a given region. After that, it should generally be assumed that the adversary actor[965] has added the question, and reasonable responses to it, to its knowledge base[10270] and so the adversary bots[255] and trolls[260] will "know the answers" from that point onward. Thus the challenge questions[41600], especially those that are tailored to specific demographics of users[220] are a somewhat limited resource.

Correct tailoring of the challenge question[41600] to the alleged demographics of a given adversary[265] will often be critical. For example, an adversary bot[255] or troll[260] claiming to be a user[220] from a particular city, and a fan of its sports teams will immediately be outed if it fails to correctly recognize a reference to a local sports hero. And of course in multi-language theaters of operation[11030], the language of the question also is a factor.

Most embodiments will package a challenge question [41600] for each user[220] demographic that is substantially present in the audience[910] for the engagement[125], assuming that one is available at the time that the engagement package[50030] is being assembled. (In most embodiments, alerts[50560] will be launched to the USM user console[51610] if a particular category of challenge question [41600] is running low.) Otherwise, more generic challenge questions[41600] will be used if needed. Questions[41600] which were not used will be unlocked at the end of the engagement[125]. Questions[41600] that were used will be marked as "used." In most embodiments, a timestamp will also be stored.

Different embodiments may have somewhat different policies with respect to question[41600] reuse. For example, some embodiments may decide that a question[41600] used in one region or language will be considered stale only with respect to that region or language; if the question[41600] has value outside of this context, it can be reused elsewhere.

Some embodiments will choose to test the adversary's [265] capabilities in this regard, even at the cost of having some number of adversary[265] identities falsely pass an initial challenge[41600]. If these same identities[270] fail to pass a subsequent challenge[41600], or there is evidence of delay, sock puppet transfer, etc. such a scenario can be inferred to have occurred, and the question[41600] "freshness" window will have to be shortened either throughout the entire theater of operation[11030] or with respect to the specific region/language. Some embodiments will choose to have human operators[250] re-evaluate the current policies, while others may do it automatically based on trial and error empirical evidence.

Human Operators[250]

Although the hope is that human operator[250] intervention will not be a frequent need, some engagements[125] are inherently higher risk in this regard, for example if there are many diehard detractors[51560] in the audience[910]. Most embodiments as a matter of general principle will want to ensure the availability of an appropriate human operator [250] should the need arise. However, the number of human operators[250] needed will very largely depend on the estimated probability that they will actually be needed. So for example, if empirical evidence showed that a human operator[250] was only needed to support $1/100$ normal difficulty Ukrbot engagements[125], then in most embodiments an operator[250] would be considered to be available if there are less than 100 such engagements[125] currently (assuming for this example that there are no higher risk engagements[125] during this period.)

However, human operators[250] are far from one-size-fits-all. They will have different language skills, cultural and domain knowledge, and of course levels of skill at their job. In special cases, some human operators[250] may also be the author of the dialog scripts[50475] used by a particular Ukrbot persona[115], or may have prior experience with the specific adversary identity[270] for example. Thus almost all embodiments will allow human operators[250] to have as many attributes as needed to be able to assign them appropriately: for example an operator[250] who can't even read the language in question is of little use. Most embodiments will also allow individual human operators[250] to be specified, as may be deemed appropriate for high priority cases. These embodiments will provide a mechanism for traversing a list of operator[250] names, and what to do in the event that none of these operators[250] are available when needed: cancel or postpone the engagement[125] or launch with other operators[250] ready to intercede if needed.

Most embodiments will also support the case in which a Ukrbot instance[110] is launched with a human operator[250] controlling it from the start. However, presumably this would only be done in a very small number of high value cases, and/or from time to time with the purpose of trying to confuse the adversary actor[965] as to the actual technical capabilities of the Ukrbot[100]. Most embodiments will not comingle such totally human-controlled engagements[125] with normal Ukrbot[100] ones as far as reporting metrics.

Most embodiments will monitor the performance of human operators[250] based on both/either the outcomes[720] of the engagements[125] where they intervened, and/or the outcomes[720] of those engagements[125] that were under their control that did not succeed, but where they chose not to intervene. These performance measurements will be stored in one or more operator[250] attributes according to the embodiment, and may be used as criteria for operator[250] selection.

Some embodiments will also include analysis of those engagements[1215] which faltered for some period, but which in the end were considered to have successful outcomes[730]. An example of this last would be the case in which the NLU system[10100] failed to appropriately parse an adversary identity's[270] posts[195] but the Ukrbot[110] is aided by supporters[51575] and the adversary[265] is forced to withdraw for some specified period from the channel[140] in question—or at least to shed the particular identity[270] that was successfully chased away. In any case in which supporters[51575] play a dominant role relative to the Ukrbots[100], the operator[250] may not be credited with the successful outcome[730] in some embodiments.

Dialog Scripts

A dialog script[50475] allows one or more Ukrbot instances[110] to present information in a structured way, and provides for interactivity with users[220] by trying to anticipate likely comments given the context of the audience[910], the channel[140], and the evidence types[540] being presented. A dialog script template[50477] allows details such as the name of the target[50425] to be automatically filled in as well as throw away lines such as greetings that are rotated so as to inject some variety. Such templates[50477] can be very generic, or can be bound to a specific evidence reason[535] or type of content[950]. Both dialog scripts[50475] and templates[50477] will have tags consisting of attribute-value pairs that the collateral picker[980] uses to identify the appropriate ones. Such tags may include but are certainly not limited to: language[50495], dialect[50500], evidence reason(s)[535], topical content[950], targeted educational level[51520], or specific contexts. These contexts may include but are not limited to: an audience[910] that is highly hostile, a multi-channel[140] engagement[125], a multi-role engagement[125], a specific medium[135] or type of medium[135.]

In almost all embodiments, one or more dialog scripts[50475] must be packaged for each engagement[125]. However all Ukrbot instances[110] will also have access to generic or context-free user[220] or adversary[265] comments and responses via the dialog system[40000]—for example greetings of "Hey there Mr. Ukrbot" and taunts of the "you are just a stupid bot" variety. This includes initiating conversations or being proactive, for example thanking a supporter[51575] for their past support if that supporter[51575] appears on the same channel[140] with them—or mocking an adversary identity[270] for previously ducking a challenge question[41600].

Almost all embodiments will include at least minimal dialog in a Ukrbot engagement[125]. Even if the medium[135] is not a text-heavy one, it must be assumed that the Ukrbot instance[110] may have to respond to an adversary identity[270], a detractor[51560] or for that a matter, a supporter[51575] at some juncture during the engagement[125]. Doing so will almost always require either text or text→speech, depending on the medium[135]. For this reason, the vast majority of dialog scripts[51575] are tree-like structures of which not all branches will be likely be used. In the event that a dialog script[50475] branch was not written for a sufficient number of conversational turns, depending on the budget[50450] for the engagement[125], either a human operator[250] will take over for the Ukrbot[100], or for lower value engagements[1215] ML methods will be used.

Dialog scripts[50475], and other types of collateral[50040] are chosen for use in a particular engagement[125] by the Engagement Packager[970] in most embodiments according to one or both of the following essential criteria:
  It is appropriate for the evidence reasons(s)[535] provided by the targeting system[10000].
  It is a direct, topical response to content in posts[195] made by adversary identities[270].

However, the above criteria while necessary, are not sufficient. Almost all embodiments will at least additionally require the following:
  Script[50475] is available in the necessary language[50495] needed for the engagement[125] based on its target audience[820]
  Script[50475] is available in, or can be automatically converted to, a particular dialect[50500] by the NLG component[60035], likewise.
  Script[50475] is available in, or can be automatically modified by the NLG component[60035] to be in a particular register[51845], tone[50502], or style[51645].
  Script[50475] is at least compatible with the available non-text collateral[50040] (which may impose requirements on the accompanying scripts[50475] in some embodiments).
  Script[50475] is appropriate for the medium[135] in question
  Script[50475] is appropriate for the relevant special scenario at hand, for example a multichannel engagement[125].

The same holds true for text that in any way appears in non-text collateral[50040], for example text that appears within an image or video.

Other constraints may also apply based on the engagement parameters[51625] that have already been noted, for example a minimum quality level, a maximum age[50235] and of course budget[50450]. Further, it's not always enough to find a script[50475] that matches all of the constraints: in situations in which there is an insufficient supply of dialog scripts[50475] with certain properties, different targeting requests[50435] in the same batch may contend for the same scripts[50475]. In most embodiments, the higher value engagements[125] take precedence in this situation, with a class of exception for operator[250] overrides.

In order for an engagement[125] to proceed, either a suitable dialog script[50475] must be available for the needed combination of attributes, or the engagement[125] must be conducted with a human operator[250] controlling the Ukrbot[100] account[215]. Note that the latter option raises the engagement cost[50005], and in most embodiments will lead to cancelation of the targeting request

[50435] if this pushes the engagement cost[50005] past the specified budget threshold[50140] absent an operator[250] override.

In addition, many embodiments will support a style factor[51645] that is distinct from register[51845] so as to account for the fact that over time, it is likely to be empirically established that certain styles[51645] of content play better with audiences[910] of certain demographics [242]. Examples of styles[51645] include but are not limited to: use of emoji, loud talking, as described in U.S. Pat. No. 10,445,668 B2, terse sentences, and frequent refrains. Different embodiments may offer the set of styles[51645] that they see fit. These include but are certainly not limited to: simple scoring of user[220] feedback on dialog[41100] that was written by a particular author[210] to machine learning techniques, to data from UDTS[90000].

Some engagement packages[50030] will contain more than one dialog script[50475] since in a more complex engagement[125] one dialog script[50475] may naturally lead to the invocation of another if a certain branch of the dialog tree is traversed. In order to both keep the usage accounting as simple as possible, and to avoid effectively wasting dialog content, most embodiments will prefer to encourage smaller, modular dialog scripts[50475] that can logically chain together to create more complex ones as needed.

Even so, in most cases there will be significant variation in the complexity of dialog scripts[50475]. This complexity will most often be measured by metrics including but not limited to the following, or combinations of them:

Number of branches in the dialog tree

Estimated number of turns expected between the Ukrbot instance[110] initiating the dialog[41100] and any other identity[270], friendly or otherwise, that is not explicitly playing a role in the engagement[125]

Total number of Ukrbot[100] turns[750] written

Number of participants needed to execute, whether other Ukrbot instances[110] or supporters[51575]

Most embodiments will be concerned with the cost of use[380] of the dialog script[50475]. In most embodiments, the main components of cost of use[380] include, but are not limited to, the following:

The literal cost of creating the dialog script[50475], largely the cost of paying the dialog author[210] if written by a human author[210]; alternately, if automatically generated, an assessed cost for use of a specialized NLG system[60035]. In the former case, it will be presumed that there will be a large salary range, based on the quality and proven efficacy of the author's [210] dialog scripts[50475]. In those cases in which a particular dialog script[50475] is very tightly tied to other collateral[50040], such that that collateral[50040] isn't really usable without the dialog script[50475], the cost[375] of creating the collateral[50040] will also be included by many embodiments.

The IP cost[50490] of using the dialog script[50475]; some scripts[50475] may be deemed usable more than once and templates[50465] are intended to be used repeatedly. If for example a dialog script[50475] (or significant portions of it) is deemed only usable once— for example because of how very specific it is—the cost[51795] of using it will be considered at least equal to the cost[50005] of creating it in most embodiments. Some embodiments may also elect to place an additional IP cost[50490] for dialog scripts[50475] that are considered especially good, either by the system administrator[250] based on measures such as the prior track record of the particular writer, or as empirically measured in the UDTS[90000] or elsewhere. Other embodiments may assess IP costs[50490] based on the track record of the author[210] to date. They do so under the logic that really excellent content is a rare commodity.

The cost and probability of human operator[250] intervention, which becomes more probable the greater the number of branches there are in the dialog tree[41105] and more costly, since if intervention is needed, it is not as simple as just jumping in to provide a meaningful Ukrbot[100] response if the NLU system[10100] failed. The same is true for dialog scripts[50475] that require the participation of multiple cooperating participants. The particular requirements for the operator [250] will also impact the cost. In the event that operator[250] intervention is required, if this would result in a budget[50450] overrun, in most embodiments an operator[250] override would be required.

While none of these costs are likely to be particularly large, they will add up over time. This is especially the case if the use of human authors[210] for the dialog scripts [50475] is generally assumed, with an NLG system being used mostly to create variations and customizations, (for example the adjustment of register[51845] or the substitution of standard words for those in a given dialect[50500].) Nonetheless, most embodiments will try to maintain a large cost asymmetry with the adversary[265], and this requires constantly evaluating costs[50005], and limiting engagements[125] for which the ROI[51605] is not attractive.

It should be noted that in many embodiments, Ukrbot instances[110] can work in pairs or even groups—if it is called for by the dialog script[50475] used in the engagement[125]. Having more than one Ukrbot instance[110] cooperating in the same engagement[125] can allow for more complex comedic routines. In the case in which a particular dialog script[50475] is often reused (because it is "aging well"), sometimes supporters[220] can play this role, much in the same way that fans of a particular standup comic become participants in the show. Since the latter is an incrementally less expensive method, some embodiments may lean towards it in the case of audiences[910] that contain a meaningful number of such candidate supporters [51575]; if none step up to the role, one or more additional Ukrbot instances[110] as required by the script[50475] will be dispatched by the SDS[50000] to pick up the routine.

Most embodiments will support the notion of a trap [50255]. A trap[50255] is a particular kind of engagement [125], usually involving a dialog script[50475] which requires multiple Ukrbots[110] or supporters[51575] on a given channel[140]. A trap[50255] is unusual in that it does not require a target[50425] to already be present on the channel[140] in question, and so it does not go through the normal targeting queue[50507] process. Rather the point is to create content or activity on a contested channel[140] such that a particular adversary identity[270]—or a particular class of one—will perceive an opportunity and so is likely to show up and begin posting[195]. (In the event that the trap[50255] is intended for a particular adversary identity[270], in most embodiments the associated engagement [125] will be launched within a time window when this identity[270] is normally active, and so will be factored into bot saturation level[50185] calculations. In many embodiments, the dialog script[50475] will be required to have specially tagged "off ramps" or breaking points if the desired adversary identity[270] doesn't turn up so that the punchline can be saved for a later date.)

The dialog script[50475] in this case is in effect an ambush. For example, it might be aimed to get the adversary identity[270] to initially agree with an untrue statement favorable to the adversary[265], only to later refute the statement in a very compelling way later on in the dialog script[50475]. One or more accounts[270] seeming to agree on the untrue statement is bait[50255] to draw out one or more adversary identities[270].

In many embodiments, dialog scripts[50475] may come along with props[52555] for the Ukrbot instance[110] to be rendered with. For example, if the dialog script[50475] causes the Ukrbot[110] to sing, the engagement package [50030] configuration instructions for the Ukrbot[110] may specify that it is to be carrying a guitar[52555] as is in FIG. 61.

Once the relevant audiences[910] have been assessed, and collateral[50040] appropriately parceled out among the proposed engagements[125], some number of the engagements [125] are likely to be canceled, postponed, or put on hold on the basis of lack of appropriate collateral[50040], human resources[250], or adequate audience[910] conditions. Though each of these three states is a bit different, any of them result in the associated targeting request[50435] being at least temporarily removed from the targeting list[51635] in most embodiments.

A targeting request[50435] will be postponed rather than canceled in most embodiments if there is regularity of behavior that can be reasonably relied on to automatically reschedule the engagement[125] at a given time within the permitted response window. For example, if additional conforming collateral[50040] is scheduled to be uploaded to the knowledge base[10270] in 20 minutes, and the response window has 30 minutes remaining, in most embodiments the targeting request[50435] will be postponed for just over 20 minutes. Likewise for any desired change to the audience [910] that can reasonably be anticipated within the foreseeable future—or any behavior on the part of the adversary [265].

A "put on hold" mechanism by contrast is intended to be used by human operators[250] to pause execution for a brief period, for example for an operator[250] with particular skills or knowledge to return to her desk. A targeting request[50435] that is explicitly canceled or aged out can easily enough be effectively re-instantiated, but in most embodiments this requires the adversary identity[270] to freshly trigger the targeting system[10000].

Although new targeting requests[50435] will be added continuously to the targeting queue[50507], this cannot be allowed to create blocking conditions (e.g. an especially valuable piece of collateral[50040] never being placed into an engagement package[50030] under the reasoning that a higher value engagement[125] could yet come along.) For this reason, most embodiments will generally process the target requests[50435] in batches, though many embodiments will make exceptions for those engagements[125] with special high priority tags[51640] such that they can jump into a batch that is currently in process.

Bot Saturation[50185] Issues

In many instances, the greatest contention among targeting requests[50435] will center on bot saturation level [50185] constraints. This is particularly complex because it requires factoring in recent Ukrbot[100] activity[50115] as well as projected future activity—that is, anticipatable targeting requests[50435] including those that are currently in a "postponed" state, pending traps[50255] and other engagements[125] that are queued up waiting for the expected arrival of a particular target[50425]—and the activity that would result were all of the currently posited engagements [125] to be executed within a small period of time. Further aggravating the problem is the fact that bot saturation level[50185] is both highly context-dependent and highly dynamic in most embodiments[125].

In many embodiments, bot saturation levels[50185] are a measure of whether users[220] are developing "Ukrbot[100] fatigue." In other words, in these embodiments it is intended to be a measure of how users[220] perceive the Ukrbots [100], rather than a frequency of occurrence metric. An interesting aspect of this is that Ukrbot engagements[125] with higher cost[50005] parameters will generally create a situation in which a greater density of Ukrbots[110] will be deemed desirable by users[220]; hopefully more expensive collateral[50040] results in making the Ukrbot instances [110] that can avail themselves of it appear more attractive to users[220]. Thus, higher value users[220] should generally be more eager to encounter Ukrbots[110] in greater numbers, as they are the likeliest to be favored with the high quality collateral[50040].

Most of these embodiments will choose to calculate bot saturation level[50185] with respect to groups of reasonably homogeneous users[220], since in addition to the just noted quality of material point, what one demographic group of users[220] may find entertaining may be very distinctive to it. Different embodiments may choose user[220] groups in ways that include, but are not limited to, the following: creating the groups based on a type of clustering of user [220] demographic attributes of the embodiment's choosing, taking the users[220] from the audiences[910] associated with a location[405], or creating groups based on specific user[220] attributes of interest. If the chosen grouping method is not location[405]-oriented, some embodiments will use the most common user[220] demographic group as a means of determining the appropriate bot saturation level [50185] for each location[405]. Other embodiments will instead choose on the basis of the highest value group, where value is determined either by aggregating the individual user values[50145] or is set according to a configuration setting on user[220] demographic prioritization.

Embodiments that factor in user[220] perception are posed with the problem of trying to fathom how users[220] of different kinds feel about the Ukrbots[100] based on recent interactions, and whether this is improving or sinking. Most commonly, these embodiments will rely on sentiment [50150]-bearing user[220] posts that reference the Ukrbots [100] generally or a single instance or persona[115] specifically, or make comments about their frequency rather than the low-effort/single-click, easily gamed actions such as "liking" or "disliking" a post. Most embodiments will consider both the relative proportion of positive to negative sentiment[50150] as well as how many posts[195] there are altogether; if few people are bothering to comment one way or the other, that's generally not a good sign.

Almost all of these embodiments will either/both exclude users[220] who are known detractors[51560], and/or who have been identified by the targeting system[10000]. The reasoning in both of these cases is that the detractors[51560] or useful idiots[295] by definition wish to see no Ukrbots [100] at all and/or might be making negative posts[195] about them accordingly. By contrast, most embodiments will consider such feedback from supporters[51575] under the reasoning that if even the supporters[51575] start to tire of the Ukrbots[100], it is problematic.

In other embodiments, bot saturation level[50185] is a measure for how many times per hour/day/week/month either an "average" user[220] of a given channel[140], channel group[145], medium[135] or ecosystem[915] encounter a Ukrbot[100], while others will calculate a literal average. Some embodiments will use more than one of these partitionings as a sanity check.

A user[220] will be considered to have "seen" a Ukrbot instance[110] if he was active on a channel[140] during any part of a Ukrbot engagement[125], or there is any evidence that the user[220] subsequently viewed the content from an engagement[125] either in the original channel[140] where it appeared or elsewhere. In the latter event, the date and timestamp will be associated with the viewing event, not the original posting events by most embodiments. What types of evidence exist to be able to gauge whether or not a user[220] was active on a channel[140] at a given time, or has read certain content will depend on the individual medium[135].

Some embodiments will choose to combine measures of literal frequency and apparent user[220] perception of the Ukrbots[100], under the reasoning that in fact you can have "too much of a good thing." Still other embodiments will choose to consider metrics based on the number of posts [195] made in the course of Ukrbot engagements[125] by any participating party as a percentage of all posts[195] made on whichever channel[140] or other bounding object within a time window of its choosing.

In still other embodiments, the matter of bot saturation [50185] is effectively dealt with by requiring a high quality or "cost" of collateral[50040] and disallowing—or at least limiting—the reuse of collateral[50040]. This results in a content-metering strategy; otherwise put the Ukrbot engagements[125] will fail to package if the available collateral[50040] is of insufficient quality or newness, and the saturation level[50185] of Ukrbots[110] will fall accordingly. Such embodiments will generally have the "cost" and reuse thresholds relate to the value of the audience[910] in question rather than being one size fits all.

Most embodiments will support an aging model[51860] for dialog script templates[50477], visual and other non-text templates[50465] and instances. An aging model[51860] is used to determine when particular content[950] should be either retired or updated so as to inject some variety. Many embodiments may also opt to employ differentials in the cost of use[51795] of collateral[50040] that should be applied between the first usage of the template[50477] (or instance) when it will enjoy the benefits of being fresh and so garner more attention and positive comments[51615], and the last usage before the collateral[50040] is retired or updated.

Each time that a piece of collateral[50040] is actually posted (rather than just added to an engagement package [50030], its aging counter[50615] is incremented by 1 in most embodiments. Certain embodiments may also increment the counter[50615] if a non-Ukrbot[100] user[220] reposts the collateral[50040], or it is automatically reposted by some mechanism. Different embodiments may prefer to use different increments based on different circumstances that they will specify. If the collateral[50040] was generated from a template[50465], the template's[50465] counter is similarly augmented. Just as aging models[51860] are population-relative, so too is age[51800]. In most embodiments, a piece of collateral's[50040] age counter[51865] will be reset to zero if it is being used in a location[405] where (presumably) users[220] will be unfamiliar with it. Because some collateral[50040] may age very well—some comedians use the same jokes successfully for decades—and others may really only work well upon first use, almost all embodiments will scan for user[220] comments made during the course of an engagement[125] and for a specified trailing period after it, about any of the collateral[50040] used as well as the Ukrbot[100] itself. As noted in FIG. 62, the two main things of interest in most embodiments will be the number of comments[51615] from the audience[910]—as previously noted, silence is not golden in this situation—and the numbers of these comments[51615] with discernible positive or negative sentiment[50510]. Because from an HCI standpoint, the Ukrbot[100] isn't readily separable from the collateral[50040] and vice-versa, the sentiment [50510] in comments[51615] about the Ukrbot[110] is considered to apply to the collateral[50040] it uses and vice-versa.

For good collateral[50040]—and especially collateral [50040] that has been initially verified with the UDTS [90000] system—it can typically be expected that upon initial usage, it will garner a number of positive comments [51615], re-posts etc as it benefits from the newness effect. These can be expected to fall off over time, as more and more of the particular audience[910] sees it for the first time, while others see it for the Nth time. However, the speed and degree of that fall off will vary considerably with factors such as the variability of the audience[910]—and thus how long it takes for most of that audience[910] to see the collateral[50040]—the inherent quality of the collateral [50040], and its suitability for the particular audience[910].

While the detection and categorization of such comments [51615] may have only moderate fidelity depending on the medium[135] in question, trends in the number of user[220] comments[51615] and their sentiment[50510] should be identifiable. Most embodiments will consider media-specific artifacts such as "likes" and "retweets" of collateral[50040] or portions of collateral[50040] as evidence of positive sentiment[50510] absent some explicit accompanying negative sentiment[50510] text.

Different embodiments may choose to weight such user [220] actions differently from actual text-bearing comments [51615]. Most embodiments will determine that a piece of collateral[50040] has "aged out" at the point that positive comments[51615] have dropped off and negative comments [51615] (e.g. 'not this one, again?!') are starting to rise. Specifically, most embodiments will employ heuristics of their choosing based on properties of three different feedback[90020] curves: one each for the number of total detected comments[51615], one for positive comments [51615], and one for negative comments[51615]. (Note that the number of total comments generally will not simply be the sum of the positive and negative ones, since some percentage of comments[51615] will fail to categorize by sentiment[50510].) Most embodiments will have search filters for such "fatigue"-related user[220] comments [51615]. In such cases in which there are an insufficient number of user[220] comments[51615], the system[10000] will fall back on data from the UDTS[90000] if available.

Failing that, most embodiments will default to a specified number of uses, which will generally be by collateral [50040] type or by location[405], depending on the particular embodiment. However, some embodiments may prefer to take more sophisticated approaches, for example basing the "retirement" age on what has been observed for other pieces of collateral[50040] produced by the same person. In other locations[405] that are considered to be non-overlapping with the current one in the configuration, in some embodiments, the aging model[51860] will be applied to help determine how many times the collateral[50040] can be used before it becomes "stale" and must be retired or reworked. (Depending on the configuration, aging models[51860] may be restricted to a particular medium[135], ecosystem[915], geographic region, or any other type of constraint whose purpose is to define non-overlapping populations of users [220]. This is in part so as to get the fullest practical reuse out of collateral[50040], but also so as to create different populations of users[220] for whom collateral[50040] may age at different rates.)

The properties of the feedback[90020] curves will then be used by most embodiments to determine the costs of use [51795] for a template[50465] or individual pieces of collateral[505[for each of its N usages within a bounded area as described just above. For example, if a simple embodiment were basing this determination solely on the basis of positive comments[51615], if the first time a piece of collateral [50040] were used, it garnered 100 comments[51615], the next time 80, then 50, then 40, then 20, then 10, then none, in those embodiments implementing variable costs of use [51795], the cost of use[51795] for the initial usage would be ⅓ of the cost of collateral[50040].

Some embodiments will also use this logic for assessing Ukrbot saturation[50185] of a given location[405]. Specifically, most of these will look for a combination of positive comment[51615] fall off and a rise in the number of Ukrbot [100]-fatigue comments[51615]. When both of these conditions are met, either/both the Ukrbots[100] will stay away from the given location[405] for a pre-specified interval time (absent operator override[51870]) and/or higher requirements will automatically be placed on the collateral[50040] being used, with the budget[50450] being raised commensurately to accommodate.

In most embodiments, the number of comments[51615] explicitly about a piece of collateral[50040], as well as reposts of it, and likes, retweets and the equivalent will also be considered a measure of the collateral's[50040] effectiveness[51515]. Please note that "effectiveness" in this context does not mean effective in exerting influence but rather effective in the sense that the target audience[820] seems to like it. Thus it is a lower bar that can reasonably include low value/low fidelity signals such as "likes." Most embodiments will limit measuring effectiveness[51515] to the first N uses of the collateral[50040] in a given location [405], where N is specified in a system parameter.

Many embodiments will also treat bot saturation[50185] as something to be optimized for, rather than just as a constraint. It is very arguably a desirable outcome to saturate the set of contested channels[140] with Ukrbots[110] just up to—but not beyond—the point at which they would become oversaturated. Otherwise put, most embodiments will strive to attain an at least somewhat middle of the road position: too few Ukrbots[110] in circulation defeats the purpose of a scalable, largely automated system but too many will backfire.

Whichever strategies for assessing bot saturation level [50185] have been chosen by the particular embodiment, virtually all embodiments will impose a bot saturation level[50185] check on each batch of engagements[125] that have been packaged. As noted in FIG. 63, most embodiments will include engagements[125] that are expected to occur within time windows that once factored in, would cause bot saturation level[50185] problems on specific locations[405]. Depending on the configuration settings, this calculation cascades hierarchically, so that even if a particular channel[140] were not saturated, the additional engagement[125] could oversaturate the relevant channel group [145] or ecosystem[915].

Where a proposed engagement[125] is blocked by existing saturation issues[51850], the engagement packager [50010] will postpone the engagement if doing so will both avoid the saturation issue[51850] and yet still probably occur within the permitted window of response (based on predictions of how long the particular adversary identity [270] will stay active on the particular channel[140].) In the event that this is not possible, in some embodiments the targeting request[50435] is cancelled, and its lock on any collateral[50040] is released. In other embodiments, an operator alert[50560] is issued. In the event that bot saturation problems[51850] are caused by engagements[125] that are part of the current batch and/or have not yet been launched, conflicts are resolved in most embodiments according to the value[50182] of each engagement[125]. However most embodiments will allow strategic engagements[125]—those with either/both a strategic target identity[270] and/or that involve radioactive content[185]—to take precedence, and will also support operator[250] overrides.

Pre-Launch Check

As indicated in FIG. 64, Most embodiments will opt to conduct a pre-engagement[125] launch check so to as ensure that none of the governing conditions have changed within the (usually) brief interval of time between the relevant targeting request[50435] having been made and the point at which the engagement[125] in question will actually be launched by the SDS[50000]. This process will begin in most embodiments with the Engagement Packager[970] requesting permission from the Ukrbot Management System (UMS)[985] to launch the particular engagement[125]. The UMS[985] will then perform a number of tests that may vary somewhat with embodiment. The tests that will be executed by a default embodiment are documented below.

As noted elsewhere, a bot saturation level[50185] check will be performed. Likewise, most embodiments will impose a reaction time window[50090] on engagements[125] from the point in time at which the adversary identity[270] last posted triggering content[950]. There will thus be a check to ensure that this window[50090] has not been exceeded. Many embodiments will perform a separate test for whether or not the adversary identity[270] is still active on the relevant channel[140] so as to handle the edge case in which the reaction window[50090] has not run out, but the particular adversary identity[270] being targeted has left the channel[140]. In situations in which computing resources are very limited, some embodiments may perform a check to ensure that there is sufficient capacity before launching a new engagement[125]. Some embodiments that employ the construct of risk level[51830] will opt to recheck it prior to launch.

Many embodiments will examine the audience[910] size or value[815] on the relevant channel[140] at the current moment so as to determine whether it is consistent with what would typically be expected on that channel[140] given the time and day. This check provides the opportunity for an engagement[125] to be postponed or cancelled in the event that for whatever the reasons, the audience value[815] is unexpectedly and significantly low. The degree of variation in value[815] that will be considered acceptable will be expressed in a configuration parameter.

Many embodiments will also choose to take in one further update of activity on the channel[140] in question, so as to try to ensure that the discourse[50515] has not substantially altered during the interval of the targeting request[50435] and the point at which the engagement[125] is ready to launch. This is due to the fact that on some media[135], during a spike in activity hundreds or even thousands of new posts could appear within a quite short period of time.

Many of the embodiments that do so will not only look at the posts[195] of the adversary accounts[270], but also of any interactions between these accounts[270] and other users[220], whether supporters[51575], detractors[51560], or not obviously aligned users[220]. The motivation for this is that "reaction time" isn't just about straight clock time, but also about the amount and kind of activity that occurs on the given channel[140] during that time interval. A Ukrbot engagement[125] is less likely to succeed if its premise is already becoming stale by the time it is launched. Thus part of the activity update will include any notifications from the NLU System[10100] that a topic change[51630] has been introduced, and if so, how many posts[195] since that point are on the new topic[165] rather than the old. Likewise if the displayed attitudes have already changed in the desired way.

Different embodiments will set their own rules for activity that is unrelated to the triggering event[50480]. Some of these will not be concerned if a topic change[51630] has been introduced, so long as there also continue to be user[220] posts[195] on the original topic[165].

If all of the necessary tests return a code of "success", assuming no human operator[250] intervention, the UMS [985] will notify the Engagement Packager[970]. The Engagement Packager[970] will send the Engagement Package[50030] to the Ukrbot Instantiator[975] which will instantiate the requested Ukrbot instance(s)[110] on the channel(s)[140] that have been specified in the engagement package[50030].

If one or more of the tests returns a failure code, the launch of the engagement[125] will be put on hold, postponed, or cancelled. A status of "put on hold" means that whatever the issue is, the launch can reasonably be retried within a maximum (small) number of minutes. Postponement is similar, but is intended to indicate a longer delay, and some embodiments may opt to re-perform the pre-launch checks. Cancellation results in the cancellation of the associated targeting request[50435]; the target[50425] of course still remains a target[50425], but will now have to do something new that re-triggers the targeting system[10000] in order to be targeted again. The particular failure code returned will indicate the extent of delay that is deemed necessary. If multiple tests returned failure codes, the most severe failure will determine the launch outcome.

Initiation of an Engagement

In most embodiments, a Ukrbot engagement[125] will begin with either the Ukrbot instance[110] or persona[115] introducing itself on the channel[140], or with it appearing and executing the first turn[750] in a dialog script[50475]; the greeting on those channels[140] for which it makes sense to have such a greeting, need not be part of the dialog script[50475]. Although the issuing of challenge questions [41600] is a key part of the engagement[125], most embodiments will not choose to start off with a challenge question [41600]. This is because while the challenge questions [41600] may be necessary to the mission, in many cases the questions[41600] themselves, and any responses[44200] to them will not be especially entertaining to any users[220] watching—except of course in the case in which the response[44200] is flubbed in some humorous fashion. For this reason, most dialog scripts[50475] will have slots [11060] for challenge questions[41600], and these slots [11060] will determine the set of junctures within the dialog script at which a challenge question[41600] may be issued without steering the intended progression off course. As noted elsewhere, it is not generally necessary for there to be any direct semantic or other relationship between the dialog script[50475] and the challenge question(s)[41600]. However some embodiments may allow a dialog script[50475] to have designated challenge questions[41600] associated with it and/or with the particular collateral[50040] that has been packaged.

Depending on the medium[135] in question, most posts [195] may be effectively made into the ether; that is to say, there will be no visible reaction to them. In this event, the Ukrbot[110] will simply continue on with the dialog script [50475] until it gets to the first turn[750] set aside for a challenge question[41600]. Again depending on the medium [135], this will be a message that is somehow directed explicitly at the targeted adversary account[270] so as to avoid any ambiguity, but a message that is also publicly visible so that any users[220] watching the channel[140] witness the challenge[41600].

Although the specific delivery of the challenge question [41600] will vary by embodiment, system[40000] configuration, medium[135] and engagement parameters[51625], in most embodiments, the challenge[710] is presented much as a captcha is, e.g. "please convince us you are not a bot posing as a person", or that you are who and what you say you are. Experience shows that most people accept the momentary inconvenience of having to respond to captchas because they understand that bots pose problems for the services that they are trying to use. This acceptance is greatly facilitated by the fact that captcha usage is almost always restricted to either once a session, or just once ever, as part of the process of signing up for something. Most embodiments will at a high level try to follow analogous logic, which is to say limiting the number of challenge questions [41600] both directed at an individual user[220], and that the same set of users[220] will unavoidably see posted[195] on whatever channel[140], or in many embodiments, channel group[145] or ecosystem[915].

Figure 65:
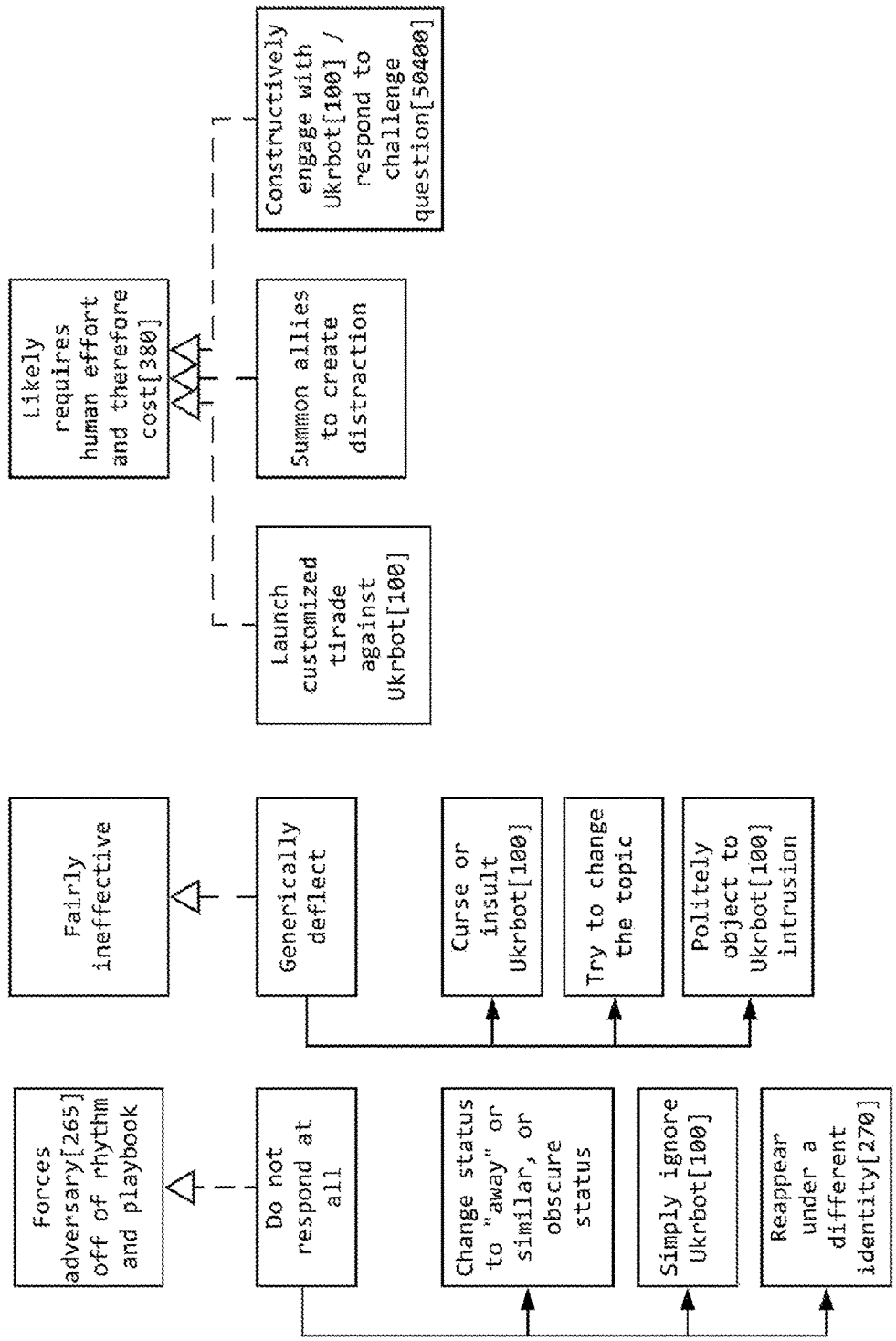
FIG. 65 is a block diagram illustrating adversary options when engaged by an embodiment of a Ukrbot.

Once a challenge[45700] has been issued, the options for the adversary[265] are not particularly attractive. As illustrated in FIG. 65, these are as follows, and are not necessarily mutually exclusive:

Not respond and become inactive for some noticeable period, while remaining in a "logged in" or "present" status if the given medium[135] supports such a thing.

Not respond and become inactive for some noticeable period, while changing status to "away", if such statuses are supported by the given medium[135]

Not respond and become inactive for some noticeable period, presence status unknown Ignore the Ukrbot[100]

Attempt to generically deflect (e.g. "That's not relevant." and similar generic responses)

Generically insult the Ukrbot[110], which is a type of deflection

Change the topic[165] altogether, thus ignoring the challenge[710]

Try to politely object to the Ukrbot's[100] intrusion

Reappear quickly, but with a different user handle[240]

Start a customized tirade against the Ukrbot[110]

Try to deflect by having other adversary accounts[270] or Ukrbot detractors[51560] make a lot of noise to distract users[220] watching Constructively answer the question[41600] posed, possibly requiring a sock puppet, or troll to troll transfer.

The "not responding" cases are tantamount to the adversary[265] withdrawing, at least for a while. Even if the same account[270] returns later the same day, or the next, its inability to run its playbook within fairly minimal time between "plays" limits its ability to gain influence and even visibility. Almost all embodiments will log non-responses, and will use statistical, ML, and other models to determine which of these deflection attempts and non-responses should be considered as evidence[535] of being an adversary bot [255] or troll[260]. (Obviously a normal user[220] may leave his desk at an inopportune moment from the POV of the SDS[50000] without it signifying anything.

Figure 66A:
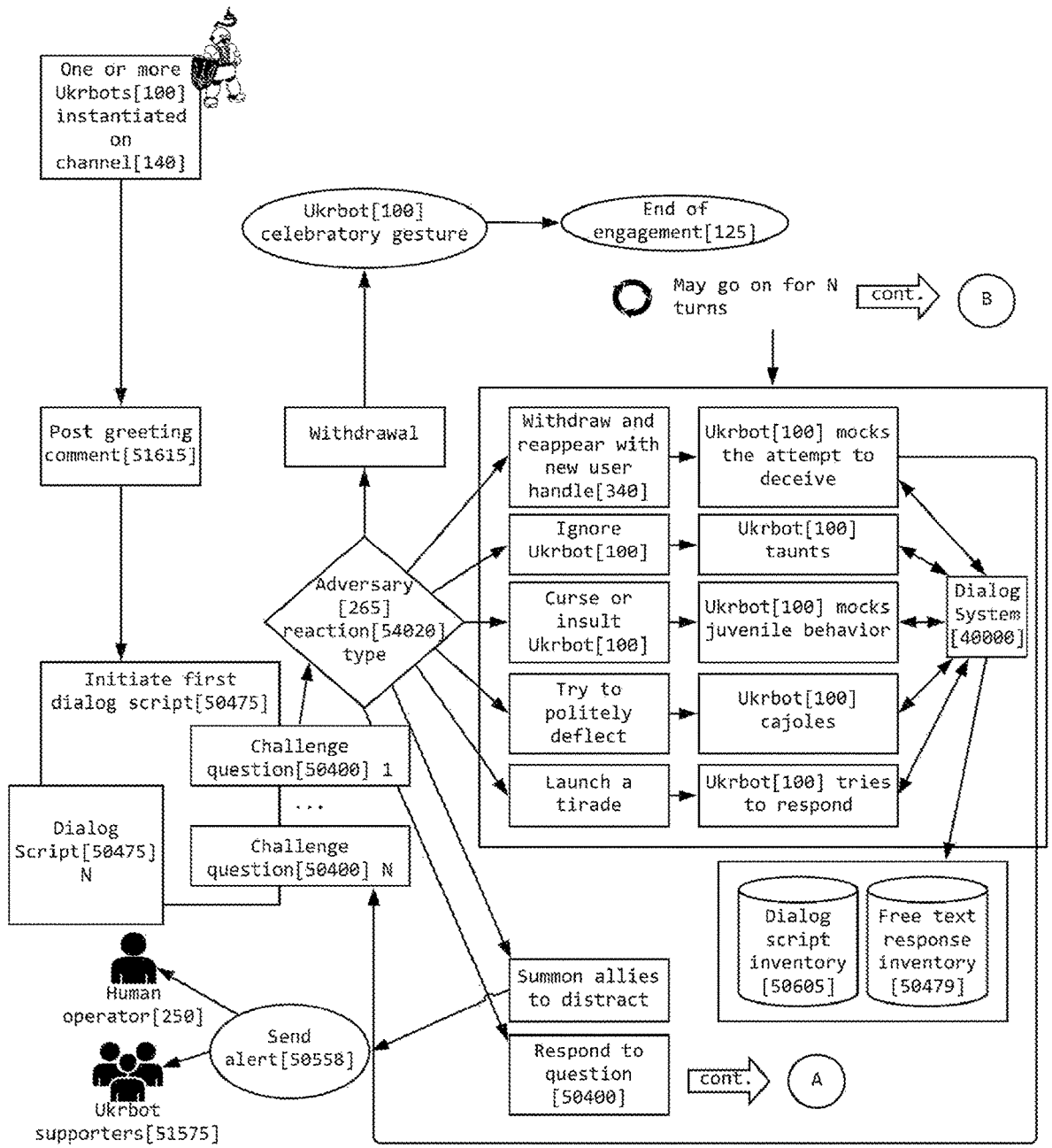
FIGS. 66a and 66b are a set of two block diagrams illustrating a common embodiment's engagement and challenge question protocols.
Figure 66B:
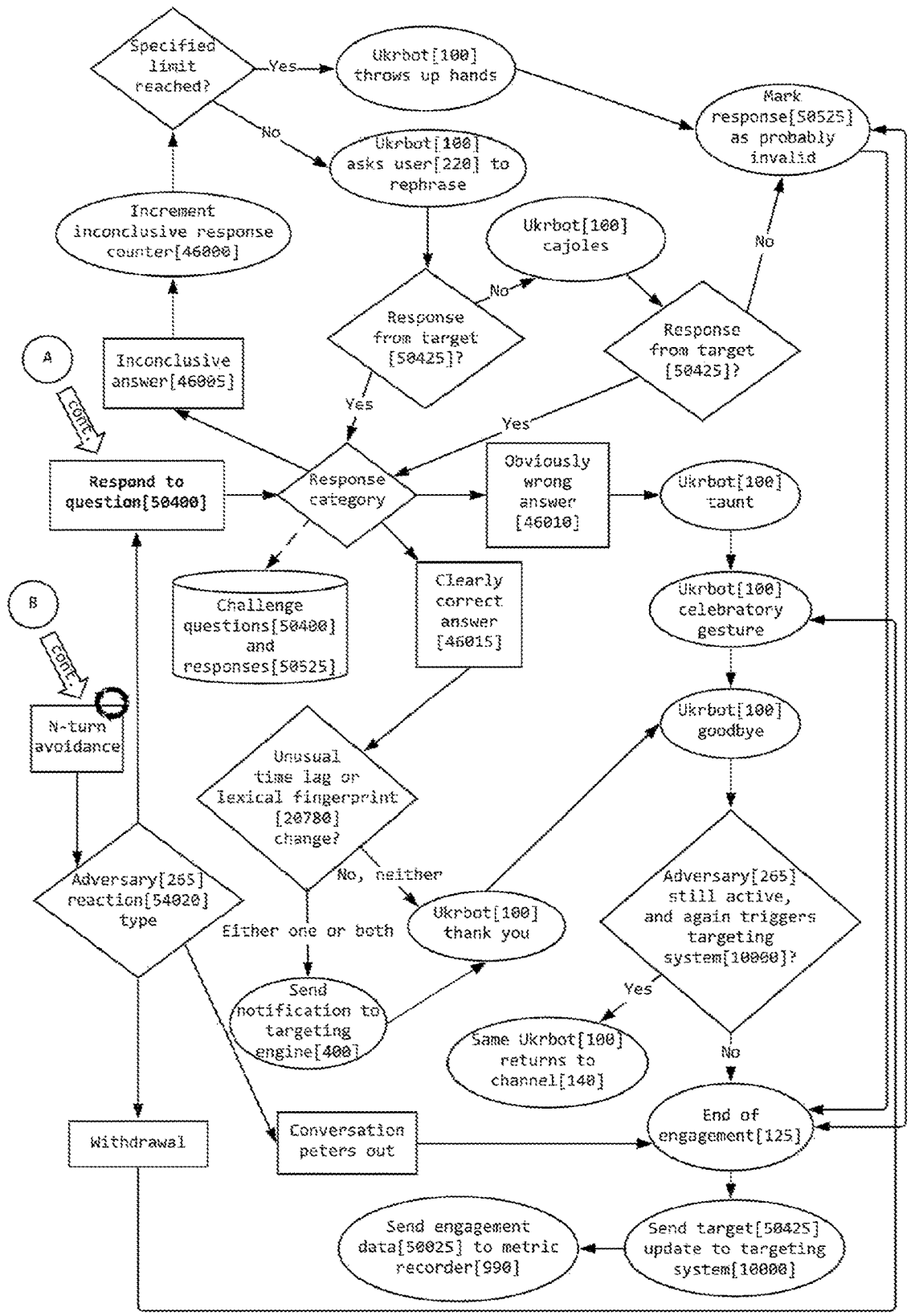

But it can't keep happening without it being highly suspicious.) As indicated in FIGS. 66a and 66b, in most embodiments, in this event, the Ukrbot[110] will use stored dialog[41100] to publicly note that the adversary identity [270] has disappeared. This may be generic dialog[41000] for this scenario from the free text response inventory [50479] in the knowledge base[10270], generic but customized to the specific interaction, or part of a dialog script [50475] or template[50477] that includes this scenario. The Ukrbot[100] may also do a victory dance or perform some other culturally appropriate gesture, if possible on the given medium[135]. After a pre-set period of inactivity on the part of the adversary[265]—so as to ensure that it's not a matter of someone leaving their desk for a few moments—the withdrawal will be logged by the SDS[50000], and the engagement[125] will end and be marked as successful. In many embodiments, the fact of the withdrawal will be worked into future dialog scripts[50475] to mock the specific adversary identity[270]. For example, a dialog[41000] line such as "Hey <insert adversary identity name> are you going to run away again like you did the last time we met on <insert date> ?" would be inserted at the start of a dialog script[50475].

Generic deflection techniques on the part of the adversary [265] will be met in most embodiments with special dialog [41000] stored in the knowledge base[10270] for this purpose, that as with other dialog[41000], will be tailored to the specific audience[910] by the NLG system[60035]. For example, the Ukrbot[110] might challenge the adversary [265] as to whether it knows how to do anything other than use generic curse words, which any simple bot or third grader can do. Since each successive turn[750] will be more of the same if the adversary[265] is a bot[255]—or maybe even a junior troll[260]—any users[220] viewing the content on the channel[140] will clearly be able to see the adversary account[270] for what it is. Most embodiments will thus provide special purpose dialog scripts[50475] that are made for several turns[750] of cursing or other insults. Most embodiments will score engagements[125] that end in this fashion as inconclusive or neutral in terms of outcome [50535]. However, this does not mean that the engagement [125] may not have had a positive influence on users[220] who witnessed it.

In the event that the adversary[265] tries to politely deflect, for example by changing the topic[165], here too most embodiments will have special dialog[41000] that can be brought to bear. This dialog[41000] will be tailored to make answering the question[41600] the path of least resistance (e.g. "Please take a moment to respond to our simple question so that we know whether we should pay attention to anything that you say.") Here too, the SDS[50000] will generally provide dialog scripts[50475] that contain several turns[750], with the assumption that the adversary[265] will try to ignore it, and that it is important for any users[220] seeing the exchange to realize that the adversary[265] is not taking the path of least resistance by ignoring the Ukrbot's [110] request.

In many embodiments, the Ukrbot[110] will exhort any supporters[51575] currently present on the channel[140] to pressure the adversary[265] into answering the challenge question[41600]. In this case, the adversary[265] has been forced off of its original intended discourse, and may well end up having to answer the question[41600], which in most cases will incur cost[50005] to them. Most embodiments will consider the case in which the engagement[125] terminates without the challenge question[41600] being answered as neutral in outcome[50535]. This is because while the target identity[270] hasn't been conclusively outed, suspicions will have surely been raised.

If the adversary's[265] solution is to disappear and in short order reappear on the channel[140] pushing similar discourse under a different user handle[340], the "new" identity[270] can be challenged again, if allowed by the configuration rules in place to prevent an excess of challenges[45700]. (As noted in the targeting system[10000] section, such shedding will be presumed to have occurred in most embodiments if one apparently adversarial identity [270] disappears from a channel[140] once challenged by a Ukrbot[100] but a different identity[270] shows up within some pre-set window of time[50090] and is assessed as either/both manifesting similar behavior to that of the previous identity[270] and/or is posting related or similar kinds of content[950].) Having to shed identities[270] continually makes it much harder for any identity[270] to build influence[51620] on the channel[140]. Most embodiments will provide canned dialog[50520] for this case—for example quips to the effect that a wolf in sheep's clothing is still obviously a wolf. Because of the cost/loss of investment of shedding an identity[270], most embodiments will consider this case as a successful outcome[50537] to the engagement [125].

A tirade or lengthy customized rant can be an effective strategy if well executed, but it incurs cost[50005] for the adversary[265], since it will very likely require a human operator[250], and a relatively more skilled one. Likewise bringing other helpers in to create distraction can be effective, but either requires a bunch of detractors[51560] to be quickly found or probably incurs cost[50005], since it is likely to require at least one troll[260]. Because of the incursion of cost[50005], most embodiments will consider this case as a successful engagement[125]; some embodiments may require a minimum estimated cost incurred [51600] to treat the outcome[720] as successful[50537]. In most embodiments, the incurred cost[50005] in this case is assessed according to the estimated pay for the "helpers" during the course of their involvement, including a supervisor.

Finally, the adversary[265] can just answer the challenge question[41600] and be done with it, at least for a while. However, if the questions[41600] are well selected—that is, they are a novelty to the adversary[265] while being fairly common knowledge among the target population—and are appropriately tagged, answering them correctly will likely incur cost[50005], both for a correct response[44200] to be researched and for a troll[260] (or a more senior troll[260]) to take over control of the account[270].

Answering incorrectly in an obvious way, whether because a troll[260] lacked certain key knowledge, or that the bot's[100] logic just wasn't good enough, results in the adversary identity[270] being pretty definitively, and perhaps even comically, outed. Some embodiments may choose to have a special "success" sub-state for this best case outcome, which in some of these embodiments will be based on capturing the reaction of the audience[910] with topic [165]/sentiment[50150] filters, while in others, it will be determined by human operator[250] review. Indeed, most embodiments will store incorrect answers[50530] for the purpose of reusing them in both dialog scripts[50475] and infographics[51525] to mock the adversary[265]. In this case, the Ukrbot[110] will emphatically claim victory in most embodiments. Depending on the embodiment and the medium[135] in question, the Ukrbot instance[110] may do a little jig or other culturally appropriate dance—or break into song before departing the channel[140] (assuming that in fact the adversary identity[270] doesn't return within a pre-specified time window.)

Most embodiments will consider any engagement[125] that includes a challenge[45700] being accepted by the adversary[265] as a successful outcome[50537]. The reasoning for this is as follows. If the adversary identity[270] gives an obviously incorrect response[44200] to the challenge question[41600], it is outed. This is by definition success. In this event, the Ukrbot's[100] dialog[41000] will provide a means of noting the failure publicly with ridicule.

If the adversary[265] provides a valid response, —even if a hostile one—cost[50005] was likely incurred to do so, so also a good outcome. If the targeting system[10000] incorrectly targeted a user[220] who nonetheless responds in good faith—and apparently without transferring the account to someone else—that's not a bad outcome either. Users [220] who are trying to be good citizens should respond if challenged; doing so will literally only take seconds if the person is who they say they are. In either event, in most embodiments, the Ukrbot[110] will politely thank the user [220] for their cooperation.

Almost all embodiments will look for evidence of sock puppet transfers[50540] in such cases, and will flag any cases that are deemed suspect to the targeting engine [10130]. The approaches include but are not limited to: measuring elapsed time, and lexical fingerprinting differences. Even if the challenge[45700] is successfully responded to without any red flags, most embodiments will not consider this to be the end of the matter, despite being bound by a pre-set mandatory wait period before that same identity[270] can be challenged again.

In the event that the Ukrbot[110] is beset with supporters [51575] making friendly comments[51615] (as identified by the NLU System[10100]) upon showing up on the channel [140], in most embodiments the Ukrbot[110] will acknowledge and thank the supporters[51575]. Specific dialog [41000] will be provided for this purpose in the knowledge base[10270] in the different languages[50495] that are relevant for the theatre of operation; the NLG system[60035] in most embodiments will enact further refinements, such as dialect[50500] and register[51845] adjustments.

In many embodiments, comments and other Ukrbot[110]-related activities of supporters[51575] will be tracked, allowing the Ukrbots[110] to make customized comments [51615] to individual supporters[51575] to encourage their continued efforts, much as politicians do to their supporters [51575] with the assistance of their staff and/or various apps. Such embodiments will provide support for this via the NLG system[60035], which will avail itself of dialog templates [50477] in the knowledge base[10270] as the basis for customized messages to individual supporters[51575]—for example, thanking a supporter[51575] by name for her help in chasing a particular adversary identity[270] off a channel [140] recently.

An analogous logic applies to handling detractors[51560], with the Ukrbot[110] responses being calibrated to the specific (negative) sentiment[50150]—though not necessarily mirroring the exact sentiment[50150] expressed by the detractor(s)[51560], but rather using a sentiment[50150] response mapping table provided by the given embodiment. Well known, repeated detractors[51560] may be personally addressed, with specific references to any evidence[535] of wrongdoing available from the targeting system[10000].

Often both supporters[51575] and detractors[51560] may be simultaneously present on a channel[140]. While some embodiments may opt to provide explicit dialog[41000] that addresses the fact that there's a mixture of viewpoint in the audience[910], most will otherwise handle supporters [51575] and detractors[51560] as indicated above.

It should be noted that even if a challenge question [41600] is responded to, it may not be the end of the engagement[125] in most embodiments. If the adversary [265] provides a valid response[44200] to the challenge [45700]—possibly with outside aid, or the temporary transfer of the account—it may well continue with its appointed mission. In most embodiments, the SDS[50000] will not consider the engagement[125] to be terminated in this scenario, despite an outcome[720] having already been potentially assigned, until the adversary identity[270] has withdrawn from the channel[140]. It will continue to pull updates on the target's[50425] activity from the targeting system[10000] until the adversary[265] departs in most embodiments. If the target[50425] again triggers the targeting system[10000], for example by posting tainted content [185], the same Ukrbot instance[110] or persona[115] will reemerge to again challenge the adversary[265].

However, in most embodiments it will not pose a second challenge question[41600] in this case, under the reasoning that doing so could bore the users[220] watching. Instead, the challenge[45700] will relate to the adversary's[265] actions. Most embodiments will supply evidence-type[540]-related dialog scripts[50475] for this purpose. For example, the Ukrbot[110] might ask the adversary account[270] why, given that it was clever enough to correctly answer the challenge question[41600], is it so stupid to again be reposting content that came directly out of the Kremlin, and post infographics[51525] and/or links to such occurrences. This too is a kind of challenge[710] that will likely cause a troll[260] to have to intervene if there are a sufficient number of users[220] watching. A similar case occurs in the event of a nonsensical response[44200] to the challenge question [41600].

Evaluating the Challenge Question Responses[44200]

All challenge questions[41600] will have a set of valid responses[41110], and most embodiments will accept many variations of these, including but not limited to common misspellings and specific language competence issues, morphological variations and long-winded answers. Some questions[41600] may also have list of known wrong answers [50530], specifically responses that are likely to be provided by an adversary[265] of known language[50495] and culture characteristics. Almost all embodiments will have an extensive set of attempted deferrals that they can recognize, comments like "I don't need to answer your stupid questions!" Most embodiments will provide a mechanism to attempt to recognize specific cases such as automated attempts to parse the first result of a Google search.

But all of this still leaves open the question of how to deal with responses[44200] that are recognized as neither valid nor invalid. Such responses[44200] can occur for many different reasons, including the case in which the targeted user[220] literally says "I don't know" or some other deflection that may also be a good faith response to the challenge question[41600]. By itself, it is not evidence that the targeted user[220] is in fact an adversary[265]. Most embodiments will err on the side of targeting[50425] users [220] who may have even a tenuous relationship with the adversary[265]; asking someone to spend a few seconds answering a question is mild enough, and provides some value: a user[220] with low targeting certainty[51500] who quickly and correctly offers a response[44200] is likelier than not to be harmless, and in most embodiments, in such cases the targeting certainty[51500] will fall further as a result. However, often even "normal" users[220] will not provide the desired thing, especially on the first try.

For example, a normal user[220] if incorrectly challenged by a Ukrbot[110] may simply not know the answer to a given question[41600] but try to guess; consider for example the case of a person who never watches television and so cannot identify a common TV reference. There may be interpretations of the question[41600] other than the originally intended one. The user[220]—whether or not actually an adversary[265]—may provide a very tangential response. And of course some people are just truly horrible typists or spellers.

Most embodiments will try to deal with this issue in the following way. If the first response falls in this category, the Ukrbot[110] will try to assist the user[220] by action which may include but are not limited to: asking for the response [44200] to be reworded and/or to be made more intelligible or standard, reminding the user[220] of the purpose of such challenges[710], asking the user[220] if they would prefer another genre of question (to deal with the above noted case of someone who just doesn't watch TV and others like it), and rephrasing the question. (Note that almost all embodiments will tailor the question[41600] wording to the language[50495], dialect[50500], and education level[51520] of the target[50425] so as to try to minimize this as the issue.) Otherwise put, the Ukrbot[110] will try to remind the user[220] that the point isn't to give a great or even a true answer, just one that helps the system[10000] to authenticate them.

For example, if the challenge question[41600] were: "What is your favorite flavor of ice cream?" a common flavor such as "chocolate" or "vanilla" is a perfectly good response[44200] and indeed the best kind of response [44200] as it will surely be recognized as valid. It doesn't actually matter if the user's[220] actual favorite flavor of ice cream is "Chunky Monkey." A detailed description of an ice cream sundae might be recognized as valid, but is totally superfluous.

Thus the hope is that for a non-adversary-aligned user [220], the second time will be the charm. If there is no immediate response[44200], in most embodiments, in the next turn[750] of dialog[41000] the Ukrbot[110] will try to cajole the user[220] to provide a second response[44200]. It may also again ask other users[220] present to encourage the targeted user[220] to respond. Of course, this also buys time for the adversary[265] to seek help and/or to transfer control of the account[270]. But this also incurs a cost[50005] in doing so.

Failing any kind of second response[44200] after a fixed period of time, most embodiments will consider the initial response[44200] as probably invalid. At this point, different embodiments may opt to handle things differently based on their specific circumstances. Some embodiments may set a maximum number of turns post initial challenge question [41600], and/or a maximum number of attempts to try to get the user[220] to respond. If these thresholds are exceeded, the Ukrbot instance[110] will perform a gesture of throwing up its hands (or the equivalent in the relevant culture) and the engagement[125] will be terminated, the responses marked as all probably invalid.

Some embodiments may submit the initial response [44200] for human operator[250] review, if adequate resources are available. If another indeterminate response [44200] is provided, in some embodiments it will be submitted to the human operator queue[50565] for review unless this case has previously occurred with the same user[220], in which case most embodiments will just assume that the response is invalid and that the identity[270] being challenged is an adversary[265]. Other embodiments will simply mark the response as probably invalid. The other possible resolution of the N-turn challenge question[41600] avoidance scenario is that the conversation simply peters out. Most embodiments will treat this as tantamount to the engagement[125] timing out.

It should be noted that the adversary[265] will at some point figure out that providing rambling or somewhat incoherent responses[44200] is advantageous insofar as it both makes life more difficult for the NLU system[10100] and also decreases the chances that users[220] bother to really read the response[44200] to see just how really wrong it is. Other possible obfuscation strategies include trying to throw questions back to the Ukrbot[110], or launch some kind of rant that includes terms that are semantically related to those found in the challenge question[41600]. Thus many embodiments will deploy specific countering techniques. These will include but are not limited to: ML or other text analytics techniques to assess non-semantic similarity among unrecognized responses[44200] in the context of a challenge [710]—in other words, to identify a machine generation fingerprint, novelty[45100] assessment (with the idea that content[950] that contains some of the right words was plucked from another source) checks for syntactic correctness, and semantic similarity assessments with other content on the relevant topic(s)[165]).

Some embodiments will differentiate between the case in which the target[50425] disappears and then subsequently reappears and that in which the target[50425] remains active on the channel[140] following the second challenge, but provides no response[44200]. In the former case, some embodiments may pose a third challenge question[41600], since sufficient time will have passed to allow valid answers [50530] to be researched for the second challenge question [41600]. In the latter case however, the Ukrbot[110] will shift to either the ridicule branch of the dialog script[50475] or a new ridicule-oriented dialog script[50475], and may also encourage supporters[51575] to troll the target[50425]. Most embodiments however will leave it there, since it serves no useful purpose to mount further challenges. Any users[220] watching will have already observed the repeated unwillingness of the target[50425] to respond. Most embodiments will score such a case as a neutral outcome [50535].

Other Metrics for Evaluation

Some embodiments will consider that an engagement [125] has failed if its actual cost[50005] of execution[51795] has exceeded the gain[50455] from it, or a specified ROI [51605] for the engagement[125] was not achieved. Other embodiments of this class may prefer other cost-based metrics, for example cost overrun. The most common case of this will be unexpected levels of human operator[250] involvement.

Most engagements[125] will consider that failure has occurred in the event that one or more errors in any of the subsystems[107] has led either to the SDS[50000] recalling a Ukrbot[110] based on the existing "bail out" rule set, or to the need for a human operator[250] to intercede—either to temporarily take over the account[215] or else to withdraw the Ukrbot[110] from the channel[140]. In other words, they will choose to measure on the basis of the technical functioning of the system, and will set up rules, including for human operator[250] intervention, accordingly. Such technical failures include, but certainly are not limited to the following:

NLU failure in interpreting the text of recent posts[195] by the adversary[265]

NLG failure such that one or more turns[750] of dialog [41000] are either nonsensical or objectively offensive. (Most embodiments will for example try to put in place defenses against the unwitting echoing of ethnic slurs and the like by the NLG component[60035], but it is not likely to be able to avoid all such cases.)

Image analysis failure w.r.t. content posted[950] by the adversary[265]

Audio analysis failure (e.g. speech to text) w.r.t. content posted[950] by the adversary[265]

Other targeting system[10000] failures (e.g. wrong targeting reasons(s)[50445], wrong target[50425], etc)

The identification of such technical failures will fall into the following categories in most embodiments: a) literal failures, such as exceptions being thrown in the relevant components, b) low parsing or other analytic certainties—or inability to interpret content[950] altogether—that cobbles the engagement[125], c) an operator[250] observing odd or desirable behavior on the part of a Ukrbot[110], d) the reaction of users[220] in the audience[195], including supporters[51575]. In their "bail out" rules, most embodiments will choose to use combinations of these different failure types. For example, low parsing certainty of a post[195] coupled with even a small number of user[220] comments suggesting that the Ukrbot[110] has missed the boat together very likely mean that there's a real problem.

Most embodiments will assess engagement[125] success or failure based at least largely on the literal outcome. These embodiments will generally conclude success if the specific adversary[265] either withdraws from the given channel [140] at least for a specified period of time, or is clearly outed even if it does not depart from the channel[140]. They will generally conclude failure if the Ukrbot[110] withdraws or must be taken over but the adversary[265] does not, and neutral otherwise, if the engagement[125] just peters out. (Most embodiments will have definitions of "petering out" which will generally be expressed in the number of posts [195] on the channel[140] that are entirely unrelated to the engagement[125] that have occurred since the last engagement[125]-related one.) Most differences in implementation will arise from the interpretation of "clearly outed."

Some embodiments will try to assess this based on user[220] reactions, which should be present, assuming any number of users[220] are watching the exchange—and the adversary[265] really was "clearly outed." Some of these embodiments will also try to assess the degree of intensity of reaction by the set of adversary identities[270] present, under the reasoning that the more clear the "outing" was, the greater the perceived need on the part of the adversary[265] to try to deflect it. Different embodiments may use different approaches to assess "intensity." These include but are not limited to: scales of the emotional intensity of different words, loud talking[51855] as described in U.S. Pat. No. 10,445,668 B2, and the number of identities[270] that show up on the channel[140] to comment.

Other embodiments will have human operators[250] score challenge responses[44200] that were rejected as invalid by the SDS[50000]. Some embodiments will also have a selection of "trick" challenge questions[41600] such that there are known very bad answers[50530], not just known good answers[50530]. For example, a certain name of a person may have a different—and a very strong—association for a Russian than for a Ukrainian. Such a question[41600] could pose a trap for a Russian troll[260] who is presenting as a Ukrainian. Some embodiments will choose their own mixture of these approaches.

Some embodiments will choose to define their own mixture of cost[50005], technical performance and real world outcome. Indeed different real world scenarios will call for different measures. For example, incrementally higher cost of the human operators[250] may be much more important in some cases than others.

It should be noted that users[220] may be influenced in ways positive or negative that are independent of the overall outcome[50005] of the engagement[125], in those embodiments in which success or failure is judged by other means. For example, a Ukrbot[110] could commit a horrible gaffe due to NLU and/or NLG failures, but still post an infographic[51525] that is compelling to many of the users[220] who see it. Or the unwillingness of a user[220] to comply with a Ukrbot[100] challenge[710] may raise questions about that user[220] in the minds of other users[220]. Some NLG/NLU failures could result in unintentionally humorous dialog. A Ukrbot engagement[125] has many pieces to it, and they will not necessarily always point in the same direction w.r.t. success or failure. Nonetheless, the long game is about influencing and educating users[220]. Many embodiments will thus attempt to measure user influence [50555] on a per-engagement[125] level, even while keeping it separate from the determination of engagement outcome[50005]. Of course, successful engagements[125] such as those in which an adversary identity[270] is clearly outed, can be expected to exert more influence[50555] than otherwise comparable engagements[125] without a definitively successful ending.

Most embodiments will use the UDTS[90000] to measure the reactions of focus group users[220] of different demographics to a replay of high value engagements[125]—or observe them watching the engagement[125] as it is occurring—in order to gauge the influence (positive or negative) that it generated after each turn[750], including the end point. Specifically, the UDTS[90000] will allow focus group users[220] to post to the channel[140] on which the engagement[125] is occurring, or did occur (via simulation) as a means of opinion measurement. It will also directly solicit opinions from these users[220] so as to be able to map them to different user states[50315] as the test continues. This data can then be used to seed ML systems[50405] and to extrapolate the reactions of users[220] to other engagements[125] of similar properties based on their demographics. Other embodiments will try to measure based on user[220] comments of different sentiment polarities that are apparently related to the particular engagement[125], including references to the content of collateral[50040] posted during it.

Of course, there is no guarantee that there will be user [220] comments much of the time. Most embodiments will prefer to avoid simplistic and easily gamed metrics based on single-click actions such as "likes." In such cases, UTDS data[50313] and any operations on, or output from it, will serve.

Even when there are a substantial number of user[220] comments, this remains necessarily an imperfect process since it generally won't be possible to know what else the user[220] making the comment has seen elsewhere, either in other Ukrbot engagements[125] or through unrelated sources. The fact that content on most media[135] can be viewed well after the fact, including in many cases on other media[135] is also a complicating factor. This inherent murkiness is why many embodiments will opt to keep user influence[50555] calculations separate from outcome[50005] determination.

Post-Engagement Housekeeping[50463]

When an engagement[125] has concluded, the metrics for it must be updated accordingly. In most embodiments, these include but are not limited to:

- Recording the official outcome[50005] of the engagement[125]
- Updating usage counters[51540] for dialog scripts[50475] and other collateral[50040] in the engagement package[50030] that were actually used in the course of the engagement[125]
- Update the effectiveness metrics[50080] for the collateral[50040] that was actually used—and thus also for the specific creators of the collateral[50040]
- Update the effectiveness metrics[50080] for either/both any specific Ukrbot personae[115] used in the engagement[125] and/or specific characteristics[50265] of dynamically configured Ukrbot instances[110] used
- Similarly for Ukrbot symbiont stewards[50340], if used in the engagement[125]
- Calculating the actual cost[50005] to execute the engagement[125], and therefore also the delta from the initial cost estimate[51600] for it.
- Calculate final engagement ROI[51605]; note that some embodiments may opt to use more than one method for assessing ROI[51605]
- Calculate the estimated cost[50005] inflicted on the adversary[265]
- Calculate the strategic damage[50545] inflicted on the adversary[265]; some embodiments may prefer to keep this separate from literal costs, such as those for incremental or more skilled personnel. Different embodiments will determine this differently. Some will consider the amount of radioactive content[185] that was likely suppressed (see below)., assigning some value either to each specific class of radioactive content[185] or simply an average value that may be used. Others will consider all content[185] related to the adversary[265]. Some embodiments will focus on estimating the increased cost[50005] to the adversary[265] of distributing the additional amount of content[185] needed in order to exert the same level of influence as if there had been no impedance[51880] from the Ukrbots[110]. Others will attempt to consider reputational damage[50545] to the adversary[265] by getting caught red handed by the Ukrbots[110] according to whatever weight they wish to assign to engagements[125] that end successfully, with users[220] ridiculing the adversary identity[270]. Still others will prefer to consider outings of signed accounts—that is, those accounts affiliated with verified individuals or HVTAPs[10290] with which they have associated some value. Others may use combinations of these, or whatever metrics are considered to inflict the greatest amount of strategic damage on the adversary[265].
- Calculate the value of users influenced[50555]
- Calculate the actual gain[50455] realized from the engagement[125] and the delta from the estimated gain[50455]
- Calculate the difference between the estimated audience value[815] and the actual one.

Most embodiments will attempt to estimate impedance[51880], or the amount of opposition that the Ukrbots[100] are generating with respect to any particular location[405] or content[950]. This will be done by comparing either comparable locations[405] (or content[950]) or the same ones at different intervals in time such that the case(s) where Ukrbots[100] are active can be compared to the cases in which they are not. "Active" may be defined in different ways by different embodiments. These include but are not limited to: a) completing one or more engagements[125] within the period of time being examined, b) completing one or more successful engagements[125] in it, and c) appearing during the interval and making at least N many posts[195].

As is depicted in the abstract in FIG. 53, when the Ukrbots[100] are active, the number of users[220] transitioning one or more of their user states[50315] towards the adversary's[265] objective can be expected to be higher when they are operating unchallenged. However, with one or more Ukrbots[100] on the scene, this number should be lower. Furthermore, some users[220] could be expected to demonstrate movement away from the adversary's[265] objectives, for example if the Ukrbot[110] posts an especially damning infographic[51525]. In such a case, for example, a user[220] might post[195] something like "Wow—can that possibly be true?" which can be a step in the right direction if they are currently adversary[265]-leaning.

Some embodiments might decide that for such a user[220], clicking on any of the detailed evidence links[20755] in the infographic[51525] constitutes a user state[50315] change (assuming that they are able to capture it on the given medium[135].) Ditto for retweets and the like, assuming no negative polarity[11065] accompanying comment with respect to the friendly state actor[960]. In addition to signaling a possible user state[50315] change, such actions also help to distribute the infographics[51525], so they are doubly useful. Conversely, if users[220] start to doubt the veracity of the adversary's[265] content[950], they are less likely to re-post it. Some embodiments may measure the delta N in the percentage of users[220] reposting adversary content[950] as a direct measure of suppression, considering that now adversary identities[270] must post the content[950] at least an additional N times.

Of course most users[220] are likely to just passively observe rather than take any action. Thus most embodiments will extrapolate on the basis of the users[220] who do take some action, based on the presented demographics of the different users[220] inferably present; as noted elsewhere, "present" will of necessity be defined by what is possible to measure on the given medium[135]. Some embodiments may opt to use more than one such definition. Failing that, if possible/available, the system[10000] will fall back to using UDTS[90000] data (which may be difficult when it involves finding users[220] who lean towards the adversary[265].)

The ratio between the sum of the values of all of the user state[50315] changes in the otherwise comparable case(s) in which Ukrbots[110] were present and where they were not will be used by many embodiments to calculate the impedance[51880] being generated by the Ukrbots[110]. Some embodiments will calculate this separately by influence dimension[50335], since it may be easier for the Ukrbots[110] to block the adversary[265] on some of these dimensions[50335] than others; other embodiments may do this empirically, in those cases in which meaningful deltas have been observed among different dimensions[50335]. Most embodiments will not distinguish between the case of users[220] who might have been influenced by the adversary identity[270] but were not because of the Ukrbots[110] (prevention of forward movement from the adversary's[265] POV) and the case in which the Ukrbot[110] actually moved users[220] to user states[50315] closer to it (backward motion from the adversary[265] POV.) To take a simple example, if the sum of the values of all user state[50315] changes were +100 (the "+" signifying movement in the direction intended by the adversary[265]) in the case in which the adversary identity/ies[270] were unchallenged, but only +20 in the case where the Ukrbots[110] are present, that would be an impedance[51880] of 5×. This can roughly be seen as the adversary[265] now being required to exert 5× more effort in order to distribute their content[950] (which is now at least partially suppressed) and obtain influence. Thus impedance[51880] will used as a multiplier by many embodiments that consider suppression-related costs in their models of costs[50005] incurred by the adversary[265].

It should be noted that many embodiment will perform one or more additional rounds of updates on many of these individual engagement[125] metrics with noticeable time staggers[50550]. This is because just-after-the-fact measurements may not tell the whole story for many of these metrics. For example, any collateral[50040] that becomes widely distributed after having been introduced in a given engagement[125] is important to understand. But such distribution requires some time to occur—minimally hours, or even days or weeks. Similarly, an influenceable user[220] who seems to remain influenced has far greater value than one who may have been briefly amused by a particular piece of collateral[50040], but whose views remained unchanged.

Different embodiments will take different views on which engagement metrics[50080] to recalculate, how often, and for how long based on the specific circumstances at hand. For example, many embodiments may decide to make updating policies contingent on some aspect of the particular engagement[125], for example its value[50182], or the delta between the estimated cost[50005] inflicted on the adversary [265] and the actually observed one. By default however, many embodiments will continue to monitor for updates until a pre-set point on the mention curve[50240] for the given event[170], generally as the curve approaches zero mentions per unit of time (such as a day.)

Time staggers[50550] in most embodiments will be determined over time by any suitable statistical or ML method. Otherwise put, it is computationally senseless to keep recalculating if the odds of observing meaningful change have been demonstrated to be essentially nil. However most embodiments will start off with pre-set values and policies, until sufficient empirical data can be collected.

Managing the Ukrbots[110]

Although in most cases the Ukrbots[110] are launched without requiring human operator[250] approval, as previously noted, many embodiments will support an engagement package[50030] parameter indicating that final manual approval from an operator[250] is required to launch. This option is likeliest to be used in the case of a very high value engagement[125]. Likewise, the hope is that Ukrbots[110] will generally be recalled automatically by the SDS[50000] once the engagement[125] objective has been accomplished. Nonetheless, there are exceptions, such as real subsystem [107] failures that in turn cause the Ukrbot[110] to fail badly enough that simply withdrawing it from the channel[140] with some kind of public "oops" statement may be the best strategy. In some cases, the Ukrbot[110] could exhaust all of the turns[750] in the originally packaged dialog script [50475], and there is no suitable "next" script[50475] available. And of course, human operators[250] may find it prudent to intervene in engagements[125] in many cases that are well short of outright technical failure, for example, a Ukrbot instance[110] that is getting trolled by multiple detractors. Many embodiments will offer an intermediate monitoring option in which the human operator[250] has a brief opportunity to edit the Ukrbot[110] post[195] before it is made.

Operators[250] may decide to intervene in cases other than the Ukrbot[110] stumbling. For example, if a particular engagement[125] seems to be drawing in a really substantial number of users[220], in many embodiments, a human operator[250] can decide to raise the budget[50450] of the engagement[125], thus allowing a new engagement package [50030] to be configured for the remaining portions of the engagement[125] that contains higher quality collateral [50040], additional Ukrbot instances[110], and more opportunistic operator[250] cycles. Alternatively the operator [250] may decide to take over the Ukrbot account[215] to increase the probability of either/both getting to a successful engagement[125] outcome and/or W to exert greater influence on users[220].

Well-trained operators[250] actively monitoring the active engagements[125] and contested channels[140] can also provide critical feedback to the targeting system [10000], including identifying additional targets[50425] that for some reason managed to elude the targeting system [10000].

For all of these reasons, almost all embodiments will provide a Ukrbot Management Console[880] or UMC[880]. In most embodiments, the UMC[880] will provide capabilities that include but are not limited to the following:

One or more drill-down visualizations[11035] of the contested channels[140] that indicate estimates of the number of active users[220], their composition demographically and with respect to being either supporters [51575] or detractors[51560], the number of adversary accounts[270] active and the number and characteristics of engagements[125]

Dashboards that provide running engagement[125] statistics

An operator[250] review queue[50565], for example for unrecognized challenge question responses[44200].

User management[51585], including creating, modifying, and deleting operators[250], providing them with different levels of permissions, assigning them to different tasks or queues[50565]; to this end, also listing and visualizing capabilities of currently available operators [250] including but not limited to knowledge of different languages[50495], dialects[50500] and domain knowledge[50505]

Editing tools for dialog scripts[50475] and other types of collateral[50040]

Tools to modify engagement packages[50030]

Ability to manually reprioritize different targeting requests[50435] including postponing, canceling, and putting them on hold.

Tools to manage all system parameters, including but not limited to: reaction time window[50090], response time, and bot saturation[50185] parameters Controls to allow the temporary taking over of a given Ukrbot account[215]—and to subsequently relinquish the control, to yank a Ukrbot instance[110], or to verify the launch of one in any given medium[135].

Tools to edit the appearance, behavior, and "beats" of Ukrbot personae[115], as well as to create new ones, and retire existing ones Tools for communicating with Ukrbot symbiont[50225] accounts, as well as exerting oversight over them Tools for exception reporting to the targeting system [10000]

Tools to make observations about specific adversary entities[265]

Computation resource management tools

Report generation

In almost all embodiments, the UMS[880] will flag an intervention alert[50560] if the Ukrbots[110] are encountering difficulties. Such cases include, but are not limited to, the following:

NLU problems lead to significant misinterpretation of a post[195] or other content The NLU component[10100] is failing to interpret content altogether The NLG component[60035] has badly malfunctioned in some way The Ukrbot instance(s)[110] are being trolled by multiple hostile users[265] and no supporters[51575] are currently present on the channel[140].

However, virtually all embodiments will allow human operators[250] with appropriate credentials to assume control of a Ukrbot instance[110] without an alert having been flagged.

Operator[250] Tasks

In most embodiments, the tasks supported by the UMC [880] mostly fall into four broad categories:

Exception handing, including but not limited to: temporarily assuming control of a Ukrbot instance[110] that is struggling, providing assistance in interpreting an adversary[265] post[195], adjusting the engagement package[50030] parameters so that the engagement [125] can be executed.

Proactive Management, or anticipating and trying to prevent an exception from occurring, for example a Ukrbot instance[110] running into difficulty with an audience[910] that is manifesting a higher percentage of active detractors[51560] than had been anticipated. Also includes assessing prior engagement[125] performance statistics so as to make adjustments to parameters at different levels. This includes things like raising the minimum required targeting certainty[51500] if engagements[125] with lower targeting certainty [51500] were either/both generally not having successful outcomes[50537] and/or were going well over their allocated budget[50450].

Feedback to targeting system[10000], including but not limited to: notification of possible mis-targeting, mis-assigning of ringleader status[50190], observations of odd user[220] activity patterns on one or more contested channels[140], new narratives[155], suggestions that a particular actor[210] is linked to one or more accounts[220] of interest, and that a high value target [10290] is likely to appear in a particular place either at a given time, or in response to a particular stimulus.

Resource Management: Routine UMC[880] user[220] management, symbiont steward[50340] management, and provisioning additional hardware or cloud services.

User permissions will generally be granted according to these different areas, as they each require different skills. For example, it may be not be desirable for a less experienced operator[250] to be providing feedback directly to the targeting system[10000].

In most embodiments, the primary visualizations of the set of contested channels[140] will resemble a targeting video game in which the operator[250] can take different actions on different types of on-screen objects in different contexts. For example, in almost all embodiments, the operator[250] can select a currently active Ukrbot instance [110] and then either take full control of it, deactivate it, change its appearance in some way, or give it a particular instruction[51570], for example to switch to a different dialog script[50475], or to swap one piece of collateral [50040] for another.

Likewise, by selecting a supporter[51575] user[220] currently present on a contested channel[140], the operator [250] can either see all available information about this supporter[51575] or privately message him, assuming the availability of a mechanism with which to do so.

In most embodiments, an operator[250] with appropriate permissions can select a target[50425] on which to change attributes such as its target value[50430], to reprioritize a targeting request[50435] on it, to confer or remove ringleader status[50270]. In many embodiments, there is a running scoreboard for each human operator[250] that indicates how many adversary accounts[270] were chased off of contested channels[140], and how many "points" this amounts to—in most embodiments the total of the target value[50430] for each target[50425].

Ukrbot Design & Test System (UDTS)[90000]

Because of the critical HCI element involved, most embodiments will have a user testing component[90000] for different configurations of Ukrbot instances[110] and different pieces and combinations of collateral[50040]. Because users[220] of different demographics[240] may have different preferences, almost all embodiments will solicit and record as much user demographic information[240] as possible. Because objective and subjective metrics[90160] may differ in what they indicate, in most embodiments the UDTS[90000] will support both, and allow the system administrator[90205] to specify rules for creating a composite score[90205] so as to allow scalar comparisons. (An example of a subjective metric[90160] would be asking users[220] to provide a numerical score for how much they liked or disliked a particular Ukrbot[100] configuration. An example of an objective metric[90165] would be whether users[220] remembered a Ukrbot persona's[115] name after 5 minutes.) Most embodiments will allow system administrators[90205]] to define new metrics.

Figure 2:
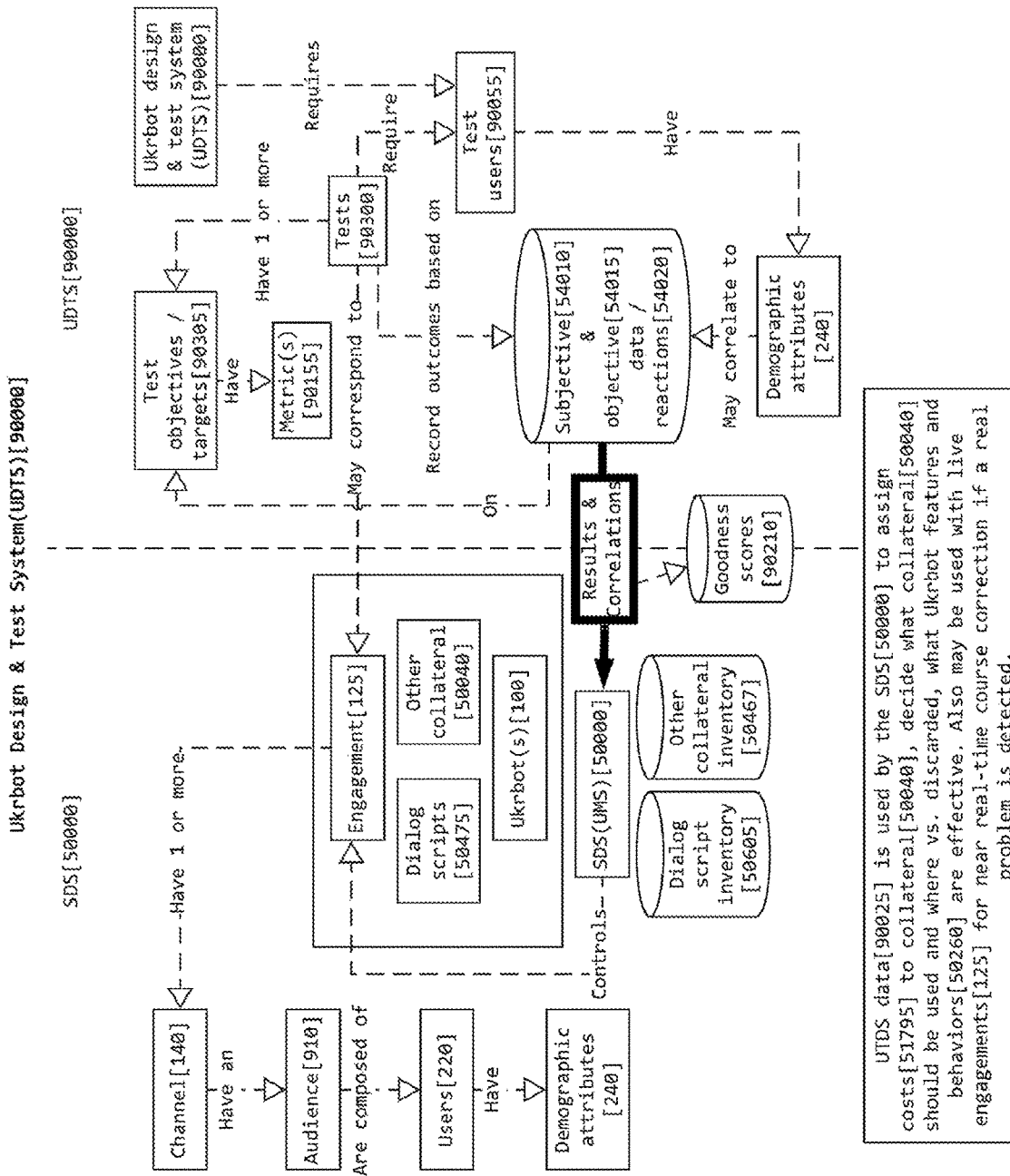
FIG. 2 is a block diagram that illustrates an embodiment of the User Design and Testing System used for different configurations of Ukrbots with different pieces and combinations of collateral.

As indicated in FIG. 2, the UDTS[90000] will be used to run focus group or usability tests[90300] that have one or more specific test objectives[90305]. These will usually involve assessing the performance of specific system [90000] objects including but not limited to dialog scripts [50475], different styles of visualizations[530], and Ukrbot personae[115]. Test users[90055] will often be selected for their demographic attributes[242], so as to assess how well the objects in question work with audiences[910] with specific demographics[240]. What counts as "working well" will vary with the objective(s)[90305] of the particular test[90300]. However, possibilities include but are not limited to: subjectively liking/disliking a particular thing, laughing vs. not, demonstrated memorability, whether they repost or share the infographics[530], and whether their attitudes about any important issues have changed and how.

Almost all embodiments will also use UDTS[90000] data with its enhanced and presumably more reliable user demographic information[240] to extrapolate the behavior of real world users[220], any change in their attitudes, and even probable user demographics[240] based on their observable reactions. For example, UDTS[90000] data on whether users[220] of a particular demographic[240] were influenced to user state[50315] X along dimension[50335] Y by a set of engagements[125] during a user test[90300] can be used to estimate the influence that was likely exerted on a given audience[910] as a result of engagements[125] of similar packaging.

In the context of a test[90300], many different methods may be used to assess both objective and subjective metrics [90160]. Such methods include, but are certainly not limited to: questionnaires, post-test[90310] interviews, facial expression and body language capturing (manually or via video analysis) and during-test[90315] questions. With this additional wealth of user data provided by UDTS[90000], most embodiments will allow inferences to be made about the perceptions of users[220] of similar demographics[242] in the ecosystem[915] for whom there will often be a large scarcity of data. Such data will be normalized in order to create an overall "goodness" score[90210] for the objects being tested. Different embodiments will specify their own rules for doing so. Many embodiments will use these "goodness" scores[90210] along with a set of rules of their choosing to set or adjust the internal price (for example, the cost of use[380]) on specific collateral[50040].)

Most embodiments use real posts[195] harvested from real channels[140] that had been flagged by the targeting system[10000] as the test bed for the Ukrbot[100] testing so as to make it as realistic as possible. In other words, the test users[90055220] will experience either something quite close to a real Ukrbot engagement[125]—or else be reacting to an actual engagement[125] as it is occurring. Most embodiments will facilitate users[220] making comparisons and indicating preferences between different Ukrbot configurations[50015] and collateral[50040].

Almost all embodiments will use UDTS[90000] data with its enhanced and presumably more reliable user demographic information[240] to extrapolate both the behavior of real world users[220] and probable user demographics[240]. For example, UTS[50310] data on whether users[220] of a particular demographic[2402] were influenced to state [50315] X along dimension[50335] Y by a set of engagements[125] during a user test can be used to estimate the influence that was likely exerted on a given audience[910] as a result of engagements[125] of similar packaging.

Most embodiments will opt to directly send UDTS [90000] data to the SDS[50000] so as to minimize delay in the SDS[50000] benefiting from data such as improved influenceability calculations. Many embodiments will use UDTS[90000] data along with a set of rules of their choosing to "raise the prices" (specifically the cost of use[380]) on specific collateral[50040] that tests really well with users [220], or likewise to decrease the cost of use[380] on collateral[50040] that performs poorly in testing.

Most embodiments will support the notion of a Ukrbot symbiont[50225]. This is an online identity, often of bounded duration, that is an explicit fusion of a Ukrbot[100] and a supporter[60100]. The motivation for such symbiont [50225] identities is threefold:
1. It is a great way of deepening the engagement with users[220] who are fans of the Ukrbots[100].
2. If the user[220] plays an active role in the account [50230], this decreases the need for human operator [50405] intervention and therefore decreases the cost of engagements[50005].
3. The comingling of Ukrbot[100] and real human user identities[220] makes it much more difficult for the accounts[50230] to be banned, especially en masse. This is true from both a pure technical standpoint as well as a business policy one.

In most embodiments, users[220] who are interested in supporting the Ukrbots[100] have a website that they can go to in order to register to have a symbiont account[50230]. In most of these embodiments, such users[220] will be filtered through the targeting system[10000] with the aim of trying to limit bad faith cases. Cases in which the user[220] is strongly suspected of being in the pay or control of the adversary[265] will be automatically denied, and indeed in many embodiments will be taken as further evidence of adversary[265] complicity by the targeting system[10000]. More borderline cases will be reviewed manually by human operators[250] in most embodiments.

Users[220] who pass this filter will be asked to provide any additional demographic information[240] beyond what was already available in existing user profiles[227] so as to best match them with the most appropriate ecosystem[915], and hence Ukrbot instances[110] or personae[115]. They will also be asked to submit an image of either a preferred avatar[525] or simply a photo of themselves according to their preference. From this information a new user profile [227] is created that is based on the demographic attributes of the human user[220]. The avatar[50295] for the new combined identity[50230] will be an automatically generated image that combines the image of the avatar[525] or person and that of the Ukrbot[110], which can be a generic Ukrbot[130], a custom-configured Ukrbot[133] or a Ukrbot persona[115]. In many embodiments, as part of registering, the user[220] will be allowed to configure the Ukrbot instance[110] in a way that they particularly like, at least with respect to attributes that are not mandated by the SDS[50000] for some reason, for example the defining characteristics of a particular persona[115]. At this point, the user[220] will be considered a symbiont steward[50340] and will be placed in the pool of symbiont stewards[50340].

Figure 67:
FIG. 67 is an illustration of an embodiment of a symbiont featuring a Ukrbot supporter's avatar sitting on the shoulders of a Ukrbot.

Different embodiments will handle the automated joint avatar image[50295] differently. Approaches include, but are not limited to: having the Ukrbot[110] be right next to existing avatar[525], much as a picture of a couple, having the existing avatar[525] on the shoulder of the Ukrbot[110], or being held or carried by it. However, most embodiments will allow a number of varieties from which the user[220] can choose, and then generate an image accordingly. One example of this is illustrated in FIG. 67.

The exact implementation of the account[50230] to which the user profile[227] will be joined will be highly dependent on the specific medium[135]. In some cases, it will also be dependent on how engaged the user[220] wishes to be with the account[50230]. In the most minimalist case, the user [220] is just in essence donating his identity and will do little or nothing else. In other cases, the user[220] is additionally donating an existing account[229] that will be time-shared with the Ukrbot[100] such that, assuming the medium[135] in question permits it, the avatar image[525] changes to reflect whether the post[195] is that of the user[220] in the normal course, or rather that of the Ukrbot symbiont[50225].

Users[220] who wish to be more actively engaged, and (in most embodiments) who have demonstrated themselves as being good stewards[50340] of these symbiont accounts [50230] as judged by the engagement outcomes[720], can modify the Ukrbot posts[195] prior to posting them and even take control of the symbiont account[50230] altogether in the event of difficulty much as the official human operator [250] would. However, in most embodiments, the human operator[250] can still intervene and recover control of the symbiont account[50230] if they believe that the user[220] is jeopardizing the success of the engagement[125]. In the event that such an override is not possible from a purely technical viewpoint in any given situation, the human operator[250] will issue a request to the user[220] through any preferred electronic mechanism to relinquish control of the symbiont account[50230]. If the user[220] repeatedly ignores the human operator's[250] request, the symbiont account[50230] will be removed from the symbiont pool [50232] in most embodiments.

In some embodiments, the proven good steward[50340] may even have the benefit of viewing the full contents of the engagement package[50030] prior to launching the engagement[125] so that they may better steer the Ukrbot[100] through the engagement[125] as intended. In most embodiments, the performance of the steward[50340] will be tracked so as to understand whether substantive changes made to the dialog script[50475] resulted in more (or less) successful engagement outcomes[720]. Less proven or trusted stewards[50340], even if actively engaged in the use of the symbiont account[50230], will not be given this level of access in most embodiments.

In most embodiments however, even such proven, active good steward users[50340] cannot simply co-opt the symbiont account[50230] and do as they wish with it and still remain in good standing, but rather must wait for the SDS[50000] to either send them an engagement packet [50030] or provide piecewise instructions through whatever available communication mechanism. This is the case because these symbiont stewards[50340] are not likely to have the same training as the official human operators[250] and also for security reasons.

The option of a symbiont account[50230] offers a mechanism to avoid any attempts by a given medium[135] or channel[140] to either bulk ban the Ukrbots[100] or to ban specific Ukrbot identities[110]. For one thing, the different stewards[50340] would have quite different IP addresses. In this ban-evasion scenario, the only overt signs that the account could be a Ukrbot symbiont account[50230] will be the avatar image[50295]—and that can be automatically changed quickly in numerous ways if need be so as to make it more difficult for ML-based approaches to detect.

But perhaps more important pragmatically, the symbiont [50225] approach makes it more difficult to ban these accounts[50230] based on anti-bot user policies that may exist on different media[135]. Large numbers of such symbiont accounts[50230] would also serve as a potent indicator of public support for the Ukrbots[100].

In most embodiments, in the event that any type of anti-Ukrbot[100] ban is encountered on a given medium [135] or channel[140], Ukrbot[100] supporters on that medium[135] or channel[140] will be asked—automatically in the event that there is a known notification and a separate line of communication—to "host" any Ukrbots[110] that were impacted—that is to say, either/both a particular Ukrbot persona[115] assigned to that beat, and/or dynamically configured Ukrbot instances[52000] that were supposed to be executing engagements[125] on the channel[140] or medium[135] in question. Most embodiments will load balance Ukrbot instances[110] across the available pool of symbiont accounts[50230] in the event of a ban scenario, giving preference to the Ukrbots[110] that are executing higher value engagements[125].

Apart from the ban scenario, whether symbiont accounts [50230] are advantageous—and if so, in what contexts—is a matter for the SDS system operator[250] to determine in most embodiments. The UMC[880] in almost all embodiments will allow the operator[250] to allocate any of channels[140], channel groups[145], ecosystems[915], target types[50440]—in other words, any Ukrbot instances[110] instantiated in these locations[405] to execute engagements [125]—or Ukrbot personae[115] with their associated beats to symbiont accounts[50230]. In most embodiments, symbiont stewards[50340] will be matched with available engagement[125] opportunities or Ukrbot personae[115] according to their demographic similarity with the relevant audience[910]—at least to the extent possible. Different embodiments may avail themselves of different matching algorithms. Many embodiments will allow operators[250] to specify an engagement value[50182] threshold above which symbiont accounts[50230] are not to be used. Engagements [125] for which symbiont accounts[50230] are eligible (if they meet the specified requirements for the engagement [125], which will generally be parallel to those required in the operator[250] specification in the engagement's package [50030]) will be referred to as being in the symbiont-eligible pool[50234].

Figure 68:
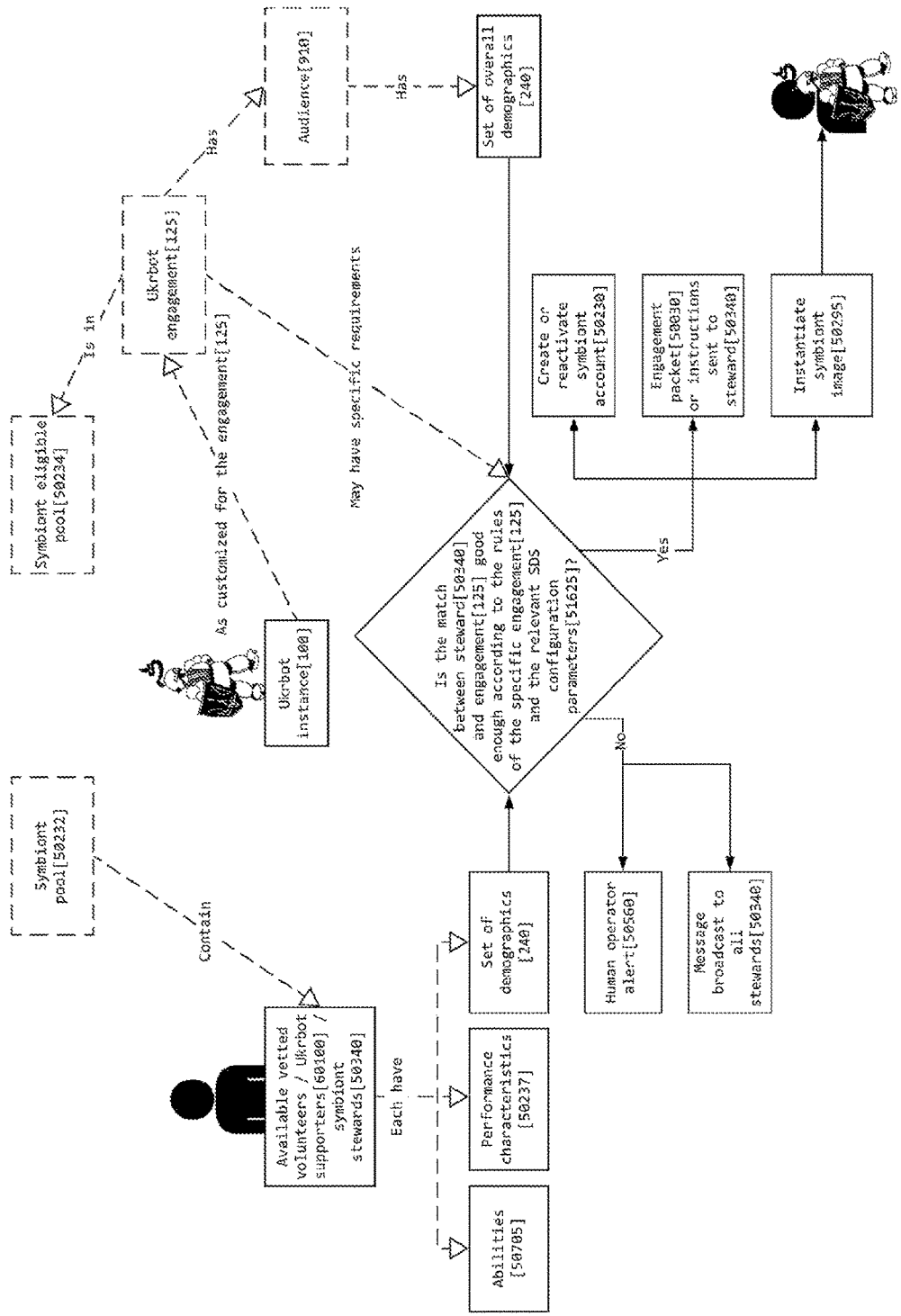
FIG. 68 is a block diagram illustrating one embodiment of the symbiont assignment process.

Most embodiments will provide a threshold that is needed for a match to be considered adequate so as to avoid the possible embarrassment of a gross mismatch between the needs of the audience[910] of the particular engagement [125] and the abilities of the steward[50340]. Some embodiments will instead choose to align stewards[50340] based on past performance[50180] and the engagement value[50182]. Some embodiments may weigh all of the above, or any combination of them. In the non-ban-evasion scenario, in the event that there are either an insufficient number of available stewards[50340], or a lack of matches that are deemed adequate for the assignments to the symbiont pool[50232] made by the operator[250], the SDS[50000] will reassign the remaining engagements[125] or Ukrbot personae[115] back to the normal control pool of operators[250]. In other embodiments, an operator alert[50560] will be generated instead. A high level example of this logic is illustrated in FIG. 68.

In the ban scenario, most embodiments will also broadcast the request to known supporters[51575] elsewhere in the channel group[145] or ecosystem[915] under the rationale that this will increase the symbiont pool[50232] size, and that the additional supporters[51575] are similar to those on the specific channel[140] or medium[135] in interests and demographics[240]. This will likewise be the case in any situation in which human operators[250] are being overwhelmed with the currently executing engagements[125].

Most embodiments will allow a user[220] to "de-host" a Ukrbot[110] upon request. In this event, if the hosted Ukrbot instance[110] was that of a persona[115], it will be put back in the "adoption pool" unless it is being retired according to the persona[115] retirement rules in place.

Certain embodiments will allow good stewards[50340] to simultaneously "host" more than one Ukrbot persona[115]. Some of these will support the generation of avatar images [50295] that feature more than one Ukrbot persona[115].

Most embodiments will maintain an inventory of visual templates[80200] that can be used to illustrate the evidence [535] identified by the targeting system[10000]. Some of these visual templates[80200] will be single-evidence-reason only, while others will combine different evidence types[540] within the same visualization[530], for example evidence[535] of both coordinated posting times and drawing narratives consistently from the same set of sources in preference to all others. Because the information contained in such visualizations[530] will be dynamic, most embodiments will choose to place a date and time stamp[760] somewhere in the generated graphic[530], most often near an edge. Likewise, in most embodiments, the visualizations [530] will be updated continuously on any medium[135] that permits it.

In most embodiments, the visualizations[530] based on these templates[80200] can appear in a variety of ways, depending on the conventions and capabilities of the particular medium[135] and the exact configuration in place.

These ways include, but are not limited to: being posted alone, with accompanying text[575], contained in an automatically generated video[555] or VR view[565] that highlights relevant features dynamically, or including an image [555], video[555], or VR view[565] with a Ukrbot instance [110] acting upon it in some way.

Renderings of the Adversaries[265]

Figure 69:
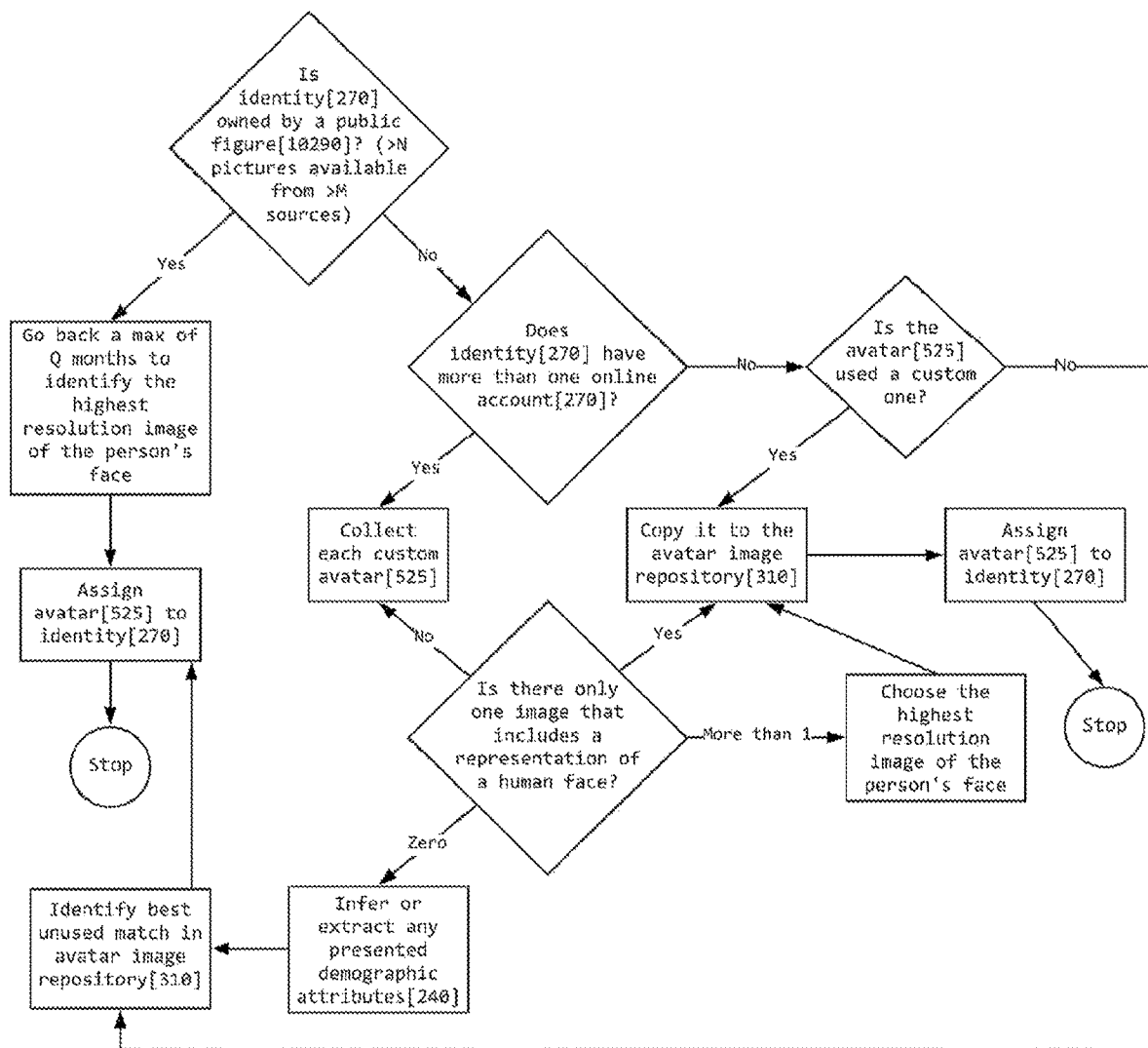
FIG. 69 is a block diagram of adversary identity representation in visualizations in a default embodiment.

In most embodiments, for any adversary[265] for whom there is an identifiable avatar[275] or photograph of a person available, the infographic renderer[60025] will use a version of it to represent the particular adversary[265]. A simple example of this process is depicted in FIG. 69, Most embodiments will prioritize images of faces, since these can be easily plugged into different visualizations[11030] (e. g. stuck on top of stock body images for different combinations of demographics[240]) and easily manipulated to look less appealing.

In the event that there is more than one avatar[275] associated with the particular adversary identity[270], some embodiments will choose the one that appears to be the most recent based on whatever data is available from which to infer its age such as the creation date of a new user profile[227]. Most embodiments will similarly endeavor to periodically check that the adversary identity[270] has not changed one or more of its avatars[275] on different media [135]. (In the event that a change is detected, including from having the default avatar for the medium[135] to a custom one, most embodiments will update accordingly unless the existing one[275] has already been used in more than a specified value N number of infographics[530] that have actually been posted.) In part because determining which avatar[275] is most recent won't be a solid proposition on many media[135], other embodiments may respectively prefer to seek the highest resolution image available, the one with the greatest percentage of pixels dedicated to the face, and one that depicts a person rather an animal or other object. Still other embodiments will choose photographs over all other images.

An important exception to this is the case in which the account[270] in question is that of an HVTAP[10290] or other public person photographs of whom are common enough in enough widely viewed publications[360] or other media[135] that much of the public would recognize them; how many instances per unit of time are needed to establish this and how many different sources will be a configuration parameter, since it will vary considerably with the theater of operation.

In this situation, most embodiments will select the photograph that provides the highest resolution shot in which the person in question's face is the largest object in the photograph; many of these embodiments will set a maximum amount of time to go back. However, since by definition, photographs of the person should be quite common in this case, there should be little practical chance of this resulting in a badly outdated photograph being selected. Note that most embodiments will make the distinction between public personae and members of the general public in order to avoid the case in which the adversary[265] has hijacked the identity (and picture) of a normal person.

In addition to depiction of persons, some embodiments will also opt to allow photographs of animals or even objects. Many embodiments will choose to apply filters or to make other modifications to the image that result in the depictions becoming less attractive. This could be anything from casting a shadow to make it look more sinister, to adding a silly looking hat to the avatar's[275] head, to depicting tears, bags under the eyes, red or bruised faces, or an uncomplimentary sign around its neck.

The Group Mug Shot[82200]

Figure 70:
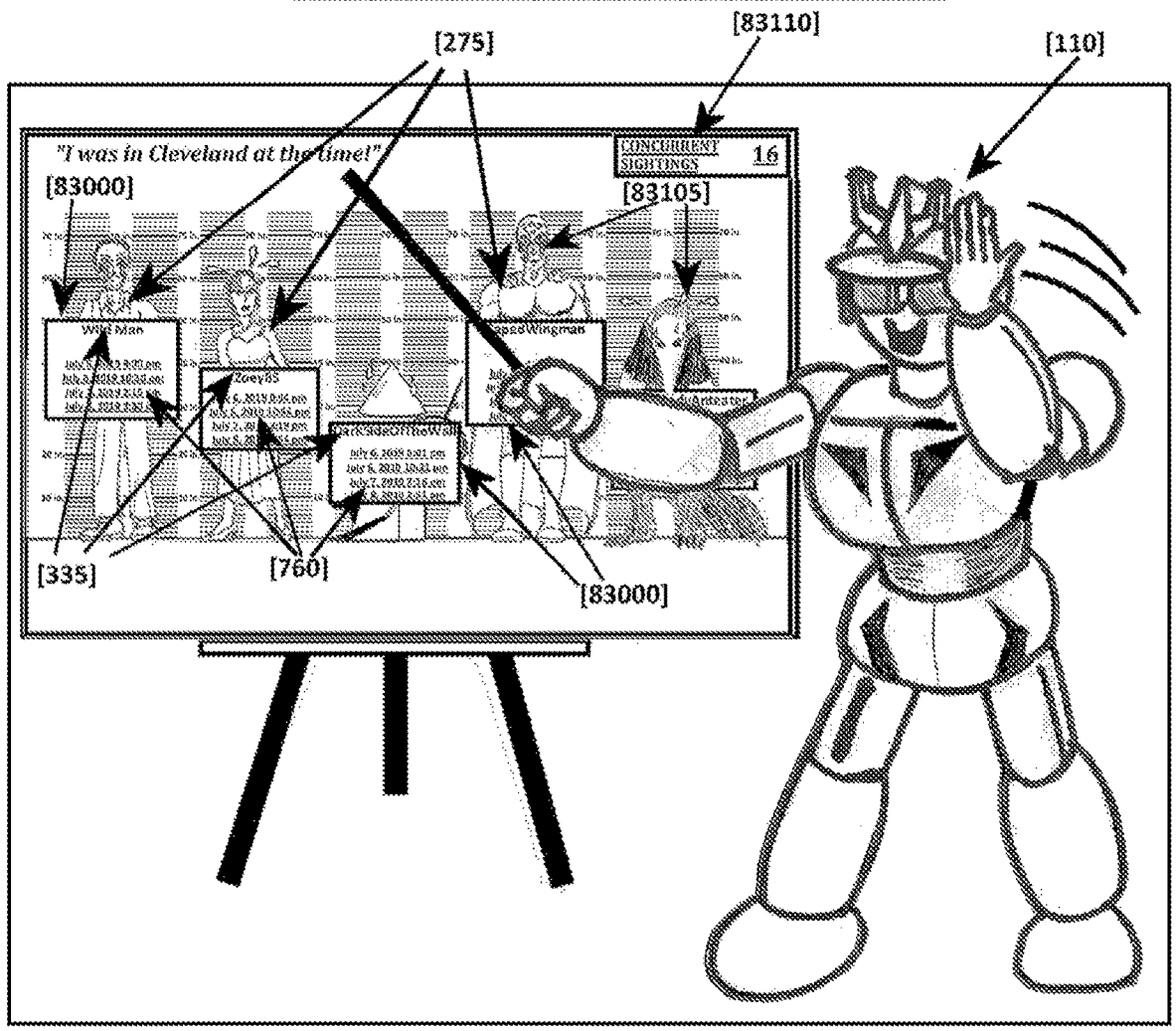
FIG. 70 is an illustration showing an embodiment of a mug shot view of adversaries targeted by the system as an engagement visualization.

Many embodiments will avail themselves of a visualization to depict different adversary identities[270] repeatedly executing coordinated behavior[10160] in an easy to understand way. One common example will be referred to as the "mug shot" view[82200]. In this view, the avatars[275] representing each adversary identity[270] belonging to a coordinating group will be arrayed horizontally against the standard view used for mug shots[82200]. In most embodiments, the avatars[275] will be holding mug shot-like signs [83000] with their usernames[335], user handles[340], or real names[10295] if known, and the date and time[760]. Most embodiment will opt to add distortions[83105] or degradations[83105] to the avatar[275] images, for example by adding tears[83105], droplets of sweat[83105], etc. One embodiment of this is depicted in FIG. 70.

Most embodiments will prominently feature the number of times that the particular group was all actively posting at the same time[83110], as a link[80400] that can be used to drill down to view the particulars of each group gathering [925]. Many embodiments will choose to title the summary link[80400], as well as the links to individual incidents [80600], using any summarization technique of its choosing. Many embodiments will highlight timestamps[760] of all group members involved in the same incident where a timestamp[760] of one member has a selection cursor "hovering" over it. Other embodiments will permit selection of more than one incident to allow for detailed comparison viewing of the group's selected incidents.

The Individual in Jail Shot[82400]

Figure 71:
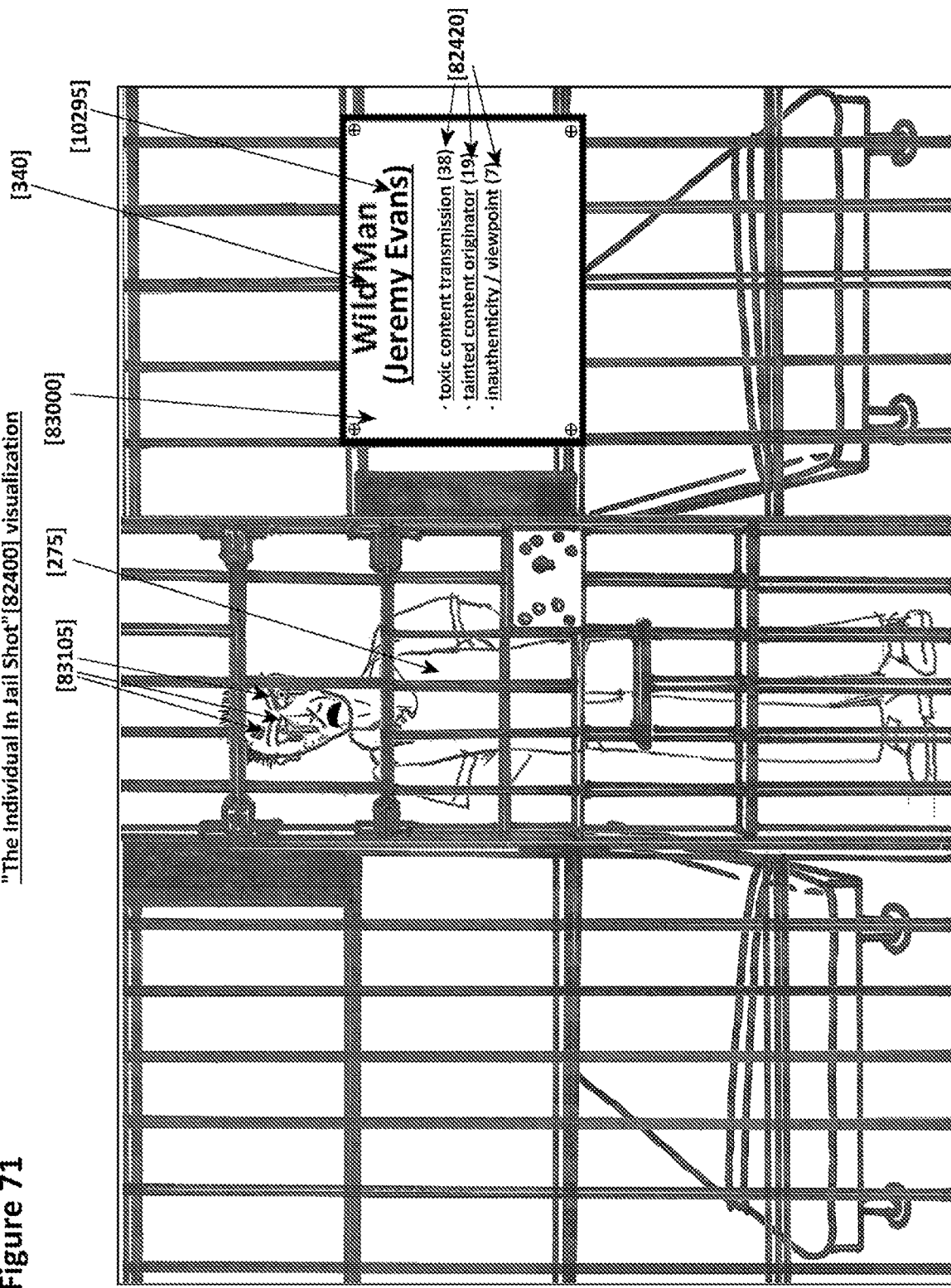
FIG. 71 is an illustration showing an embodiment of a jail cell view where an adversary's malign behaviors are exposed as an engagement visualization.

A similar principle will be applied in many embodiments to depicting the bad behavior of individual adversary accounts[270]. For example, if a particular adversary identity[270] is repeatedly posting items[185] that the targeting system[10000] has identified as being descended from an official source[345] of the adversary actor[280], a degraded version[83105] of its avatar image[275] will be rendered either in a mug shot setting[82200], or in a jail cell[82400], cuffed to a wall, or otherwise depicted as having been busted. In almost all of these embodiments, there will be a sign[83000] rendered that indicates the "crime" [82420] at hand, how many times it was detected, and either the username[335], user handle[340] or the actual person name [10295], if known. This information will generally appear in a link[80600] that enables drill down to the specific details, including the content[950] that was posted, and its relation to the source material[345]. If more than one adversary identity[270] has been identified as co-participants in the "crime" [82420], degraded versions[83105] of their avatars [275] will also be placed in the same jail cell. An example embodiment of this is depicted in FIG. 71.

The Parrot View[82600]

This visualization is implemented as a matrix that in most embodiments will be required to have a minimum threshold of rows in order to render. Each row, reading from left to right, first depicts—and clearly labels—the original real world person[10295] or online adversary identity[270] who appears to have initiated a particular instance of tainted content[185]. Depending on the available data in a given instance and the embodiment, the depiction of shared content in each display cell[82640] could be an image that contains text[575], an image[555], or a video[555]. Most embodiments will opt to include date and time stamps[760], as well as location if available. The next display cell[82640] over is used to similarly depict the next real world person

[10290] or online identity[220] chronologically who used some form of the tainted content[185], as established by the targeting system[1000]. The rightmost display cell[82640] will contain a depiction of the specific adversary identity [270] being targeted. The idea is to show just how much tainted content[185] this identity[270] is repeating from other, presumably adversary, sources.

Most embodiments will opt to define a maximum number of display cells[82640] in between the originating one [20400] and the final one that contains the avatar[275] of the targeted adversary[265], since past a certain number of such examples, it starts to become somewhat redundant. Nonetheless, many embodiments will still opt to include a link [80400] that indicates how many other examples there are, so that users[220] can peruse them all if they wish.

So as to make it very clear that such parroting was not a matter of one-time happenstance, multiple occurrences of it will be presented, one per row, such that the display form is that of a matrix. In many embodiments, each row will be titled with an appropriate name for the tainted content[185] being peddled, using existing or any serviceable summarization methods. Many embodiments will also choose to specify a maximum number of rows to actually render, under the same logic applied to the number of columns. Most of these embodiments will provide clear links[80400] to any examples that were not rendered for purposes of readability.

Most embodiments will prefer to allocate limited space in either rows or columns to instances in which one or more of the tainted content[185] propagators[350] is an actual real world person[10290], and in particular one with a clear, public affiliation to the relevant state actor[965] or other adversary[265]. This is both because in this way the source of the tainted content[185] is unambiguous, and because content such as TV news clips or videos is probably more compelling to users[220], especially if accompanied by verification links so as to quell any concerns about deep fakes.

Many embodiments will superimpose or highlight shared textblocks[10050] (or the result of other methods of identifying similar text snippets) between the different display cells[82640] in a row, so as to make as clear as possible the evidence[535] flagged by the targeting system[10000]. Most embodiments will take a similarly approach for shared image components[545]. Some embodiments will play—or allow to be played by pressing a button—synchronized audio clips of the shared textblocks[10050] (or other shared subset of text) to be read aloud by an ensemble of voices, where the voice of any real, identifiable persons[10295] are combined with generated ones for different online adversary identities [270].

Figure 72:
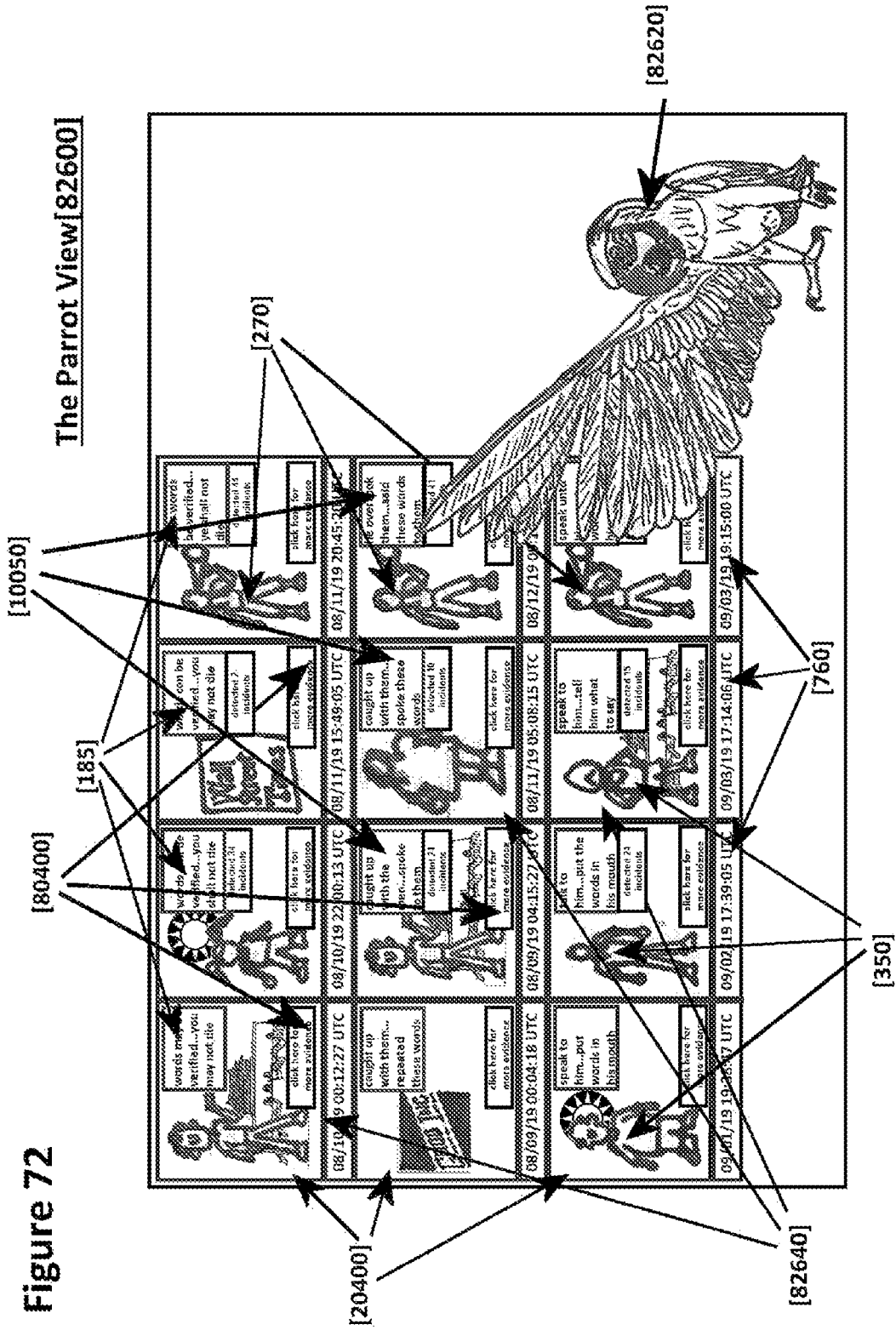
FIG. 72 is an illustration showing an embodiment of the parrot view where adversaries spreading tainted contents are exposed as an engagement visualization.

Similarly, the display cells could show detected shared components in other media including but not limited to audio (including environmental or musical sound), image, film, or VR, as well as mixed media incorporating two or more of the above, Certain embodiments will opt to use a parrot-like voice in any text→speech representation of the tainted content[185] to represent that of the targeted adversary identity[270]. Other embodiments will opt to incorporate parrot imagery [82620] somewhere in the infographic[530], for example perched on top of it looking down on it as if it were a billboard. In other embodiments, an animated parrot or other type of animal[82620] is depicted as standing in front of the matrix, conducting with a baton. An example of this is illustrated in FIG. 72.

The Puppeteer[82800]

Figure 73:
FIG. 73 is an illustration showing an embodiment of a puppetmaster view where an adversary controlling multiple accounts is exposed as an engagement visualization.

In those cases in which the targeting system[10000] evidence[535] is that N identities[270] are apparently being controlled by the same individual[280], many embodiments will support a visualization that depicts the avatar[275] used by the adversary [270] to designate that individual[270] pulling the strings of the puppet accounts[300]. In many embodiments, the puppets[300] will have their own dioramas representing the media[135] and channels[140] where they are active. Sometimes, multiple puppets[300] controlled by the same individual[270] will be found active on the same channel[140] in a medium[135] and will thus be displayed in the same diorama. Summary links[80400] will appear in the diorama backdrops allowing an operator[250] to examine the puppet accounts'[300] activities further. An example of one embodiment is illustrated in FIG. 73.

The Crystal Ball[51525]

Many embodiments will support a visualization that highlights the Ukrbot's[110] ability to "predict" future behavior on the part of particular adversary identities[270] as a way of ridiculing the adversary[265]. Visualizations featuring crystal balls[51595], tarot cards[51595], or any other culturally appropriate metaphor for foreseeing the future will be used to illustrate what is likely to happen next. Such infographic visualizations[530] will be used in cases that include, but are not limited to: framed narratives[180], adversary dialog scripts[50475], and known coordination patterns[10160].

Figure 74:
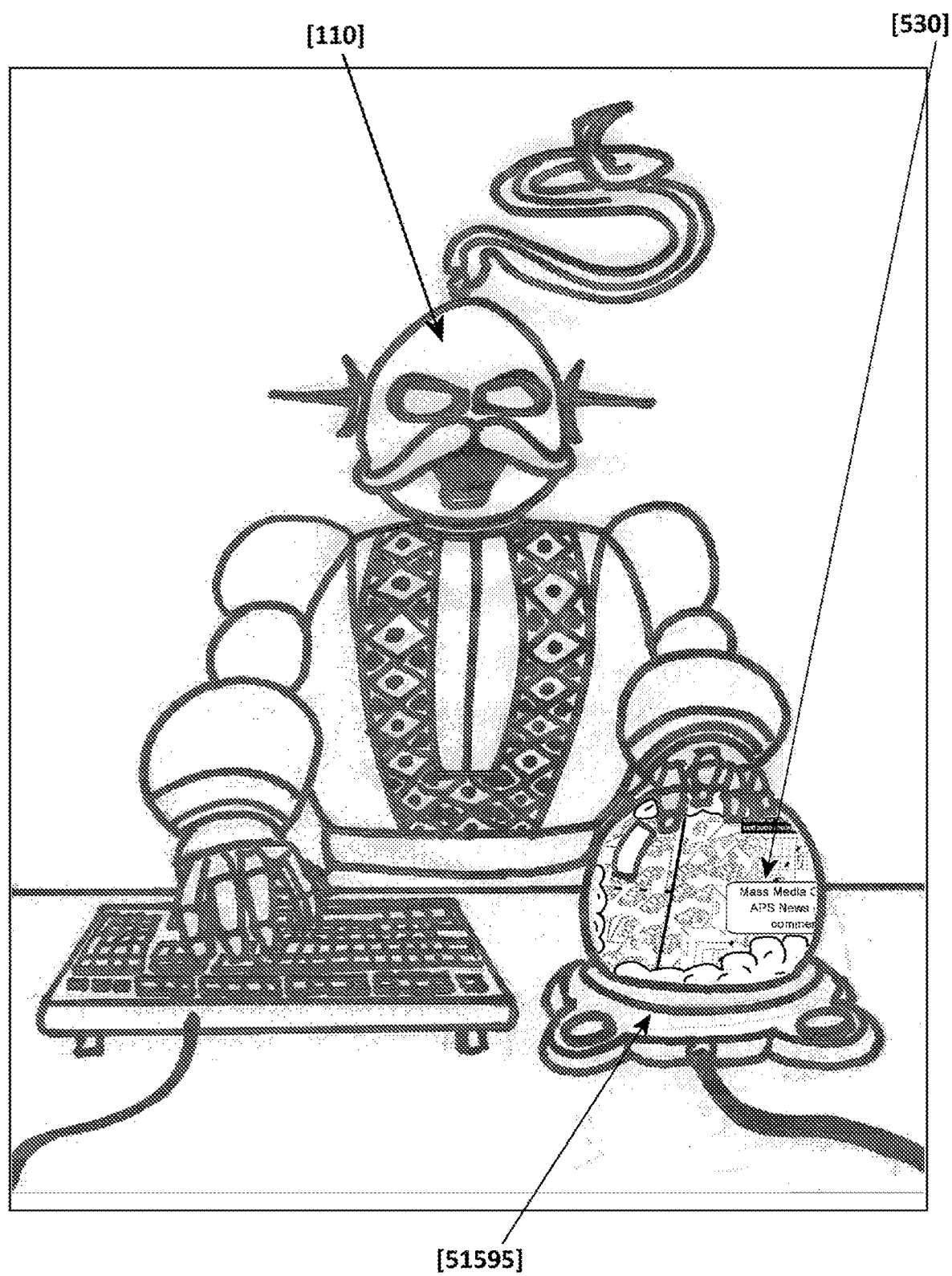
FIG. 74 is an illustration showing an embodiment of a Ukrbot using a crystal ball to predict adversary behavior as an engagement visualization.

A simple example of this is illustrated in FIG. 74.

Concerted Effort

In the case where posts[195] made by a coordinating group do not have the same or similar content but reflect the cooperating identities[270] playing a designated role in a framed narrative[180], the Concerted Effort visualization [84000] is used to spotlight the identities[220] and the framed narrative[180] that they are playing out.

Figure 75:
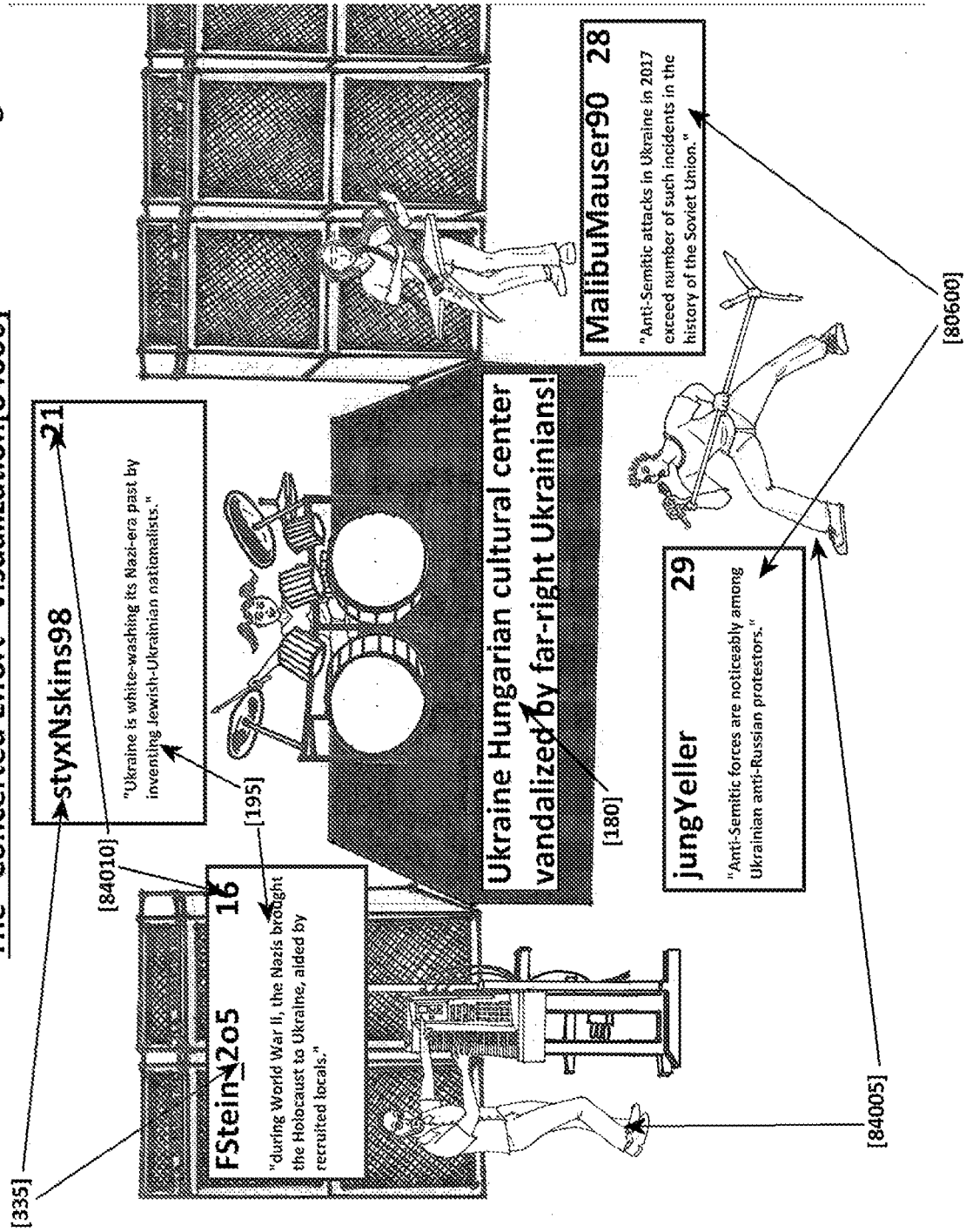
FIG. 75 is an illustration showing an embodiment of an engagement visualization showing adversaries coordinating a framed narrative.

This visualization depicts the adversary accounts[270] as a group of musicians[84005], each member performing a distinct role in the framed narrative[180] (as suggested by unique instruments; in cases were more than one adversary account[270] performs the same role, some embodiments could support them being depicted performing the same instrument). FIG. 75 shows one such embodiment in which the adversary identities[270] are members[84005] of a rock band, each on a unique instrument to indicate their particular roles in the framed narrative[180]. Where possible and/or relevant, many embodiments may prefer to match instruments to roles of the adversaries[270], such as using melodic instruments (lead vocals, guitar, violins, flutes) to visually mark those members whose posts[195] with respect to the framed narrative[180] are more numerous, have greater complexity (by any preferred measure), who are assessed as being ringleaders[50190] by the targeting engine[10000], or some other measure of choice in terms of their role in driving the framed narrative[180]. By contrast, rhythmic instruments (drums, bass, tubas) would be used to visually mark those who have been identified as taking secondary roles, such as posting short comments[195] that indicate agreement with a post[195] made by one of the primary players.

A phrase or sentence indicative of the framed narrative [180] in most embodiments is displayed in this embodiment on the drum riser in the same manner that a rock band would display the name of whatever they are promoting, such as their latest recording or a charitable cause.

In most embodiments, incident links[80600] posted near the musicians[84005] will display their usernames[335] or user handles[340] and/or real names[10295], and a summarization-generated excerpt from their posts[195], along with number[84010], indicating how many posts[195] each member[270] has contributed[160] to the framed narrative[180]. In some embodiments, the incident links[80600] may be followed to view prior "performances" of the particular framed narrative[180].

The Circle[83500]

Many embodiments will support a visualization in which the identities[220] responsible for creating and maintaining an echo chamber[10220] are rendered as stick people or in any other fashion desired, in a circle[83500], hands joined. One typical embodiment will use the size of the avatars[525] forming the circle[83500] to correspond to the number of their recent posts[195] in the echo chamber[10220], with those who have posted to it in a lesser degree standing outside the circle[83500], and depicted as being smaller than the users[220] forming the circle[83500]. The avatars[525] will each be labeled with a summary link[80400] showing their user names[335], user handles[340], and/or real names [10295] (where known) and the number of posts[195] they have recently made to the echo chamber[10220]. though other embodiments may allow for more information to be made available before clicking through the link[80400]. Most embodiments will allow for users[220] that have been identified as adversaries[270] to be marked as such. This may be achieved through the use of a different avatar[525], or through decorating the avatars[525] in question in a particular way.

Figure 76:
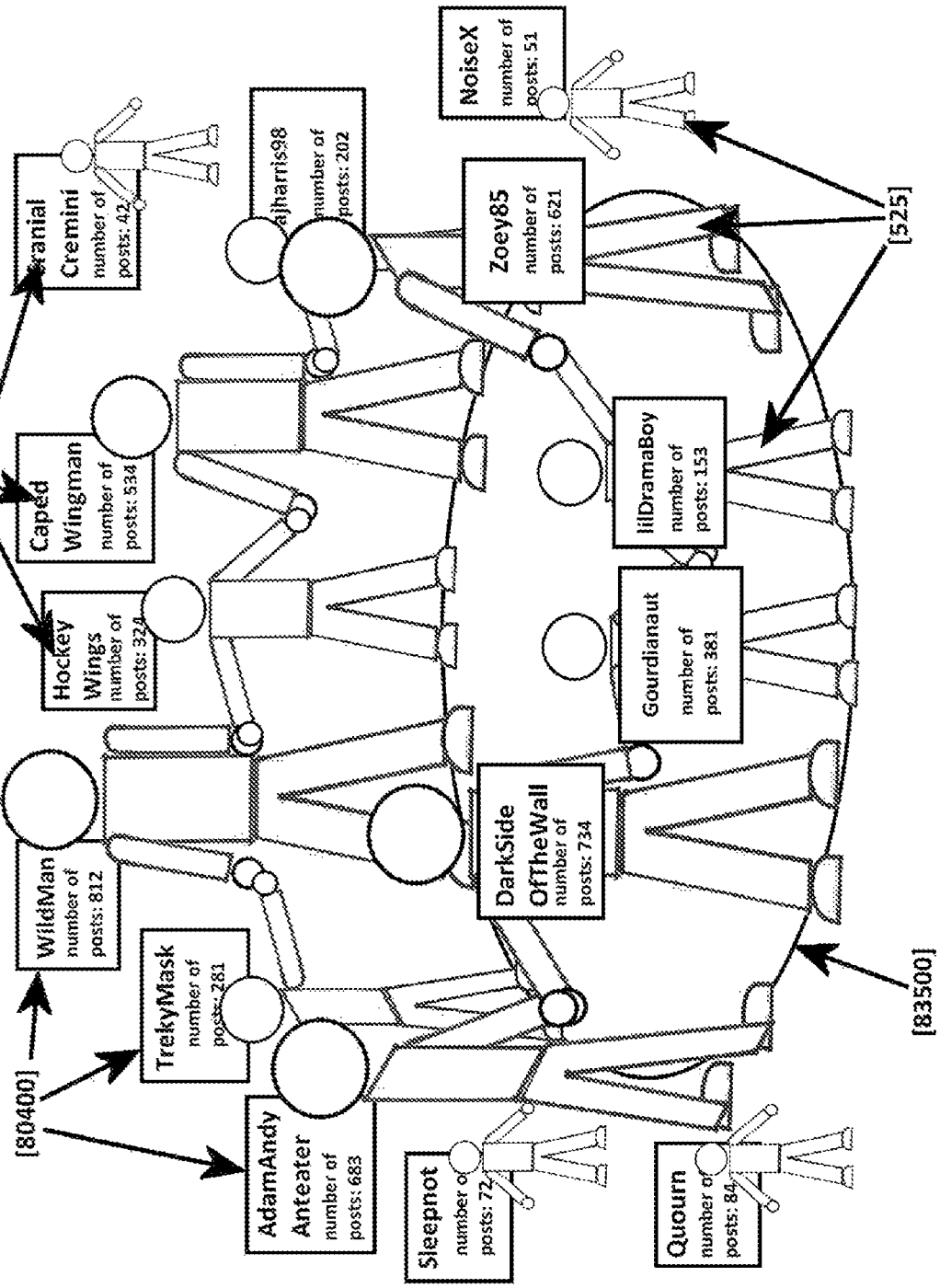
FIG. 76 is an illustration showing an embodiment of an engagement visualization exposing adversaries involved in an echo chamber.

An example embodiment of this is illustrated in FIG. 76.

The Echo Chamber Barn[85000]

In an alternate echo chamber[10220] visualization that focuses more on the rapidity of the construction of the echo chamber[10220], and commonality amongst the identities [220] creating them, the echo chamber barn visualization [85000] depicts adversary accounts[270] involved repeatedly in the construction of artificial echo chambers[10220] with one another. In many embodiments, adversary avatar [275] renderings, representing these adversary identities [270], are depicted constructing or maintaining barns or other buildings[85005], which represent artificial echo chambers[10220]. Other embodiments may feature different kinds of objects team efforts commonly associated with assembling. The visualization[85000] shows artificial echo chambers[10220] that have been created by many of the same users[270]. Although not every member of this group is involved in the creation of every echo chamber[10220] depicted, all of them have participated in the construction of some number of them, along with some users[220] who might have unwittingly joined them before, including useful idiots[295].

Figure 77:
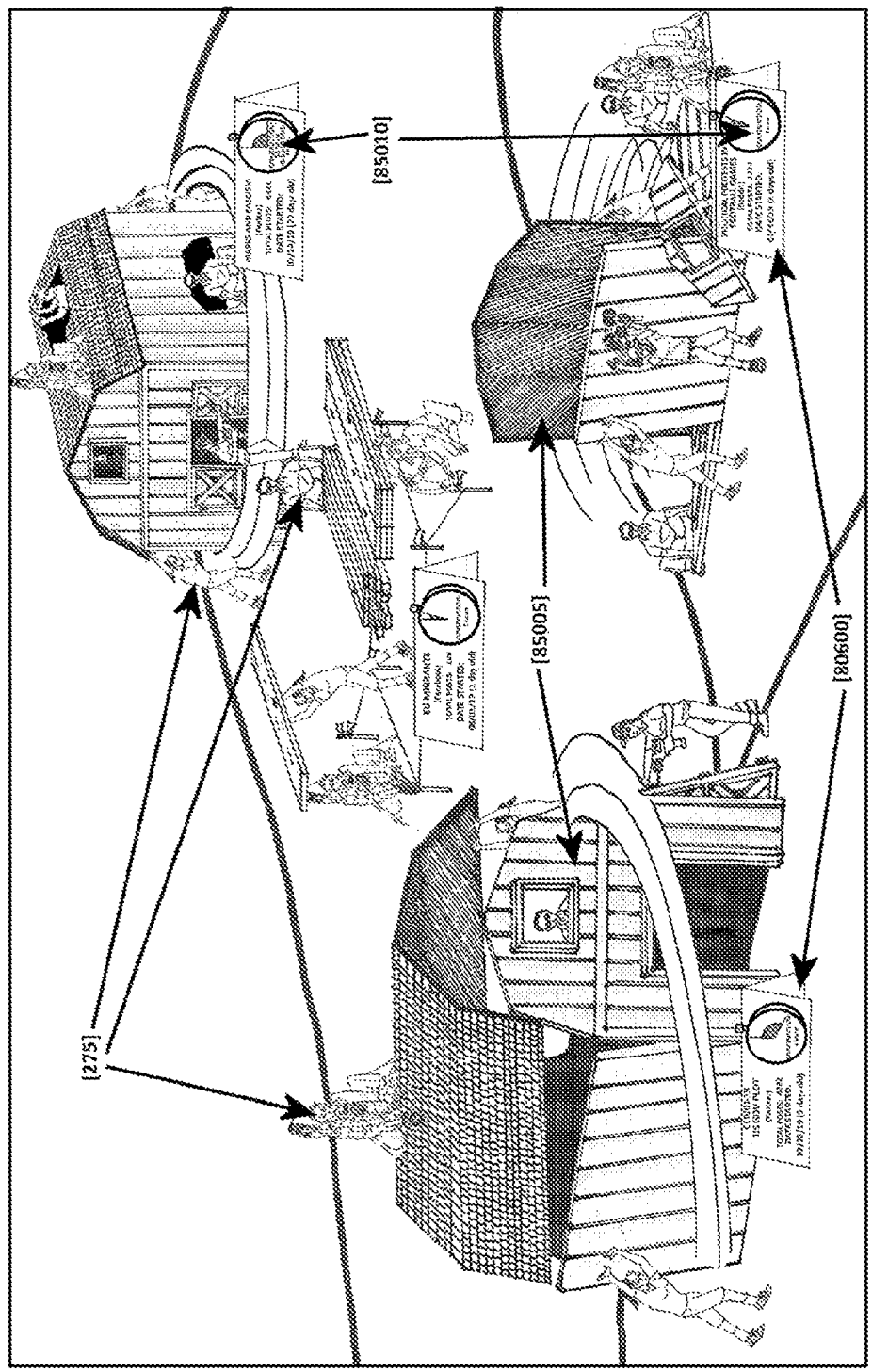
FIG. 77 is an illustration showing an embodiment of an engagement visualization exposing adversaries involved in rapidly building multiple echo chambers.

In most all embodiments, the barn[85005] or other object being constructed can be depicted in various states of assembly, completion, or disrepair, depending on where it is in its lifecycle, as measured by the number of participant users[220] in the echo chamber[10220] and volume of recent postings[195] to it. In one embodiment, as shown in FIG. 77, an echo chamber[10220] that has just been created will be depicted as a stack of building materials with users[220] beginning to pick them up and/or laying foundations. Echo chambers[10220] that have not had new posts[195] or new users[220] in some time may appear as dilapidated buildings, though if there is a recent sudden burst of activity involving adversary users[270], their avatars [275] may appear trying to effect repairs on the building, In embodiments where this infographic[85000] is static, the avatars[275] may be depicted as constructing the buildings [85005] with motion streaks and the same user(s)[270] appearing in multiple spots around the building[85005], further emphasizing that they are doing this very quickly. Other embodiments may employ animations and sound clips to depict this.

An incident link[80600] in the form of a sign in all embodiments would show information including but not limited to the topics[165] discussed within the echo chamber [10220], how many posts[195] have been made so far, when the echo chamber[10220] was started, and how long it has been "under construction"—that is, in rapid growth mode (based on numbers of new users[220] joining and how many new posts[195] there per unit of time). How long the echo chamber[10220] community has been "under construction", in many embodiments, is shown by a clock[85010] displaying elapsed time.

The Locksteppers

Figure 78:
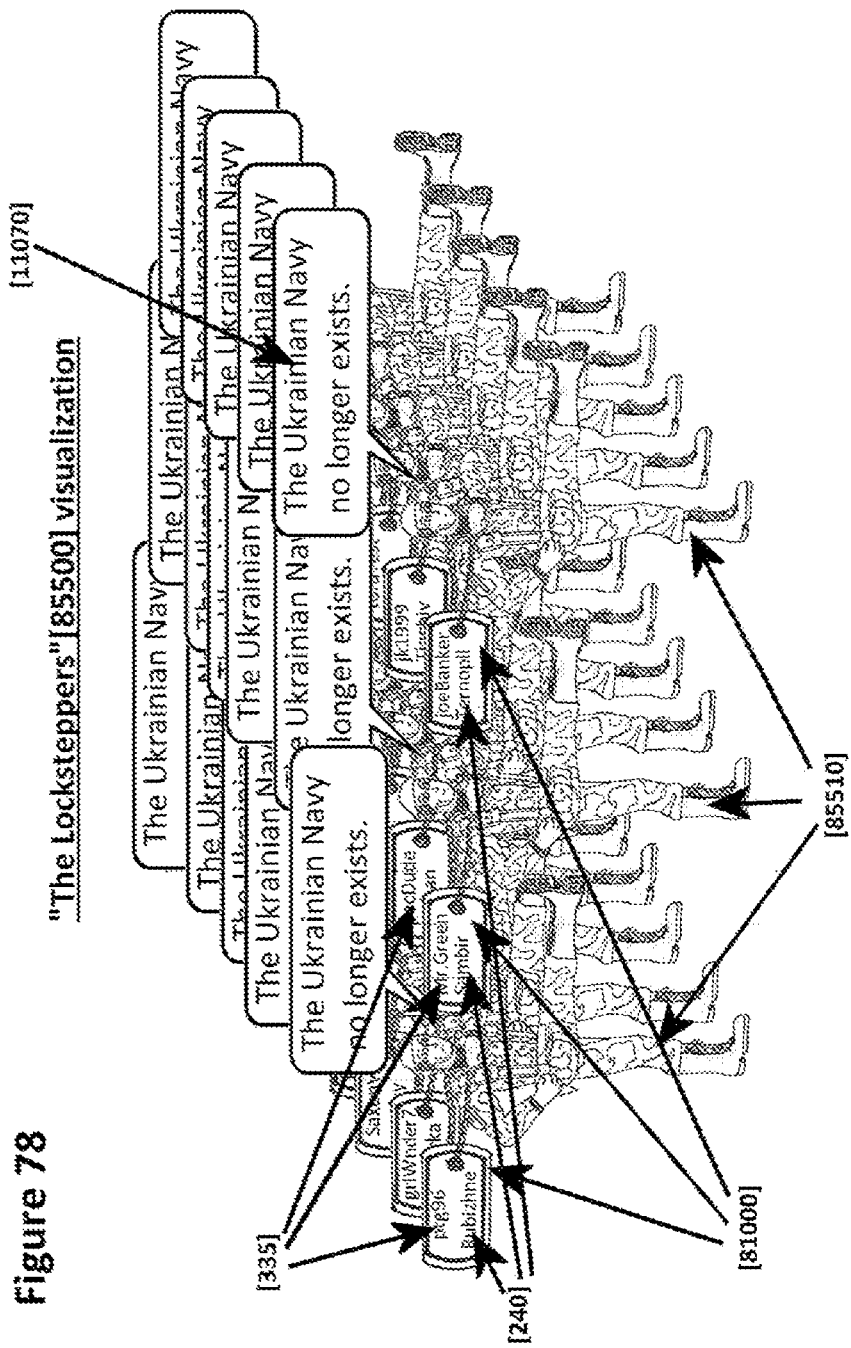
FIG. 78 is an illustration showing an embodiment of an engagement visualization exposing adversaries in lock step to a narrative.

When identities[270] and authors[210] maintaining assertions[11070] in one or more narratives [180] despite these assertions[11070] having been rejected, disproved, and/or quietly disappearing in most others' posts[195] and articles [11080], some embodiments may display a visualization [85500] such as the one depicted in FIG. 78, In this example of an embodiment, depicting these identities[270] as soldiers [85510] marching in a goose-stepping lockstep. Other embodiments may choose different uniforms and lockstep marches to mock the identities'[270] actions in a manner the target audience[820] may more readily recognize. The adversary identities[270] in FIG. 78 marching in lockstep are identified in some embodiments by dogtags[81000] that provide usernames[335], user handles[340], and/or other available demographic information[240] such as the identity's geolocation, which other embodiments may handle with alternate forms of "ID badges" commonly associated with the uniforms the lockstepping identities'[270] avatars [85510] are wearing.

Figure 79:
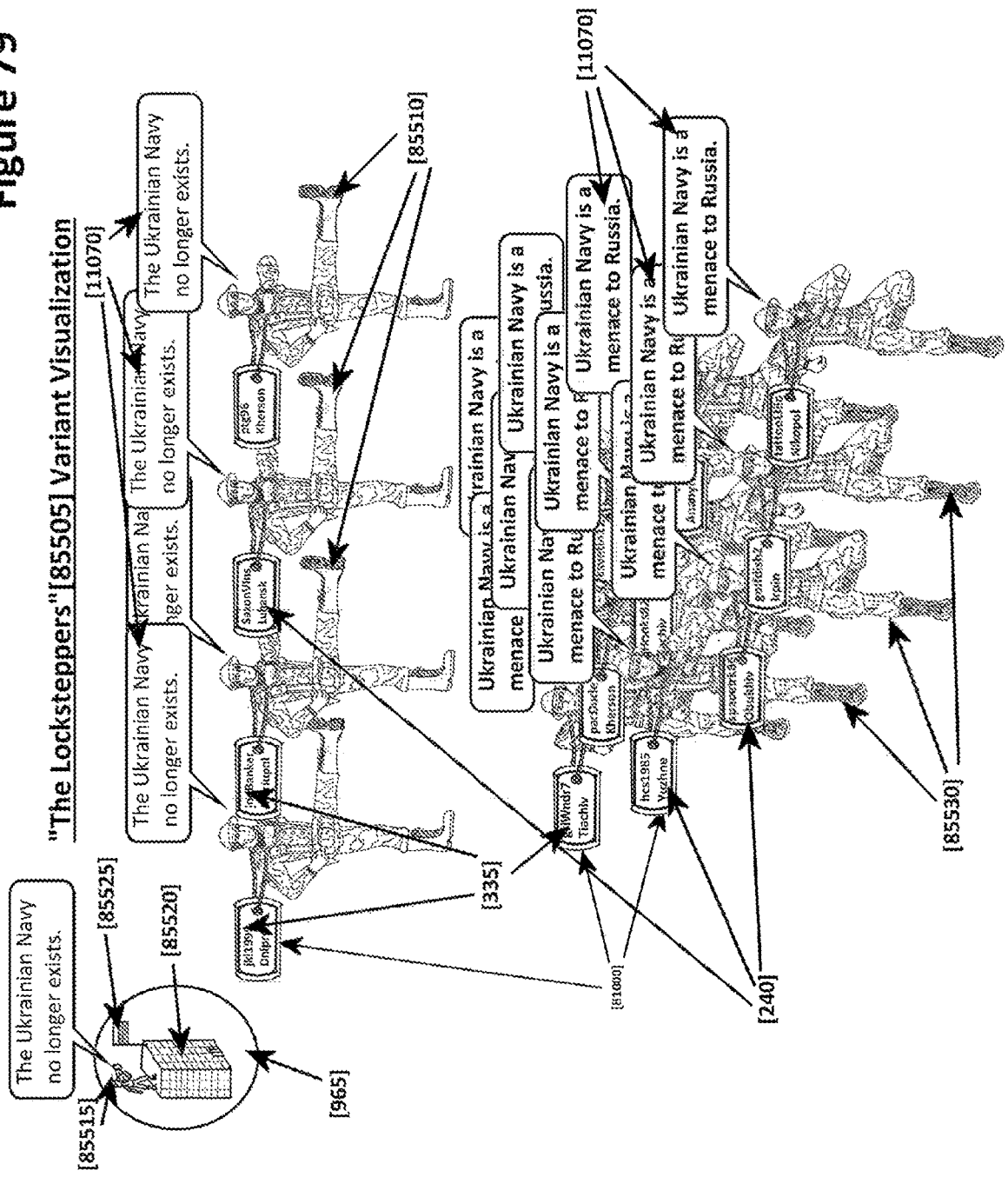
FIG. 79 is an illustration showing an embodiment of an engagement visualization exposing adversaries in lock step to an adversary state actor's narrative despite the mainstream breaking away with a conflicting assertion.

Another embodiment, shown in FIG. 79, is an example visualization[85505] of the related scenario in which identities[270] and authors[210], revealed to be a minority, continue goose-stepping in lockstep, repeating the assertion(s)[11070] of a state actor adversary[965] in the distance (in this example, depicted by an individual with a bullhorn[85515] atop a building[85520] bearing a flag [85525] representing the state adversary[965]), despite other identities[220] who had previously been repeating the same assertions[11070] as the state actor[965] breaking ranks and moving in a different manner and direction (represented by soldiers running in a more practical manner[85530]), making a different, contradicting (rejecting, disproving, etc.) assertion[11070], and thus joining the mainstream opinion.

The Wolf[83205] In Sheep's Clothing[83200]

Sometimes, an adversary[265], having raised enough suspicions so as to be challenged by a Ukrbot[100], terminates an engagement[125] without answering the question[41600] and disappears. In the event that this adversary[265] re-emerges on the channel[140] but pushes a similar discourse under a different user handle[340], the Ukrbot can challenge the adversary[265] again. If this re-appearance falls within a pre-set time window[50090] and appears to manifest similar behavior to that of the previous identity[270], posting related or similar content[950], the Ukrbot[100] call the adversary[265] out with a Wolf[83205] in Sheep's Clothing [83200] visualization, an embodiment of which is shown in FIG. 80.

In this visualization, the adversary[265] is shown resembling a sheep[83200]. The sheep[83200] wears a bell on which the adversary's[265] user handle[340] and demographic information[240] appears. More or other information could be displayed on the bell in other embodiments. A second image will display a wolf[83205] removing the sheep's skin[83200] it was wearing. The wolf[83205] may be wearing a collar and/or accessory[83210] revealing its association with an adversary state actor[965] if there is sufficient evidence. The visualization could be presented as a single image of both the sheep[832000] and the sheep [832000] revealed as wolf[83205], though in other embodiments, as supported by the channel[140], could be presented as a quick slideshow of images between the sheep[83200] and the wolf[83205] shedding the sheepskin[83200], or a short animated video or VR clip, for example. Other embodiments can choose different animals or characters to enact this metaphor in a manner more relatable to other cultures.

Putting the Ukrbot[100] Together with the Infographic Visualizations & their Elements Depending on the specific medium[135], different embodiments and configurations will choose to generate content that integrates an infographic[530] with a Ukrbot instance[110]. In some cases this will be a static image that depicts the Ukrbot instance[110] performing some action with the infographic[530], for example, a Ukrbot instance [110] standing next to or in front of the infographic[530], pointing and laughing, with an appropriate call out which pokes fun at the most egregious aspect of the data that are depicted in the infographic[530]. An example of this is depicted in FIG. 70.

If the medium[135] permits it, many embodiments will opt to weave together multimedia content that contains both one or more Ukrbot instances[110] and the infographic[530] and/or some of its constituent elements. Such content may include, but is not limited to: a Ukrbot[100] explaining the content of an infographic[530] in a video[555], or in a VR setting, a Ukrbot[100] as news anchor reviewing the boldest recent disinformation attempts, likewise.

Figure 81:
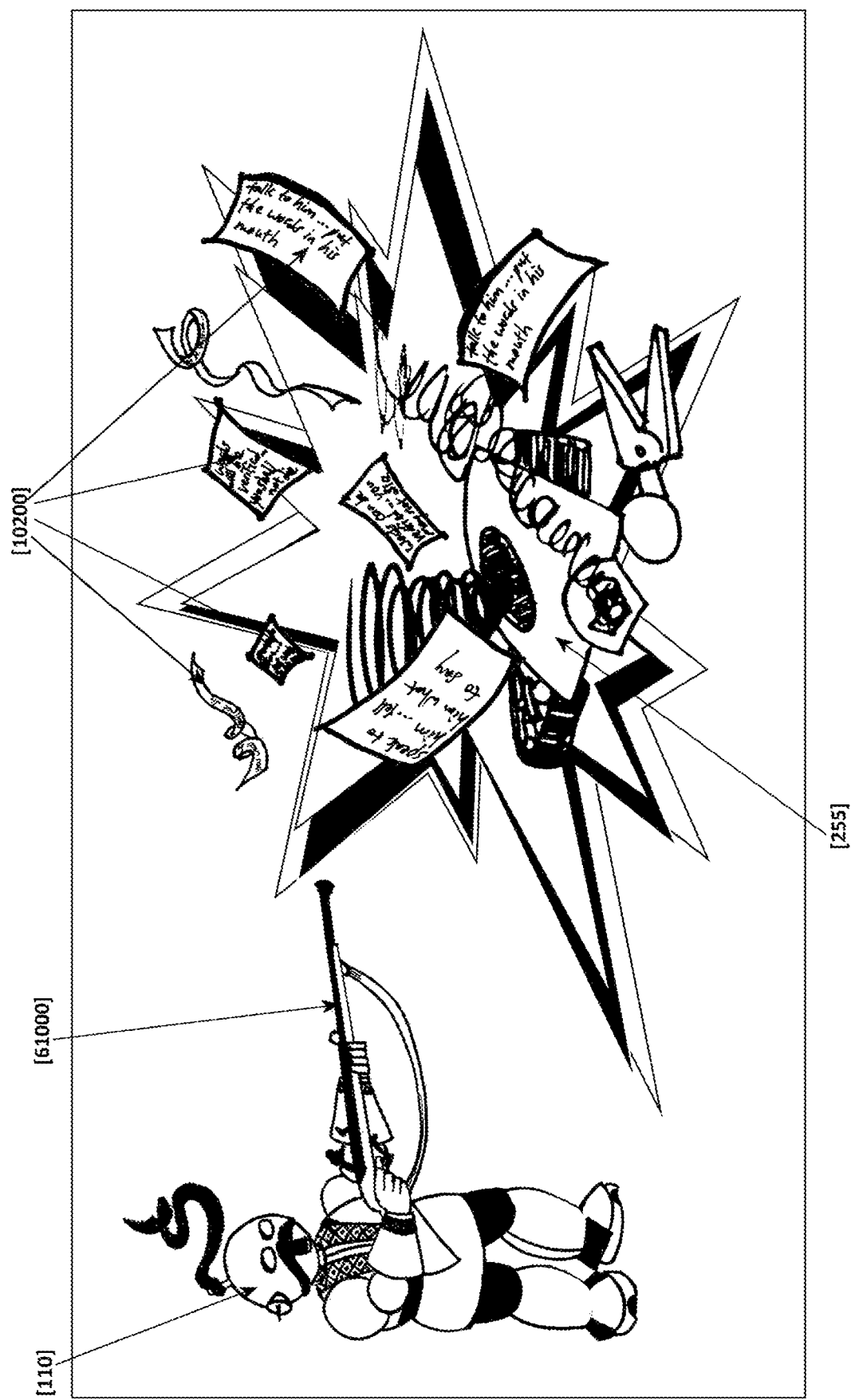
FIG. 81 is an illustration showing a Ukrbot directly interacting with an adversary's avatar in a ridiculous manner such as shooting it with a rifle following a successful engagement.

Some embodiments on some media[135] will allow a Ukrbot instance[110] to directly interact with adversary avatars[275] in ways that ridicule them, for example a Ukrbot instance[110] using a weapon[61000] to strike or blast an adversary bot avatar[255] that, once smashed or blown apart, spews little bits of overtly ridiculous disinformation[10200]. An example embodiment of this is illustrated in FIG. 81. Which depictions are likely to be the more effective will vary greatly by the culture of the audience [910].

Ukrbot Viewing & Validation User Interface

Most embodiments will include interactive visualizations of activity [50100] in the relevant information space [90075]—an information space map[90030] that is intended for use by the broad public. This is for at least three distinct reasons.

The first of these is to provide the public with a concrete sense of how much activity is occurring in any given period of time with respect to certain topics[165] among the general population and with respect to both the activity of bad actors[280], as well as that of the Ukrbots[100]. This is surely useful for a variety of educational and research purposes.

The second reason is providing the general public with a means of giving feedback[90020] on, or tips to, the Ukrbots [100]. While such a feedback [90020] mechanism is sure to be the target of mischief—specifically various attempts by the adversary actor[280] to insert bad or distracting input into the system—it can also serve as a uniquely broad means of capturing broad, well-meant feedback from the general public [90020].

The third reason is security-related: it is clear that the adversary[265] will try to spoof the Ukrbots[100] so as to have them appear to commit every type of bad behavior imaginable. In addition, a variety of other actor types ranging from the benign prankster to the harmful fraudster, are bound to try to spoof the Ukrbots[100]. Thus it is important to provide a good mechanism for users[220] to check whether suspicious encounters with an apparent Ukrbot[100] really were them interacting with a Ukrbot[100]. In this way, users[220] can often avoid being fooled by impostor actors [330], which limits potential mischief on the part of the adversary[265]. Such checks function simultaneously as both user[220] feedback [90020] on Ukrbot[100] behavior or appearance that perhaps should be rethought (if the encounter in question were in fact with a real Ukrbot[100]) and as a means of reporting impersonation attempts. Thus it is quite important to encourage the behavior of user validation [71000].

"Good" in this case means making it as easy—and as enjoyable—as possible for normal users[220] to determine whether or not an apparent Ukrbot instance[110] is actually a real one or an impostor [330], regardless of its provenance. Since the dispatch system[50000] will keep a full auditability log[50020] of all Ukrbot[100] engagements[125] with timestamps[760], it will not be difficult to determine whether a given engagement [125] (e.g. a particular post[195] at a given time, on a given channel[140]) came from a "real" Ukrbot instance[110].

The difficulty comes from the fact that in many cases, a user[220] may only become curious about a particular (presumed) Ukrbot[100] engagement[125] hours or even days after the fact, and may no longer recall many of the specific details including the exact hashtag, text, or timestamp[760] for example. Further, some users[220] can be expected to react to the adversary's [265] propaganda—for example, a claim that on a given day, a Ukrbot instance[110] made a very racist or otherwise objectionable comment [51615] on a given platform[190] relating to a given topic [165]—not just what they themselves experienced. Users [220] trying to debunk such propaganda would thus lack the exact information that would facilitate a normal forms-based search.

The spoofing of Ukrbots[100] by the adversary [265] is one argument for having Ukrbot instances[110] be instantiated with different individual characteristics[120] so that they change frequently. In the case of Ukrbot personae[115], although some characteristics [120] will be persistently associated with that persona[115], other characteristics [120] will change; even the fixed ones may be modified in some way that still leaves them recognizable.

These characteristics [120] may be anything that might be memorable to users[220] of the target demographics [240]. In fact, in the best case, the characteristics [120] are of a nature such that they are meaningful and so memorable to users[220] of the particular demographic [240], but not to the adversary[265]. Examples include but not limited to: a name or nickname with special meaning, a very visible short ID number, a Ukrbot[110] who is wearing gear with the colors or logos of particular sports team, a particular type of hat, is accompanied by a certain pet, wearing a pin/button, or a particular jacket. Many embodiments will opt to go this route as it makes Ukrbot[100] impersonation a bit more difficult.

Modifying such features[120] in a varying way, for example after each time window[50090] of length M, or after each Nth engagement[125], and in which M and N also change regularly imposes an additional barrier to spoofing.

Thus most embodiments will opt to do this. For example, if a particular personality[133] always wears a hat, the exact features of the hat can regularly change; focus group testing can help identify which types of changes seem to be most noticed by users[220]—and accurately remembered by users [220] for a few hours or more afterwards. In the embodiments that make such regular changes to the Ukrbots'[133] appearance, programmatic access for authorized applications allowing the retrieval of all such changes will also be provided through an API to the Authentication Server [70015].

In addition to having a standard form interface[90110] into which a user[220] can enter information that includes, but is not limited to: a time range[90115], a channel[140], the medium[135], the gist of the text/image/video[555] that appeared in posts[195], and any specific information about the Ukrbot instance[110], many embodiments will offer a drill-down visual topic map[90035] that is analogous to a street map that shows the "beats" of different cops in community policing. Different embodiments may opt to determine the gist differently, for example with text similarity measures, any form of topic detection, or any combination of these. Note that by "topic" in this case, we mean broadly any partition by campaign[150150], narrative[155] or single topic[165]. In many cases, there will be complex ontological hierarchies of that can be navigated by drill-down. Most embodiments will allow either—or both—individual users[220] and/or operators of the Ukrbot site [880] to adjust the level of object that is displayed by default upon entry of the site[880].

The information space maps[90030] are cross-channel. If a given narrative[155] appears on 67 distinct sites or media [135], and multiple channels[140] within some of them (e.g. multiple hashtags on Twitter for example) its representation in the map[90030] would be broken down in 67 distinct appearances. In some embodiments, activity within each distinct site/media[135] will be contained within a contiguous area[50305]. In other embodiments, the similarity of the discourse [50515] among the given channels[140] will trump the medium[135] of the channel[140]. Thus, very similar discussions occurring on different media[135] will be rendered contiguously. Some embodiments may offer users[220] the choice of whether to draw the positions of the different regions on the map based primarily on media[135] or based on similarity of discourse [50515]. Some embodiments will opt to draw the "best" topic map[90035] in each individual instance, including drill-down level, in much the same way as graph layouts commonly are performed, and offer this option as a user preference. Most embodiments will allow channels[140], channel groups[145], media[135] or ecosystems[915] to be the default units of location [405] to be pictured on a map[90030] of the information space [90075].

Similarly, the layout of the different areas[50305] is determined in the usual way in most embodiments: cross-referencing of topics[165]. Some embodiments may however instead prefer to use other options. These include, but are not limited to: topic[165] similarity, relationships among topics such as membership in the same narrative[155] or campaign[150] or other kinds of ontological relationships among topics[165]. However, some embodiments may instead prefer to lay out based on crossover of users[220]; still others may prefer to do so on the basis of explicit links and other types of co-referencing.

In most embodiments, each distinct area[50305] will have a slightly different background coloring [90100] so as to make rapid distinguishing among them easier; many will also use a light border line as one sees commonly in maps. Likewise, each area[50305] will have a clear label in almost all embodiments, much as regular maps do.

In most embodiments, the different channels[140] within a given medium[135] are represented as streets[90060] of different sizes based on combinations of the following elements, amongst others: their overall traffic levels[90070], maximum level of traffic [90070], amount of bad trolls and bots active[50195], the apparent influence being gained by these bots[60520], their activity level[50100], number of Ukrbot instances[110] active, and the stability/longevity of the channel[50180]. Different embodiments may opt for different combinations, or to change dynamically based on anomalies captured by the targeting system[10000], and allow different user preference options. The reason for the variation between embodiments is that while, for example, more heavily trafficked channels[140] are likely to be of greater interest, all things being equal, if the targeting system[10000] finds nothing to target, arguably in our context, it is not even worth visualizing at all. Channels[140] that first popped up yesterday may well be all but dead before the end of the week, and there are arguably HCI benefits to trying to keep the map[90030] reasonably stable.

So for example a long-running discussion group with a large user base on a given platform[190] might be drawn as a 4 or 6-lane road, while one that is used by a small group of experts would be only 2-lane—or maybe even a one-way alley. A very highly trafficked street[90060] would be rendered as a boulevard in many embodiments, with a separator strip between the lanes going in opposite directions. Street names[90065] are the same as the names of the channel[140] they represent, although most embodiments will perform truncations past a certain fixed character limit.

Since channels[140] very often have relationships to other channels[140] such as cross-posting, co-referencing, and co-occurring topics[165], the roads[90060] associated with related channels[140] will often intersect on the map [90030]. Roads[90060] may also go across media[135] boundaries, albeit with name changes, thus linking together conceptually similar channels[140] on different platforms [190]. In some embodiments, the titles of posts[195] that were either judged influential by the targeting system [10000] or popular by whatever measure appropriate for a given media[135] according to the chosen configuration, will show up as signs[83100] on buildings[90080] on either side of the street[90060] representing the channel[140] or other location [405] unit, truncated at the word level if needed for space reasons. In other embodiments, this will instead be topics[165], in still others narratives[155] or campaigns[150]. The height and width of the buildings [90080] in most embodiments provides a visual cue to either the number of posts[195] it represents or their influence [60520], depending on the embodiment, and the configuration parameters in place. Buildings[90080] that correspond to a collection of posts[195] that are aging will in some embodiments be rendered as being older, for example as having chipped or faded paint and/or being of an older architectural style. In many of these embodiments, these buildings will eventually be removed after a certain pre-set interval of inactivity and replaced with one that reflects a more current conversational topic[165]. If there is no suitable replacement due to lack of activity on the channel[140] in question, some embodiments will show an empty lot, which may initially be accompanied by a bulldozer, so as to indicate the virtual equivalent of urban blight. Some of these embodiments will display the title of the former building [90080] in the dirt.

Conversely, in some embodiments, streets[90060] that are significantly gaining in traffic may show signs of construction consistent with the road[90060] being enlarged. Likewise, those buildings[90080] that represent collections of posts[195] that are rapidly growing will be rendered as new-looking and modern.

In some embodiments, the direction of traffic on the streets[90060] will be random; there's a direction to the traffic only so as to maintain the metaphor. For this reason, some embodiments may choose to render only one-way streets[90060], regardless of their traffic levels [90070]. In other embodiments, the direction of motion will reflect whether the given user[220], or objects representing multiple users[220] is moving from one conversational thread within the channel[140] to the next—and if so, the order—or is largely sticking with the same one. Similarly, where there are streets[90060] (e.g. channels[140] or media[135]) that intersect, in such embodiments, motion within one street [90060] towards, or away, from another will be reflected in the rendering. Some embodiments may also choose to use traffic direction to indicate a positive or negative sentiment [50510] polarity[11065].

Because this visualization will usually have a considerable number of moving pieces, many embodiments will allow users[220] to select or deselect channels[140] and media[135] based on what their interests are. Some embodiments will choose to provide an extensive list of user preferences relating to what to view and what to suppress.

In most embodiments, the map[90030] will have a slider to adjust for both time and day[760]. For example, in most embodiments the background coloration[90100] and ambient light level of the map[90120] will change to reflect the time of day being selected. In many embodiments, stars and a moon will be rendered for nighttime hours. Likewise, there may be visual cues for specific holidays[11005]; visual cues of this nature might make someone remember that they saw a post [195] on a particular day, or during a particular season (e.g. Christmas lights around the holiday season.) In many embodiments, users[220] can specify the timeframe they wish to visualize, thus allowing them to view previous periods of time. While most embodiments will use standard calendar widgets for this purpose, many will also provide sets of simple events[11005] from which to choose that may help the user[220] to better recall the relevant time period; often it is much easier to remember that something occurred the day of a memorable event than the actual date. Drilling down far enough will recreate any Ukrbot instances[110] that were active on the given location[405140] during the specified time period as well the accounts[229] the system has determined are adversary bots[255] or trolls[260]. However, as an anti-spoofing measure, most embodiments will not render visual details of the Ukrbot instance's[110] appearance that were not specified in the search.

Most embodiments will depict engagements[125] that were successful by rendering a visual artifact[90085], for example a chalk outline of a bot[255] or troll[260] as appropriate on the street[90060], much as at a crime scene. In most of these embodiments, the chalk outline (or other such artifact) will fade over time and eventually disappear. This is because the intent of the map[90030] in most embodiments is to visualize activity that is recent or current. However, many embodiments will offer viewing modes that show only such artifacts[90085], rather than traffic[90070], for a user-requested window of time[50090], as this provides a nice visualization of the channels[140] and general topic areas in which, for example, the Ukrbots[110] are having the greatest impact.

Figure 82:
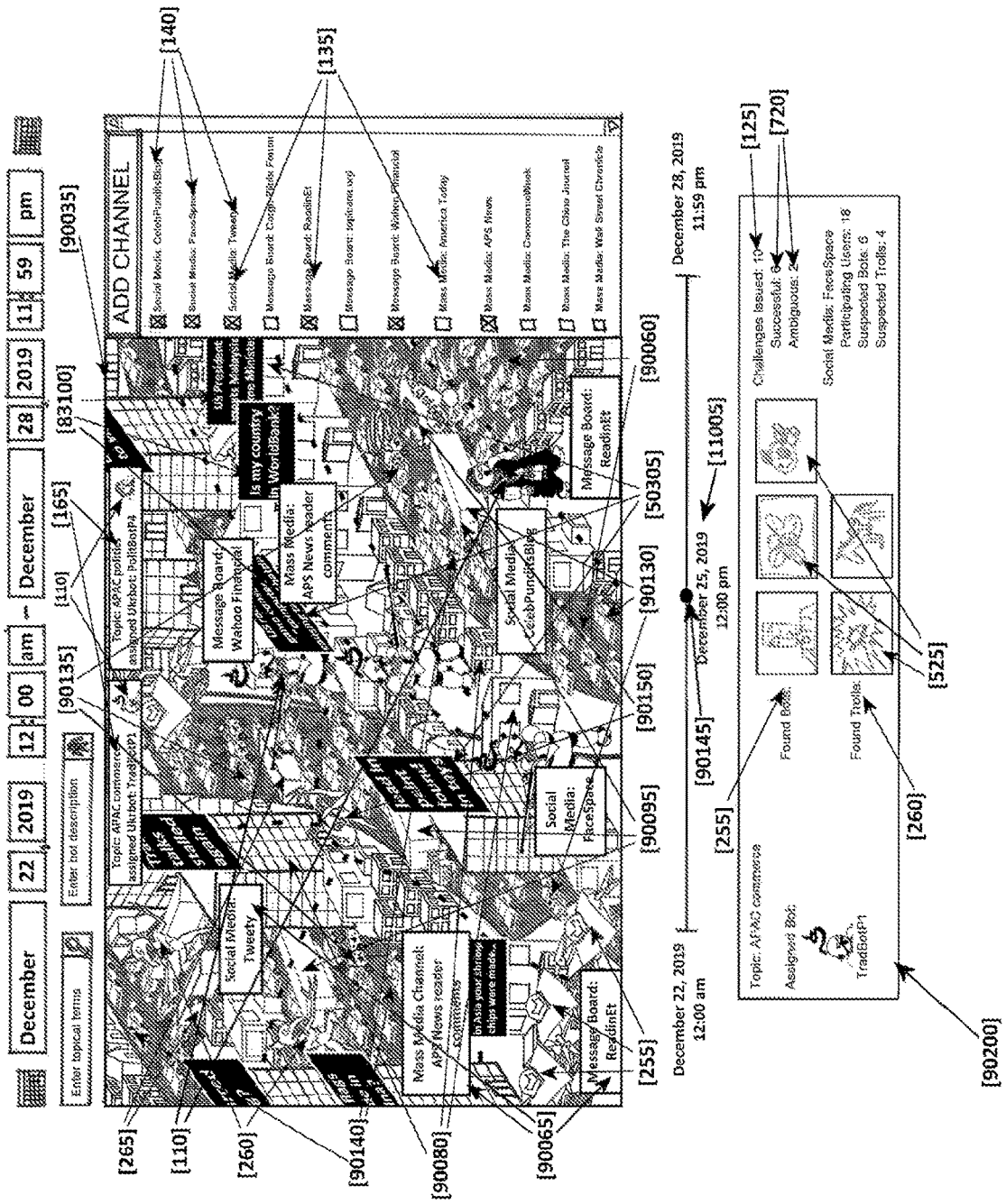
FIG. 82 is an illustration showing an embodiment of the Ukrbot Viewing & Validation User Interface's traffic map view.

Most embodiments will provide visual cues as to the amount and assessed type of users[220] and adversaries [265] of different kinds that are circulating on a given channel[140] at a given time, for example genuine users [220] vs. suspected (or confirmed) bots[255] or trolls[260], users[220] of different demographics [240], of special interest, etc. One embodiment as illustrated in FIG. 82, chooses to do this with vehicles of different kinds[90130] to represent different demographics [240] of users[220], however other embodiments may choose other representations, including anthropomorphic ones such as people walking, bicycling, on scooters, motorcycles, etc. Still others may opt to avail themselves of a mixture of representation styles, so as to best represent the population being visualized, for example, cars, people walking, riding bicycles, etc.

Most embodiments will support the notion of an aggregate or composite user[220290], which is to say aggregating individual users[220] who are manifesting self-similar behavior and/or also share many demographic traits[240]. This notion of an aggregate user[290] will generally be used either in the case of visualizing large numbers of simultaneous users[220], and in many embodiments, in the case in which groups of users[220] seem to be demonstrating coordinated (as opposed to similar) behavior. It should be noted that "coordinated" does not imply the motive for the observed coordination, which could be anything from trying to promote a product to sowing disinformation on behalf of a state actor [965].

Some embodiments may use different means of visualizing users[220] based on their behavior, both for individual users[220] and aggregate[290] ones. For example, a user [220] who is widely deemed to be misbehaving in some way by other users[220] might be rendered in some embodiments as a clown driving a clown car[90135]. Further, some embodiments may choose to specially designate users[220] who have come to the aid of a Ukrbot instance[110] as understood by the NLU component [10100]—and those who have done the reverse.

Almost all embodiments will render probable adversaries [265] as one of bot[255], troll[260], unclear[265], or sock puppet[90090], that is an account[229] that is observably passed between human operator[250] and bot[255]. They will generally use supplied graphics in the knowledge base [10270] for the particular identity[285] in question. Similarly, almost all embodiments will use the guidance provided by the dispatch system[50000] to render each Ukrbot instance[110].

Most of these embodiments that use vehicles in their representations will render aggregate users[290] as trucks [90095] rather than cars, with the relative length of the truck[90095] serving as a visual cue as to the number of users[220] it represents. Many embodiments will opt to print the number of users[220] being represented in this manner.

Almost all embodiments will acknowledge both that many types of demographic features [240] may be useful to visualize, depending on the exact circumstances, but that such demographic information[240] will often be false. Thus, they will opt to allow visual representation of both the asserted demographic [240] and indicators of the probable authenticity of the demographic information [240] provided. For example, in those embodiments which use cars [90130] to indicate traffic [90070], question marks[90140] will be rendered on the roofs of the vehicles [90130] in the cases in which the available demographic information[240] is considered suspect by the targeting system[10000]. In many of these embodiments, the size of the question mark[90140] relative to the available space serves as a visual cue to the extent of the suspicion.

Most embodiments that implement the notion of Ukrbot instances[110] with persistent personas[115] will offer users the option of display the "beat" of each such Ukrbot instance [110] on the map[90030]. When this option is enabled, a picture[520] of the Ukrbot persona[115] and its name will appear over the area that it "patrols" along with a largely transparent colored overlay to designate the boundaries.

Clicking on that picture[510520] or name in most embodiments will bring up a scorecard[90200] for that Ukrbot persona[115]. In most embodiments, one must view the scorecard[90200] in order to really be able to see the persistent identifying visual and other personalized details of the Ukrbot persona[115].

In most embodiments, the scorecard[90200] will contain statistics which include, but are not limited to: the number of engagements[125] to date for this persona[115], when it was originated, the breakdown of the outcomes[720] of its engagements[125], and a list of adversaries[265] pictured with their avatars [525] that this persona[115] successfully chased away. Some embodiments may also choose to include links to the infographics[530] used successfully by the persona[115] and/or a list of the narratives[155] that the adversaries[265] successfully engaged by the Ukrbot[100] were promoting.

The scorecard[90200] in most embodiments also allows users[220] to provide feedback on the performance of the related Ukrbot persona[115]. In many embodiments, this will be handled by a dedicated dialog system[40000] which tries to iteratively prompt users [220] to disambiguate or restate their comments [51615] so that they are as specific as possible, and ideally also fully interpretable by the dialog system[40000], "System and Method for Detecting and Analyzing Digital Communications," U.S. patent application Ser. No. 16/576,736, filed Sep. 19, 2019, herein incorporated by reference in entirety.

Almost all embodiments will display a variety of rolling statistics on demand. These include, but are not limited to: the average number of Ukrbot instances[110] active, the number of engagements[125] executed and their assessed outcomes[720], the number of suspected trolls[260] and bots[255] active, the number of users[220] endeavoring to assist the Ukrbots[100], counts of the most frequently occurring campaigns[150], narratives[155], and topics[165] in channels[140] on which there is meaningful adversary[265] activity.

Almost all embodiments will provide a multi-faceted search widget[70010] so as to enable users[220] to verify whether or not one or more particular posts[195] were made by a real Ukrbot instance[110] as opposed to some kind of impostor [330]. Most embodiments will provide as many ways as possible for users[220] to locate the engagement [125], or the Ukrbot instance[110] if in fact it took place. These ways include, but are not limited to the following: Ukrbot[100] ID, date and time range with the previously described extended calendar widget[70010], channel[140], medium[135], topics[165], narratives[155], campaign[150], sentiment[50510], language[50495], dialect[50500], visual appearance aspects[60010], persona[115] details such as name [50585], moniker [335], and visual appearance [60010] aspects, user handle [340] of adversaries[265], words, phrases, or text snippets from posts[195], images, sounds, or video contained in posts[195], links contained in posts, [195], hashtags contained in posts[195]. An example of this is illustrated in 82.

In almost all embodiments, a search will be permitted if even one of these values is specified. Likewise, in the majority of embodiments, if no results are found, parameters that are easily extended, such as time, time of day, related topics[165] will be automatically, and the search rerun. This is to allow for mistakes of memory among users[220], which are likely to be fairly common.

In some instances, on the basis of search parameters provided—for example, in the case of radioactive content [50200]—it may be initially clear that the post [195] did not come from a real Ukrbot[100] and so is a fake. Nonetheless, many embodiments may still produce search results. For example, the radioactive content[50200] may indeed have come from a Ukrbot engagement[125]—but was posted by an adversary identity[285], not a Ukrbot[100] and there may be some value in showing this to be the case.

Once the search has been run, if results were returned, in most embodiments the user[220] can browse them or further refine or otherwise modify the search parameters. Virtually all embodiments will provide a means for the user[220] to indicate that he found what he was looking for—or that he definitively did not. In the event that a large number of results are returned, most embodiments will offer refined search assistance, for example visualizations and statistics relating to things like the topics[165] or narratives[155] that occur most frequently in the returned results, the language [50495] or dialect[50500], etc.

If the user[220] fails to indicate that they have located the desired thing, in most embodiments, the Authentication System[70000] will provide the user[220] a coarse-grained probability that the interactions they are describing were actually those of a Ukrbot instance[110]. In most cases, this will occur either because the sought-after thing doesn't exist—because the interactions were with an impostor [330]—or because insufficient and even inadvertently incorrect data was provided by the user[220]. Alternately, the user[220] simply didn't want to spend the time looking through the returned results, and wants to know quickly whether or not it was probably an impostor [330] or a real Ukrbot[100].

While this is not at all a standard behavior of search interfaces, it makes sense in this case. The reason is best illustrated by example. It would be highly undesirable for searches such as the post [195] by a bot with a Ukrbot[100] appearance: "Hitler was right to kill or enslave non-Aryans" to fail to return a result, but still leave the user[220] wondering if it were only because he had gotten some detail wrong. If however, a set of searches is run in the background which establishes (for example) that no Ukrbot instances [110] have ever used the named entity "Hitler" then the user[220] could be informed that the probability of a real Ukrbot instance[110] having made the post [195] is basically zero. Thus the Ukrbot[110] could post a comment [51615] that none of its Ukrbot brethren have never ever made reference to Hitler. Case closed.

The same strategy will also be employed by most embodiments in cases in which it is less clear cut. For example, positive sentiment[50510] Ukrainian Ukrbot[100] posts on the topic of Vladimir Putin are highly unlikely, but not entirely impossible; sarcastic dialog could be miscategorized as positive sentiment [50510] for example. Still, a probability could be calculated based on the analysis of all Ukrbot[100] postings [195] on a given ecosystem[915]—or altogether.

To calculate the probability of a Ukrbot[100] spoofing incident most embodiments will also search available databases of adversary[265] memes and narratives[155], looking to match any text and other information provided by the user[220]. If a near-match using any existing technique is found, in most embodiments, the probability of the relevant interaction being fake will be set very high, the exact weighting being left to the administrator. Likewise, almost all embodiments will accept as input lists of identities[285] that have been deemed to be in the control of the adversary [265] by a trustworthy entity so that they can be blocked from trying to exploit the feedback system [90020].

Different embodiments may take different approaches to assessing the non-zero probability that a post[195] is the result of a Ukrbot[100] spoofing incident. These include but are not limited to: assessing and comparing topic/sentiment [50510] categorizations of common topics between the collection of Ukrbot[100] data and the collection of adversary identity[285] posts[195] over the same time period and in the same ecosystems[915], similarly assessing and comparing relative topic[165] frequency, the timing, content [950], and identity[285] performing the search w.r.t. manifesting any patterns or links to the adversary[265], and looking for specific linguistic markers, for example text that appears to have been machine translated or which reflects limited language competency.

Some embodiments will leverage the dialog system [40000] and the infographic generation component[60025] to generate explanations of the assessment. For example, if adversary identities [285] frequently mention "Hitler" that can be both explained in text and visualized in an infographic[530].

Searching for Adversary Identities[285]

Most embodiments will also allow users[220] to search for bad guys through the information space [90075] topic map[90035] user interface through a search widget for that express purpose. The same techniques as elsewhere described also can be applied to this use case. However, there is one important difference that most embodiments will accommodate: users[220] may search and receive results for an adversary identity[285] which has already been featured in a Ukrbot engagement[125] and for which the targeting certainty[51500] is above an administrator-specified threshold but no others.

The motivation for this is straightforward enough. Once an adversary identity[285] has already been "outed" from the system's point of view, there is nothing to be gained from secrecy about it. However in more ambiguous cases, and in those cases in which an identity[285] has been targeted but not yet engaged, it may be useful to hide what is effectively a proxy for the targeting certainty[51500] from public view. This is because, for example, such identities[285] can provide "guilt by association" value in identifying both other adversary-linked identities[285] and tainted content[185]. Thus no results will be returned in such cases by most embodiments.

What is claimed is:

1. A technical targeting system for multi-evidence targeting, comprising:
    graph processing server configured to accept messages from one or more message queues of online content, the one or more message queues fed by a data collection process encoding online content into data records for the one or more message queues,
    one or more storage devices configured to store data and manage a knowledge base; and
    one or more processors, configured to execute functionality for subsystems, components, and mechanisms stored in one or more non-transitory computer readable mediums, the one or more non-transitory computer readable mediums store subsystems, components, and mechanisms comprising:
    a Natural Language Understanding/Natural Language Generation (NLU/NLG) subsystem configured to reference the knowledge base;
    an assertion and event identification, extraction and analysis component configured to execute the NLU/NLG subsystem to extract the data from the accepted messages for storage into the one or more storage devices, the extracted data directed to assertions or references to real world events,
    an influence measurement component configured to detect sentiment change from the stored data and label disinformation in the stored data based on the detection of coordination patterns,
    a narrative and campaign identification component configured to identify one or more narratives from one or more sequences of disinformation from the stored data and one or more campaigns of disinformation regarding the real-world events within a bounded window of time.

2. The technical targeting system of claim 1, wherein the one or more processors are configured to:
    identify an at least one characteristic of disinformation based on one or more of:
    presence of following processes, commands, and work schedules,
    coordinated behavior,
    sock puppet transfers,
    anomalous echo chamber formulation,
    content transmission patterns,
    aspects of the online content being posted,
    trajectories,
    accounts being transitioned among multiple identities,
    narrative transmission,
    campaign participation,
    inauthenticity in one or more of demographic, professional or domain
    knowledge, employment status, physical location, and bot versus human,
    characteristics displayed by bots,
    behavior when confronted with system bots,
    unstable lexical fingerprints,
    malicious or adversarial actions,
    unusual regularities in behavior, or
    correlation to unusual changes in user behavior, Social Network Analysis (SNA), and image component reuse.

* * * * *